(12) United States Patent
Dugan et al.

(10) Patent No.: US 7,209,964 B2
(45) Date of Patent: *Apr. 24, 2007

(54) INTELLIGENT NETWORK

(75) Inventors: Andrew Dugan, Superior, CO (US); Allen M. Holmes, Colorado Springs, CO (US); Terence A. Robb, Colorado Springs, CO (US); Ajay P. Deo, Lewisville, TX (US); Sami Syed, Tervuren (BE); Wendy T. Wong, Dallas, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 380 days.

This patent is subject to a terminal disclaimer.

(21) Appl. No.: 10/817,295

(22) Filed: Apr. 5, 2004
(Under 37 CFR 1.47)

(65) Prior Publication Data

US 2005/0021713 A1    Jan. 27, 2005

Related U.S. Application Data

(63) Continuation of application No. 10/040,320, filed on Jan. 4, 2002, now Pat. No. 6,779,030, which is a continuation of application No. 09/420,666, filed on Oct. 19, 1999, now Pat. No. 6,363,411, which is a continuation-in-part of application No. 09/128,937, filed on Aug. 5, 1998, now Pat. No. 6,418,461.

(60) Provisional application No. 60/061,173, filed on Oct. 6, 1997, provisional application No. 60/104,890, filed on Oct. 20, 1998.

(51) Int. Cl.
*G06F 15/173* (2006.01)

(52) U.S. Cl. .................................. 709/223; 379/221.08

(58) Field of Classification Search ........ 709/200–203, 709/212–213, 217–226, 346, 246; 379/221.08
See application file for complete search history.

(56) References Cited

U.S. PATENT DOCUMENTS

| | | |
|---|---|---|
| 4,713,806 A | 12/1987 | Oberlander |
| 5,157,390 A | 10/1992 | Yoshie et al. |
| 5,168,515 A | 12/1992 | Grechter et al. |
| 5,185,782 A | 2/1993 | Srinivasan |
| 5,323,452 A | 6/1994 | Dickman et al. |
| 5,335,268 A | 8/1994 | Kelly, Jr. et al. |
| 5,450,480 A | 9/1995 | Man et al. |
| 5,463,682 A | 10/1995 | Fisher et al. |
| 5,475,817 A | 12/1995 | Waldo et al. |
| 5,537,466 A | 7/1996 | Taylor et al. |
| 5,551,035 A | 8/1996 | Arnold et al. |
| 5,619,557 A | 4/1997 | Van Berkum |
| 5,644,629 A | 7/1997 | Chow |
| 5,655,081 A | 8/1997 | Bonnell et al. |
| 5,664,102 A | 9/1997 | Faynberg |
| 5,742,668 A | 4/1998 | Pepe et al. |
| 5,748,896 A | 5/1998 | Daly et al. |
| 5,754,639 A | 5/1998 | Flockhart et al. |
| 5,754,939 A | 5/1998 | Herz et al. |
| 5,774,668 A | 6/1998 | Choquier et al. |
| 5,799,153 A | 8/1998 | Blau et al. |
| 5,812,533 A | 9/1998 | Cox et al. |
| 5,825,865 A | 10/1998 | Oberlander et al. |
| 5,825,869 A | 10/1998 | Brooks et al. |
| 5,826,268 A | 10/1998 | Shaefer et al. |
| 5,828,747 A | 10/1998 | Fisher et al. |
| 5,838,970 A | 11/1998 | Thomas |
| 5,867,498 A | 2/1999 | Gillman et al. |
| 5,881,134 A | 3/1999 | Foster et al. |
| 5,892,946 A | 4/1999 | Woster et al. |
| 5,898,839 A | 4/1999 | Berteau |
| 5,907,607 A | 5/1999 | Waters et al. |
| 5,912,961 A | 6/1999 | Taylor et al. |
| 5,915,008 A | 6/1999 | Dulman |
| 5,923,892 A | 7/1999 | Levy |
| 5,940,616 A | 8/1999 | Wang |
| 5,958,016 A | 9/1999 | Chang et al. |
| 5,966,434 A | 10/1999 | Schafer |
| 5,991,389 A | 11/1999 | Ram et al. |
| 5,991,811 A | 11/1999 | Ueno et al. |
| 5,999,965 A | 12/1999 | Kelly |

| | | | |
|---|---|---|---|
| 6,014,700 A | 1/2000 | Bainbridge et al. | |
| 6,028,924 A | 2/2000 | Ram et al. | |
| 6,041,109 A | 3/2000 | Waller et al. | |
| 6,041,117 A | 3/2000 | Androski | |
| 6,044,142 A | 3/2000 | Hammarstrom et al. | |
| 6,044,264 A | 3/2000 | Huotari et al. | |
| 6,044,368 A | 3/2000 | Powers | |
| 6,078,586 A | 6/2000 | Dugan et al. | |
| 6,085,030 A | 7/2000 | Whitehead et al. | |
| 6,101,616 A | 8/2000 | Joubert et al. | |
| 6,122,510 A | 9/2000 | Granberg | |
| 6,134,530 A | 10/2000 | Bunting et al. | |
| 6,182,109 B1 | 1/2001 | Sharma et al. | |
| 6,208,856 B1 | 3/2001 | Jonsson | |
| 6,209,018 B1 | 3/2001 | Ben-Shachar et al. | |
| 6,266,406 B1 | 7/2001 | Mercouroff et al. | |
| 6,295,353 B1 | 9/2001 | Flockhart et al. | |
| 6,310,949 B1 | 10/2001 | Taylor et al. | |
| 6,321,323 B1 | 11/2001 | Nugroho et al. | |
| 6,324,275 B1 | 11/2001 | Yagel et al. | |
| 6,327,355 B1 | 12/2001 | Britt | |
| 6,330,326 B1 | 12/2001 | Whitt | |
| 6,333,931 B1 | 12/2001 | LaPier et al. | |
| 6,360,266 B1 | 3/2002 | Pettus | |
| 6,363,411 B1 | 3/2002 | Dugan et al. | |
| 6,366,657 B1 | 4/2002 | Yagel et al. | |
| 6,393,481 B1 | 5/2002 | Deo et al. | |
| 6,418,461 B1 | 7/2002 | Barnhouse et al. | |
| 6,430,600 B1 | 8/2002 | Yokote | |
| 6,453,038 B1 | 9/2002 | McFarlane et al. | |
| 6,564,270 B1 | 5/2003 | Andert et al. | |
| 6,628,769 B1 | 9/2003 | Vleer et al. | |

FOREIGN PATENT DOCUMENTS

| | | |
|---|---|---|
| WO | 95/23483 | 8/1995 |
| WO | 96/13949 | 5/1996 |
| WO | 96/20448 | 7/1996 |
| WO | 98/09421 | 3/1998 |
| WO | 00/23898 | 4/2000 |
| WO | 00/24182 | 4/2000 |

OTHER PUBLICATIONS

Stowe, Mike, "Service Management For the Advanced Intelligent Network", Countdown to the New Milennium, Phoenix Dec. 2-5, 1991, Proceedings of the Global Telecommunications Conference. (Globecom), New York, IEEE, US, vol. 3, Dec. 12, 1991, pp. 1667-1671.

*Primary Examiner*—Moustafa M. Meky

(57) ABSTRACT

In a telecommunications switching network having a resource complex including network switches, an intelligent service platform for providing intelligent call processing and service execution for call events received at the switches and requiring call processing services. A centralized administration system is provided that comprises a system for storing one or more reusable business objects that each encapsulate a distinct call-processing function, and any associated data required by the business object; a system for distributing selected business objects and associated data to selected nodes in the switching network based on pre-determined node configuration criteria; and, a system for activating the business objects in preparation for real-time use. A computing platform is provided within each node for executing those business objects required to perform a service in accordance with an event received at the network switch. Also within a node is a storage and retrieval system for sorting and retrieving selected objects and any associated data distributed by the administration system, and making them locally available to the computing platform when required to perform a service. An underlying location-independent communication system is provided to coordinate interaction of one or more business objects to perform the service in response to needs of the received event.

30 Claims, 61 Drawing Sheets

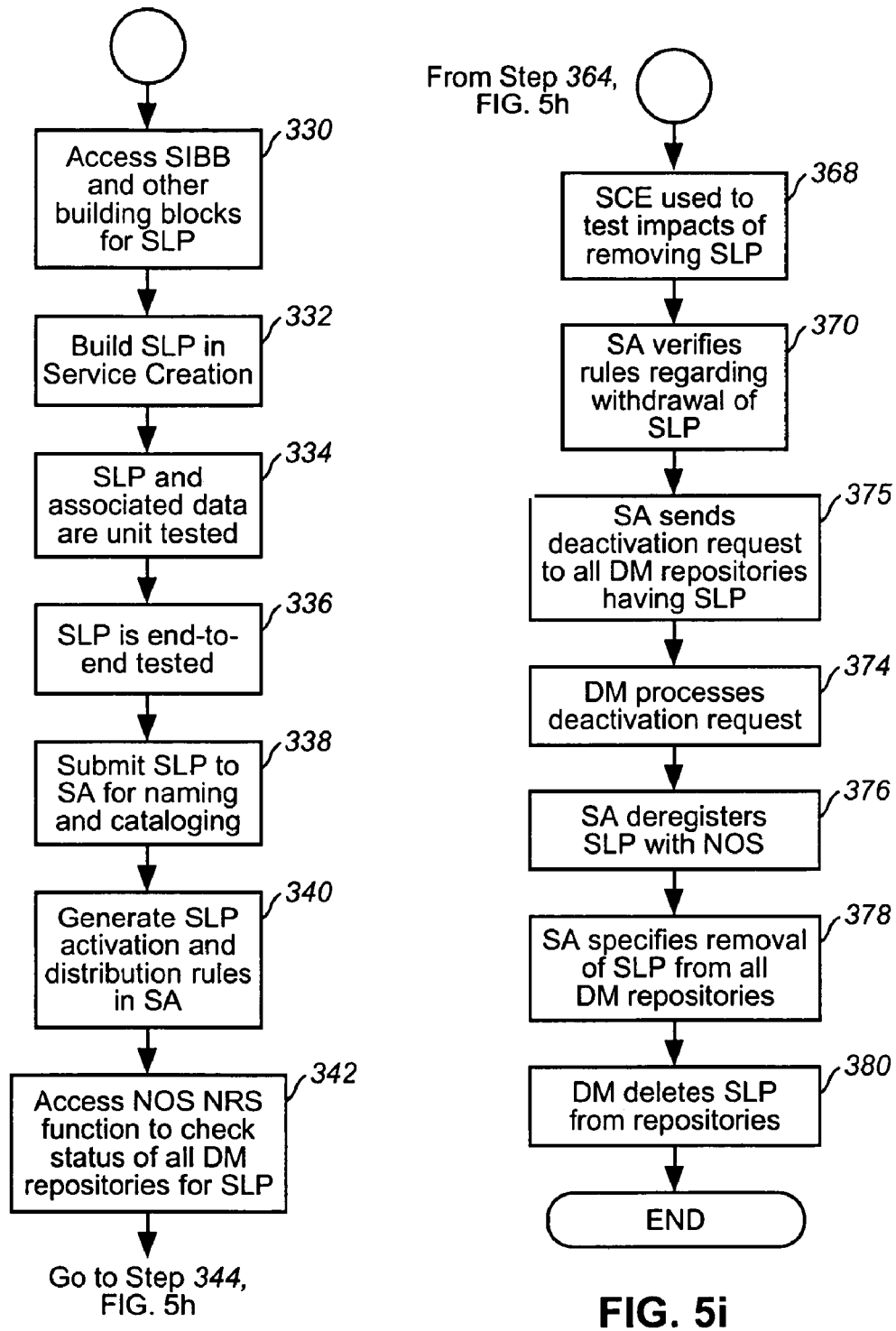

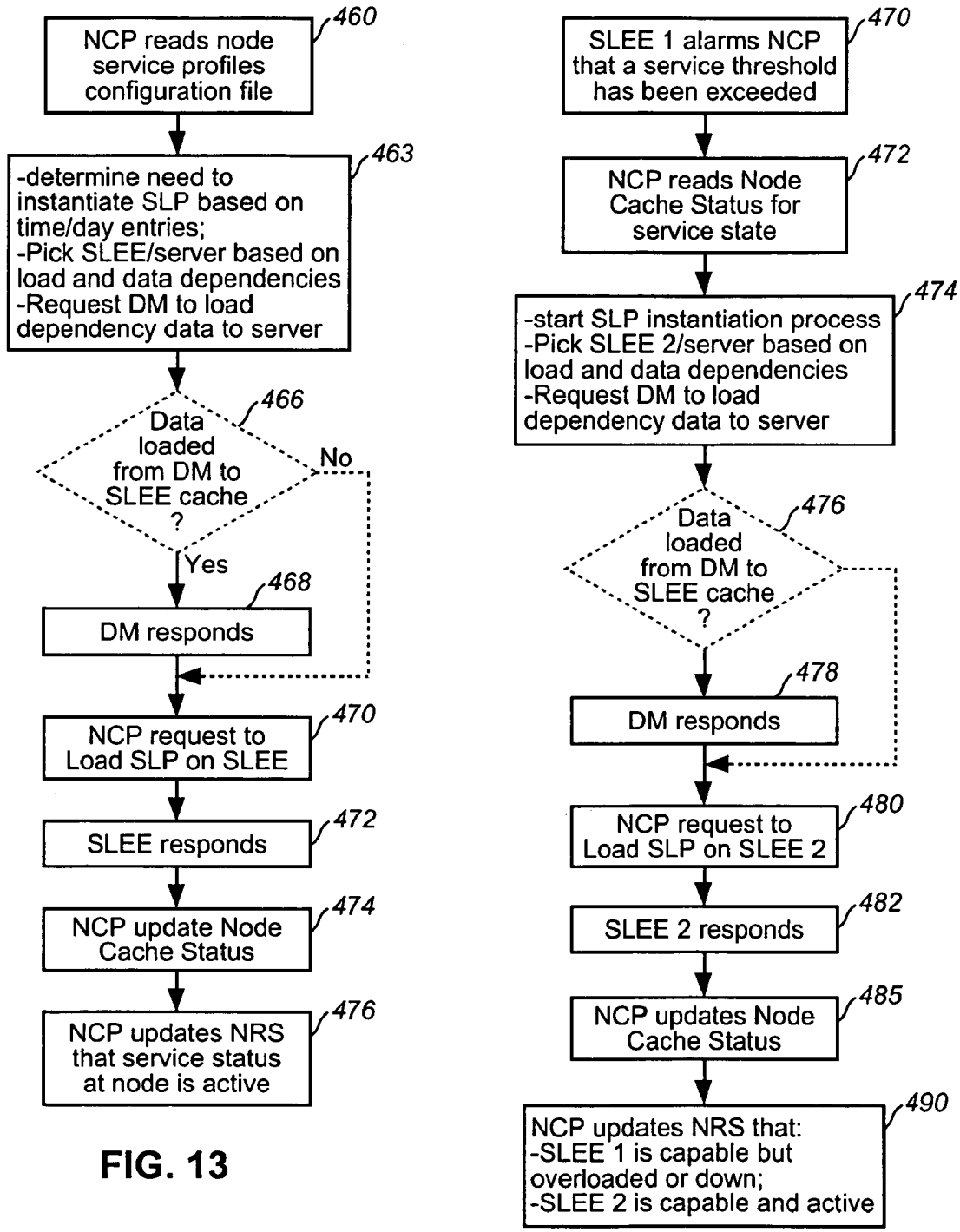

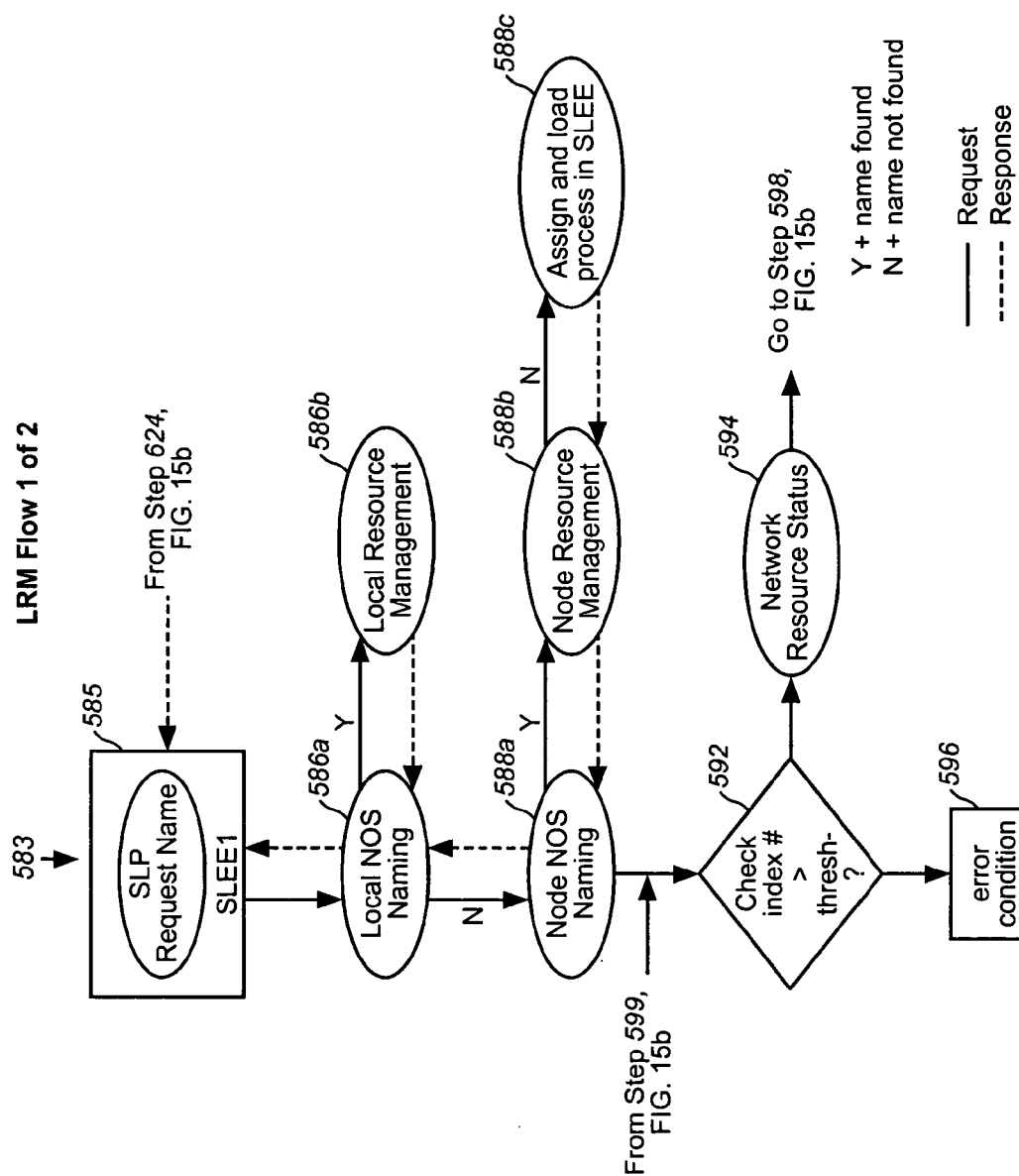

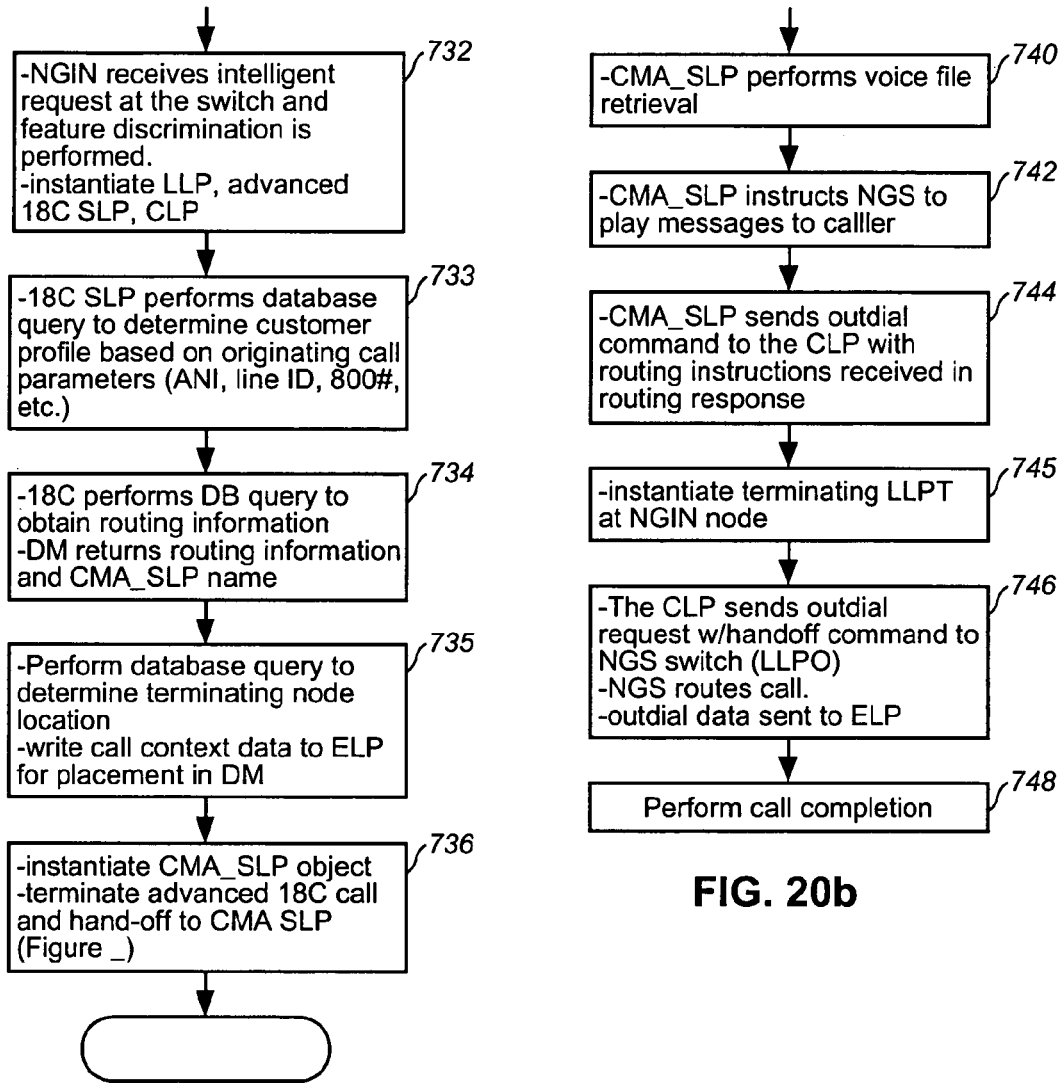

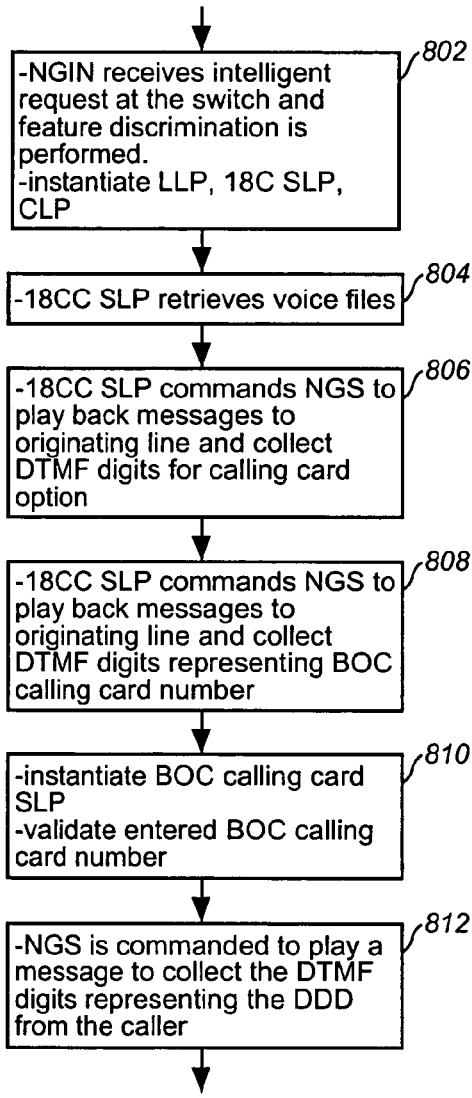
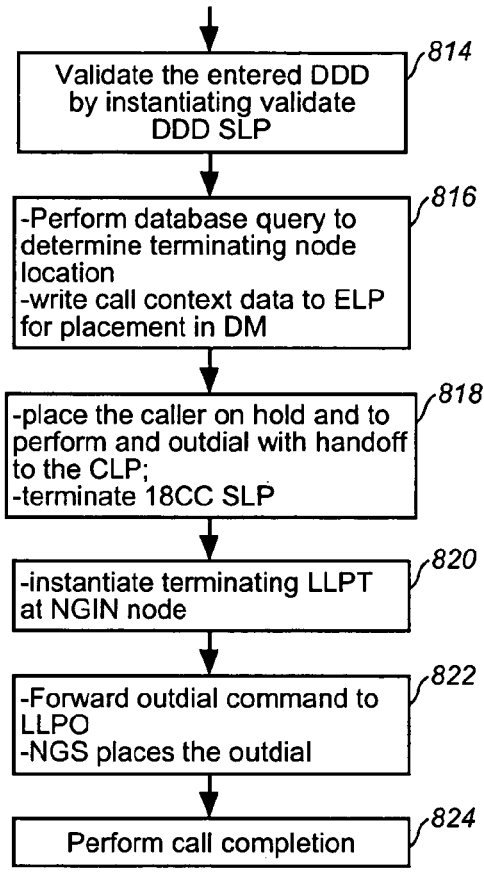
FIG. 22a
FIG. 22b

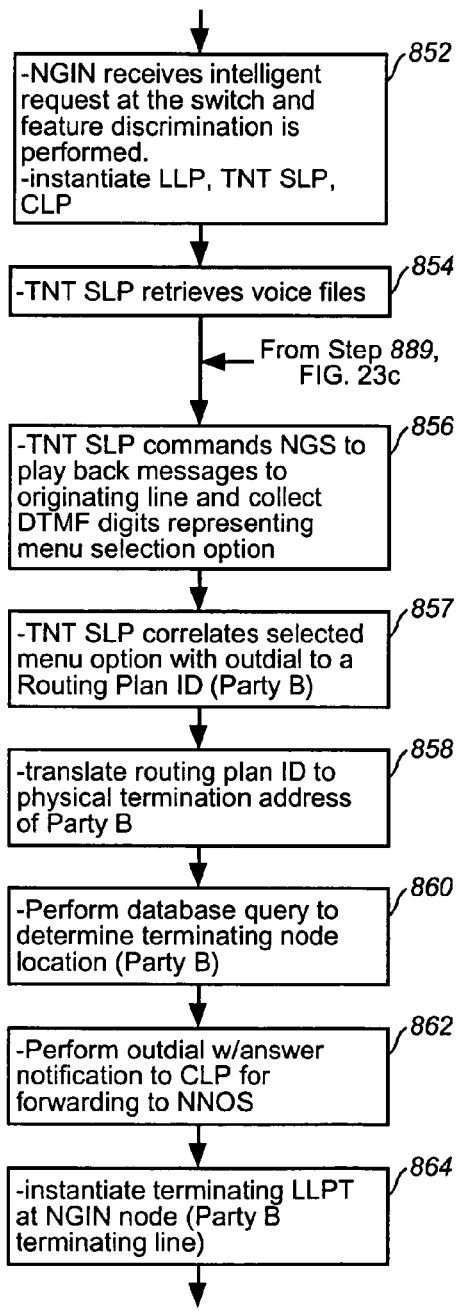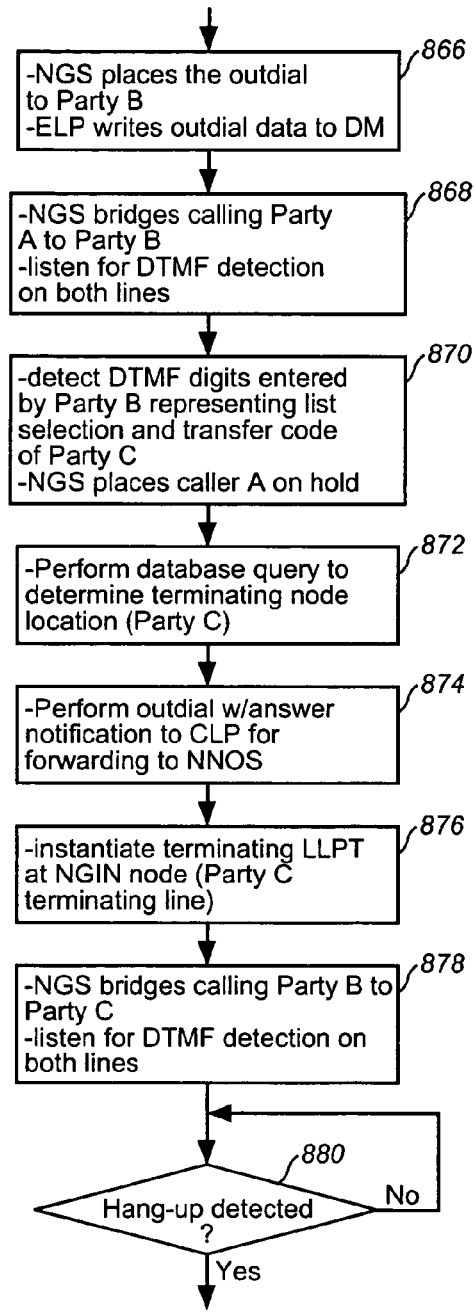
FIG. 23a
FIG. 23b

| 1841 | SLP Name: The 18C SLP sends the logical 18C QA SLP to NT for name translation. |
|---|---|
| 1842 | SLP Name: NT sends the logical 18C QA SLP Name to DM. |
| 1843 | SLP Name Plus Stored Locations: DM returns the actual 18C QA SLP name plus all the locations where it is stored. |
| 1844 | Node Selection Request: NT queries the NRS to determine the best node that is able to run the 18C QA SLP. This is done based on location and node status. |
| 1845 | Node Selection: NRS returns to NT the selected node. |
| 1846 | Instantiate Remote SLP: The NT of the local node requests the NT of the remote node to instantiate the 18C QA SLP. |
| 1847 | 18C QA SLP (Remote Node): The NT on the remote node queries its LRM to determine if the 18C QA SLP is already instantiated on this node. If not, it instantiates the SLP. |

FIG. 26a

| 1848 | Query Data (Remote Node): The LRM of the remote node forwards the query data to the QA_SP. The query includes the return address of the 18C SLP and the associated CLP. |
|---|---|

FIG. 26b

| 1849 | LP Name: The 18C SLP sends the logical 18C QA_SP LP name to NT for name translation. |
|---|---|
| 1850 | LP Name: NT sends the logical 18C QA SP LP Name to DM. |
| 1851 | LP Name Plus Stored Locations: DM returns the actual 18C QA SLP name plus all the locations where it is stored. |
| 1852 | Node Selection Request: NT queries the NRS to determine the best node that is able to run the 18C QA SLP. This is done based on location and node status. |
| 1853 | Node Selection: NRS returns to NT the selected node. |
| 1854 | Instantiate Remote SLP: The NT of the local node requests the NT of the remote node to instantiate the 18C QA SLP. |
| 1855 | 18C QA SLP (Remote Node): The NT on the remote node queries its LRM to determine if the 18C QA SLP is already instantiated on this node. If not, it instantiates the SLP. |
| 1856 | Query Data (Remote Node): The LRM of the remote node forwards the query data to the QA_ACL. The query includes the return address of the QA_SP. |
| 1857 | Query Answer: The QA_ACL processes the query and the result is returned to the QA_SP. |

FIG. 26c

| 1858 | LP Name: The QA_SP LP sends the logical QA_CQS LP name to NT for name translation. |
|---|---|
| 1859 | LP Name: NT sends the logical QA_CQS LP Name to DM. |
| 1860 | LP Name Plus Stored Locations: DM returns the actual QA_CQS LP name plus all the locations where it is stored. It is determined that this LP is stored locally and may be executed at this node. |
| 1861 | LP: The NT queries its LRM to determine if the QA_CQS LP is already instantiated at this node. If not, it instantiates the LP. |
| 1862 | LP SLEE Address: The LRM returns to NT the SLEE address where the QA_CQS LP is running. |
| 1863 | Data: The LRM forwards the data to the QA_CQS LP. |

FIG. 26d

| 1864 | LP Name: The QA_SP LP sends the logical CQ LP to NT for name translation. |
|---|---|
| 1865 | LP Name: NT sends the logical CQ LP Name to DM. |
| 1866 | SLP Name Plus Stored Locations: DM returns the actual CQ LP name plus all the locations where it is stored. |
| 1867 | Node Selection Request: NT queries the NRS to determine the best node that is able to run the CQ LP. This is done based on location and node status. |
| 1868 | Node Selection: NRS returns to NT the selected node. |
| 1869 | Instantiate Remote LP: The NT of the local node requests the NT of the remote node to instantiate the CQ LP. |
| 1870 | CQ LP (Remote Node): The NT on the remote node queries its LRM to determine if the CQ LP is already instantiated on this node. If not, it instantiates the LP. |
| 1871 | Data (Remote Node): The LRM of the remote node forwards the data to the CQ. |

FIG. 26e

| 1881 | LP Name: The SCA LP sends the logical QA _CP LP name to NT for name translation. |
|---|---|
| 1882 | LP Name: NT sends the logical QA_CP LP Name to DM. |
| 1883 | LP Name Plus Stored Locations: DM returns the actual QA_CP LP name plus all the locations where it is stored. |
| 1884 | Node Selection Request: NT queries the NRS to determine the best node that is able to run the QA_CP LP. This is done based on location and node status. |
| 1885 | Node Selection: NRS returns to NT the selected node. |
| 1886 | Instantiate Remote SLP: The NT of the local node requests the NT of the remote node to instantiate the QA_CP LP. |
| 1887 | QA_CP LP (Remote Node): The NT on the remote node queries its LRM to determine if the QA_CP LP is already instantiated on this node. If not, it instantiates the SLP. |
| 1888 | Data (Remote Node): The LRM of the remote node forwards the data to the QA_CP LP. This data will contain the logical name of the operator termination location. |

FIG. 26f

| | |
|---|---|
| 1889 | LP Name: The CP LP sends the logical Call Queue Status LP name to NT for name translation. |
| 1890 | LP Name: NT sends the logical Call Queue Status LP Name to DM. |
| 1891 | LP Name Plus Stored Locations: DM returns the actual Call Queue Status LP name plus all the locations where it is stored. |
| 1892 | Node Selection Request: NT queries the NRS to determine the best node that is able to run the Call Queue Status LP. This is done based on location and node status. |
| 1893 | Node Selection: NRS returns to NT the selected node. |
| 1894 | Instantiate Remote SLP: The NT of the local node requests the NT of the remote node to instantiate the Call Queue Status LP. |
| 1895 | Call Queue Status LP (Remote Node): The NT on the remote node queries its LRM to determine if the Call Queue Status LP is already instantiated on this node. If not, it instantiates the SLP. |
| 1896 | Query (Remote Node): The LRM of the remote node forwards the query to the Call Queue Status LP. |
| 1897 | Response (Remote Node): The LRM of the remote node forwards the response to the CP. The response will contain the address of the CQ and the SLP which is waiting on the capability. |

FIG. 26g

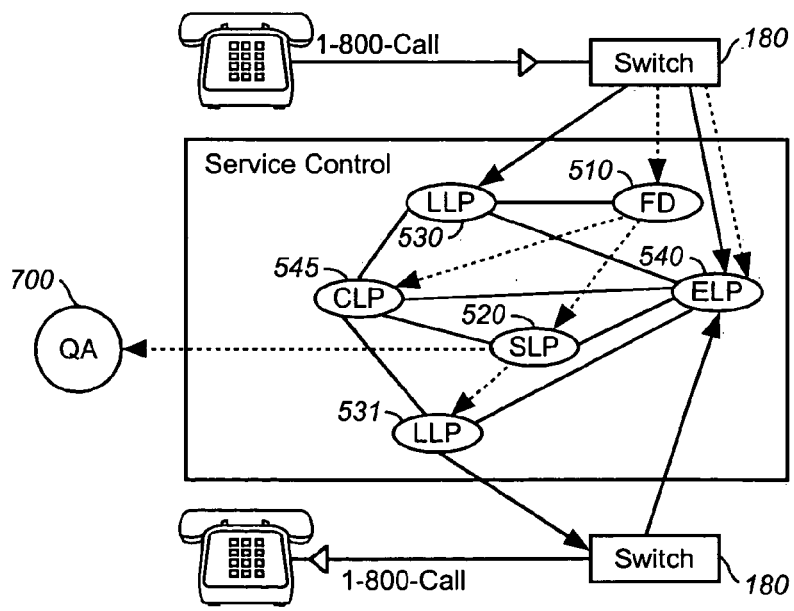

FIG. 29

INTELLIGENT NETWORK

CROSS-REFERENCE TO RELATED APPLICATIONS

This application is a Continuation of commonly assigned, U.S. patent application Ser. No. 10/040,320 entitled "Intelligent Network", filed Jan. 4, 2002, now U.S. Pat. No. 6,779,030 which is a Continuation of commonly assigned, U.S. patent application Ser. No. 09/420,666 filed Oct. 19, 1999 entitled "Intelligent Network", now U.S. Pat. No. 6,363,411, which is a Continuation-In-Part of commonly assigned, U.S. patent application Ser. No. 09/128,937 filed Aug. 5, 1998 entitled "Intelligent Call Platform for an Intelligent Distributed Network", now U.S. Pat. No. 6,418,461, which claims the benefit of U.S. Provisional Application Ser. No. 60/061,173, filed Oct. 6, 1997. This application additionally claims the benefit of U.S. Provisional Application Ser. No. 60/104,890 filed Oct. 20, 1998.

FIELD OF THE INVENTION

The present invention is related generally to telecommunications networks, and more particularly to an Intelligent Network architecture including a novel central administration and resources to a plurality of service nodes capable of telecommunications service processing.

BACKGROUND OF THE INVENTION

Network service is a function performed by a communications network, such as data or telephony, and its associated resources in response to an interaction with one or more subscribers. For example, a telephony network resident service, such as call forwarding or voice mail access, can be invoked by a subscriber by dialing a special sequence of digits. Other network services may be directed at assisting a network owner with security, validation, and authentication. Adding or modifying a service requires changes to be made in the communications network.

Most conventional telecommunication networks are composed of interconnected switches and communication services. These switches are controlled by integrated or imbedded processors operated by proprietary software or firmware designed by the switch manufacturer. Typically, the switch manufacturer's software or firmware must support all functional aspects of service processing, call processing, facility processing and network management. This means that when a network owner wishes to implement a new service or modify an existing service, the software of every switch in the network must be revised by the various switch manufacturers.

The fact that the network contains different switch models from different manufacturers requires careful development, testing and deployment of the new software. The time required to develop, test and deploy the new software is lengthened because the code size at each switch grows larger and more complex with each now revision. Thus, this process can take several years. In addition, this increased complexity further burdens the switch processors, increases the chances for switch malfunction, and may require the modification or replacement of the switch.

Moreover, the fact that multiple network owners depend upon a common set of switch manufacturers results in two undesirable situations that limit competition. First, a manufacturers' software release may attempt to incorporate changes requested by several network owners, thus preventing the network owners from truly differentiating their services from the services provided by their competition. This also forces some network owners to wait until the manufacturer incorporates requests from other network owners into the new release. Second, a switch software release incorporating a function as requested by one network owner to implement a new service can unintentionally become accessible to other network owners.

These problems have become intolerable as the demand for new network services has increased exponentially over the last five to ten years due to increased subscriber mobility, increased variety and bandwidth of traffic, dissolution of traditional numbering plans, more sophisticated services and increased competition. Thus, it is widely recognized that new network architectures need to incorporate a more flexible way of creating, deploying and executing service logic. In order to fully appreciate the novel architecture of the present invention hereinafter described, the following description of the relevant prior art is provided with reference to FIGS. 1–4.

Referring to FIG. 1, a logical representation of various switching architectures, including the present invention, is shown. A monolithic switch, which is denoted generally as 20, contains service processing functions 22, call processing functions 24, facility processing functions 26 and a switch fabric 28. All of these functions 22, 24, 26 and 28 are hard-coded, intermixed and undifferentiated, as symbolized by the group 30. Moreover, functions 22, 24, 26 and 28 are designed by the switch manufacturer and operate on proprietary platforms that vary from manufacturer to manufacturer. As a result, these functions 22, 24, 26 and 28 cannot be modified without the aid of the manufacturer, which slows down service development and implementation, and increases the cost of bringing a new service to market. The development of new and innovative services, call processing, data processing, signal processing and network operations are, therefore, constrained by the manufacturer's control over their proprietary switch hardware and software, and the inherent difficulty of establishing and implementing industry standards.

The service processing functions 22 are encoded within the monolithic switch 20 and only allow local control of this process based on local data contents and the number dialed. This local information is interpreted by a hard-coded process engine that carries out the encoded service function. The call processing functions 24 are hard-coded and provide call origination and call termination functions. This process actually brings up and takes down individual connections to complete a call. Likewise, the facility processing functions 26 are also hard-coded and provide all data processing relating to the physical resources involved in a call. The switch fabric 28 represents the hardware component of the switch and the computer to run the monolithic software provided by the switch manufacturer, such as Northern Telecom, Inc. The switch fabric 28 provides the physical facilities necessary to establish a connection and may include, but is not limited to, bearer devices (T1's and DSO's), switching matrix devices (network planes and their processors), link layer signal processors (SS7, MTP, ISDN, LAPD) and specialized circuits (conference ports, audio tone detectors).

In an attempt to address the previously described problems, the International Telecommunications Union and the European Telecommunication Standards Institute endorsed the ITU-T Intelligent Network Standard ("IN"). Similarly, Bellcore endorsed the Advanced Intelligent Network Standard ("AIN"). Although these two standards differ in presentation and evolutionary state, they have almost identical objectives and basic concepts. Accordingly, these standards are viewed as a single network architecture in which the service processing functions 22 are separated from the switch.

Using the IN and AIN architectures, a network owner could presumably roll out a new service by creating and deploying a new Service Logic Program ("SLP"), which is essentially a table of Service Independent Building Blocks ("SIBB") to be invoked during a given type of call. According to this approach, a number of specific element types inter-operate in conjunction with a SLP to provide services to network subscribers. As a result, any new or potential services are limited by the existing SIBBS.

The In or AIN architecture, which is denoted generally as 40, logically separates the functions of the monolithic switch 20 into a Service Control Point ("SCP") 42, and a Service Switching Point ("SSP") and Switching System 44. The SCP 42 contains the service processing functions 22, whereas the SSP and Switching System 44 contain the call processing functions 24, facility processing functions 26 and the switch fabric 28. In this case, the call processing functions 24, facility processing functions 26 and the switch fabric 28 are hard-coded, intermixed and undifferentiated, as symbolized by the group 46.

The Service Switching Point ("SSP") is a functional module that resides at a switch in order to recognize when a subscriber's signaling requires more than simple routing based solely upon the number dialed. The SSP suspends further handling of the call while it initiates a query for correct handling of the call to the remote SCP 42, which essentially acts as a database server for a number of switches. This division of processing results in the offloading of the infrequent, yet time consuming task of handling special service calls, from the switch. Furthermore, this moderate centralization draws a balance between having one readily modifiable, heavy burdened repository serving the whole network versus deploying a complete copy of the repository at every switch.

Referring now to FIG. 2, a diagram of a telecommunications system employing an IN or AIN architecture is shown and is denoted generally as 50. Various customer systems, such as an ISDN terminal 52, a first telephone 54, and a second telephone 56 are connected to the SSP and Switching System 44. The ISDN terminal 52 is connected to the SSP and Switching System 44 by signaling line 60 and transport line 62. The first telephone 54 is connected to the SSP and Switching System 44 by transport line 64. The second telephone 56 is connected to a remote switching system 66 by transport line 68 and the remote switching system 66 is connected to the SSP and Switching System 44 by transport line 70.

As previously described in reference to FIG. 1, the SSP 70 is a functional module that resides at a switch in order to recognize when a subscriber's signaling requires more than simple routing based upon the number dialed. The SSP 70 suspends further handling of the call while it initiates a query for correct handling of the call. This query is sent in the form of SS7 messaging to a remote SCP 42. The Service Control Point 42 is so named because changing the database content at this location can alter the network function as it appears to subscribers connected through the many subtending switches. The query is sent through signaling line 72 to the Signal Transfer Point ("STP") 74, which is simply a router for SS7 messaging among these elements, and then through signaling line 76 to the SCP 42.

The Integrated Service Management System ("ISMS") 78 is envisioned as a management tool to deploy or alter services or to manage per-subscriber access to services. The ISMS 78 operates mainly by altering the operating logic and data stored within the SSP 70 and SCP 42. The ISMS 78 has various user interfaces 80 and 82. This ISMS 78 is connected to the SCP 42 by operations line 84, the SSP and Switching System 44 by operations line 86, and the Intelligent Peripheral ("IP") 88 by operations line 90. The Intelligent Peripheral 88 is a device used to add functions to the network that are not available on the switches, such as a voice response or speech recognition system. The IP 88 is connected to the SSP and Switching System 44 by signaling line 92 and transport line 94.

Now referring to FIG. 2, the processing of a call in accordance with the prior art will be described. The call is initiated when the customer picks up the receiver and begins dialing. The SSP 70 at the company switch monitors the dialing and recognizes the trigger sequence. The SSP 70 suspends further handling of the call until service logic can be consulted. The SSP 70 then composes a standard SS7 message and sends it through STP(s) 74 to the SCP 42. The SCP 42 receives and decodes the message and invokes the SLP. The SLI interprets the SCP, which may call for actuating other functions such as database lookup for number translation. The SCP 42 returns an SS7 message to the SSP and Switching System 44 regarding the handling of the call or otherwise dispatches messages to the network elements to carry out the correct service. At the conclusion of the call, an SS7 message is sent among the switches to tear down the call and call detail records are created by each switch involved in the call. The call detail records are collected, correlated, and resolved offline for each call to derive billing for toll calls thus, completing call processing.

The IN and AIN architectures attempt to predefine a standard set of functions to support all foreseeable services. These standard functions are all hard-coded into various state machines in the switch. Unfortunately, any new functions, which are likely to arise in conjunction with new technologies or unforeseen service needs, cannot be implemented without an extensive overhaul and testing of the network software across many vendor platforms. Furthermore, if a new function requires changes to standardized call models, protocols, or interfaces, the implementation of the service utilizing that function may be delayed until the changes are ratified by an industry standards group. But even as draft standards have attempted to broaden the set of IN and AIN supported functions, equipment suppliers have refused to endorse these draft standards due to the staggering increase in code complexity. A detailed flow chart describing the process for generic service creation according to the prior art may be found in above-mentioned, commonly-owned, co-pending U.S. patent application Ser. No. 09/128, 937 filed Aug. 5, 1998 (MCI D# RIC-97-110) entitled "Intelligent Call Platform for an Intelligent Network Distributed Architecture," the contents and disclosure of which is incorporated by reference as if fully set forth herein.

In further view of FIG. 2, other limitations of the IN and AIN architecture arise from having the call processing and facility processing functions, namely, the SSP 70, operating within the switch. As a result, these functions must be provided by each switch manufacturer using their proprietary software. Network owners are, therefore, still heavily dependent upon manufacturer software releases to support new functions. To further complicate the matter, the network owner cannot test SSP 70 modules in conjunction with other modules in a unified development and test environment.

Moreover, there is no assurance that an SSP 70 intended for a switch manufacturer's processing environment will be compatible with the network owner's service creation environment.

This dependency of multiple network owners upon a common set of switch manufacturers results in two undesirable situations that limit competition. First, a manufacturer's software release may attempt to incorporate changes requested by several network owners, thus preventing the network owners from truly differentiating their services from the services provided by their competition. This also forces some network owners to wait until he manufacturer incorporates requests from other network owners into the new release. Second, a switch software release incorporating a function as requested by one network owner to implement a new service can unintentionally become accessible to other network owners. Therefore, despite the intentions of the IN and AIN architects, the network owner's creation, testing and deployment of new services is still impeded because the network owner does not have complete control of, or access to, the functional elements that shape network service behavior.

In another attempt to solve these problems, as disclosed in pending U.S. patent application Ser. No. 08/580,712, a Separate Switch Intelligence and Switch Fabric ("SSI/SF") architecture, which is referred to generally as 150 (FIG. 1), logically separates the SSP 70 from the Switching System 44. Now referring back to FIG. 1, the switch intelligence 152 contains the call processing functions 24 and facility processing functions 26 that are encoded in discrete state tables with corresponding hard-coded state machine engines, which is symbolized by circles 154 and 156. The interface between the switch fabric functions 158 and switch intelligence functions 152 may be extended through a communications network such that the switch fabric 158 and switch intelligence 152 may not necessarily be physically located together, by executed within the same processor, or even have a one-to-one correspondence. In turn, the switch intelligence 152 provides a consistent interface of simple non-service-specific, non-manufacturer-specific functions common to all switches.

An Intelligent Computing Complex ("ICC") 160, contains the service processing functions 22 and communicates with multiple switch intelligence elements 152. This approach offers the network owner advantages in flexible service implementation because all but the most elementary functions are moved outside the realm of the manufacturer-specific code. Further improvements may be realized by providing a more unified environment for the creation, development, test and execution of service logic.

As previously discussed, current network switches are based upon monolithic proprietary hardware and software. Although network switches can cost millions of dollars, such equipment is relatively slow in terms of processing speed when viewed in light of currently available computing technology. For example, these switches are based on Reduced-Instruction Set Computing ("RISC") processors running in the range of 60 MHz and communicate with each other using a data communications protocol, such as X.25, that typically supports a transmission rate of 9.6 Kb/s between various platforms in a switching network. This is extremely slow when compared to personal computers that contain processors running at 200 MHz or above and high end computer workstations that offer 150 Mb/s FDDI and ATM interfaces. Accordingly, network owners need to be able to use high-end workstations instead of proprietary hardware.

SUMMARY OF THE INVENTION

The present invention is directed to an intelligent network designed to perform intelligent call processing services for any type of call received at a resource complex or switching platform. The intelligent network includes a plurality of distributed service nodes, each node providing an execution environment that may provide all of the call processing functionality necessary to handle a call at the instance it is received at the switch or resource complex associated with that particular service node. It is of a highly scalable architecture and engineered to ensure that telecommunications services may be deployed in a cost-effective manner. The intelligent network additionally provides intelligent call processing services independent of and transparent to the call switching platform or resource complex in which a call is received, and is readily adapted to handle call events. Thus, the dependency for expensive, vendor-specific hardware, operating systems and switching platforms, is eliminated. The distributed intelligent network additionally supports location-independent call processing service execution, enabling modular software processes to be run virtually anywhere in the architecture, and provides location-independent communications among these distributed processes, thus further eliminating the need for specialized service nodes.

More specifically, a single intelligent network architecture is provided that is platform-independent, portable to any hardware and operating system platform, and eliminates system incompatibility problems by allowing the use of different computing platforms. The intelligent network of the present invention further comprises an underlying systems infrastructure designed to support any and all conceivable call processing services, wherein specialized functions needed for a particular service are encapsulated in high-level logic programs that are easily written and deployed using the same network infrastructure.

The intelligent network of the present invention further implements a data management component that is responsible for making any required data and/or software service module immediately available for processing a specific call. Additionally implemented is a common Service Logic Execution Environment capable of running the software service modules for providing platform-independent services in a network comprising different types of computers and operating systems, and switching platforms.

The present invention further implements a centralized service administration process having functionality for naming, cataloging, distributing, activating, auditing, de-activating and removing call processing service module and data components used throughout the network.

Thus, in accordance with the invention, there is provided an intelligent service platform having one or more nodes for providing intelligent call processing and service execution for a telecommunications switching network, the switching network having network elements for receiving telecommunications events requiring call processing services, the service platform comprising:

a) a centralized administration system comprising:
i) a device for storing one or more re-usable business objects that each encapsulate a distinct call-processing function, the business object including any data required by the business object; ii) a device for distributing selected business objects and associated data to selected one or more nodes in the switching network based on pre-determined node configuration criteria; and, iii) device for activating the business objects in preparation for real-time use; b) a computing system integrated within a node for executing those business objects required to perform a service in accordance with an event received at the network element; c) a system integrated within a node for retrieving and storing selected business objects and any associated data distributed by the administration system, and making the business objects and associated data available to the computing system when performing the service; and, d) a system integrated within a node for providing location-independent communication between services at the node and between nodes in the intelligent service platform, and, coordinating interaction of one or more business objects to perform the service in response to needs of a received event, wherein services are performed in the platform for an event arrived at a network element independent of a type of hardware comprising the network element.

Advantageously, as will further be explained, the Intelligent Network of the invention provides for the total control of switching, services, including operator, call center and ATM/Vnet services and intelligent call processing with software that runs on general purpose computers, and that enables the provision of switching functions with non-proprietary or otherwise inexpensive switching hardware, such as that available with scalable programmable switches.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF THE DRAWINGS

The above and further advantages of the present invention may be better understood by referring to the following description in conjunction with the accompanying drawings, in which:

FIGS. 5(g) and 5(h) illustrate flow diagrams generally depicting the service creation and deployment phases of the IDNA/NGIN system;

FIG. 5(i) illustrates a flow diagram depicting the service withdrawal/deactivation phase of the NGIN system;

FIG. 13 is a flow diagram depicting an SLP instantiation process;

FIG. 14(a) is a flow diagram depicting the SLEE threshold processing;

FIGS. 15(a) and 15(b) depict the three-tiered intelligent network resource management functionality;

FIGS. 20(a) and 20(b) depict an example process for performing 1-800/8xx number translation, and performing message playback to a caller before extending a call to a termination;

FIGS. 22(a) and 22(b) depict an example process for performing 1-800/8xx collect call service when caller implements a calling card;

FIGS. 23(a)–23(c) depict an example process for performing an enhanced voice takeback and transfer call service;

FIGS. 26(a)–26(g) depict process flows for implementing Operator Services system 800 in the NGIN system;

FIG. 29 depicts a call processing scenario as serviced by NGIN;

DETAILED DESCRIPTION OF THE PREFERRED EMBODIMENTS

The present invention is a comprehensive intelligent network architecture alternately referred to herein as the Intelligent Distributed Network Architecture ("IDNA") or the Next Generation Intelligent Network (ANGIN"). As described herein, the NGIN architecture is designed to perform intelligent call processing services for any type of call received at a resource complex or switching platform, e.g., switch, router, IP termination address, etc.

Figure 1:
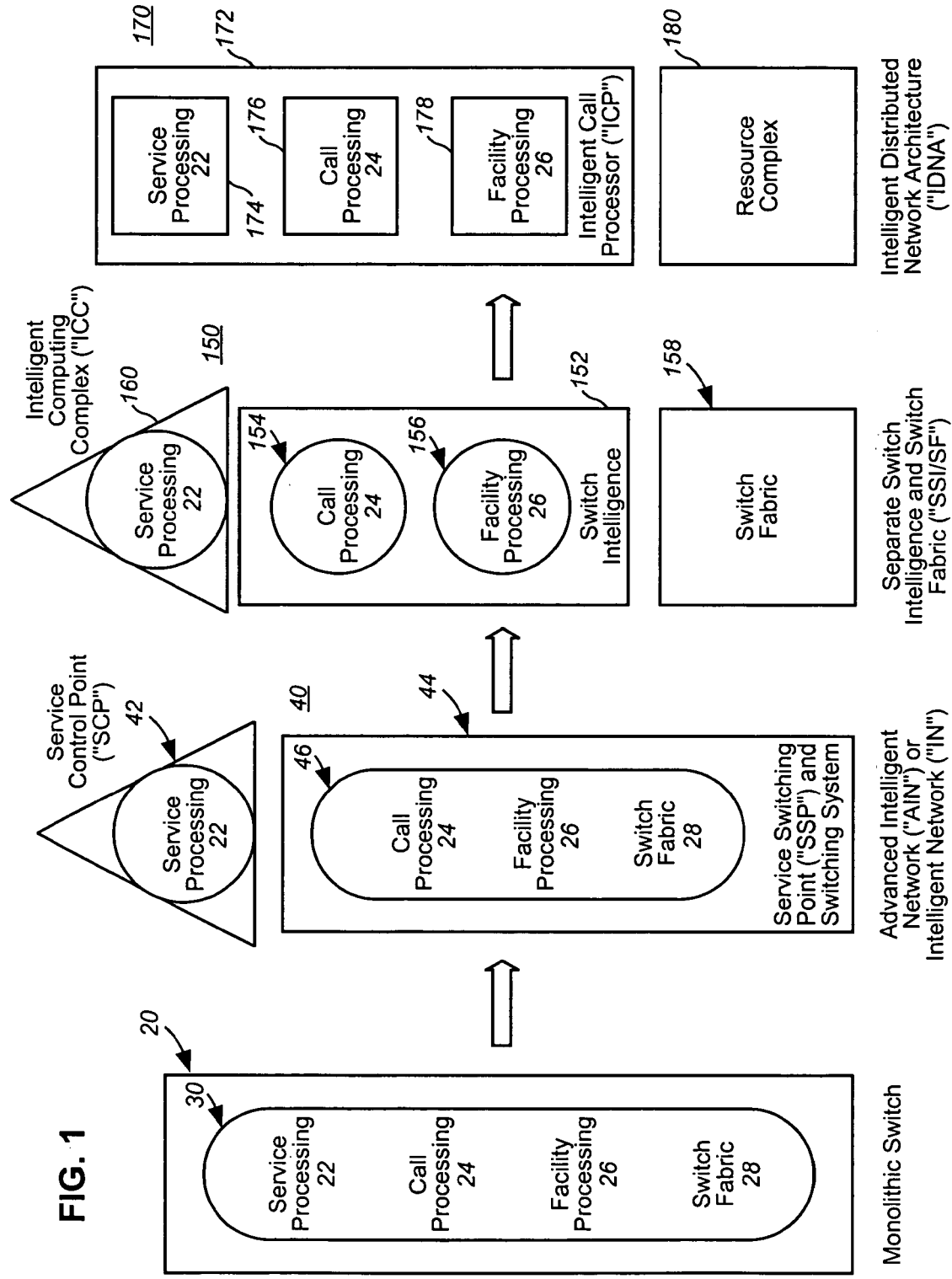
FIG. 1 is logical representation of various switching architectures.
Figure 2:
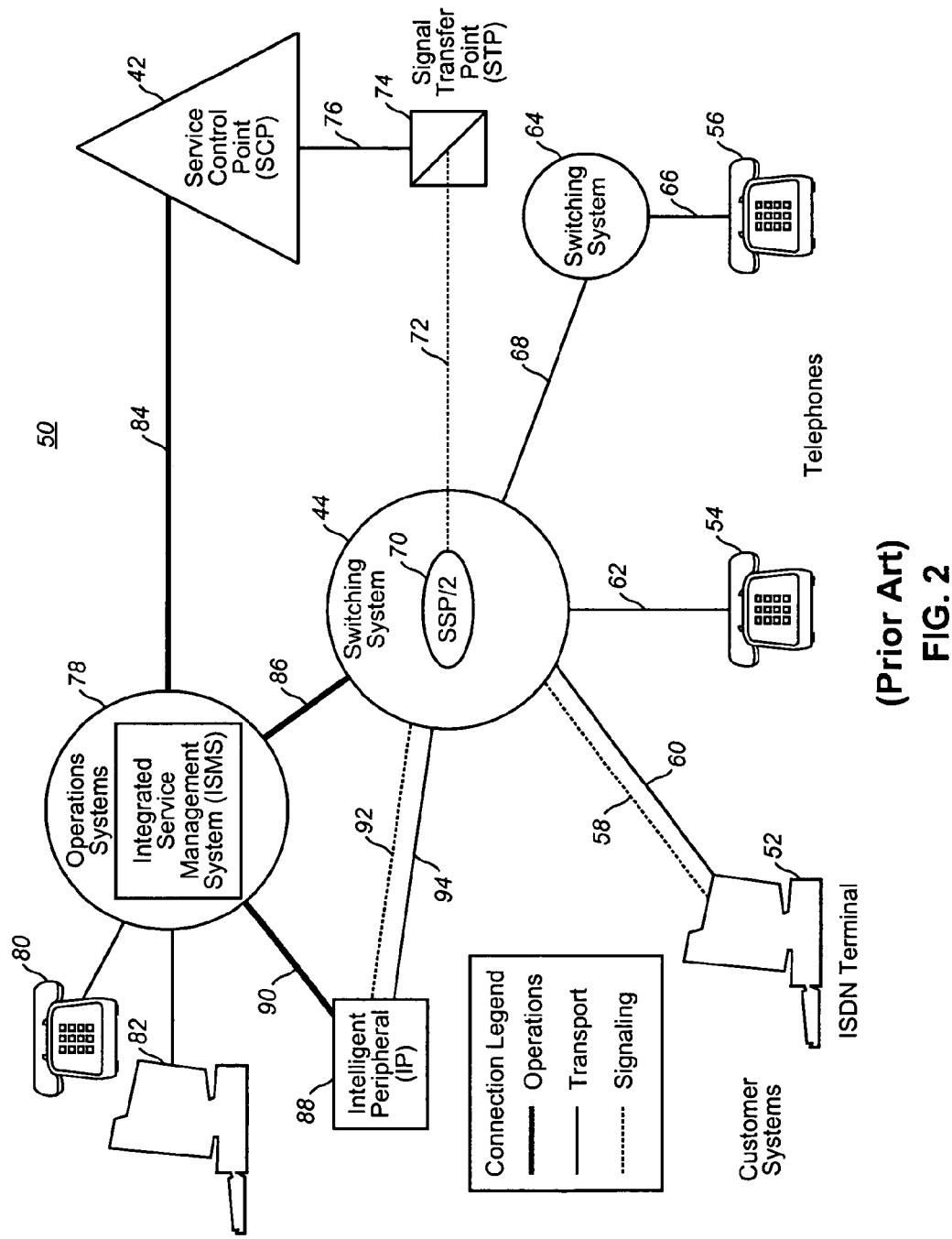
FIG. 2 is a diagram of a telecommunications system employing, a typical intelligent network configuration according to the prior art.

As shown in FIG. 1, the Intelligent Distributed Network Architecture ("IDNA") is denoted generally as 170. The present invention unifies the ICC 160 and Switch Intelligence 152 of the SSI/SF architecture 150 into an Intelligent Call Processor ("ICP") 172. Unlike the IN or AIN of SSI/SF architectures 40, whose functions are defined in state tables, the ICP 172 contains the service control functions 22, call processing functions 24 and facility processing functions 26 as managed objects in an object-oriented platform, which is symbolized by blocks 174, 176 and 178. The ICP 172 is logically separated from the Resource Complex 180.

Now referring to FIG. 3, a telecommunications system employing an intelligent distributed network architecture in accordance with the present invention will be described and is denoted generally as 200. The Wide Area Network ("WAN") 202 is a system that supports the distribution of applications and data across a wide geographic area. The transport network may be based upon Synchronous Optical NETwork ("SONET") for connecting the IDNA Nodes 204 and enables the applications within those nodes to communicate with each other.

Each IDNA Node 204 contains an Intelligent Call Processor ("ICP") 172 and a Resource Complex 180 (FIG. 1). FIG. 3 illustrates an IDNA Node 204 having a Resource Complex A ("RCA") 206 and a Resource Complex B ("RCB") 208. The ICP may be linked to Adjunct Processors 210, which provide existing support functions, such as provisioning, billing and restoration, however, these functions may be absorbed by functionality provided by a Network Management System ("NMS") 212. In the preferred embodiment, however, these support functions are provided by a centralized Service Administration ("SA") system 500 having a Data Management ("DM") component 400 as will be described herein with respect to FIG. 4. As further shown in FIG. 3, the ICP 172 may be also linked to other ICP's 172, other networks (not shown), or other devices (not shown) through a direct link 214 having signaling 216 and bearer links 218. A direct link prevents latency between the connected devices and allows the devices to communicate in their own language. The ICP 172 is the "brain" of the IDNA Node 204 and is preferably a general purpose computer, which may range from a single processor with a single memory storage device to a large scale computer network depending on the processing requirements of the IDNA Node 204. Preferably, the general purpose computer will have redundant processing, memory storage and connections.

As used herein, general purpose computers refer to computers that are, or may be assembled with, commercial off-the-shelf components, as opposed to dedicated devices specifically configured and designed for telephone switching applications. The integration of general purpose computers within the calling network affords numerous advantages.

The use of general purpose computers gives the ICP 172 the capability of scaling up with additional hardware to meet increased processing needs. These additions include the ability to increase processing power, data storage, and communications bandwidth. These additions do not require the modification of manufacturer-specific software and/or hardware on each switch in the calling network. Consequently, new services and protocols may be implemented and installed on a global scale, without modification of individual devices in the switching network. By changing from monolithic switches 20 (FIG. 1) to intelligent call processors 172, the present invention provides the foregoing advantages and increased capabilities.

In the case of applications that require more processing power, multi-processing allows the use of less expensive processors to optimize the price/performance ratio for call processing. In other applications, it may be advantageous, necessary or more cost effective to use more powerful machines, such as minicomputers, with higher processing rates.

The ICP 172 may, as noted above, comprise a cluster of general purpose computers operating, for example, on a UNIX or Windows NT operating system. For example, in a large application, supporting up to 100,000 ports on a single Resource Complex, the ICP 172 may consist of sixteen (16) 32 bit processors operating at 333 MHz in a Symmetric Multi-Processor cluster. The processors could, for example, be divided into four separate servers with four processors each. The individual processors would be connected with a System Area Network ("SAN") or other clustering technology. The processor cluster could share access to Redundant Array of Independent Disks ("RAID") modular data storage devices. Shared storage may be adjusted by adding or removing the modular disk storage devices. The servers in the clusters would preferably share redundant links to the RC 180 (FIG. 1).

As illustrated and like the "plug and play" feature of personal computers, the ICP software architecture is an open processing model that allows the interchangeability of: (1) management software; (2) ICP applications; (3) computing hardware and software; (4) resource complex components; and even (5) service architecture and processing. Such a generic architecture reduces maintenance costs due to standardization and provides the benefits derived from economies of scale.

Thus, the present invention enables the partitioning of development work and the use of modular tools that result in faster development and implementation of services. Moreover, the use of and the relevant aspects of service management are within the control of the network operator on an as required basis as opposed to the constraints imposed by fixed messaging protocol or a particular combination of hardware and software supplied by a given manufacturer.

Through the use of managed objects, the present invention also allows services and functions to be flexibly ("where you want it") and dynamically ("on the fly") distributed across the network based on any number of factors, such as capacity and usage. Performance is improved because service processing 22 (FIG. 1), call processing 24 (FIG. 1) and facility processing 26 (FIG. 1) operate in a homogeneous platform. In addition, the present invention allows the monitoring and manipulation of call sub-elements that could not be accessed before. The present invention also provides for monitoring the usage of functions or services so that when they are outdated or unused they can be eliminated.

The Resource Complex ("RC") 180 (FIG. 1) is a collection of physical devices, or resources, that provide bearer, signaling and connection services. The RC 180, which can include Intelligent Peripherals 88, replaces the switch fabric 28 and 158 (FIG. 1) of the IN or AIN or SSI/SF architecture. Unlike the IN or AIN architecture, the control of the Resource Complex, such as RCA 206 (shown in FIG. 3) is at a lower level. Moreover, the RCA 206 may contain more than one switch fabric 158. The switch fabrics 158 or other customer interfaces (not shown) connect to multiple subscribers and switching networks via standard telephony connections. These customer systems may include ISDN terminals 52, fax machines 220, telephones 54, and PBX systems 222. The ICP 172 controls and communicates with the RC 180 (FIG. 1), RCA 206 and RCB 208 through a high speed data communications pipe (minimally 100 Mb/sec Ethernet connection) 224. The RC 180, 206 and 208 can be analogized to a printer and ICP 172 can be analogized to a personal computer wherein the personal computer uses a driver to control the printer. The "driver" in the IDNA Node 204 is a Resource Complex Proxy ("RCP") (not shown), which will be described below in reference to FIG. 6. This allows manufacturers to provide an IDNA compliant node using this interface without having to rewrite all of their software to incorporate IDNA models.

In addition, the control of the Resource Complex 180 (FIG. 1), RCA 206 and RCB 208, is at a lower level than typically provided by the AIN or IN architecture. As a result, resource complex manufacturers only have to provide a single interface to support facility and network management processing; they do not have to provide the network owner with specific call and service processing. A low level interface is abstracted into more discrete operations. Having a single interface allows the network owner to choose from a wide spectrum of Resource Complex manufacturers, basing decisions on price and performance. Intelligence is added to the ICP 172 rather than the RC 180, which isolates the RC 180 from changes and reduces its complexity. Since the role of the RC 180 is simplified, changes are more easily made, thus making it easier to migrate to alternative switching and transmission technologies, such as Asynchronous Transfer Mode ("ATM").

Intelligent Peripherals ("IP") 88 provide the ability to process and act on information contained within the actual call transmission path. IP's 88 are generally in a separate Resource Complex, such as RCB 208, and are controlled by the ICP's 172 in a similar manner as RCA 206. IP's can provide the ability to process data in the actual call transmission path in real-time using Digital Signal Processing ("DSP") technology.

As mentioned, a Network Management System ("NMS") 212 may be used to monitor and control hardware and services in the IDNA Network 200. A suggested NMS 212 implementation might be a Telecommunications Management Network ("TMN") compliant framework which provides management of the components within the IDNA Network 200. More specifically, the NMS 212 controls the deployment of services, maintains the health of those services, provides information about those services, and provides a network-level management function for the IDNA Network 200. The NMS 212 accesses and controls the services and hardware through agent functionality within the IDNA nodes 204. The ICP-NMS Agent (not shown) within the IDNA Node 204 carries out the commands or requests issued by the NMS 212. The NMS 212 can directly monitor and control RCA 206 and RCB 208 through a standard operations link 226.

Figure 3:
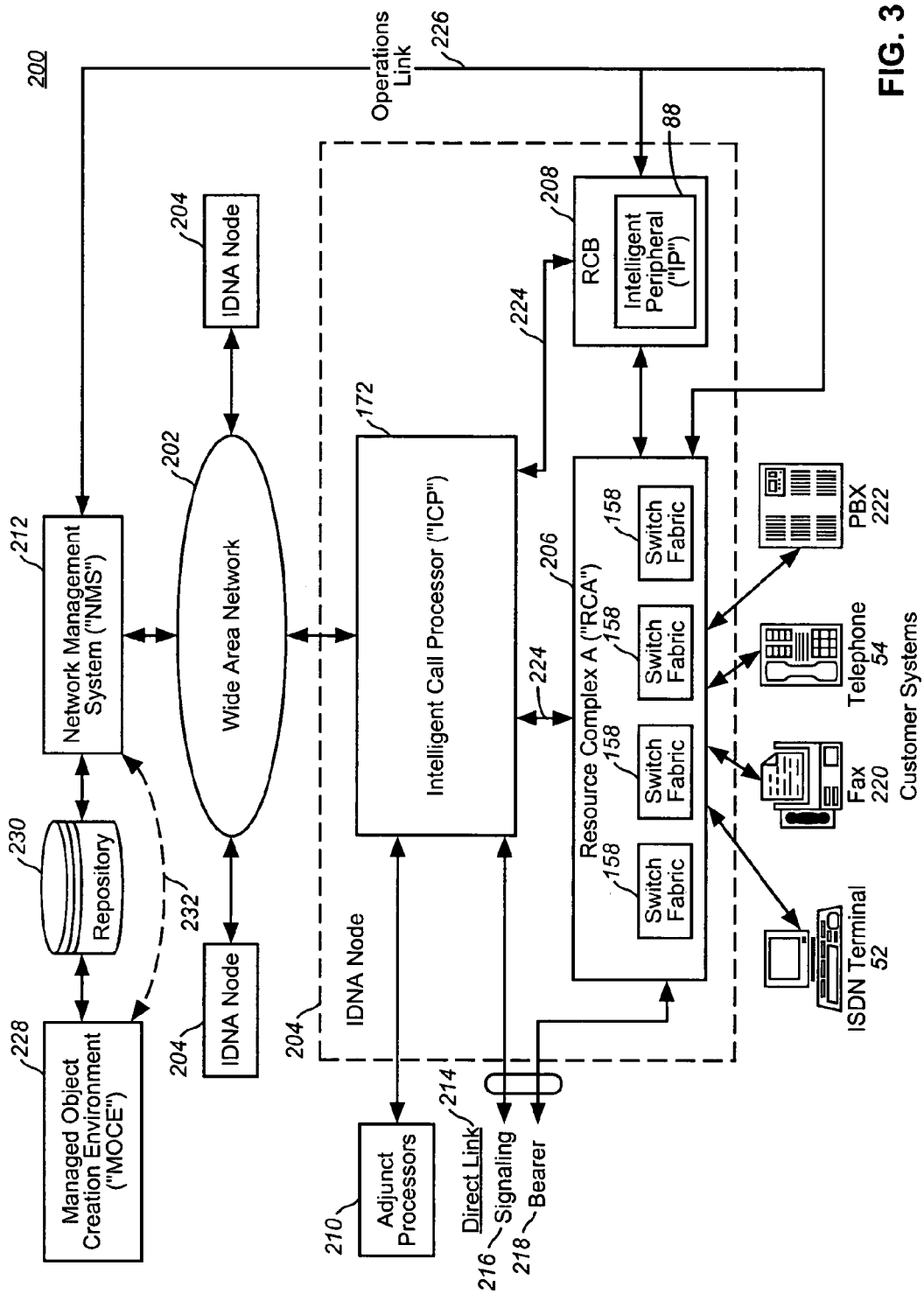
FIG. 3 is a diagram of a telecommunications system employing an intelligent distributed network architecture.

As further shown in FIG. 3, the Managed Object Creation Environment ("MOCE") 228 includes the sub-components to create services that run in the IDNA network 200. A Service Independent Building Block and API representations that a service designer uses to create new services are imbedded within the MOCE'S primary sub-component, a Graphical User Interface ("GUI"). The MOCE 228 is a unified collection of tools hosted on a single user environment or platform, alternately referred to as a Service Creation ("SC") environment. It represents the collection of operations that are required throughout the process of service creation, such as service documentation, managed object definition, interface definition, protocol definition and data input definition, which are encapsulated in managed objects, and service testing. The network owner only has to develop a service once using the MOCE 228, because managed objects can be applied to all the nodes on his network. This is in contrast to the network owner having each of the various switch manufacturers develop their version of the service, which means that the service must be developed multiple times.

The MOCE 228 and NMS 212 are connected together via a Repository 230. The Repository 230 contains the managed objects that are distributed by the NMS 212 and used in the IDNA/NGIN Nodes 204. The Repository 230 also provides a buffer between the MOCE 228 and the NMS 212, The MOCE 228 may, however, be directly connected to the NMS 212 to perform "live" network testing, which is indicated by the dashed line 232.

Figure 4:
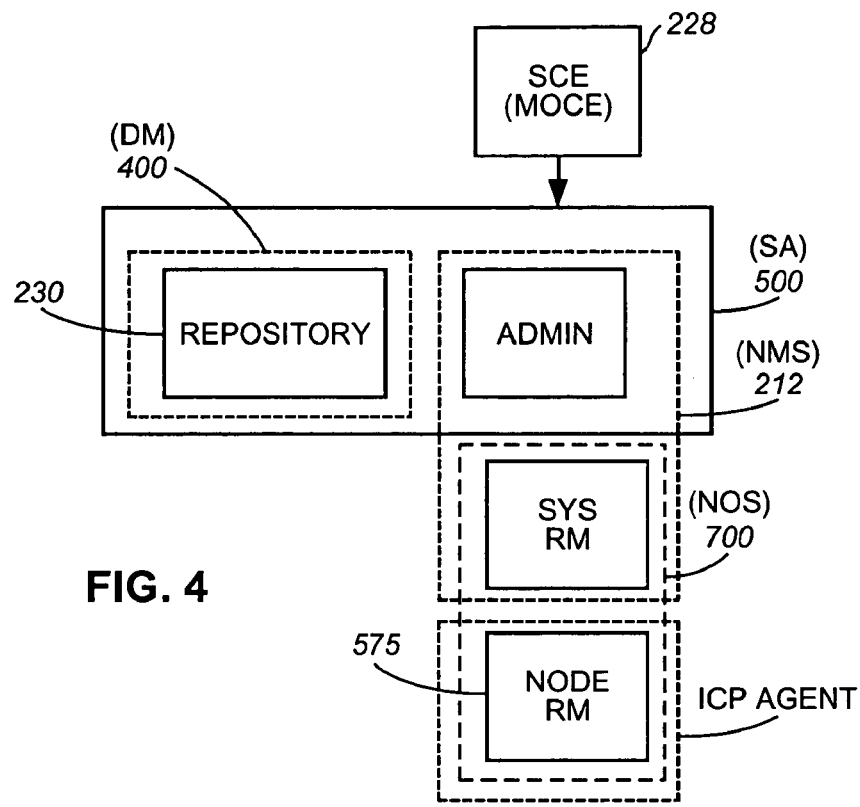
FIG. 4 is a block diagram depicting the SA and DM components of the Next Generation Intelligent Network.

In accordance with the preferred embodiment of the invention, as shown in FIG. 4, the IDNA/NGIN system includes a centralized Service Administration ("SA") component 500 that provides both a storage (Repository) 230 functionality and the generic network management (NMS) 212 functionality of the IDNA system 170 together with added capabilities as will be described hereinafter. Generally, the SA component 500 as shown in FIG. 4, supports off-line storage, naming, distribution, activation and removal of all services and data for the IDNA/NGIN system and, additionally provides a data management ("DM") function enabling the run-time storage, replication, synchronization, and availability of data used by the service objects in the IDNA service nodes.

More particularly, as shown conceptually in FIG. 5(*a*), the Service Administration component 500 is a component that performs all of the functions needed to manage, store, and distribute all services and service data used by IDNA service processing nodes and to configure both the hardware and software components implemented in the system IDNA/NGIN. Generally, as shown in FIG. 5(*a*), the SA component 500 is responsible for: receiving the data from MOCE (Service Creation) 228, receiving customer order data 502 from order entry and other legacy systems 229 to provision the IDNA/NGIN system for use by customers; deploying data, Service Independent Building Blocks ("SIBBs"), Service Logic Programs ("SLPs"), and other service components 503, e.g., to the MOCE 228 as requested by MOCE/SCE users, for example, during the service creation process; receiving completed and tested service packages, SIBBs, SLPs or other service or data components 506 from MOCE 228; providing unique names to each service component; and, distributing the data and each service component 509 to local Data Management components 400, to be described in greater detail herein. In addition, as shown in FIG. 4, Service Administration 500 maintains the repository 230 which includes a global Database of Record ("DBOR") comprising all IDNA/NGIN services and data from which the Data Management component 400 receives all of its data.

Other responsibilities of Service Administration include: activating data and service components 512 to ensure that all data, SIBBs and managed objects or service logic programs SLPs are available for nodes via the Data Management component 400; registering the names of the data, SLPs and SIBBs 515 by feeding their logical names to a Network Operating System ("NOS") component 700, to be described in detail below, for registration therewith; deactivating data and service components 518; and, removing data and services 521 from the IDNA/NGIN system via the Data Management component 400. Service Administration additionally performs a configuration management function by maintaining the state of each SIBB and service (pre-tested, post-tested, deployed, etc.), in addition to versioning through its naming process. This ensures a service is not deployed until all components of that service have been successfully tested and configured.

As will be described with respect to FIG. 5(*d*), the Service Administration component 500 further performs the function of configuring and provisioning the IDNA/NGIN service nodes 204 in accordance with configuration information that SA receives. Particularly, based on the received configuration information, the SA component 500 determines the capabilities of each component at each service node 204, which services and data to distribute to which nodes, which services will run on which server(s) resident at the service node, and which data will be cached to local memory resident associated with IDNA/NGIN node server(s). Particularly, SA deploys configuration rules contained in service profile (configuration) files 580 to a Local (node) Resource Manager (ALRM") component 575 of the NOS system 700 for storage in the local LRM cache located at each service node. As will be described in greater detail herein, these configuration files 580 determine which services to execute at an IDNA node. The LRM first reads this service profile file 580 stored in the local cache at that node, and determines a specific Service Layer Execution Environment ("SLEE11), e.g., a virtual machine, to run a service on in accordance with the rules in the service profile file and, which services are to run actively (as persistent objects) in the SLEE, or are to be instantiated only on-demand.

FIG. 5(*b*) illustrates a preferred physical architecture for Service Administration component 500. While Service Administration is a centralized function, it may be embodied as two or more redundant Service Administration sites, e.g., sites 550*a*, 550*b*, for reliability with each SA site comprising: SA Servers 560, which may comprise dual redundant processors with a shared disk array comprising the global DBOR 230; and, a personal computer (PC) or workstation 556*a,b* resident at each respective site 550*a*, 550*b* having an interface to enable user access to all Service Administration functions and particularly initiate data and service distribution to specified IDNA/NGIN service nodes, depicted in FIG. 5(*b*) as service nodes 204. The aforementioned data and service distribution activation functions all execute on one or more SA Servers 560 found at each site. The components at each respective SA site 550*a,b* are connected by an Ethernet LAN 559, which, in turn, is linked to a WAN 566 for communication with the service nodes.

FIG. 5(*c*) illustrates a preferred physical embodiment highlighting the main functional components of and external interfaces to the Service Administration component 500 of FIG. 5(*a*). As shown in FIG. 5(*c*), the Service Administration component 500 comprises a Data Distribution sub-component 510 that: 1) provides for the reliable communications with external systems; 2) performs any data translation and formatting functions for receiving data from external systems and distributing data from SA to external systems, typically through the intermediary of a common Data Distribution Application Program Interface (DDAPI) 505; 3) extracts data from communications messages received from external systems for input to an Inventory Manager sub-component 516; 4) provides a multipoint distribution function for service/data packages with a store and forward feature and guaranteed delivery and recovery services; and 5) provides for the delivery of data sets in sequence, in addition to gap checking, duplicate checking, receipt acknowledgments, and ensures security of data transmissions.

The input feeds to SA component 500 include: a feed 506 from MOCE/SCE 228 from which service components, packages and SIBB modules used to build services are fed; an enterprise Order Entry (AOE") feed 502 from which customer data is input to perform service provisioning functions; and, one or more Environment Provisioning (AEP") system feeds 508 from which user specifications are input to direct SA 500 on how and where to distribute the services created by the SCE component 228. More particularly, with regard to the Environment provisioning system feed 508, each service node component that is considered part of the NGIN service processing environment (computer hardware, operating system, SLEE, local caches of Data Management) is specified with a service node profile, comprising that node's physical capabilities (e.g., storage capacity, memory capacity, computer processing capacity, etc.). Via the EP system 508 GUI (not shown), a user specifies, based on the service node profile (capabilities) of each service node, a service profile comprising which service objects (e.g., SLPs, SIBBs, data, etc.) are to be deployed to which SLEEs at which nodes, which data are to be deployed to which nodes, and, the local caching strategy of each SLEE and computer. These specifications are input to SA and are used by an Environment Manager sub-component 530 to specify the correct distribution of services and data.

With more particularity, the Environment Provisioning system interface is used to enter the service node profiles as well as direct the distribution of service profiles to the appropriate service nodes. Service nodes may be matched with service profiles automatically, based on the capabilities of the service node and the requirements of the service profile, however, a service profile may specify that a service node be selected manually. If a service profile requests that it be matched against service nodes manually, the service will not be distributed until the match is made using EP System 508. If the service profile requests that the service be distributed automatically, the service may be matched and distributed automatically, however, the Environment Provisioning interface may override this and change the distribution at a later time.

The Data Distribution API 505 provides the standard interface for utilizing all of the SA functions and further interacts with the Data Distribution sub-component to provide guaranteed delivery/recovery services. Particularly, the DDAPI 505 provides a standard message set for utilization by service administration clients, which are the local Data Management components of each service node. The SCE and EP system are also designed to interface with Service Administration via the DDAPI. Other external systems, however, such as OE systems 229, may not designed to utilize DDAPI, and, consequently, a mediation process 511 may be used to adapt communications protocol and messaging formats of such external systems to the DDAPI 505.

Figure 5A:
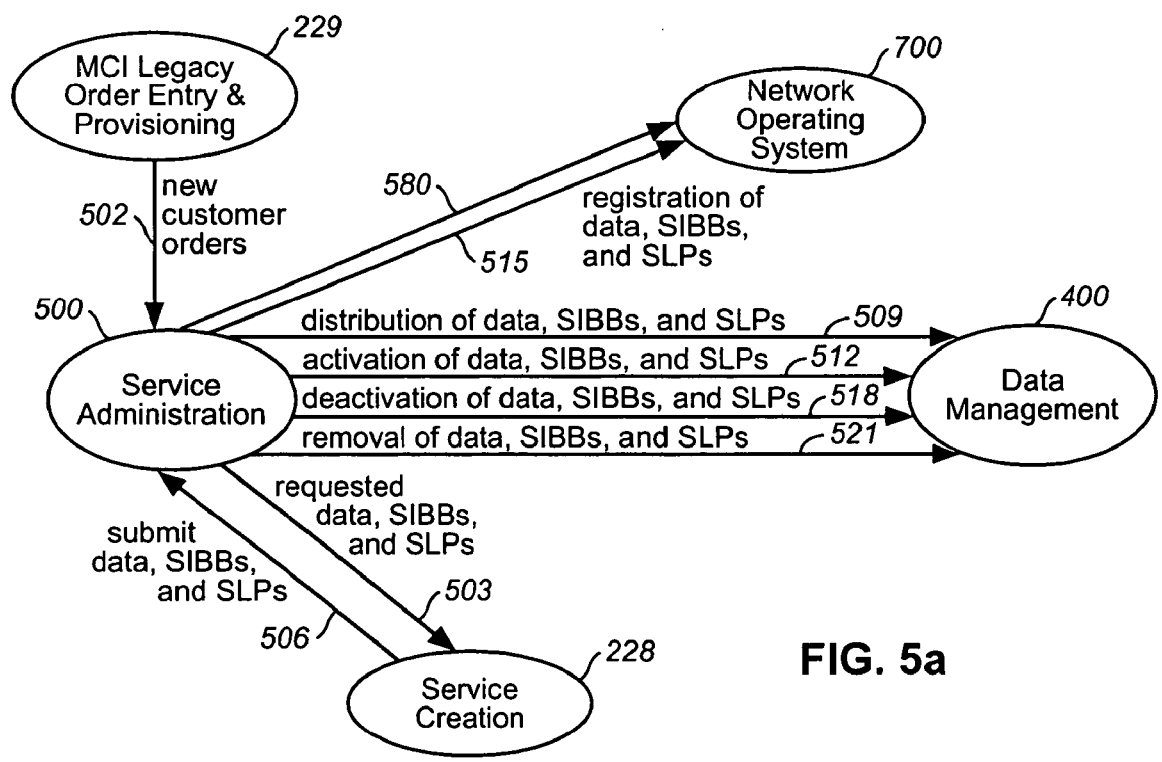
FIG. 5(a) illustrates conceptually the functionality of the service administration component 500.
Figure 5B:
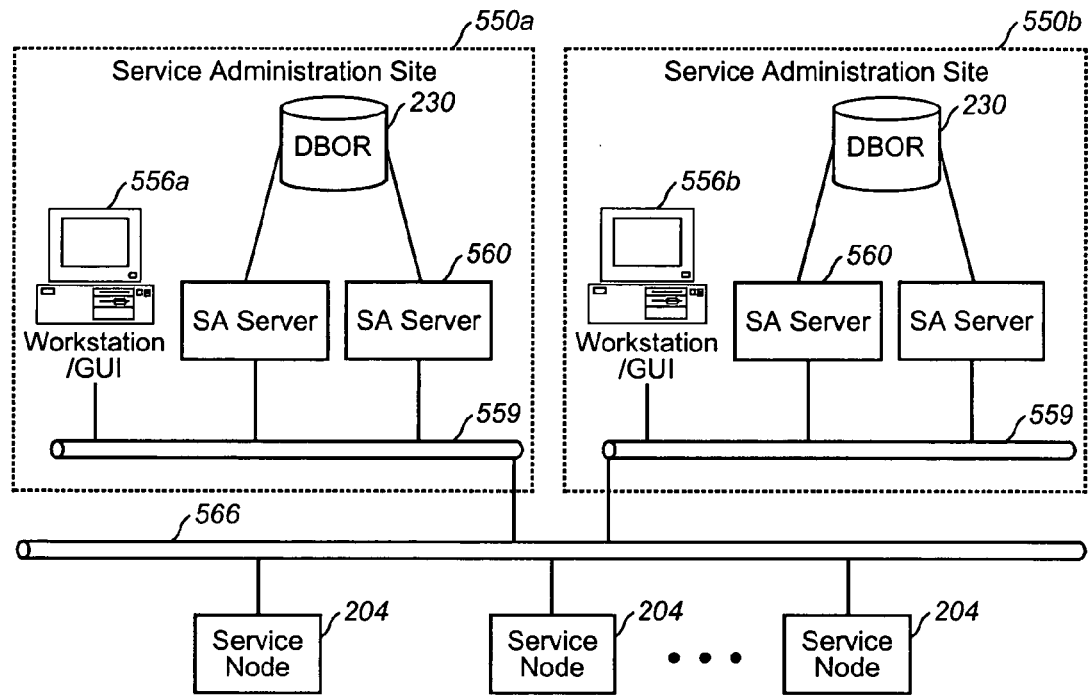
FIG. 5(b) illustrates the physical architecture of the service administration component 500.
Figure 5C:
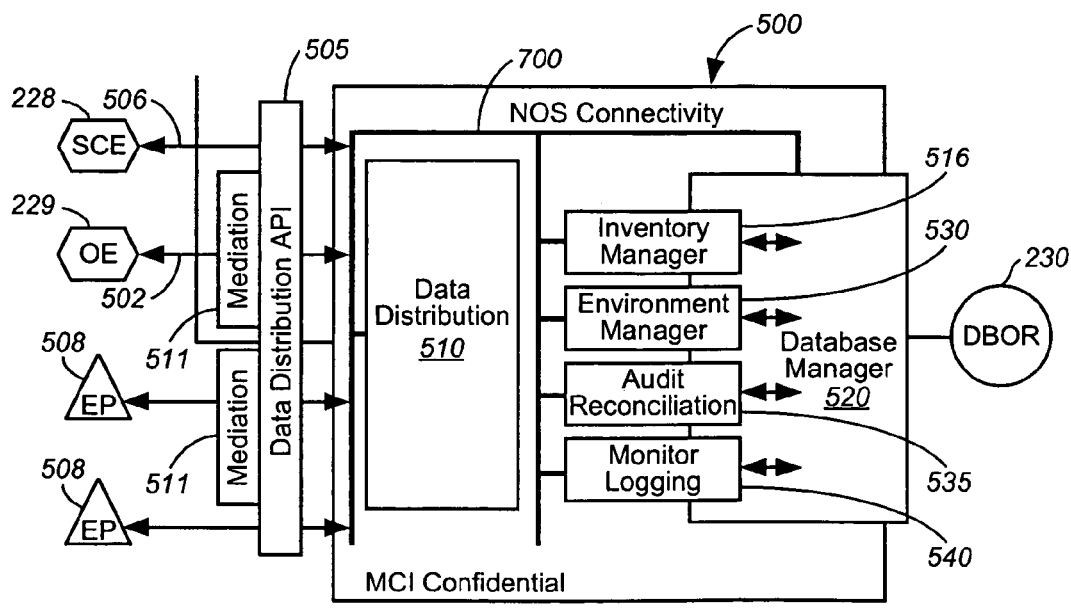
FIG. 5(c) illustrates the general functional architecture of the Service Administration component 500 of the IDNA/NGIN system 100.
Figure 5D:
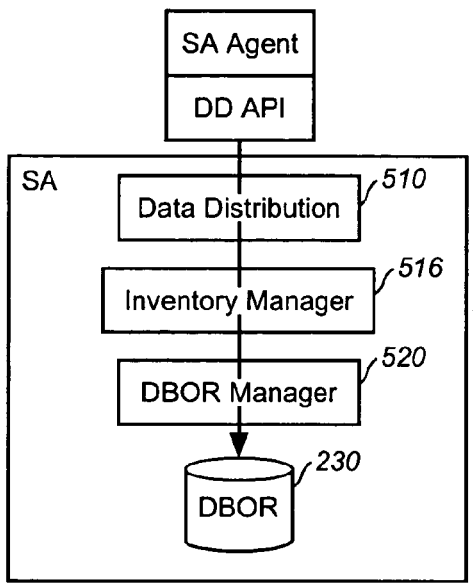
FIG. 5(d) illustrates the scheme employed by SA for updating the DBOR.
Figure 5E:
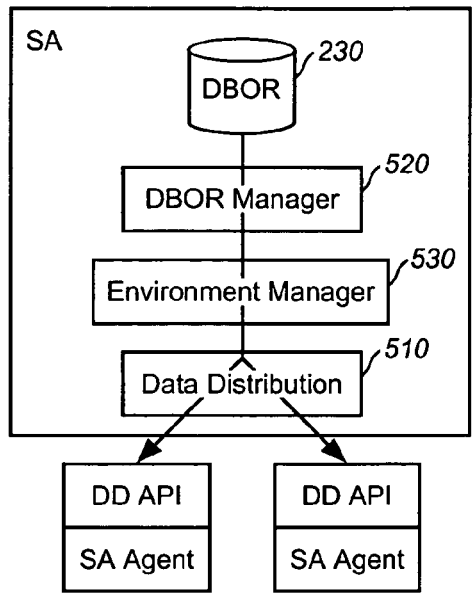
FIG. 5(e) illustrates the scheme employed by SA for distributing data from the DBOR to the data management components.

As shown in FIG. 5(c), only a single DDAPI 505 and Data Distribution process 510 is required for all external interfaces. All external systems that interface with Service Administration have access to all of its functions, depending on the privileges allowed to each. This ensures that functions such as DBOR updates, for example, are all handled in the same manner, regardless of who initiates them, and, further, eliminates special case processing. This also ensures that the same data integrity checks that are provided to some systems (e.g., OE) are provided to other systems (e.g., Network Elements), and further, encourages development of external systems to interface with Service Administration.

As further shown in FIG. 5(c), the SA component 500 comprises the following sub-components: as Inventory Manager 516; a DBOR Manager 520; an Environment Manager 530; an Audit and Reconciliation Manager 535, and, a Monitoring and Logging Manager 540. The functions of each of these will now be explained in greater detail.

The Inventory Manager sub-component 516 receives all data entities from external sources, via the Data Distribution process 510. These data entities include services and SIBBs from Service Creation, service data and customer data from order entry system feeds 502, and environment configuration and provisioning specifications from Environment Provisioning feeds 508. The Inventory Manager 516 provides a unique name to each data entity received according to a pre-determined naming convention. This includes multiple versions of the same data entity. Inventory Manager also ensures data integrity among the data received from multiple sources, and resolves any conflicts. For example, if Inventory Manager receives, from two different OE sources, two different network terminations (resolved from having applied any intelligent routing features) for the same customer toll-free telephone number, Inventory Manager will detect this by performing an audit on each received data entity. Upon detection, it may either perform a resolution algorithm (e.g., keep the network termination with the most recent date/time stamp), or, notify the user of the conflict. Inventory Manager then stores the named data entity in the DBOR 230. It uses a DBOR Manager 520 to actually store the data in the DBOR. The Inventory Manager also notifies the Environment Manager of any updates to the DBOR.

The DBOR Manager 520 provides a single interface to the DBOR 230 for the multiple functional components of Service Administration and performs all database management functions (add, delete, retrieve, modify, etc.). This is a significant function, in that the DBOR may actually comprise multiple databases for the purpose of storing multiple types of data: SLPs for services, SIBBs, datasets for customer and service data, multi-media data for IVR services, etc. Preferably, the DBOR comprises both object databases and relational databases. These databases may be provided by different vendors, and, therefore, require different command sets for performing database management functions. The DBOR Manager 520 encapsulates these variations from the other Service Administration components, so that any component that needs a DBOR function performed simply implements a common command set provided by the DBOR Manager, and a data entity name. The DBOR Manager 320 uses the data entity name provided, and adapts the requested command to a format used by the specific database type, to perform the requested function. There are three Service Administration sub-components that interface with the DBOR Manager: Inventory Manager, 516, Environment Manager 530, and an Audit and Reconciliation Manager 535.

The Environment Manager sub-component 530 is responsible for deploying services and data from the DBOR to the local Data Management components at the NGIN service nodes. It does this by first determining which service/data entities needs to be distributed to which nodes; then issuing the appropriate distribution commands, along with the data entities extracted from the DBOR, to Data Distribution. Environment provisioning specifications that are input by a user via the EP system feeds 508, are stored in the DBOR and are used by the Environment Manager to determine distribution. In this way, Service Administration distributes to each NGIN service node only those data entities that will be needed by that service node. This feature reduces the storage requirements at each service node and network bandwidth and processing/transmission time needed for data distribution. It additionally enables the network-wide distribution of NGIN functions by simplifying data integrity, since the number of copies of a data entity is minimized. It should be understood that Environment Manager functions may require complex processing by Service Administration, but this complexity is easily encapsulated in distribution rules, which are applied by the Environment Manager. Additionally, Environment Manager 530 presents a valuable level of configuration provided to the NGIN system architecture. That is, while all data may be deployed to all service nodes to enable all services at each node, this is not necessary. A user may decide which services to render at which nodes to optimize network design, then deploy data necessary for those services to those nodes.

The Environment Manager 530 may be additionally notified by either the Inventory Manager or the DBOR Manager, whenever the DBOR is modified, for example, when a service has been replaced with a new version. The Environment Manager 530 ensures that each service node that is impacted gets updated (i.e., receives the new service version). When it receives notification of a DBOR update, it identifies each service node that uses the updated data or that provides the updated service and then distributes the updates to the local Data Management components at each impacted service node as described herein.

The Audit and Reconciliation (A/R) Manager 535 ensures data synchronization among the DBOR and its multiple extracts by running auditing routines to compare the data in the DBOR 230 with data in any of various DBOR extracts. It then determines corrective actions to re-sync the multiple databases. To implement these actions, the A/R Manager generates a data package containing data and commands to process these data. This data package is then provided to whichever databases is needed to implement the corrective action to re-sync the multiple databases. Preferably, this may be accomplished as follows: 1) during system idle time, it may run an auditing routine to look for and resolve any discrepancies between the data in the DBOR and the data in a DBOR extract, which may reside in a local Data Management database at a service node; and, 2) during real-time call processing, if a service application finds a discrepancy, e.g., a service application is given a key for a data lookup in Data Management, queries a database with this key, but finds no record, the application generates an alarm. This alarm is sent to the A/R Manager 535, which resolves the discrepancy.

The Monitoring and Logging sub-component 540 is a process which monitors the performance and stability of Service Administration processes, and logs certain or all events performed so that a user can later see what data was deployed to which nodes and when, for example.

As described, the global DBOR 230 may be one or more physical databases, partitioned to store and manage the many different types of data and services including: SLPs, SIBBs, service data and customer data, e.g., customer profiles including call record information, faxes and routing plans, and, multi-media files including voice mail messages and other audio and video files or objects for interactive services. While a plurality of DBORs may exist for redundancy and survivability, the DBOR 230 is a single logical storage of all NGIN services and data, for distribution to any and all other NGIN functional components and processes.

As further shown in FIG. 5(*c*), the SA component 500 implements the NOS component 700 to provide communications among the different Service Administration processes. For instance, the DDAPI 505 uses NOS services to provide a message set that uses the communications mechanisms of NOS to enable interfaces between external systems and Data Distribution 510, and between Data Distribution 510 and the other SA sub-components. The NOS 700, however, is not required for communications among the Inventory Manager, Environment Manager, A/R Manager, and DBOR Manager components as these processes, in a preferred physical embodiment, are designed to run on the same computing system. It should be understood that even in a distributed computing environment in which these processes run on different computing systems, these processes may communicate with each other using other internal APIs and communications protocols, e.g., TCP/IP sockets. It would be apparent to skilled artisans how to provide all Service Administration internal processes with the capability for using NOS for inter-process communications.

Having described the preferred embodiment of the SA component 500, a more detailed description of the major services performed by Service Administration 500, is now provided with reference being had to FIGS. 5(*c*)–5(*e*).

First: as mentioned, the SA 500 is responsible for naming and performing versioning of services and data. That is, SA provides a unique name to every version of every service/data entity prior to storing the service/data entity in the DBOR 230, so that multiple versions of the same service/data entity may be maintained. When SA distributes the data/services to Data Management, a single logical name is provided with each entity, along with a unique version name, so that processes such as SLPs may call on a service/data entity with a common logical name without having to know which version is needed. It should be understood that the name registration requirements provide a detailed understanding of the need for data, SIBB, and SLP names to be unique, and for SA component 500 of NGIN to maintain the master copy of these various components. As data, SIBBs and SLPs are provided to SA, the creator of those components has identified them using a user name. This user name provides a way for MOCE/SCE to identify the component, in their terms; this user name is then uniquely identified with the single logical name, (i.e., a common reference). Preferably, SA implements a naming structure convention when naming new or modified components and, preferably maintains a mapping among the user name and the logical system unique names. In the performance of a request for data, SLPs and SIBBS, SA may provide the user name, in addition to the logical system unique name.

Second: the service administration component 500 is responsible for service provisioning, i.e., provisioning services with data needed to provide those services. This type of data is input to SA from the Order entry feed 502 and is stored in the global DBOR 230 prior to distribution to Data Management 400. This type of data may include, but is not limited to, customer profile data, such as customer service options, customer name and account data, terminating telephone numbers, call routing data, and any data potentially needed to process and complete a call for a service. As an example, when a 1-800 service is built in Service Creation for a corporate customer, that customer=s name, account/billing information, 800 telephone number(s), terminating network addresses, service options (routing features, multi-media file identifiers) received from the OE system are needed to provision the particular service(s). In this function, Service Administration 300 parses appropriate order entry feeds to create a consolidated and consistent order entry record to the NGIN and ensures that each feed received from an order entry system or from a provisioning system is acknowledged.

Third: the SA component 500 is responsible for service support provisioning, i.e., configuring of the NGIN processing environments (hardware, operating systems, SLEE(s), sites, site LANs and inter-site WANs) and the provisioning of data that specifies these configurations. Specifically, each IDNA/NGIN service node has an associated service node profile that is input to SA via the Environment Provisioning sub-component 508 (FIG. 5(*c*)) and specifies the capabilities of the computing system, the functions the computing system is allocated, and the types of services that may be supported at that service node. An example service node profile, which may be embodied as a formatted data file in SA, is depicted in Table 1 as follows:

TABLE 1

| | |
|---|---|
| Computer Name: | Hayward #1 |
| Operating System: | SUN Unix |
| Processing Units: | 5,000 Units |
| Memory Units: | 3,000,000,000 Units |

TABLE 1-continued

| Disk Units: | 30,000,000,000 Units |
| 30,000,000,000 Units | 10,000,000 Units |
| Voice Playback Capability | |
| Data Management Access: | Full |
| Service Node Selection: | Manual |

Thus, in the example profile of table 1, there is specified: a node name, an operating system for the computer executing service logic programs, the amount of memory, disk and data communication units, an indication that the node is capable of receiving customer specific data from SA (data management access) and, that the node can support special service features, for example, voice playback capability. It should be understood that the example Table 1 may include other types of information associated with the amount of resources and capabilities associated with a particular service node.

Additionally generated in the SA for each service is a service profile, which may be embodied as a formatted data file in SA, that specifies that service=s requirements and to which SLEE(s) and/or computers within the network it should be deployed. An example service profile for a particular service to be deployed in the network is depicted in Table 2 as follows:

TABLE 2

| Profile Name: | Service 1001 for Customer X Announcements |
| Operating System: | All Unix |
| Processing Units: | 200 Units |
| Memory Units: | 30,000 Units |
| Disk Units: | 2,000 Units |
| Instantiate (Time Range, Min, Max): | 00:00–23:59, 1, 5 |
| Data Communication Unit (Average): | 10,000 Units |
| Data Communication Units (Burst): | 30,000 Units |
| Voice Playback Required | |
| Data Management Required: | Data Set 1001 |
| Service Start Date: | 01-01-1998 10:00 |
| Service End Date: | None |

In table 2, there is specified: a service profile name, e.g., service #1001 for a customer X; amount of processing units, memory, and disk space required to execute the service when instantiated; a node instantiate field(s) specifying a time range when a particular service (embodied as a service logic program, for example) is to be instantiated according to a predetermined business rule(s) specified in Service Administration, and a corresponding min/max field(s) indicating the minimum and maximum number of those service objects (SLPs) that may be instantiated by NOS during the specified time range; a special requirements field(s) indicating for example, that the service requires a particular service node capability, e.g., voice playback; and, a service start data and service end date. It is readily apparent that SA may distribute the service (and service profile) of the example service 1001 of Table 2 to the service node having the service node profile depicted in Table 1, as the node clearly has the memory requirements and the voice playback support. It is additionally apparent that the example service #1001 depicted in the service profile in Table 2, requires a data set from customer X that would comprise, inter alia, a voice playback service announcement specific to that service #1001 provided by customer X. The SA component 300 will receive data via order entry feed 307 that includes the customer X voice playback announcement, and SA=s inventory manager will assign it as a data set #1001, for example, for storage in the DBOR 230. In this manner, SA may automatically distribute the dataset #1001 to the service node(s) providing the service #1001 for customer X.

These service node profiles (e.g., Table 1) and service profiles (e.g., Table 2) are input to SA and stored therein to enable automatic tracking of: 1) the capabilities of each service node, i.e., how many computers and SLEE(s), and the resource capacity of each; 2) which services and data are to be deployed to which service nodes and when; and, 3) the configuration of service execution, i.e., at which times an SLP should run persistently versus on-demand, for example. The capabilities of each node and computer in the network is maintained, so that simple and complex business rules governing data/service distribution, data/service activation and data/service removal may be applied to optimize the execution of services on IDNA/NGIN service nodes. Thus, a part of the service support provisioning function is to determine which service to instantiate as a persistent object (to run actively) on which SLEE, with rules based on one or more criteria including, for example, load balancing among service nodes, network call routing efficiencies, and service demand. An example of this service support provisioning function now follows. As some services are more time-sensitive than others, the degree of tolerance callers may have for delays in a certain type of service may be used to determine whether that service runs actively in the SLEE as a persistent object, for example, and whether data for that service is to be cached to local memory to reduce latency. When considering service demand, a certain service may see peak demands, for instance, at night. The SA 500 thus allows a user to specify an SLP for this service to run actively (be instantiated as a persistent object in the SLEE) from 5:00 pm to 12:00 midnight, local time per each site, for example, and be instantiated only on-demand at other times. A rule in the service profile file (Table 2) generated by SA will reflect this.

Fourth: the SA component 500 is responsible for distributing services and data to the local Data Management functional component at the selected IDNA/NGIN system nodes, in accordance with the strategies specified by the customer. These strategies are embodied as specifications in the service package created in the Service Creation Environment 228, and also as specifications input by the user via the SA 500 as part of its service support provisioning function. Included in this function is the ability of SA to track the current state (e.g., tested, deployed) of data, SIBBs, and SLPs. Not only does it track the state, but additionally tracks the current versions of data, SIBBs, and SLPs and the various components (i.e., data, SIBBs, and SLPs) needed to create a specific version (including the various dependencies) of a service. In the global DBOR, SA stores each version of a service (i.e., including all SLPs encapsulated in a service SLP) and, moreover, tracks the configuration (e.g., physical address) of the various Data Management repositories, e.g., DBOR extracts, across the IDNA/NGIN network.

Moreover, the SA component 500 tracks services and data that have been distributed, in order to ensure integrity. For example, if a service is successfully deployed to a node, but distribution of the data needed for that service fails, SA detects this and either retries the data distribution or notifies the user. If after a predefined, configurable number of retries, the designated repository is unable to receive the distribution, SA generates an alarm and stores the pending distribution.

Further to the SA distribution function for distributing data, SIBBs and SLPs to Data Management, SA is also responsible for: 1) distributing SLPs, SIBBs and data to a network integration test environment for end-to-end testing; 2) enabling an authorized user to configure a preset time for a distribution; e.g., now (on-demand), noon today, 3 p.m. tomorrow; 3) initiating distributions based on a preset time; e.g., deploying a voice file at 1:15 a.m. tomorrow; 4) defining distribution rules that designate to which NGIN data management repositories are to receive SLPs, SIBBs and data; 5) determining the locations to distribute the data based on predefined distribution rules; 6) checking the status of a designated repository (by querying the NGIN NOS component) prior to a distribution; 7) attempting the distribution to all designated repositories reporting an on-line indication, and, if a designated repository is reporting an off-line indication, storing the distribution for that repository for future forwarding; 8) forwarding all pending distributions to a repository once an on-line indication is received from a designated repository that was previously off-line; 9) monitoring the distributions to Data Management. For example, if a distribution is for a new version of an existing SLP, SIBB or data entity, SA ensures that when the distribution is received, the existing data is not overwritten in Data Management; 10) receiving status indications of successful or unsuccessful distributions from Data Management and, updating the status of all data based on the successful/unsuccessful distribution status indications received from Data Management; and 11) logging all distributions to Data Management.

At this point, it is necessary to distinguish between the internal processes required to update the DBOR 230, as depicted in FIG. 5(*d*), and, the internal processes required to distribute service packages and data extracts from the DBOR, as depicted in FIG. 5(*e*). Separate processes are required as the format of data maintained in the DBOR 230 differs from the format of data input from the external sources, and from the format of data in extracts for distribution. Thus, to perform meaningful audits and ensure data integrity and synchronization, the DBOR update process depicted in FIG. 5(*d*) requires invocation of the Inventory manager process 516 and DBOR manager process 520. When extracting data from the DBOR to the various SA agents (DM clients), invocation of Environment manager process 530 and DBOR manager process 520 is required, as depicted in FIG. 5(*e*). Thus, implementation of these separate processes allows audits of the DBOR with input systems data, and audits of the DBOR with extracted data that is being or has been distributed to Data Management.

Fifth: the SA component 500 is responsible for activating services that are successfully deployed to service nodes, i.e., making the data, SLP or SIBB available for Service processing. The requirements pertaining to SA service/data activations and the handling required when errors occur include the following: 1) ensuring that all distribution dependencies (defined in the MOCE/SCE 228) are complete prior to allowing activation of SLPs, SIBBs or data. An example of a dependency may be that an SLP requires use of a specific database. The SA thus ensures that the database has been distributed and activated prior to allowing activation of the SLP; 2) checking the status of the distribution to its designated repositories prior to activation of an SLP, SIBB or data entity; 3) determining, based on distribution status, dependencies, completion status and predefined distribution rules whether the data previously distributed can be activated at all locations which successfully received the distribution. If SA determines that the data distributed may be activated, SA will attempt to send an activation request to Data Management; 4) checking the status of a designated repository (by querying the NGIN NOS) prior to sending activation requests; 5) attempting the activation on all designated repositories reporting an on-line indication, and, if a designated repository is reporting an off-line indication, storing the activation request for that repository for future forwarding and not attempt the activation on that repository. If a designated repository reports an on-line indication and for some reason is unable to process the activation request, SA retries the activation to that repository. If after a predefined, configurable number of retries the designated repository is unable to process the activation request, SA generates an alarm and stores the pending activation. Once an on-line indication is received from a designated repository that was previously off-line, Service Administration forwards all pending distributions and activations to that repository; 6) receiving activation responses from Data Management. If an activation request indicates a success on all designated repositories, SA registers the system unique name of the data, SIBB or SLP and the physical locations of the information with the NOS. It should be understood that the physical location name includes an identification of the hardware component name.

In the preferred embodiment, SA determines, based on predefined distribution rules and the activation responses received from Data Management 400, whether the data has been activated at enough locations to make it available to service control managed objects. If Service Administration determines that the data may be made available to service control, SA registers the system unique data name and physical data locations of all successful distribution and activation locations with the NOS. If the data activated is to replace existing data in the network, SA ensures a smooth transition process of completing existing service processing on the old data while initiating new service processing on the new data. The old data becomes deactivated once all service processing completes on it, as will be explained in greater detail herein.

More specifically, as part of the service/data activation step, SA implements a trigger which causes the downloading of the service profile at the appropriate time. When a service profile (e.g., as shown in Table 2) is downloaded to a service node, the service profile includes the service start and end times. The service profile is downloaded to the service node by provisioning the information into Data Management, as will be described in further detail with respect to FIG. 5(*f*). The NOS, acting as a DM Client, is notified of the change in service profile information via the DM API. In a preferred embodiment, SA sends a message to a NOS Name Translation (ANT") function in each SLEE on which the service will execute to direct a name translation function to re-point the logical name for the service to the physical address or object reference of the version that is being activated.

Finally, the SA tracks repository platform characteristics to ensure that when data, SIBBs or SLPs are activated, they work on the appropriate platform; updates the status of the data, SIBB or SLP based on an activation or deactivation; and, logs all activations of data, SLPs and SIBBs with the monitoring logic component 540 (FIG. 5(*c*)).

According to this fifth SA function, an explanation of how the IDNA/NGIN system handles service construction and deployment phases, is now provided with reference to FIGS. 5(*g*) and 5(*h*) which illustrate a scenario of steps in constructing and deploying an SLP for the IDNA/NGIN system, e.g., for a 1-800 Collect ("18C") service. As indicated at steps 330 in FIG. 5(g), the MOCE/SCE application program enables the user to access from SA all of the SIBB, SLP, data and other building blocks that are necessary for the creation of the 18C SLP. In the example context of 18C service, such building blocks may include: a play audio building block, a collect digits building block and a voice recognition building block. Copies of these appropriate building blocks are pulled from the global DBOR 230 by SA into the MOCE/SCE to provide the foundation for developing the 18C Service Logic Program, as indicated at step 332, FIG. 5(g). Then, as indicated at step 334, the 18C Service Logic Program and all associated data such as voice files are unit tested within the MOCE/SCE environment. Next, as indicated at step 336, the 18C Service Logic Program is end-to-end tested in a lab environment which closely resembles the real-time MCI network to ensure that the Service Logic Program will execute correctly once distributed in the network. Then, as indicated at step 338, the 18C Service Logic Program is submitted to the Service Administration for naming and cataloging in the manner described in detail herein, prior to its distribution.

As described herein, the Service Administration component allows the introduction of rules governing data and information distribution, data activation and data removal. Thus, as indicated at step 340, the SA component checks the rules that specify the Data Management repositories that are to receive the SLP and, the rules regarding the minimum number of repositories that must receive the distribution prior to allowing activation of the 18C SLP. To do this, as indicated at step 342, Service Administration checks the status of the local DM repositories by accessing the NOS Network Resource Management function, as described herein. Then, as shown at step 344, FIG. 5(h), the Service Administration component determines those DM repositories indicating "On-line" status, and, at step 346, distributes the 18C SLP to all the DM repositories that are on-line. For those repositories reporting an off-line status, Service Administration stores the distribution for future forwarding to the off-line repository, as indicated at step 348. Then, as indicated at step 350, the Service Administration component waits unit Data Management returns a status for each repository indicating the success or failure of the distribution. A determination is made at step 352 to determine whether the confirmation has been received from the respective DM repository. If the confirmation is not received, the SA waits for the confirmation as indicated at step 355. Once the confirmation is received, the process continues to step 354 where a determination is made by Service Administration as to whether the 18C SLP can be activated at all repositories where the distribution was successfully received.

Particularly, Service Administration makes the determination of whether the 18C SLP may be activated based on the combination of the following activation criteria: 1) the distribution status, 2) the data dependency status and 3) predefined rules. This is because Service Administration 500 performs the function of ensuring that all data dependencies of the service logic program are completed; i.e., distributed and activated, prior to allowing activation of an SLP dependent on such data. Thus, in the example context, if the 18C SLP uses another Service Logic Program (e.g., an interface SLP to a Line Information Data Base) during its execution, Service Administration ensures that the other SLP or database has been distributed and activated prior to allowing activation of the 18C SLP. It should be understood that some services may be activated even if all designated repositories do not receive the distribution of the Service Logic Program. This is dependent on several factors including: the expected call volume, and the quality of service, as specified in the distribution and activation rules in SA. For example, it may be sufficient for a particular low-call volume service to only be stored on two DM repositories in the network prior to being activated while others require that the service be located on all designated repositories before it can be activated to receive traffic.

Figure 5F:
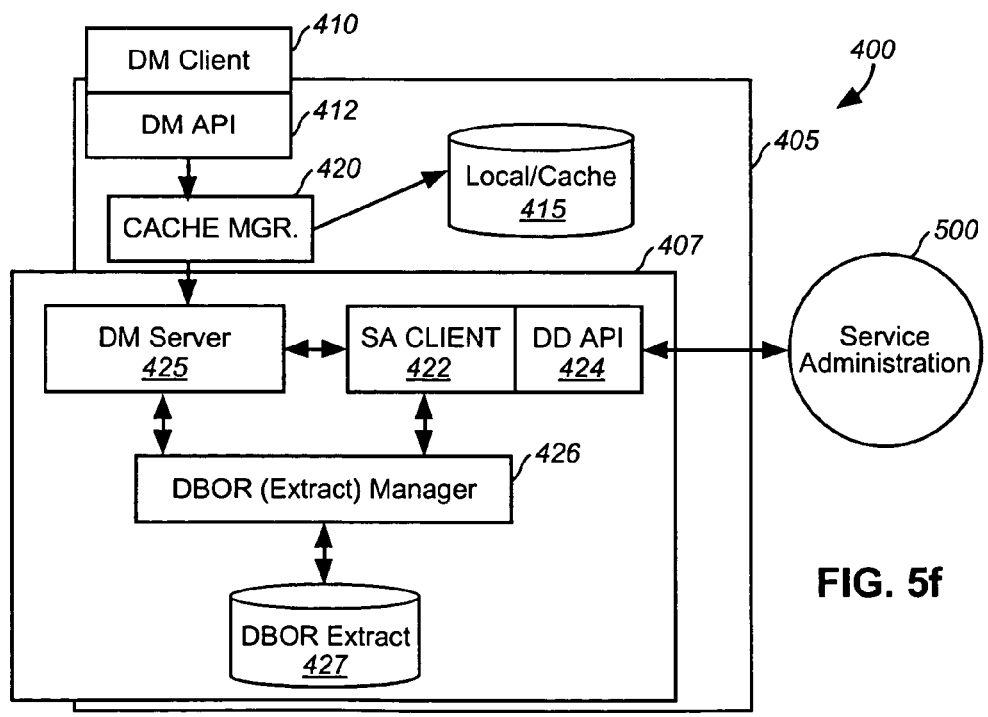
FIG. 5(f) illustrates the functional architecture of the Data Management component 400.
Figure 5H:
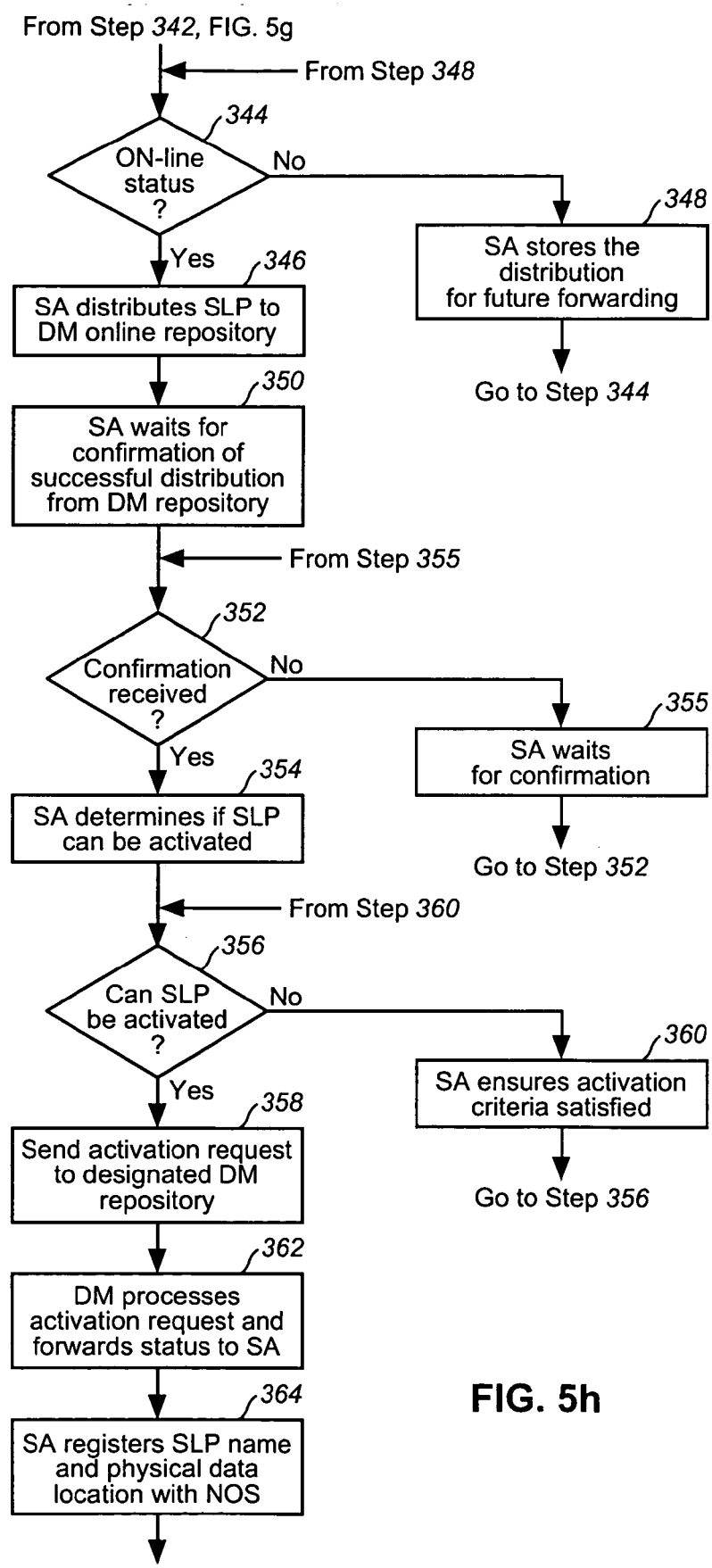

Thus, in FIG. 5(h), step 356, a determination is then made based on the satisfaction of the activation criteria. If the SLP can not be activated, SA will wait until the SLP activation criteria are satisfied, as indicated at step 360. Otherwise, as indicated at step 358, SA sends an activation request to all designated Data Management repositories. Then, as indicated at step 362, Data Management processes the activation request and forwards an activation response for each repository to Service Administration indicating the success or failure of the activation. Based on the successful activation responses received from Data Management, Service Administration registers the 18C SLP system unique name and physical data locations with NOS, as indicated at step 364, and, in the example context, the 18C Service is now available for utilization. Any data repositories that were unable to receive the distribution and/or activation of the 18C SLP are not registered with the NOS as a valid physical data location for this Service Logic Program.

Sixth: just as the SA enables the distribution and activation of service components, the SA component 500 provides for the decommissioning and removing of service components from service nodes. The major steps involved are planning, de-activation, de-installation and/or de-commissioning of its associated parts, and the testing for adverse consequences. For example, after a period of service inactivity, or as specified by a user, when a service is no longer needed at a particular node, service administration will remove, i.e., de-activate the service, typically by sending a message to NOS NT enables removal of a service from IDNA/NGIN service nodes by sending a message to the local Data Management component to delete that service. The requirements pertaining to the SA function of deactivation and removal of services/data include: 1) enabling an authorized user to request deactivation of an SLP, SIBB or data entity and to specify a time for a deactivation; 2) checking the status and data dependencies of the SLP, SIBB, or data prior to forwarding a deactivation request to Data Management. If the SLP, SIBB or data status is active and no data dependencies exist, SA de-registers the SLP, SIBB or data with the NOS upon reaching the specified time rendering the SLP, SIBB or data as no longer available for Service Processing; 3) upon completion of the name de-registration with the NOS, forwarding a deactivation request of the specific SLP, SIBB or data item to Data Management. If the SLP, SIBB or data status is not active or if data dependencies exist, SA ignores the deactivation request and notifies the requester; 4) logging all deactivations of data, SLPs and SIBBs; 5) enabling an authorized user to request the removal of an SLP, SIBB or data entity and specifying a time for a removal; 6) checking the status of the SLP, SIBB or data prior to forwarding a removal request to Data Management. If the status of the SLP, SIBB or data is deactivated, SA forwards the removal request to Data Management upon reaching the specified time. If the status of the SLP, SIBB or data is not deactivated, SA ignores the removal request and notifies the requester; and, 7) logging all removals of data, SLPs and SIBBs from Data Management.

As described above with respect to service/data activation, a trigger in SA 500 causes SA to download the command to remove the service profile from the service node at the appropriate time. This command is delivered to the service node by a command to Data Management 400. Data Management updates its tables, which results in NOS, acting as a DM Client, to receive notification of the service change.

FIG. 5(*i*) illustrates the service de-activation process with reference to the example of a provisioned 1-800 Collect SLP service. As shown in FIG. 5(*i*), the first step 368 involves the decision to withdraw the 18C Service Logic Program and the utilization of the MOCE/SCE to test the impact of removing the 18C Service Logic Program. Then, as indicated at step, 370, SA verifies the rules regarding the withdrawal of the 18C Service Logic Program. Particularly, Service Administration checks to ensure that there are no dependencies of other active Service Logic Programs on the 18C Service Logic Program. If dependencies do exist, further investigation is required to determine if the dependent Service Logic Programs are truly necessary and the planning step is repeated. If no dependencies exist, Service Administration will allow an authorized user to specify a time for the deactivation. Once it is determined that the SLP can be withdrawn, SA sends a deactivation request to all Data Management repositories containing the 18C SLP, as indicated at step 372. Data Management processes the deactivation request, as indicated at step 374 and sends a deactivation response to SA indicating the success or failure of the deactivation. Upon a successful deactivation of the 18C SLP, SA de-registers the 18C SLP with the NOS, as indicated at step 376, to ensure that the 18C SLP is no longer available for service processing. Future service requests will thus not be able to use the 18C SLP. Then, as indicated at step 378, SA allows an authorized agent to specify a time for removing all the 18C SLPs from all Data Management repositories where they reside. Once the specified time arrives, SA sends a removal request to all Data Management repositories containing the 18C SLP, and, as indicated at step 380, Data Management deletes the 18C Service Logic Program from its repositories, rendering the 18C service no longer available.

Seventh: the SA component 500 is responsible for performing audits. Before a service or data entity is entered into the DBOR, Service Administration audits that entity with other service/data entities already in use, to ensure no conflicts exist. Likewise, before a service/data entity is distributed to service nodes, it is audited to ensure no conflicts exist. Service administration provides both process-triggered audits and schedule-triggered audits of both services and data in the DBOR 230 that is deployed to service nodes. A process triggered audit is an audit which is initiated as a result of an unexpected failure. For example, if SA tries to download a service profile and the download is rejected because the profile already exists, SA initiates an audit to determine what to do. For example, SA compares the service which already exists against the one that is supposed to be downloaded to determine if they are the same, or different. If they are the same, the audit might stop there. If they are different, the audit process initiates a delete of the existing profile and then downloads the correct one. Schedule-triggered audits are triggered in accordance with a pre-defined schedule, or in accordance with programmed rules that launch auditing routines during system idle time, or on-demand by a user. These SA audit rules are kept as compiled code in the SA system 500, and as interpreted rules which are processed inside the SA system.

Referring back to FIG. 4, the NGIN Data Management component 400 functions in both a service life-cycle and service utilization capacity. Where the Service Administration component maintains the global database or record (repository), the Data Management component 400 provides the local data store and data management functions for each IDNA/NGIN service node. This includes all types of data including: service programs and SIBBs, data for services (customer profiles, telephone numbers, etc.), multi-media files (such as audio files for Interactive Voice Response ("IVR") services), etc. Specifically, the Data Management component 400 of a service node receives an extract of the SA global DBOR comprising all data needed for the services performed by the local NGIN service node as specified by Service Administration. The mechanics of this will be described in greater detail hereinbelow with respect to FIG. 5(*f*).

FIG. 5(*f*) illustrates the Data Management component 400 of the SA component that provides local data storage and management functions for each IDNA/NGIN service node. Particularly, Data Management stores data received from Service Administration in one or more databases, and makes services/data readily available for Service Control environment by caching the needed data to memory resident in the Service Control computers, or on a co-located database server so the services/data may be provided to a Service Control service with minimal latency. More generally, the Data Management component 400 performs the real-time storage, replication, synchronization, and availability of data whether received from Service Administration or received as a result of service processing. As now described, these Data Management functions may be further categorized as: 1) a Data Repository function; 2) a Data Manipulation function; 3) a Data Utility function; and 4) a Billing Record Generation function.

Data Repository Function

The Data Repository function comprises all specific functionality required for the storage of IDNA/NGIN data. Generally, a repository is a physical device that stores all different types of information; e.g., voice files, objects, SLPs, SIBBs, and databases. In the administration of the data repositories, Data Management functionality takes into account security, fault and configuration management of repositories.

The repository storage aspect of Data Management includes the ability to: 1) store persistent data, SIBBs, SLPs, audio files, call context data, schedule data, configuration data, name service data, text files, e.g., faxes; 2) retain specified data for a configurable period of time, e.g., call context data may be stored for a couple of days before deletion from the repositories; 3) automatically delete the specified data from its repositories upon expiration of the retention period; and, 4) provide support for multiple versions of repository data.

As part of the storage function, Data Management 400 may check the status of its repositories to ensure that queries and distributions are only made to on-line repositories. Thus, if a repository is taken off-line, queries and distributions will not be attempted on that repository. As part of this function, Data Management may: query the status of repositories, e.g., ascertain a utilization status which provides an indication of how busy each repository is in terms of the number of transactions its currently processing; forward the repository status information to NOS 700 at initialization, and as status changes occur; provide an alarm if a repository is taken off-line or is non-functional; and, notify the NOS 700 that no further queries or updates should be sent to a repository reporting an off-line indication.

Furthermore, as part of the storage function, Data Management provides for configuration management, fault management, and log management of the data repositories. The DM function pertaining to configuration management enabling an authorized user to: define and extend the schema of the data repositories; query and modify system resources allocated for a repository; and, query and modify a repository=s indexing strategies. The DM function pertaining to fault detection and report generation for the maintenance of data repositories includes: enabling the definition of fault thresholds and notifications for the system resources allocated to a repository; enabling the detection and reporting of media failures within a repository; enabling the definition of fault thresholds and notifications for the percent full of a repository=s capacity; enabling the definition of fault thresholds and notifications for the percent full of a repository=s log; and, providing a notification of when a repository or one of its components (e.g., schema, repository data) is corrupted. The DM functions pertaining to the establishment and management of logs on the repositories owned by Data Management include: the ability to log capabilities on repositories, including the following types of logs: (a) Transaction logs; (b) Error logs; and, (c) Event logs, and to save these logs on an external medium. With respect to the logging function, Data Management may retain log data for a configurable period of time before reinitializing the log. Additionally, an authorized user may query and modify characteristics (e.g., size, field descriptions, event reporting) of logs on a repository, and, specify the data that is to be written to each log. For example, due to the volume of transactions, a user may only want to capture "write" transactions in the transaction log versus all transactions.

DM Manipulation Function

The Data Manipulation function of DM comprises all specific functionality required for receiving distributions of data, replicating data across repositories, querying, retrieving, and updating data in repositories, initiating abort and roll back transactions, and performing data audits. This functionality may be broken down into the following areas: a) Data Distribution; b) Data Replication; c) Data Retrieval and Update; d) Data Transactions; and, e) Data Audits, each of which is described herein.

Data Distribution

Data Distribution as defined herein refers to the disbursement of data or services from Service Administration to the Data Management 400. With respect to the Data Distribution function, DM receives data distributions from Service Administration; reports on the state of data deployed in the system; makes data available for use by services; and, deactivates and removes data stored by Data Management.

Particularly, as embodied by the data server, DD API, DBOR extract repository and DBOR extract manager components (FIG. 5(f)) of DM 400, Data Management is enabled to receive distributions of data, file definitions, SLPs and SIBBs from Service Administration. If the capacity of the repository has been exceeded, any further attempts to receive data distributions will fail however, without blocking access to data in the repository. In response to a distribution of data to DM from SA, processes running in the DM server respond to SA with a signal indicating success or failure of the distribution. If there is a data distribution failure, DM may undo any portion of the distribution that was completed. As described, an activation request signal is distributed from SA to indicate that data has been successfully distributed to a minimum number of repositories and is to be made "active" for service processing. Data Management responds to receipt of an activation request with an activation response indicating success or failure, which is sent back to Service Administration upon a respective successful/unsuccessful activation of the data, SIBB or SLP. The DM is also able to receive and process a deactivation request from Service Administration which is sent from SA to make a specific data, SLP or SIBB unavailable for Service processing. Data Management responds to a deactivation request with a deactivation response indicating the success or failure of the requested deactivation to Service Administration.

Likewise, the DM is additionally able to receive and process a removal request signal from Service Administration which specifies that DM is to remove specific data from the designated repository. DM sends a removal response indicating the success or failure of a removal request back to Service Administration. It should be understood that activation, deactivation, and removal requests may be for an SLP, SIBB or a data entity.

Data Replication

The Data Replication function of DM includes all specific functionality required for replicating data to specific locations, i.e., service node data repositories, i.e., local server caches, and to notify the NOS of successful/unsuccessful replications. The IDNA/NGIN system replicates data based on defined replication policies provided by SA configuration files. As described herein, the term Areplication" refers to the act of copying data from one repository to another for data written as part of service processing.

For example, Data Management replicates data to other repositories when data is updated during Service Processing. First, Data Management determines a set of locations where data is to be replicated based on established replication rules provided by SA in configuration files for the data entity and, ensures that attempts to replicate repository data when the capacity of the targeted repository has been exceeded will fail without blocking access to existing data in the repository. If the replication fails due to excessive capacity, Data Management notifies the NOS component that the specific data is not available at this repository to ensure that no further attempt to retry the replication to that repository is performed. If a replication to a repository fails for reasons other than capacity, Data Management may retry the failed replication on the repository. If after a predefined, configurable number of retries, the repository is still unable to receive the replication, Data Management generates an alarm and notifies the NNOS component that the specific data being replicated is unavailable at this repository. This ensures that no queries are done on this data at this location. A synchronization utility may thus be implemented to get the repositories back in synch.

Data Retrieval and Update

The Data Retrieval and Update functionality includes the ability to access data stored by Data Management during service processing.

In the preferred embodiment, at any particular service node, Data Management receives data requests from an executing managed object instance in the SLEE, e.g., through the NOS, during service processing. Data Management specifically notifies the requester (e.g., managed object) if it is unable to understand the data request. If the data request is for the retrieval of a data entity, Data Management returns the requested data to the requester (e.g., via NOS). It should be understood that any support that is needed for manipulating and querying data in a single repository or across multiple repositories is provided by DM. Data Management additionally supports the collection and collation of the results of queries that span multiple repositories. If DM is unable to locate the name of the requested entity in the data retrieval request, DM notifies the NOS component. The NOS component will also be notified if a database failure occurs during the retrieval of a data entity. Data Management additionally notifies the requester (executing service control object) of the inability to retrieve a specific data entity from a valid name. If the data request is for an update of a data entity, Data Management updates the data entity and determines if replication is required. DM notifies the requester if it is unable to update a data entity specified in a data request and additionally notifies NO3 if it is unable to locate the name of the requested entity in the data update request. At any time during NGIN operation, DM notifies the NOS of a database failure during the update of a data entity. If the data request is for the deletion of a data entity, DM deletes the data item and determines if the transaction needs to be initiated on other repositories.

Data Transactions

A transaction is defined as a sequence of operations on a set of data that transforms the data from one consistent state to another consistent state. Examples of transaction include: entering data, updating existing data, deleting data, and copying data. In the context of the IDNA/NGIN system, DM is able to initiate a transaction on a repository, abort a transaction that has been initiated, provide notification if a transaction failure occurs, and, log all transaction failures. Data Management additionally implements a recovery strategy by returning the data controlled by a transaction to its previous state as a result of a transaction failure, and re-execute a failed transaction as a result of a transaction failure. Any recovery strategy implemented may be defined at the time of initiating a transaction, or, when the failure occurs.

Data Management is further provisioned to enable a transaction to time-out and hence fail, according to a predetermined time-out parameter specified at the time of initiating a transaction. Further data transaction functionality includes: the capability to participate in multiple transactions at a time; the provision of transaction concurrency resolution mechanisms that support blocking of concurrency collisions with queuing of pending transactions; the generation of an indication signal if any of the transaction data gets modified outside of the context of the transaction (i.e., is corrupted); the capability to roll back the state of its data while participating in a transaction; and, the capability to roll back all operations performed while participating in a transaction.

Data Auditing

The Data Auditing functionality of the IDNA/NGIN system includes the provision of an audit/recovery environment for repository data. In the context of the Data Management, an >audit=is the process of testing synchronization between two or more copies of repository data and reporting the results. >Recovery=is the set of actions taken as a result of an audit to bring the copies into synchronization. As described herein, all data that is made persistent and/or replicated may be audited. Additionally, it is assumed that a primary copy model is established and considered to be >correct=for the purposes of audit and recovery. Data Management thus is able to designate the primary copy of a repository. In the context of NGIN, DM is further enabled to audit data across multiple repositories, log all audit discrepancies, provide a notification of audit discrepancies, and, provide automatic recovery based on a defined set of rules related to an identified discrepancy. In the preferred embodiment, Data Management may schedule data audits.

Data Utility Function

In the context of the IDNA/NGIN system, data utility refers to functionality required to shutdown and initialize a repository, backup stored data, recover data following a catastrophic event, synchronize data between repositories, and, monitor and maintain data repositories. Data Management is additionally enabled to shutdown (take off-line) a repository for maintenance or recovery purposes. In determining whether to shutdown a repository, a mechanism is provided for monitoring the percent utilization of a data repository. Utilities are thus provided that allows an authorized user to maintain the data repositories, including a utility for optimizing disk space and for cleaning up of logs. Data Management may additionally backup and restore a repository using the local operating system's file commands. A repository may be recovered without loss of information.

Data Management is provided with an additional utility for archiving repository data to an external medium; synchronizing repository data across multiple repositories; synchronizing a subset of data (partial synchronization) across multiple repositories, and, bringing a repository on-line.

Billing Record Generation Requirements

Billing Record Generation functionality for the NGIN system includes the gathering of network events, formatting the network events into the appropriate (call history) records, transmitting the formatted records to the appropriate location, and identifying potentially fraudulent calls. As the Billing Record Generation function is responsible for formatting and transmitting the information that will be used to bill customers for services, its accuracy is certified.

Gathering Network Events

Raw network events used for billing purposes are gathered from Data Management=s repositories and are reviewed to verify their completeness. In the creation of call history records utilized by the various types of downstream billing systems, a unique network identifier is provided for each call history record so that the records may be subsequently manipulated for further processing. In the preferred embodiment, call history records may be used to capture information used for the generation the following types of records: call detail records (CDRs) which capture network event information on shared lines; private network records (PNRs) which capture event information on private lines (e.g., VNET); operator service records (OSRs) used to capture information when shared lines are used for operator services; and, private operator service records (POSRs) which capture information when private lines are used for operator services. Preferably, each of the foregoing types of billing records may be expanded. Thus, expanded call detail records (ECDRs), expanded private network records (EPNRs), expanded operator service records (EOSRs), and, expanded private operator service records (EPOSRs) may be generated. Additional records that may be generated through DM include: switch event records (SERs) which identify a switch event (e.g., system recovery, time change); billing data records (BDRs). This function additionally includes storing call history records on a long term storage and retrieval medium (e.g., tape).

Transmit Call History Records Requirements

After each of these call history records are generated, they are transmitted to the appropriate downstream system. For example, in the preferred embodiment, all CDRs, PNRs, OSRs, POSRs, their corresponding expanded versions ECDRs, EPNRs, EOSRs, EPOSRs, and SERs and, BDRs are sent to a system Storage and Verification Element "SAVE" (not shown) for eventual distribution to a Network Information Concentrator (NIC). A DM system function provides a verification that SAVE had successfully received each of these call history records.

Identify Potentially Fraudulent Calls

The NGIN system has a built in mechanism for identifying potentially fraudulent calls. Thus, DM component 400 provides the ability to monitor the network usage for fraud, and report suspected fraud to an appropriate Fraud Detection system. As an example, the Billing Record Generation function: 1) obtains profiles from a Fraud Detection system (not shown) to identify network events that should be sent to Fraud Detection; 2) evaluates network events against the fraud profiles; and 3) transmits potentially fraudulent calls to a Fraud Detection system in real-time.

Figure 6:
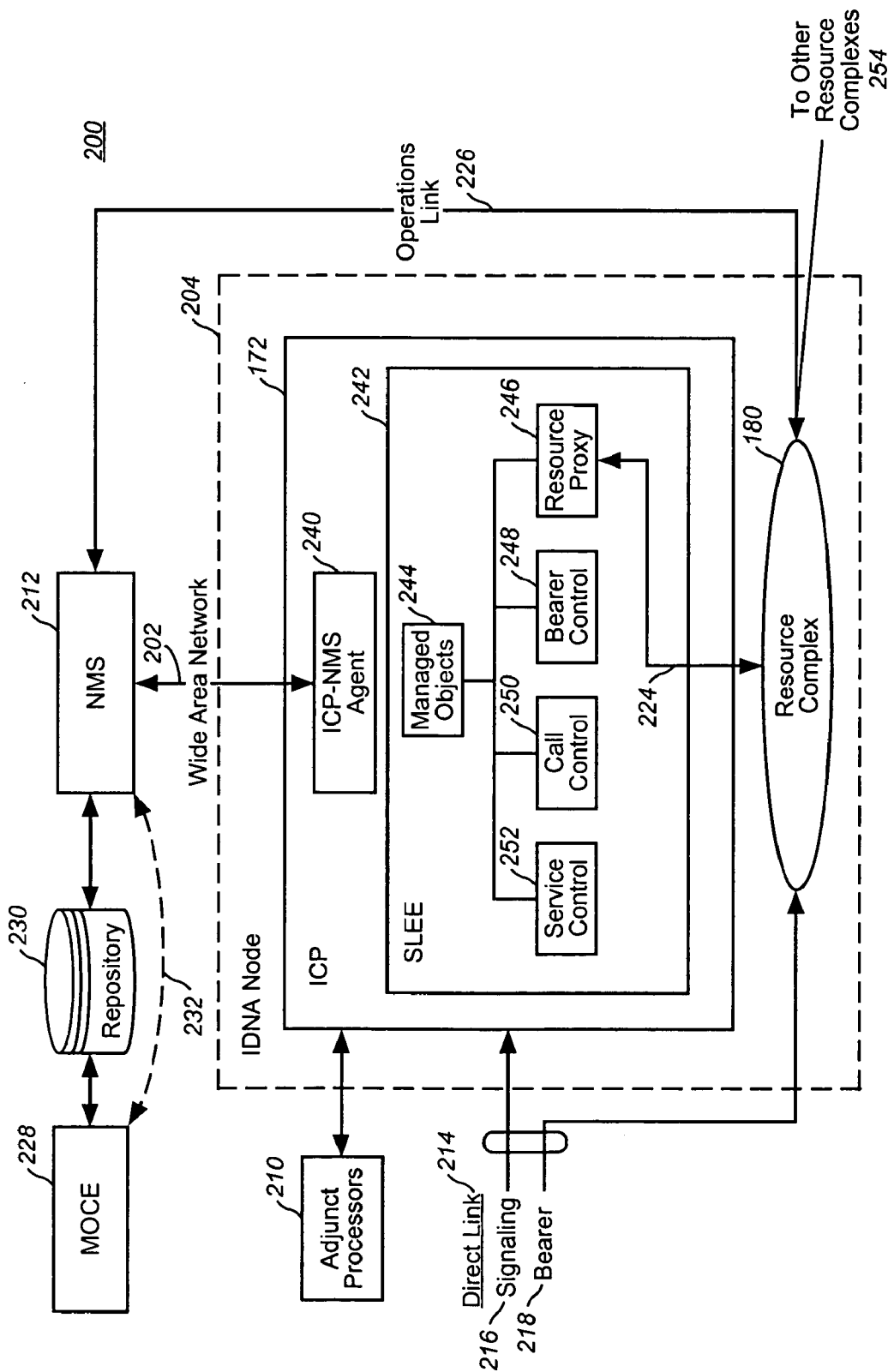
FIG. 6 is a logical and functional diagram of a telecommunications system employing an intelligent distributed network architecture in accordance with the present invention.

Referring now to FIG. 6, a logical and functional diagram of a telecommunications system employing an intelligent distributed network architecture 200 in accordance with the present invention will be described. The ICP 172 is shown to contain an ICP-NMS Agent 240 and a SLEE 242 that, in turn, hosts a variety of managed objects 246, 248, 250 and 252 derived from the managed objects base class 244.

In general, managed objects are a method of packaging software functions wherein each managed object offers both functional and management interfaces to implement the functions of the managed object. The management interface controls access to who and what can access the managed object functions. In the present invention, all of the telephony application software, except for the infrastructure software, run by the IDNA/NGIN Node 204 is deployed as managed objects and supporting libraries. This provides a uniform interface and implementation to control and manage the IDNA Node software.

The collection of network elements that connect, route, and terminate bearer traffic handled by the node will be collectively referred to as the Resource Complex ("RC") 180 or NGS. The service processing applications running on the SLEE use the Resource Proxy ("RCP") 244 as a control interface to the RC 180. The RCP 244 may be likened to a device driver in that it adapts equipment-independent commands from objects in the SLEE to equipment-specific commands to be performed by the RC 180. The RCP 224 can be described as an interface implementing the basic commands common among vendors of the resources in the RCP 244. The RCP 244 could be implemented as shown as one or more managed objects running on the IDNA node 204. Alternatively, this function could be provided as part of the RC 180. The NMS 212, Repository 230 and MOCE 228 are consistent with the description of those elements in the discussion of FIGS. 3–5(*a*).

Figure 7:
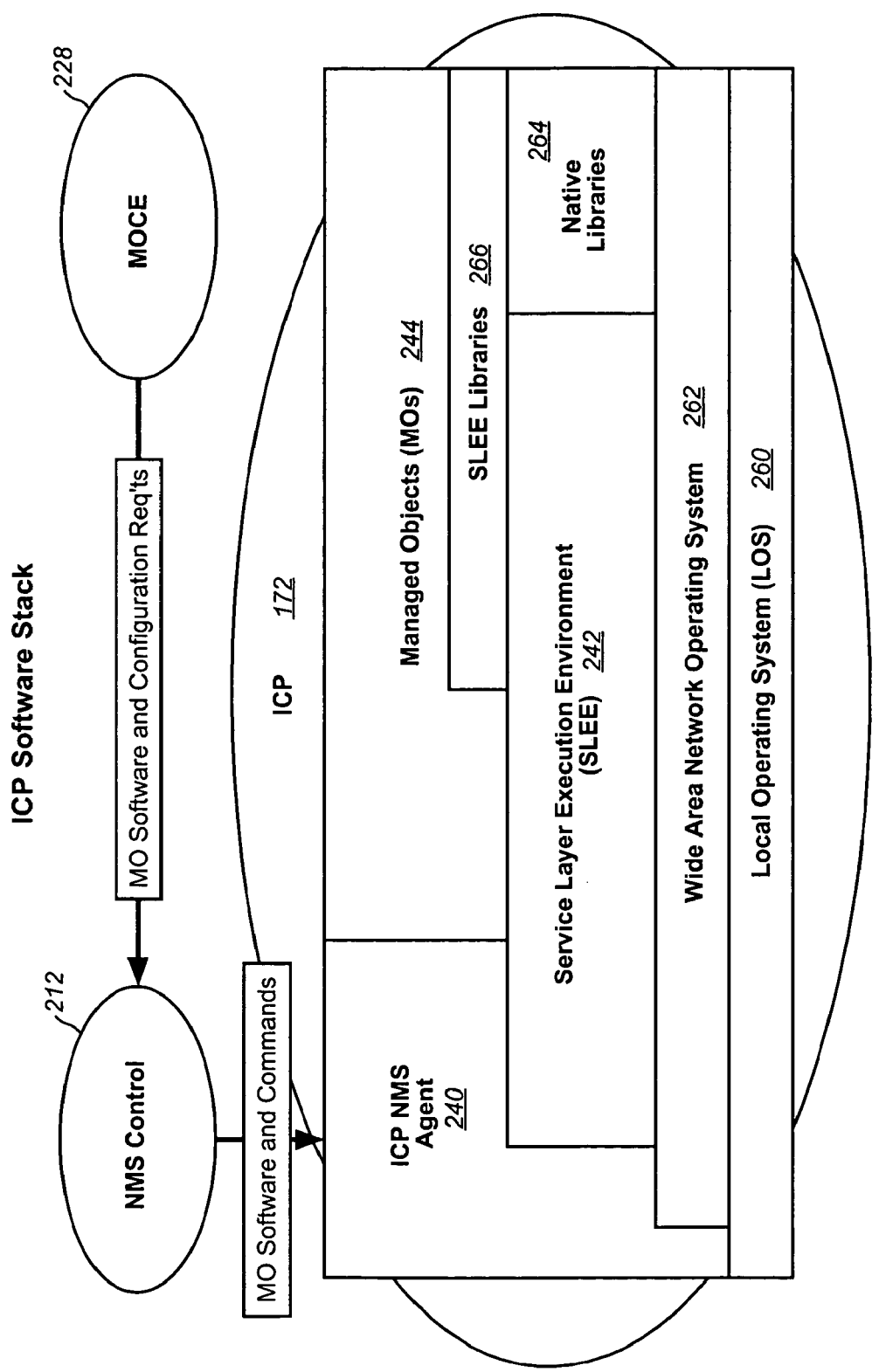
FIG. 7 is a diagram illustrating the layering of functional interfaces within an intelligent call processor in accordance with the present invention.

FIG. 7 depicts the layering of functional interfaces within the ICP 172. The MOCE 228 is the system where the managed object software and its dependencies are generated. The NMS 212 controls the execution of the ICP 172 by interfacing to an agent function provided within the ICP 172, called the ICP-NMS Agent 240. The NMS 212 controls the operation of the Local Operating System ("LOS") 260 on the ICP 172. The NMS 212 controls the operation of the ICP 172, including starting and stopping of processes, querying the contents of the process table, and the status of processes, configuring the operating system parameters, and monitoring the performance of the general purpose computer system that hosts the ICP 172.

The NMS 212 also controls the operation of the Wide Area Network Operating System ("WANOS") 262. The NMS 212 controls the initialization and operation of the WANOS support processes and the configuration of the WANOS libraries via its control of the LOS 260 and any other interfaces provided by the NMS SLEE control. The NMS 212 controls the instantiation and operation of the one or more SLEE's 242 running on an ICP 172. The LOS 260 is a commercial-off-the-shelf operating system for operation of the general purpose computer. The WANOS 262 is a commercial-off-the-shelf middle-ware software package (e.g., an object request broker) that facilitates seamless communication between computing nodes. The SLEE 242 hosts the execution of managed objects 244, which are software instances that implement the service processing architecture. The SLEE 242 implements the means to control the execution of the managed objects 244 by the ICP-NMS Agent 240. Thus, a SLEE 242 instance is a software process capable of deploying and removing managed object software, instantiating and destroying managed object instances, supporting the interaction and collaboration of managed objects, administering access to Native Libraries 264, and interfacing with the NMS-ICP Agent 240 in implementing the required controls.

The Native Libraries 264 are libraries that are coded to depend only on the LOS 260 or WANOS 262 and the native general purpose computer execution (e.g., compiled C libraries). They are used primarily to supplement the native functionality provided by the SLEE 242.

SLEE libraries 266 are libraries coded to execute in the SLEE 242. They can access the functions provided by the SLEE 242 and the Native Libraries 264. The managed objects 244 are the software loaded and executed by the SLEE 242. They can access the functionality provided by the SLEE 242 and the SLEE libraries 266 (and possibly the native libraries 264).

The ICP-NMS Agent 240 provides the NMS 212 the ability to control the operation of the ICP 172. The ICP-NMS Agent 240 implements the ability to control the operation and configuration of the LOS 260, the operation and configuration of the WANOS 262, and the instantiation and operation of SLEE(s) 242. The proposed service processing architecture operates in layers of increasing abstraction. From the perspective of the SLEE 242, however, there are only two layers: the managed object layer 244, which is the layer of objects (software instances) that are interaction under the control of the NMS 212; and the Library layer 264 or 266, which is the layer of software (either native to the SLEE 242 or the LOS 260) that supplies supplementary functions to the operation of the managed objects 242 or the SLEE 242 itself. It is, however, anticipated that at some point, the NMS 212 may relinquish control of the exact location of managed object instances. For example, managed object instances may be allowed to migrate from one node to another based on one or more algorithms or events, such as in response to demand.

It should be understood that, collectively, the LOS and WANOS functionality may be represented as a Network Operating System or "NOS", as shown in FIG. 7(*b*), that functions to provide platform independent and location independent connectivity between the IDNA/NGIN system components. That is, NOS comprises a set of network-wide services that provides process interfaces and communications among the other IDNA/NGIN functional components and sub-components. Among the services provided by NOS are object connectivity, logical name translation, inter-process communications, and local and system-wide resource management ("RM"). For instance, as shown in FIG. 3, the NOS component 700 provides the local (NODE RM) and system-wide resource management (SYS RM) function. Particularly, the NOS component encapsulates the location of any service from the processes that need services and data, so that a process only needs to make a call to a single logical name. The NOS component then determines which instance of a service to use, and provides connectivity to that instance. The NOS 700 enables, in part, both the widely distributed nature of IDNA/NGIN, and the platform-independence of IDNA/NGIN. For example, the aforementioned logic programs use the NOS component 700 to call other logic programs, and can therefore call and invoke other logic programs that run on different SLEEs either in the same service node or a remote service node. Particularly, through the SA 500, a service node may be specified to perform only certain services. When a call that arrives at a switch having an associated service node 204 for which the needed service may not be performed, e.g., joining a conference bridge, IDNA may need to route the call to another node configured to provide such service. Preferably, IDNA, via the NOS component 700, will call the needed service at another remote service node, perform the call processing, and provide a service response to the switch at the original node.

Figure 8:
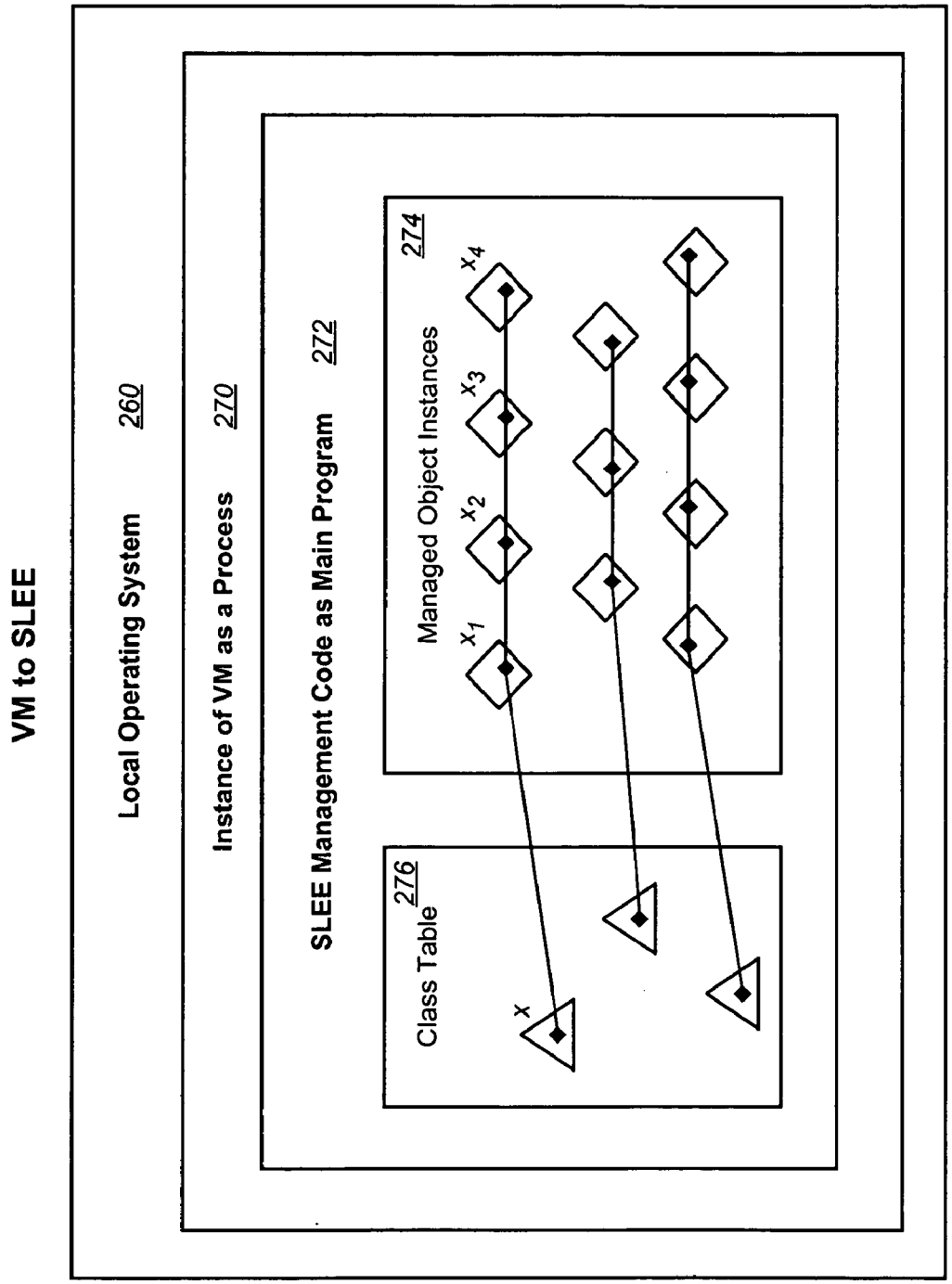
FIG. 8 is a Venn diagram illustrating the nesting of processing contexts whereby a virtual machine supports a service logic execution environment in accordance with the present invention.

FIG. 8 shows the nesting processing contexts within an ICP 172 such that the SLEE 242 is implemented within a virtual machine 270. A virtual machine 270 is started as a process within a LOS 260 in an ICP 172. Then, the SLEE management code is loaded and executed as the main program 272 by the VM process 270. The SLEE management code executing as the main program 272 interfaces to the ICP-NMS Agent 240 functionality and oversees the creation and destruction of managed object instances 274 from the class table 276. For example, managed object X, which resides in the class table 276 may have multiple instances will be explained, each managed object X is thereafter instantiated as needed, $X_1$, $X_2$, $X_3$, either under NMS control or during the course of processing services requested by subscribers. The use of a Virtual Machine 270 carries implications for service creation as well as service logic execution as will be described herein in further detail with respect to FIG. 10(*a*).

The IN and AIN architectures revolve around services being encoded as state tables. Such state table descriptions are interpreted by a hard-coded state machine engine which carries out the encoded service function. As a result, the MOCE 228 and Service Logic Interpreter ("SLI") are very interdependent and provide only a fixed palette of functions. If a desired new service requires adding a new building block function, both the MOCE 228 and SLI must be changed, recompiled, throughly tested, and deployed in a coordinated fashion. In an IN or AIN architecture, deployment of new SLI code requires a brief downtime within the network. In contrast, the present invention provides a multiple concurrent architecture that allows new and old SLI's to coexist.

The present invention uses a virtual machine 270 to overcome these disadvantages. A virtual machine 270 is the functional equivalent of a computer, programmable at such an elementary level of function (i.e., logic operators, variables, conditional jumps, etc.) that a hosted program can essentially express any conceivable logic function, even those that are not readily expressed as finite-state model. The universality of a virtual machine 270 is especially useful in this application for allowing expression of call processing logic in forms that may be preferred over a state table. This differs from a logic interpreter, which typically supports higher level functions and is constrained in program semantics and in flexibility of expression. In the IN and AIN architectures, the SLI supports a limited structure and limited set of functions.

When virtual machine 270 software is run upon a general purpose computer, the virtual machine 270 may be viewed as an adapter layer. The code that runs as a program within the virtual machine 270 may have the same granularity of control and access to input/output and storage as if it were running directly upon the processor, yet the very same program may be portable to a totally different processor hardware running an equivalent virtual machine environment (i.e., operational in heterogeneous environments).

In a preferred embodiment, the "Java" platform developed by Sun Microsystems is prescribed for expressing all telephony application software. The prevalence of Java lends practical advantages in platform portability, ubiquity of development tools and skill sets, and existing support protocols such as ftp and http. Java accommodates object-oriented programming in a similar fashion to C++. The SLEE Management Code 272 and all managed objects 276 indicated in the SLEE 242 are encoded as Java bytecodes. The SLEE Management Code 272 includes functions to install, remove, and instantiate classes, to query and delete instances, and to assert global values and run/stop status.

Despite the foregoing advantages, the use of a virtual machine as a SLEE 242, in particular, a Java virtual machine, appears to have been overlooked by In and AIN architects. Perhaps biased by the more common telephony applications like interactive voice response, IN and AIN designers have thought that a fixed palette of functions is adequate and preferable for its apparent simplicity and similarity to traditional call processing models. Whereas the AIN approach improves the speed of service creation only within a fixed call model and function set, the present invention can as easily evolve the entire implicit service framework to meet new service demands and new call processing paradigms.

The choice of an object-oriented SLEE 242 provides many key advantages including dependency management and shared security among co-instantiated objects. The touted advantages of object-oriented programming, such as modularity, polymorphism, and reuse, are realized in the SLEE 242 according to the present invention. Because of managed object inheritance hierarchy, widespread changes in call model, protocol, or some other aspects of call processing may be effected by relatively localized code changes, for example, to a single base class. Another important advantage is that the coded classes from which objects are instantiated within each SLEE 242 can be updated without having to disable or reboot the SLEE 242.

In a preferred embodiment, a set of operational rules can be encoded to permit or restrict the deployment of new class-implementing code to the SLEE 242 or the instantiation of objects therefrom based on physical location or operating conditions. These rules can be encoded in different locations, such as part of the managed object image that the NMS 212 uses for deployment or into the actual object code that is activated by the SLEE 242. In either case, the NMS 212 would have error handling procedures for when instantiations fail. Location restrictions could be any means for characterizing the physical location of the node (e.g., nation, state, city, street address, or global coordinates).

In addition, a method of resolving conflicts between the operational rules within the set can be adopted. For example, if a specific object is to be instantiated at node X, which lies in both Region A and Region B, and the set of operational rules provides that instantiation of the specific object is forbidden in Region A, but is permitted in Region B, a conflict arises as to whether or not the specific object can be instantiated at node X. If, however, a conflict resolution rule simply provides that objects can only be instantiated where permitted, the conflict is resolved and the specific object is not instantiated at node X. This set of operational rules could be used to restrict the deployment or instantiation of a Trunk management class code to situations where the intelligent call processor is actually managing truck resources. These rules could also be used to restrict billing processor instances, which are tailored to the billing regulations of a specific state, to the boundaries of that state. As previously mentioned, these location restriction rules can be internal or external to the class object.

Figure 9:
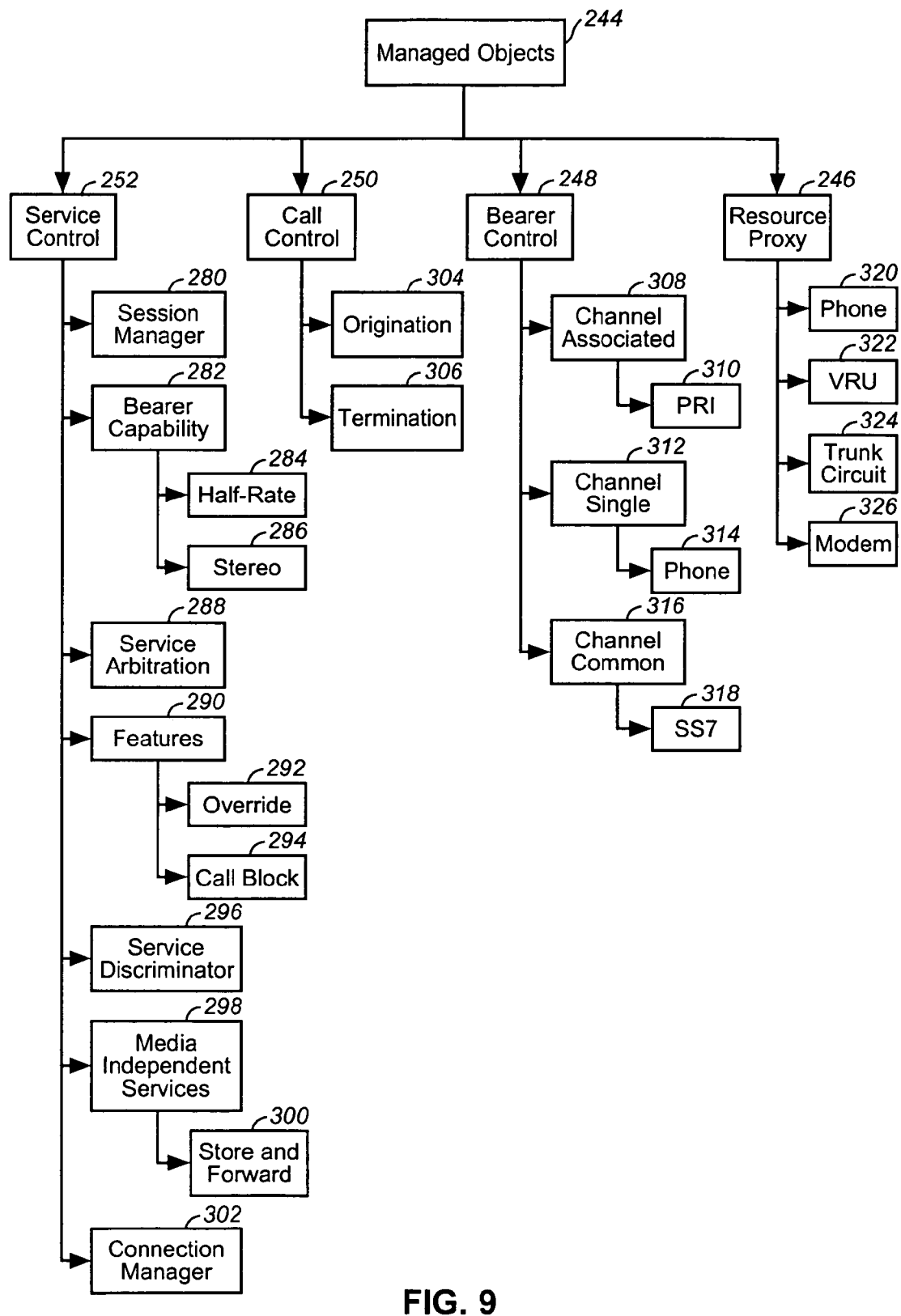
FIG. 9 is a diagram illustrating the class hierarchy of managed objects within an intelligent call processor in accordance with the present invention.

Referring now to FIG. 9, the class hierarchy of managed objects in accordance with a preferred embodiment of the present invention will be described. The abstract base class managed objects 244 includes common functionality and virtual functions to assure that all derived classes can properly be supported as objects in the SLEE 242. Specifically, four distinct subclasses are shown, the service control class 252, call control class 250, bearer control class 248, and resource proxy class 246.

The service control class 252 is the base class for all service function objects. The session manager class 280 encapsulates the session-related information and activities. A session may comprise one or more calls or other invocations of network functions. The session manager class 280 provides a unique identifier for each session. If call processing is taking place in a nodal fashion, then billing information must be collated. A unique identifier for each call makes collation easy, instead of requiring costly correlation processing. In service processing, protocols are wrapped by successive layers of abstraction. Eventually, the protocol is sufficiently abstracted to warrant the allocation/instantiation of a session manager (e.g., in SS7, the receipt of an IAM message would warrant having session management).

The bearer capability class 282 changes the quality of service on a bearer. A service control class 252 can enable changes in the Quality-of-Service ("QoS") of a call or even change the bearer capability, such as moving from 56 Kbit/s to higher rates and then back down. The QoS is managed by the connection manager class 302. For example, a Half-Rate subclass 284 degrades the QoS of a call to 4 Khz sample rate, instead of the usual 8 Khz sample rate. A Stereo subclass 286 might allow a user to form two connections in a call to support left channel and right channel.

The service arbitration class 288 codifies the mediation of service conflicts and service interactions. This is required because service control classes 252 can conflict, particularly origination and termination services. For many practical reasons, it is undesirable to encode within each service control class 252 an awareness of how to resolve conflict with each other type of service control class 252. Instead, when a conflict is identified, references to the conflicting services and their pending requests are passed to the service arbitration class 288. The service arbitration class 288 may then decide the appropriate course of action, perhaps taking into account local context, configuration data, and subsequent queries to the conflicting service objects. Having a service arbitration class 288 allows explicit documentation and encoding of conflict resolution algorithms, as opposed to either hard-coded or implicit mechanisms. Moreover, when a service is updated or added, the existing services do not have to be updated to account for any conflict changes, which could require the change of multiple relationships within a single service.

The feature class 290 implements the standard set of capabilities associated with telephones (e.g., 3-way calling, call waiting). One such capability can be an override 292 to enable an origination to disconnect an existing call in order to reach an intended recipient. Another common capability can include a call block 294 whereby an origination offer can be rejected based upon a set of criteria about the origination.

The service discrimination class 296 is used to selectively invoke other services during call processing and is subclassed as a service itself. The service discrimination class 296 provides for flexible, context-sensitive service activation and obviates the need to have fixed code within each service object for determining when to activate the service. The activation sequence is isolated from the service itself. For example, Subscriber A and Subscriber B have access to the same set of features. Subscriber A chooses to selectively invoke one or more of his services using a particular set of signals. Subscriber B prefers to use a different set of signals to activate his services. The only difference between the subscribers is the manner in which they activate their services. So it is desirable to partition the selection process from the service itself. There are two available solutions. The service selection process for Subscribers A and B can be encoded in separate service discrimination class 296, or one service discrimination class 296 can use a profile per subscriber to indicate the appropriate information. This can be generalized to apply to more users whose service sets are disjointed. Furthermore, the use of a service discrimination class 296 can alter the mapping of access to services based upon the context or progress of a given call. The implementation of this class allows various call participants to activate different services using perhaps different activation inputs. In the prior art, all switch vendors delivered inflexible service selection schemes, which prevented this capability.

The media independent service class 298 is a type of service control class 252, such as store-and-forward 300, broadcasting, redirection, preemption, QoS, and multi-party connections, that applies to different media types including voice, fax, e-mail, and others. If a service control class 252 is developed that can be applied to each media type, then the service control class 252 can be broken into re-usable service control classes 252. If the service control class 252 is broken into media-dependent functions and a media-independent function (i.e., a media-independent SC which implements a service and a set media-dependent wrapper SC's—one per media type). As derived from the media-independent class 298, store and forward 300 provides the generic ability to store a message or data stream of some media type and then the ability to deliver it later based on some event. Redirection provides the ability to move a connection from one logical address to another based on specified conditions. This concept is the basis for call forwarding (all types), ACD/UCD, WATS (1-800 services), find-me/follow-me and mobile roaming, etc. Preemption, either negotiated or otherwise, includes services such as call waiting, priority preemption, etc. QoS modulated connections implement future services over packet networks, such as voice/fax, streaming video and file transfer. Multi-party connections include 3-way and N-way video conferencing, etc. Although user control and input is primarily implemented using the keys on a telephone, voice recognition is expected to be used for user control and input in the future.

The connection manager class 302 is responsible for coordinating and arbitrating the connections of various bearer controls 248 involved in a call. Thus, the complexity of managing the connectivity between parties in multiple calls is encapsulated and removed from all other services. Service and Call processing are decoupled from the connections. This breaks the paradigm of mapping calls to connections as one to many. Now the mapping of calls to calls is many to many.

The connection manager classes 302 within an architecture are designed to operate stand-alone or collaborate as peers. In operation, the service control classes 252 present the connection manager classes 302 with requests to add, modify and remove call segments. It is the connection manager class' 302 responsibility to accomplish these changes. Note: Since connections can be considered either as resources in and of themselves or as the attributes of resources, a connection manager class 302 can be implemented as a proxy or an aspect of basic resource management functions.

The call control class 250 implements essential call processing, such as the basic finite-state machine commonly used for telephony, and specifies how call processing is to take place. Two classes may be derived along the functional partition of origination (placing a call) 304 and termination (accepting a call) 306.

The bearer control class 248 is directed at adapting specific signals and events to and from the Resource Complex 180, via the resource proxy 246, into common signals and events that can be understood by the call control objects 250. One anticipated role of an object derived from this class is to collect information about the origination end of a call, such as subscriber line number, class of service, type of access, etc. Subclasses may be differentiated on the basis of the number of circuits or channels associated with the signaling. These may include a channel associated class 308, as applies to the single signaling channel per 23 bearer channels in an ISDN Primary Interface 310, a channel single class 312 as typified by an analog phone 314 that uses dialing to control a single circuit, and the channel common class 316, represented by SS7 signaling 318 entirely dissociated from bearer channels.

The resource proxy class 246 is devoted to interfacing the execution environment to real-world switches and other elements in the bearer network. Examples of internal states implemented at this level and inherited by all descendent classes are in-service vs. out-of-service and free vs. in use. Contemplated derived classes are phone 320 (a standard proxy for a standard 2500 set), voice responsive units ("VRUs") 322 (a standard proxy for voice response units), IMT trunk connections 324 (a standard proxy for digital trunk (T1/E1) circuits), and modem connections 326 (a standard proxy for digital modems), corresponding to specific types of resources in the Resource Complex 180.

Figure 10A:
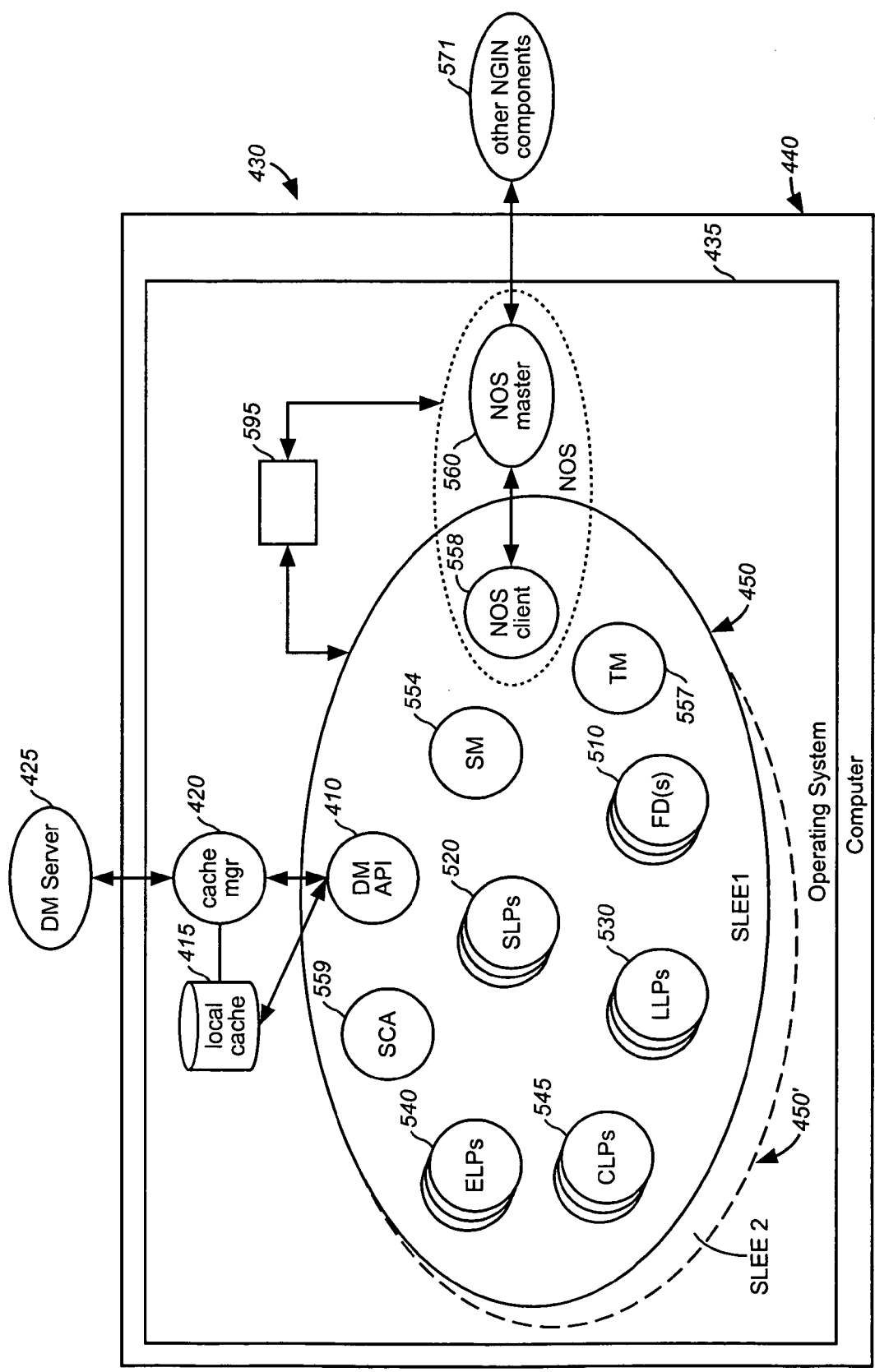
FIG. 10(a) illustrates a preferred architecture of a service control environment 430.

A preferred manner in which a Service Control component may serve incoming service requests, is now described with further reference to FIG. 10(a) which illustrates particularly another embodiment of a service control environment 430 having SLEE applications 450, 450' executing within the operating system 435 of a service control server, e.g., general purpose computer 440.

As shown in FIG. 10(a), the SLEE 450 comprises a Java™ "virtual machine" designed to execute at least five types of logic programs (objects) implemented in performing call processing services and other supporting services: 1) Feature Discriminator logic programs ("FD") 510, which are functional sub-components of the service control class/ service discriminator class 296 (FIG. 7) that first receive a service request from the switching platform, determine which service to perform on a call based on some available criteria, for example, the dialed number of the call, and, then calls on another appropriate Service Logic Program to process the call; 2) the Service Logic Program ("SLP") objects 520, which are functional sub-components of the service control class 252 (FIG. 7) that perform service processing for a received service request or event; 3) Line Logic Program ("LLP") objects 530, which are functional sub-components of the call control class 250 (FIG. 7) that maintain the current state of a network access line; 4) Event Logic Program ("ELP") objects 540, which are functional sub-components of the service control/session manager class 260 (FIG. 7) to which all other logic programs write events; and 5) Call Logic Program ("CLP") objects 545 which are functional sub-components of the service control/ connection manager class 302 (FIG. 7) that maintains the state of an entire call by providing a connection point for all other logic programs that are involved in the processing of a call. Each of these logic programs are embodied as a software "objects", preferably written in Java™ programming language, that may either be temporarily instantiated or persistent, as will be described. The IDNA/NGIN service control architecture is designed such that these objects are written only once in MOCE/SCE, and may be deployed to a SLEEs on any type of computer and on any type of operating system anywhere in the network.

With greater particularity, the FD 510 is a static sub-component that 1) first receives a service request from the resource complex, e.g., switch when the switch identifies that the service is to be processed by IDNA/NGIN; 2) analyzes the information associated with the service request; and, 3) determines which SLP is capable of processing the service request. Preferably, the FD may be a system task or an instantiated object for receiving data provided from the resource complex including, but not limited to, the called number, the calling number, the originating switch ID, originating trunk group, the originating line information, and the network call ID. Through NOS, the FD 510 initiates the instantiation of the appropriate SLP, the CLP and the originating LLP to process the call. Preferably, the FD 510 is a persistent object, not being tied to a particular call or event, and runs actively in the Service Control SLEE 450 at all times. Depending upon the complexity of the analysis performed, and the volume of the requests to FD, there may be one or more instances of a FD running actively in a Service Control SLEE 450 in order to share the load and guarantee real time efficiency. For instance, one FD may be used to analyze received SS7 message data, while another FD may be used to analyze ATM message data.

The Line Logic Program (LLP) 530 is the functional sub-component that: 1) maintains the current state of a network access point, connection, or line; 2) queries Data Management for features associated with the physical point, connection, or line; and, 3) applies those features, such as call interrupt, call waiting, call forwarding, and overflow routing as the call situation demands. There is an LLP associated with a line that originates a call, hereinafter "LLPO", and an LLP associated with a point connection, or line to which a call terminates, hereinafter "LLPT" Once a Line Logic Program instance is instantiated, it registers itself with the switch fabric. As will be described, the Line Logic Program 530 sends all event data to the ELP sub-component of the same instance of service processing.

Dynamic Sub-Components are those components that are dynamically constructed according to different stages of service processing and which are destructed when an instance of service processing is complete and including: Event Logic Programs (ELP); Call Logic Programs (CLP); and, Service Logic Programs (SLP).

The Event Logic Program (ELP) 540 is the functional sub-component used to keep the real-time event data that is generated during service processing and records all event data that occurs during execution of a service. The Event Logic Program preferably, is instantiated by the call control process at the switch when an event is first received. When the switch sends a service request to NGIN, it passes along the address of the ELP so that event data may be sent to this logic program tied to that call. The Event Logic Program is accessible to all the sub-components within the same instance of the service processing, i.e., the CLP, LLPs and SLP that pertain to the call. As each service processing component processes that call in the performance of a service, it writes event data to the ELP, through NOS, according to pre-established rules. When a call is completed, the event data in the ELP is written to a data store or log from which the event data is then compiled into billing records and sent to downstream systems for billing, traffic/usage reporting, and other back-office functions. Particularly, the ELP performs the function of: 1) gathering the network events generated by a specific call; 2) formatting the events into appropriate call history records, e.g., call detail records ("CDRs"), billing data records ("BDRs"), switch event records, etc.; and 3) verifying, validating and storing the information, e.g., in data management, for future transmission to a downstream system, e.g., customer billing. It should be understood that the rules for determining which events get written to the ELP is established at Service Creation. Event data is additionally accessible by fraud management and network management systems.

The Call Logic Program (CLP) 545 is the functional sub-component that maintains the state of each SLP involved in service processing, and provides process interfaces among all services (LP's). In one embodiment, a CLP is instantiated by the FD when an event service request is first received for a call, or, may be instantiated by a call control component located at the switch. Alternatively, the CLP 545 may be instantiated by an SLP 510 at some point during service processing, in accordance with a trigger point programmed into the SLP; in this way, the instantiation of a CLP may be specific to a service. The Call Logic Program receives the address of all the sub-components within the same instance of the service processing at the time of instantiation, i.e. the SLPs, LLPs and ELP. The CLP then associates the SLP(s), LLPO, LLPT, and ELP for that call and is accessible by all of these sub-components within the same instance of the service processing. That is, the Call Logic Program is the connection point for communication between the SLPs and the LLPs involved in the same instance of service processing. When a call is completed, the CLP notifies all of the sub-components within the same instance of service processing of the call completion which will initiate the tear down process of the logic programs.

The Service Logic Program (SLP) 520 is the dynamic sub-component providing the logic required to execute a service. An SLP is tied to a service, rather than a call, and performs services, and features contained therein, for a call. The features that an SLP may apply for a service, include, for example, call routing algorithms and IVR services. The SLP may be a persistent object for frequently used services, or it may be instantiated when demanded by the FD and killed upon call completion, e.g., for infrequently used services. Whether a certain SLP is active at all times, at some times, or only on-demand, is determined by the configuration file 580 generated by Service Administration for that service as shown in FIG. 11. Preferably, the SLP has access to the CLP and ELP sub-components within the same instance of service processing.

Not all SLPs are related to a specific call service and some SLPs are available for tasks that are needed by, and called by, other SLPs. Thus, for example, an SLP for an 800 service may need to invoke an SLP for a Line Information Database query to complete its tasks for call routing translations. An SLP can also pass control of call processing for a call to another SLP. Preferably, only one controlling SLP shall be executing at a time for a single instance of service processing. Any event data that is generated as part of the service task performed by the SLP is sent to the ELP component 540 within the same instance of service processing.

An SLP may not be executed in an operating system directly because it does not contain all the information for a operating system to execute. Moreover, if the SLP needs to be executed in different operating systems without changing the format and content, NOS middle-ware between the SLP and the operating system is provided to maintain the consistency of the SLP across operating systems.

As further shown in FIG. 10(*a*), other processes that execute within the SLEE 450 for support and operational functions include: a Service Manager ("SM") object 554, responsible for loading, activating, de-activating and removing services that run in the SLEE and, further monitoring all other services running within its SLEE, and reporting status and utilization data to NOS; a NOS client process 558 which is a NOS class library that is used for interfacing with NOS services and is used by all services running within that SLEE to call on NOS services, i.e., is the gateway to NOS; a thread manager (▓ TM▓) 557, which provides functionality needed for NGIN services to execute concurrently without tying up all the SLEE resources; and, a Data Management API ("DM API") 610 used to interface with the local cache 615 and cache manager components of DM 400 as will be described herein with reference to FIG. 5(*f*).

Still other service instances loaded in the SLEE as shown in FIG. 10(*a*) include a service agent ("Sag") instance 559 and a thread manager instance 557 associated therewith which are utilized for service activation at service nodes, as will be described in further detail herein.

FIG. 11(*a*) illustrates the (SLEE.java) process steps providing the main entry point into the SLEE process. As shown in FIG. 11(*a*), step 602 it is assumed that a DM system component is available, a NOS site locator system including a NOS client process 558 and NOS master process 560 (FIG. 11) which provides a NOS class library that is used for interfacing with NOS services and is used by all services running within the SLEE to call on NOS services is available for receiving logical name and object reference registrations and, that the service control server operating system, e.g., Windows NT, UNIX, PC, etc., may start the SLEE process, e.g., by recognizing a bootstrap call such as main( ) or fork( ). It should be understood that the NOS master component 560 (FIG. 8) interfaces directly with the computer=s operating system, the NOS client process 558, and other system components 571. Preferably, there is a NOS master process 560 located on the network or the local node that interfaces with the NOS client object 558 on each SLEE and includes all NOS class libraries for providing NOS services. Next, at step 604, the service control configuration file and parses the file to build a configuration object may include a hashtable containing key-value pairs as indicated at step 606. The SLEE accepts two parameters: a name and a configuration file. The name parameter is a unique NGIN name string that is used by the NOS Locator service for identifying this instance of SLEE, i.e., is used by the SLEE to register itself with the NGIN Locator service (step 612), and the configuration file is used by the Locator service for finding its site locator. For example, this table may be used to find SLEE configuration properties. As NOS implements CORBA, the base CORBA functionality is next initialized at step 608. Next, a step 610, a SLEEClassloader class is instantiated and a NOS locator proxy service is instantiated within the SLEE as indicated at step 612. Next, as indicated at step 615, the Service Manager (SM) class is loaded via a Classloader class, instantiated, and binded with the local NOS, i.e., the SM object is registered with the local proxy NOS locator service object. It should be understood that the local locator service propagates the Service Manager registration to other locator services in the NGIN domain. As will be explained with reference to FIG. 11(*b*), after the Service Manager object is registered with the locator service, it is capable of processing service management requests for loading, activating, de-activating and removing services to/from the SLEE. Finally, as indicated at step 618, a process event loop is executed which is the SLEE thread that keeps the SLEE running and allows the SLEE to process NOS events as they come in through the Service Manager (SM) or Service Agent (SAg) objects as will be explained in greater detail herein.

FIG. 11(*b*) illustrates the (ServiceManagerImpl.java) process steps carried out by the service manager object instance 554 (FIG. 8) instantiated as discussed above with reference to FIG. 11(*a*), step 615. Preferably, the SM object implements an ORB interface for performing service management operations on behalf of NOS. The process illustrates the steps taken by the SM instance to load, activate, deactivate, run and terminate services within the SLEE, e.g., via (load), (run) (start) and (stop) methods. The parameters passed in to the SM object instance by NOS include the logical reference of the service desired and boolean flag indicating whether NOS should register the service with the NGIN Local Resource Manager (LRM) site locator or whether the service is responsible for registering itself with NOS. As indicated at step 620, a request to load a service is first received, and, a handle is made to the proxy naming service at step 622. Then, at step 624, a decision is made as to whether the requested service, e.g., 1-800 collect (18C), is already loaded, i.e., if the object embodying the requested service is instantiated. If the object for the requested service is already instantiated, then NOS will return that service's object reference to locate the physical object instance at step 626 and the process returns to step 632. If the service object for the requested service, e.g., 18C, is not already instantiated, then the Classloader class is instantiated at step 625 which implements recursive loading to load all classes that the requested service depends on, including other SLPs and SIBBs. The recursive loading is possible by referring to a local configuration file from the local cache, for instance. Particularly, a flag is passed in which indicates whether classloader is to recursively load in all these dependent classes into the JVM. When loading classes for a service in the first instance, it is understood that a generic Service Agent class may be loaded if it already is not. Then, after loading in all the classes at step 625, a boolean register flag is checked at step 628 to determine whether the service has to register itself with the local NOS naming service (proxy). If the boolean register flag has been set, e.g., to true, then the service has responsibility to register with the NOS naming service, as indicated at step 630. Otherwise, the process continues to step 632 where the SAg class is instantiated, and an association is made between the service agent object instance 558 (FIG. 11) and the particular service, i.e., by passing in the SLP object into service agent instance. Then, at step 635 a new SLEE thread is created, in the manner as to be described, and the SLEE thread is invoked to run the Service Agent, i.e., associate the SLEE thread with the Service Agent. Finally, the SM process is exited and the process returns to SLEE.java process. Via the methods provided in SM, the additionally is responsible for monitoring all other services running within its SLEE, and reporting status and utilization data to NOS.

Further to the SM process, the invocation of (SLEEClassLoader.java) is now described in greater detail in view of FIG. 11(*c*). Particularly, the SLEEClassLoader class is a specialized class of and extends the JVM's ClassLoader class. It extends the behavior of the system class loader by allowing classes to be loaded over the network. Thus, as a first step 686 of FIG. 11(*c*), the classloader first checks its local cache associated with the instance of the SLEE to see if the class has been already loaded and defined. If the class has already been loaded, then the process returns. If the class has not been loaded, then at step 688, a message is sent via NOS to check a local data store (DM) if the class is available for loading. For example, the SLEEClassLoader may retrieve classes from a relational database using JDBC database connectivity, however, it is understood that it may retrieve classes from any relational database that supports the JDBC API. If the service class is not found in the local data store, then the SLEEclassloader checks a local file system at step 689. If the class is found in either the data store, or, local file system, the class is fetched, as indicated at step 690. Then, at step 694, a define class method is invoked to make that class available for the JVM execution environment. Particularly, the (defineClass) method may recursively go through each of the classes specified for performing that service and converts an array of bytes into an instance of class Class. Instances of this newly defined class may then be created using the newInstance method in class Class. This functionality allows the SLEE to load and instantiate new services and yet remain generic. Preferably, as indicated at step 695, a method is called to populate the local cache so the next time the class is loaded there will be a cache hit.

In the preferred embodiment, each of these instantiated objects registers themselves with a NOS locator service, i.e., LRM 577, in accordance with a naming convention, generally exemplified by the following string:

. . . site level. SLEE Number. SLP name . . .

where the site level is the information pertaining to the physical location of the NGIN service control server 440; the SLEE Number is the particular SLEE in which that object has been instantiated, e.g., SLEE#1; and the SLP name is the logical name of the service, e.g., Feature Discriminator#1. The string may include a Aversion number, as well. A registration name is propagated to other locator sites in the NGIN domain; and it is by this registration process and the NOS resource management functionality (to be described) by which the NOS component knows which processes have been deployed, where they have been deployed, and where services may be currently available.

The methods and constructors of objects created by a class loader may reference other classes. To determine the class(es) referred to, the Java Virtual Machine calls the loadclass method of the class loader that originally created the class. If the Java Virtual Machine only needs to determine if the class exists and if it does exist to know its superclass, a "resolve" flag is set to false. However, if an instance of the class is being created or any of its methods are being called, the class must also be resolved. In this case the resolve flag is set to true, and the resolveClass method is called. This functionality guarantees that the classes/SIBBs/JavaBeans which are referred by the service will also be resolved by the SLEEClassLoader.

Figure 11A:
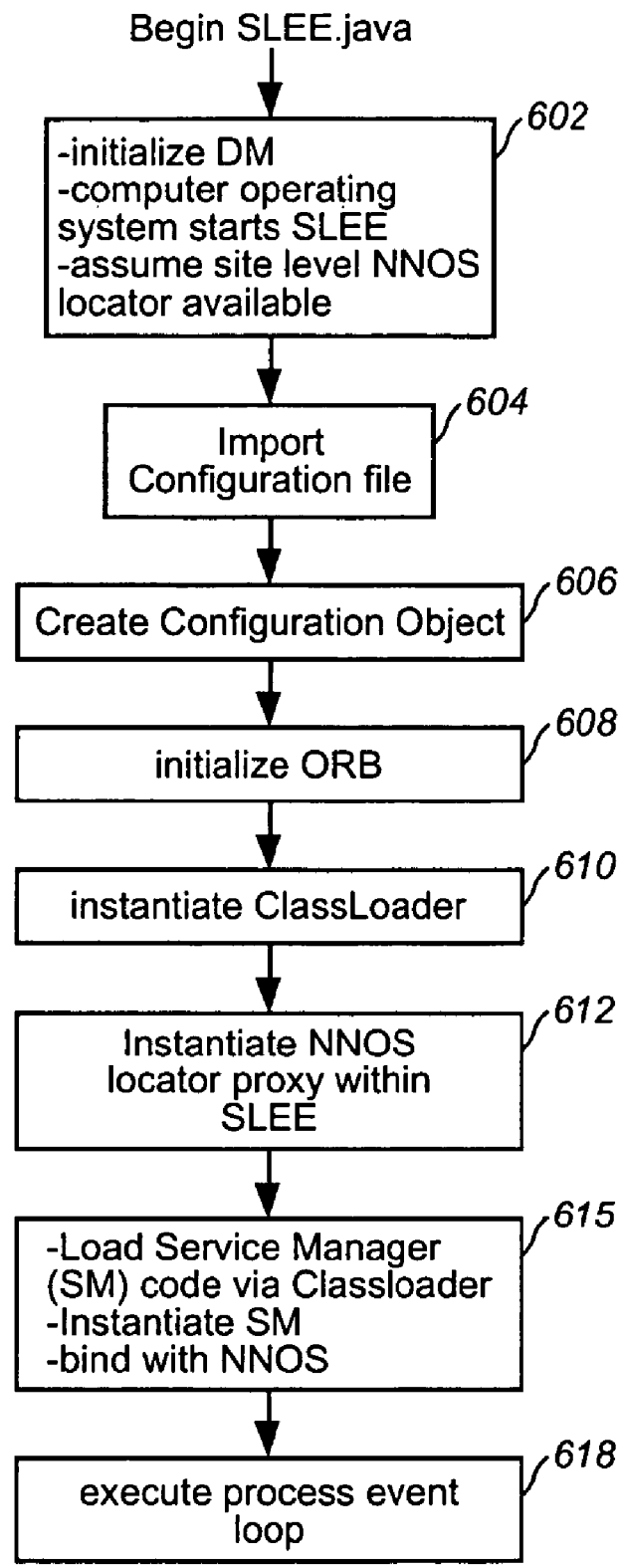
FIG. 11(a) illustrates the SLEE start-up process.
Figure 11B:
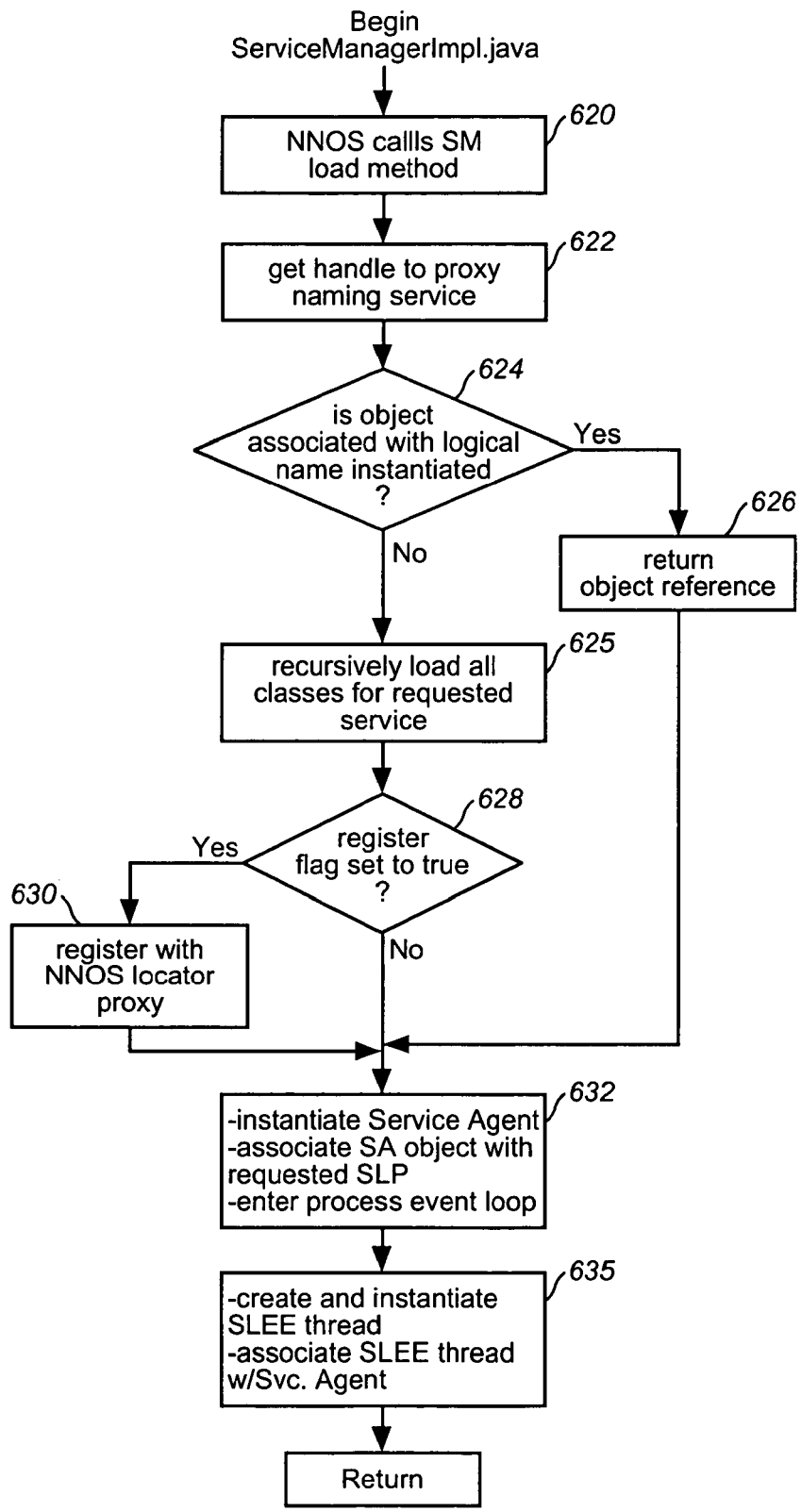
FIG. 11(b) illustrates the Service Manager process.
Figure 11C:
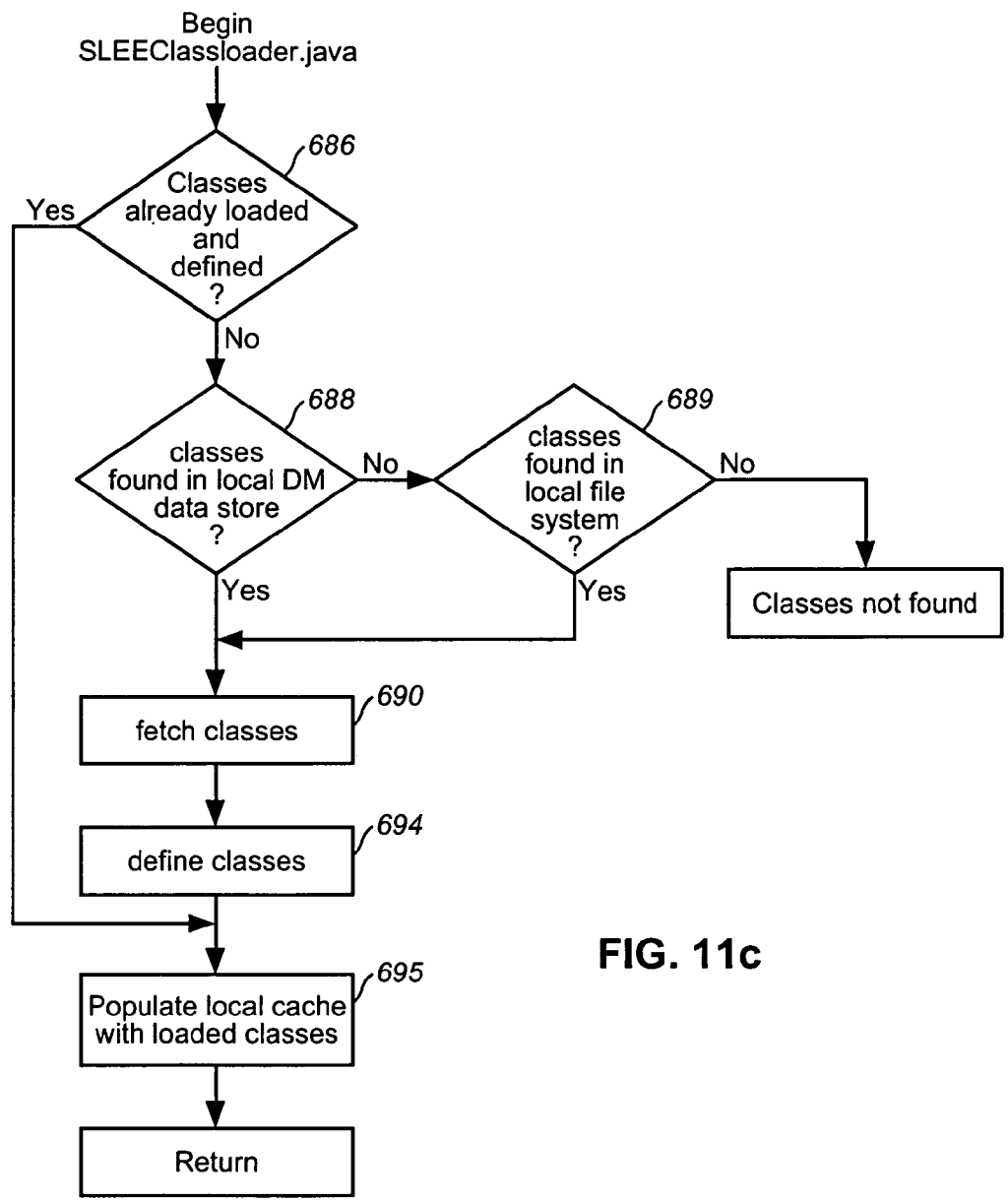
FIG. 11(c) illustrates the SLEE Classloader process.
Figure 11D:
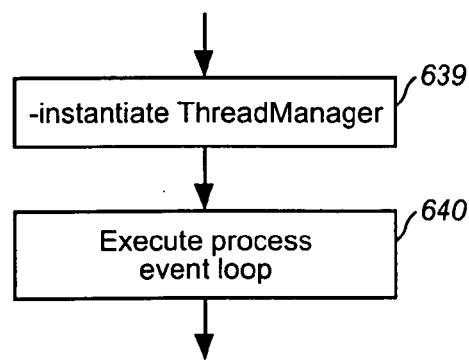
FIGS. 11(d) and 11(e) illustrate flow charts depicting the Service Agent functionality.

FIG. 11(d) illustrates the service agent class process flow upon instantiation. As shown at step 639, the first step includes instantiation of a thread manager ("TM") object associated with the service agent and depicted as TM object instance 557 in FIG. 10(a). As will be described, the thread manager object is based on a (ThreadManager) class which may be instantiated to behave like a thread factory functioning to create a new SLEE thread per service request, or a thread warehouse, which is desired when running on machines with high thread creation latencies. Next, at step 640, the SA associated with the service enters into a process event loop via its (run) class method, and is now ready for receiving call events associated with a service.

Figure 11E:
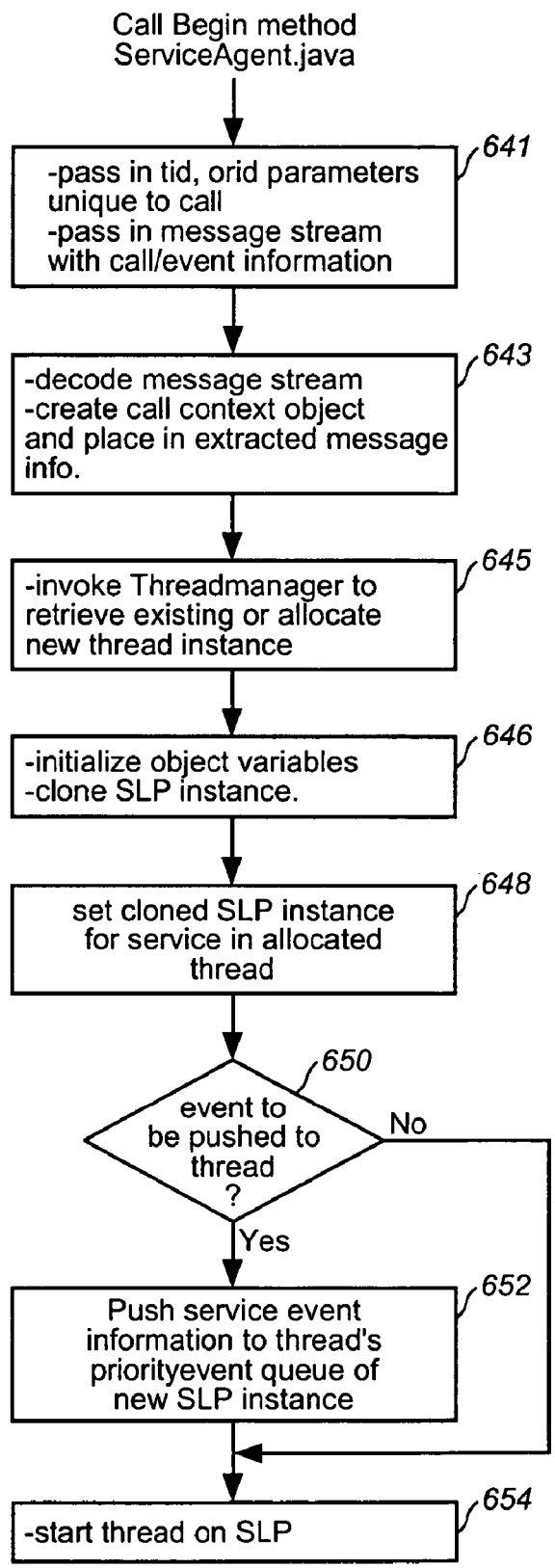

Referring to FIG. 11(e), there is illustrated the details of the ServiceAgent class which provides the gateway into the NGIN services via its (begin), (continue) and (end) class methods. Every service within the SLEE has an associated ServiceAgent object which is based on a class responsible for managing service instances (call instances) and dispatching events to service instances. As shown in FIG. 11(e), after a SAg object is instantiated by the Service Manager (load) method and is running, the SAg's (begin) method is invoked each time a new call requesting that service is received. Particularly, as indicated in FIG. 11(e), at step 641, tid, orid call identifier parameters and a message stream containing event information related to service processing for that call, e.g., as provided by an Initial Address Message ("IAM") from the IDNA/NGIN switch referred to herein as the Next Generation Switch ("NGS"), is first passed into the SAg begin method. Then, at step 643, the message stream is decoded, e.g., by invoking a (decode) method to extract the critical information related to that service instance. Additionally, a call context object instance used for managing call context data is created to receive the extracted message information. In the begin method, as indicated at step 645, a new thread is allocated for that call by invoking the allocate method of the ThreadManager instance, as described herein with reference to FIG. 11(g), or, a thread is pulled from a pool of threads if several threads for that service have been instantiated ahead of time. Otherwise, if the SAg (continue) method is invoked, an object reference corresponding to the allocated thread for that call is returned.

Figure 11F:
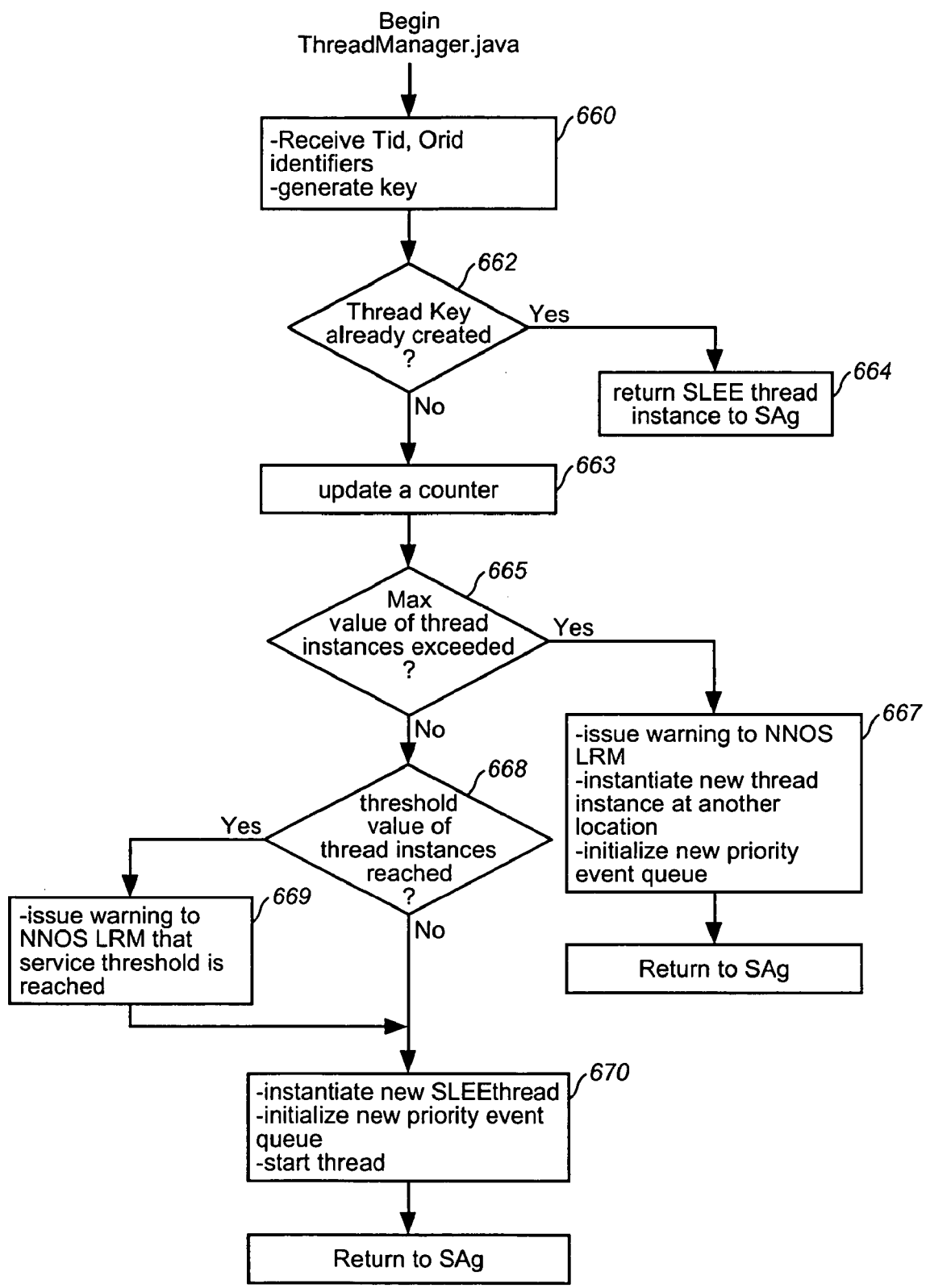
FIG. 11(f) illustrates the Thread Manager process.
Figure 11G:
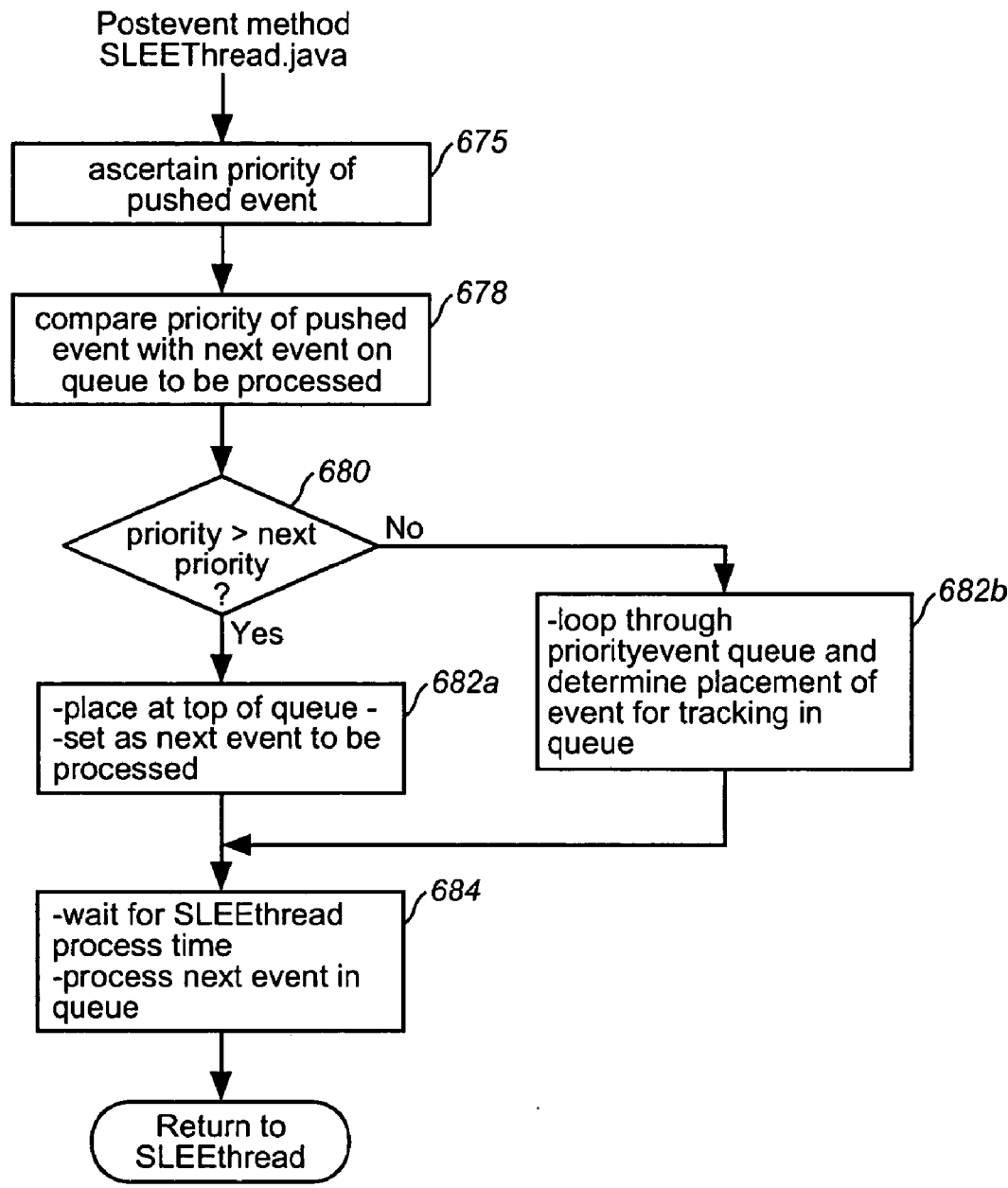
FIG. 11(g) illustrates the Service agent post-event process.

With greater particularly, the thread manager object is based on the ThreadManager class which preferably manages threads based on session ids. Two methods, (allocate) and (release) are provided for allocating and releasing threads, respectively. Both allocate and release expect a unique identifier as a key that can be used for thread identification. The unique identifiers include a transaction ID ("Tid") which is set by the NGS switch which received the call, and an object reference ID ("Orid") identifying the call originator and are used to identify a call instance. FIG. 11(f) illustrates the operational details of the (allocate) method of the thread manager class. As shown in FIG. 11(f), at step 660, the Tid and Orid identifiers for uniquely identifying the call transaction are passed in the process and a unique key is generated based on the identifiers. Then, at step 662, a query is made as to whether the key identifies an already existing thread, for example, by checking a hashtable of key-value pairs. If the key is recognized meaning that a service thread has already been allocated for the call, then at step 664, the thread manager will return the SleeThread instance (thread object) after consulting the hashtable.

Otherwise, at step 663 a counter which tracks number of instantiated service threads is incremented, and in an effort to monitor system loads, at step 665, a determination is made as to whether the maximum value of thread instances for that service has exceeded. If the maximum value of thread instances for that service has been exceeded, e.g., upon comparison of the counter value with the maximum service instance value found in the service configuration file, then at step 667 a message is issued to NOS to enable it to seek out another instance for the service which may be available, for example, in another SLEE executing at the same site, or, at instantiated at another service node location, for example, and the process returns. Further to the SleeThread instantiation process is the initialization of its PriorityEventQueue, as will be described in further detail herein with reference to FIG. 11(g). If the maximum value of thread instances for that service has not been exceeded, then at step 668, a determination is made as to whether a threshold value of thread instances for that service has exceeded. If a threshold value of thread instances for that service has been exceeded, then at step 669, a warning is issued to NOS local resource management function that the service threshold has been reached as will be described in further detail herein with respect to FIG. 11(f). Finally, at step 670, regardless of the output at step 668, a new SleeThread instance for the requested service is allocated, a priority event queue is initialized for that requested service and the thread is started with control being returned to the SAg instance for that service.

Returning back to the Service Agent (begin) method functionality as shown in FIG. 11(e), after the thread manager has allocated the thread for the service instance, object variables relating to the thread are initialized at step 646, and a new object instance of the requested service is instantiated by invoking a (clone) method. Then, at step 648, the new cloned SLP instance is set into the new allocated thread. Then, at step 650, a decision is made as to whether there is event information that is needed to be associated with that call instance, e.g., all the IAM information that had been extracted from the input message stream. If there is event information associated with the new cloned SLP instance, then this it is pushed onto the thread as indicated at step 652. Whether there is event information to be pushed onto the thread or not, the new allocated thread for that SLP is started, waiting for the asynchronous arrival of service-related event information which is processed by the SA (continue) method. As mentioned, the SleeThread allocated for that call maintains a priority event queue for holding all service related event information received during processing. All events related to service processing has an associated priority and the thread will manage processing of event information according to its priority, i.e., its placement in that service=s event queue. Finally, at step 654, the thread event loop is started for that call instance.

It should be understood that the SA (continue) method is essentially the same as the (begin) method shown in FIG. 11(e), with the difference being that SA (continue) method is directed to channeling real-time service-related events with a service process thread that has already been instantiated for that call instance, as discussed above with reference to FIG. 11(e). Thus, the Service Agent=s continue method receives events and identification parameters of the call instance, re-allocates the service thread associated with the tid, orid parameters for the received event, and pushes the event to the thread=s event priority queue. It should be understood that both the SAg and SM classes both comprises an IDL interface to NOS. Services (SLPs) do not have such an interface however, are able to communicate system wide with via its SAg interface.

During real-time service processing, the SLEE 450 is able to perform the following: 1) interpret instructions at SLP and SIBB levels during service processing; 2) deliver the incoming events to the designated instance of the SLP; 3) generate trace data if a tracing flag is set; 4) allow tracing turned on at SLP, SIBB, and SLEE levels and send the trace data to a specified output; 5) generate SLEE usage data and send the run time usage data to a specified output; 6) generate the exceptional data (errors) for telecommunications management network (TMN) interface; 7) generate performance data for TMN interface; 8) receive a message/request for adding new instances of SLP or utility programs and add such new SLP or utility program instances without interrupting and degrading the service processing; and 9) support the same service by multiple Service Control instances for load sharing.

When a service instance has finished processing, it will either initiate the termination of the service or, another process in communication with the service will. In either event, the SAg (end) method is called which functions to terminate the thread instance associated with that call. This is accomplished by invoking a ThreadManager (release) method, passing in the Tid and Orid identifiers uniquely identifying the call instance, pushing any events onto the thread=s event queue, and releasing the call, i.e., terminating the thread instance and/or placing the thread instance back into a thread pool.

Preferably, the SleeThread class instance provides the functionality needed for IDNA/NGIN services to execute concurrently without tying up all the SLEE resources and, facilitates co-operative resource sharing. Specifically, there is a one-to-one mapping between SleeThread and a service instance with the SLEE associating one instance of a SleeThread with one instance of a service, i.e., for every call that is handled by a service there is one instant of SleeThread associated with the call. The SleeThread also acts like a data warehouse for the services by housing a transaction id (tid), object reference id (orid), object references, e.g., both peer and agents, an SLP, and the priority event queue associated with the SLP. More particularly, a SleeThread acts like an event channel between the service (SLP) and the ServiceAgent by implementing two key interfaces: a PushConsumer for enabling the ServiceAgent to push events on the SleeThread; and, a PullSupplier enabling services to pull events from their associated thread. As will be described, every SleeThread has a instance of PriorityEventQueue for queuing NGINEvents, in the manner described.

Preferably, the (PriorityEventQueue) class is a platform-independent class that queues events (derived classes of NGINEvent) associated with a service (SLP). As shown with reference to steps 667, 670, FIG. 11(*f*), every SleeThread object instantiates an instance of PriorityEventQueue which may comprise a hashtable of events. The events may be queued in descending order, for example, with event priorities being defined in the NGINEvent base class and ranging anywhere from 10 to 1, with 10 being the highest priority, for example. Thus, each thread may track the number of events that are/not available for processing, thus enabling full service processing parallelism.

FIG. 11(*g*) illustrates a (postEvent) method which encapsulates logic for ascertaining the priority of the event being received by the thread, as indicated at step 675, and the posting of events to the PriorityEventQueue. As shown in FIG. 11(*g*), this is essentially accomplished by comparing the priority of pushed event with the priority of the next event on priority queue to be processed at step 678, determining if the priority of the pushed event is greater than the priority of the next event in the queue to be processed (if any) at step 680, and, either placing the pushed event at the top of the queue to set it as the next event to be processed as indicated at step 682*a*, or, looping through the queue and determining the location in the queue where the event should be stored according to its priority, as indicated at step 682*b*. Then, at step 684, the SleeThread processes the next event of highest priority when it is allocated processing time from the system.

More particularly, a PullSupplier interface is implemented by the SleeThread to support an operation for consumers to request data from suppliers by invoking either a "pull" operation which blocks until the event data is available or an exception is raised and returns the event data to the consumer, or, the "tryPull" operation which does not block. That is, if the event data is available, it returns the event data and sets a hasEvent parameter to true; if the event is not available, it sets the hasEvent parameter to false and a null value is returned. Thus, the SleeThread may act as the event supplier and the service (SLP) takes on the consumer role. The service (SLP) uses the SleeThread pull or tryPull for fetching event data from the SleeThread. The service either uses the pull operation if it cannot continue without the event data, otherwise, it uses the tryPull operation.

The PushConsumer interface is implemented by SleeThread and implements a generic PushConsumer interface which supports operation for suppliers to communicate event data to the consumer by invoking the push operation onto the thread and passing the event data as a parameter into that thread=s priority event queue. Thus, the SleeThread acts as the event consumer and the ServiceAgent take on the supplier role. The ServiceAgent uses the SleeThread push operation for communicating event data to the SleeThread. A "kill" service event may comprise the highest priority. Priorities for events may be defaulted, or, when newly created event classes are designed, may be established at Service Creation.

As described, the Service Agent instance for a particular service channels all events received and generated during the course of service processing to/from the service thread instance created for that call. For example, an initial event generated by the switch at a node may comprise a (ServiceRequestEvent) which class is responsible for conveying an initial service request to the IDNA/NGIN service control and particularly, the pertinent initial call context information such as: the time that the service request is initiated; the Switch ID that the request is originated from; the Port ID that the call is originated; the terminal equipment ID that the call is originated; the calling party's number; the called party's number, etc. A (connectEvent) subclass extending NGINevent may report on the time that the connection occurs; the station number that the calling number is connected to; and, in the context of an ATM-VNET service, report on the incoming Virtual Path ID and outgoing Virtual Path IDs. A (releaseEvent) subclass extending NGINevent may report on the release event. For example, in the context of an ATM-VNET service, the release can be caused when the calling or called party terminates the call, or when user credit is run out. Such a class may implement SIBBS for determining: the time a release event is generated; the cause of the generating the release event and the elapsed time from connection of the calling and called parties to the time the release event is generated. Further to this, a (terminateEvent) subclass extending NGINevent may used to convey a termination message from NGIN to NGS. Upon receiving this message, the switch may initiate tear down connection process. A (MonitorReleaseEvent) subclass extends NGIN-Event and is used to send a message to NGS directing NGS to forward a release indication to NGIN upon receipt of a release indication. When NGS receives a monitor release message, a (UniNotifyEvent) sub-class may be invoked sending a notification to the originator (caller). The (MonitorConnectEvent) sub-class extends NGINEvent and is a subclass used to send a message from NGIN to NGS directing NGS to send an event to NGIN when a connect message is received.

As mentioned, in the context of real-time service processing, the Data Management's data retrieval and update functionality includes the ability to access data stored by DM during service processing.

In the preferred embodiment, at any particular service node, DM receives data requests from an executing managed object instance in the SLEE, e.g., through the NOS, during service processing. Data Management specifically notifies the requester (e.g., managed object) if it is unable to understand the data request. If the data request is for the retrieval of a data entity, Data Management returns the requested data to the requester (e.g., via NOS). It should be understood that any support that is needed for manipulating and querying data in a single repository or across multiple repositories is provided by DM. Data Management additionally supports the collection and collation of the results of queries that span multiple repositories. If DM is unable to locate the name of the requested entity in the data retrieval request, DM notifies the NOS component. The NOS component will also be notified if a database failure occurs during the retrieval of a data entity. Data Management additionally notifies the requester (executing service control object) of the inability to retrieve a specific data entity from a valid name. If the data request is for an update of a data entity, Data Management updates the data entity and determines if replication is required. The DM notifies the requester if it is unable to update a data entity specified in a data request, and additionally notifies NOS if it is unable to locate the name of the requested entity in the data update request. At any time during NGIN operation, DM notifies the NOS of a database failure during the update of a data entity. If the data request is for the deletion of a data entity, DM deletes the data item and determines if the transaction needs to be initiated on other repositories.

FIG. 5(f) illustrates generally, the functional architecture of the Data Management component 400 which comprises: a service control server component 405 for making the call service data available at the service node for real-time call processing; and, a database component 407, embodied as a discrete database server, for storing and distributing the selected subset of data maintained by SA. Specifically, the service control server component 405 includes a Data Management (DM) Client 410, which is the actual data management application; a DM API 412 which is linked with the DM application and is the interface the DM application uses to obtain data from SA; local cache 415 which is a shared memory on a service control server used to store some or all data from the DBOR Extract available for call processing in accordance with a local caching strategy, and a Cache Manager 420, which maintains the state of the local cache by implementing a local caching strategy and, communicates with the DM server to retrieve data from the DBOR extract. The database component 407 includes a DBOR Extract 427 which comprises one or more databases having data to be used by managed object instances during service execution at that node; a DBOR Extract Manager 426 that performs the same functions as the DBOR Manager 520 in Service Administration (FIG. 5(d)), but handles a selected subset of the information that SA holds; an SA client 422, which inputs data received from service administration to the DBOR Extract Manager 426; a DDAPI 424 that is the process interface between the SA client 622 and the data distribution process of SA; and, a data management server 425, that generally handles data extracts from the DBOR Extract Manager 426.

The data management operation will now be described in further detail with respect to FIG. 5(f). Within a SLEE, several types of functions may need data from Data Management 400 including, but not limited to managed objects (SIBBs, SLPs, etc.) and NOS. Each of these is represented in FIG. 5(f) as a DM Client, which executes in the service control SLEE. A DM Client 410 uses the DM API 412 to make a request for data as the DM API 412 provides a common message set for all DM Clients to interface with Data Management. The DM API 412 also encapsulates from the DM Client the specific location where the data is needed, as this data may be stored in a Local Cache 415 or only in the DBOR Extract 427. The DM Client 410 requests data by a logical name, and the DM API 412 determines if that data can be retrieved from the local cache or, if it needs to request the data from the DBOR extract via the DM Server. Preferably, the local cache 415 is a shared cache available for every process running on each SLEE provided in the control server 405, i.e., there may be one or more local caches provided for different applications, e.g., 1-800 process cache, routing manager cache, etc., with each shared cache having its own respective cache manager.

When a DM Client 410 makes a request for data, the DM API first checks the local cache 415 to see if the requested data is stored there. If the requested data is stored in the local cache 415, the DM API retrieves the requested data and provides it to the DM Client 410 using any standard data retrieval technique, such as hashing keys and algorithms, or indexed sequential access methods.

If the requested data is not stored in the local cache 415 the associated Cache Manager 420 retrieves the data from the DBOR Extract 427, via the DM Server 425. Particularly, the DM API 412 notifies the Cache Manager 420 that it needs certain data and the Cache Manager responds by sending a request to the DM Server 425. The DM Server 425, in turn, retrieves the requested data from the DBOR Extract, using the DBOR Extract Manager 426 for database access. The DM Server 425 sends the requested data back to the Cache Manager 420, and the Cache Manager provides the data to the DM Client 410 via the DM API 412. The Cache Manager may also write the requested data to the local cache 415, depending upon the local caching strategy which is dependent on both service demands and on the capabilities of the computers they run on, notably the memory capacity. These specifications are obtained from the service and computer profiles generated by Service Administration.

In the preferred embodiment, data cache manager component for the DM 400 of IDNA/NGIN employs a 'Client Side Caching' strategy at each service node. In accordance with this strategy, cache manager routines and logic is implemented essentially in the following manner: 1) the local cache is maintained as a static array in the beginning of the routine; 2) the routine first checks to see if the requested data is in the local cache; 3) if the data is in the local cache, it is formatted and returned to the caller; 4) if the data is not in the local cache, the data is retrieved from the Data Server using a common "QueryServer" routine; and, 5)

when data is returned from the Data Server, it is stored in the cache, formatted, and then returned to the caller. More particularly, the "QueryServer" routine formats a query to the Data Server, sends the request, and if it does not receive a response it sends another request. This continues until either a response is received, or until a set number of attempts, at which time the routine will return with an error.

In the preferred embodiment, the code logic exists in a separate process called the 'cache manager' which allocates the cache space dynamically and not as a 'static variable'. Furthermore, in the preferred embodiment, the cache manager is a generic routine, i.e., it does not contain references to specific tables and data elements. Moreover, the cache manager of the preferred embodiment implements logic to handle many caching strategies and, implements logic for handling unsolicited data messages from the data server.

Local caching strategies range from storing all data in the Local Cache, to storing nothing but, typically includes a "most recently used" or "most frequently used" strategy. As provisioning of a local cache is to provide quick data retrieval (using shared memory) for frequently used services, the local caching strategy is closely tied to the SA service support provisioning function which determines which services to run on which Service Control Servers. More particularly, there are three levels of data caching in the system dependent upon the data characteristics and services that the data is associated with: 1) local level data which implements local caching scheme described herein utilizing the DMAPI, Cache Manager and DM server and DBOR extract devices; 2) node or site level data where the DMAPI, Cache Manager and DM server components are implemented for updating the DBOR and sending the change back through the DM server to all of the cache managers at the node; and, 3) network level data where the DMAPI, Cache Manager and DM server components are implemented to send the data up to SA and applied to the central database and down back through SA and all of the DM servers to all of the local caches in the network. It should be understood that there are also two levels of data permanency: 1) permanent data intended to be written into the DBOR; and, 2) transient data to be written to local caches depending upon the characteristics of the data.

As further shown in FIG. 5(f), as an example of local data caching of transient data, when an SLP for a service is to run actively, i.e., be instantiated as a persistent object in the SLEE based on anticipated service demand, the local caching strategy specifies storage of data for this service in the Local Cache for the specified duration of time in accordance with the configuration file, i.e., a service profile, from SA. The DM Server sends the data for that service to the Cache Manager 420 for storing the local cache 415 for the active time. Particularly, when a SLEE environment becomes provisioned, the Cache Manager 420 registers itself with the DM Server 425 by specifying which services will be performed. Based on this, the DM Server 425 retrieves from the DBOR Extract 427 and downloads to the Cache Manager 420 the data needed to fulfill the local caching strategy for the services for which the Cache Manager has registered. Preferably, the DM Server 425 knows the local caching strategy for each local cache and the cache manager at its site. Thus, the DM Server 425 may also provide unsolicited data to the Cache Manager. For example, when a network initiated update occurs, the update may be directed by the DM server directly into its DBOR extract and/or to service administration for validation and distribution to other data management platforms. If the DM Server receives from SA an update, it will send this update to the cache manager for updating the local cache. It should be understood that in this instance, the SA Client and DBOR Extract Manager 426 will update the DBOR Extract. Data Management provides a process interface between the SA Client and DM Server, for notifying the DM Server of DBOR Extract updates.

In the preferred physical embodiment, the Data Management component 400 uses commercial database products, most of which provide an interface mechanism such as an API, object request broker, ("ORB") or network file service. As such, Data Management does not use NOS component 700, however, the Service Control interface to Data Management may be adapted to use NOS. Since the Data Management function is local to each service node, this function may be physically realized by different object and relational database systems/products throughout the network. Example relational database products include those available from Oracle, Informix, and Sybase, in addition to Versant Object Oriented Database products. The interface between Service Control and Data Management may be supported by whichever database system/product is used at a particular service node, and may be different at different nodes. The distributed processing that is enabled by NOS occurs among processes in the SLEE, with each process interfacing with its local Data Management component, using whatever interface is in place at the local node.

The IDNA/NGIN Network Operating System (NOS) component 700 will now be explained in greater detail in view of FIGS. 10(a)–10(c). As mentioned, NOS functions include enablement of inter-process communications, object connectivity, and resource management functions for the IDNA/NGIN system 170. Because all IDNA/NGIN processes execute on a variety of hardware and operating system platforms in a widely distributed architecture, NOS-provides platform-independent and location-independent communications among all processes. Particularly, NOS comprises several functional sub-components to provide the interface between all NGIN processes, including the interfaces between service execution and control, service administration, and data management. The NOS is also the interface between the switch fabric (resource complex) and call and service processing (FIG. 1), and, enables two or more processes running on the same SLEE to communicate with each other.

Figure 10B:
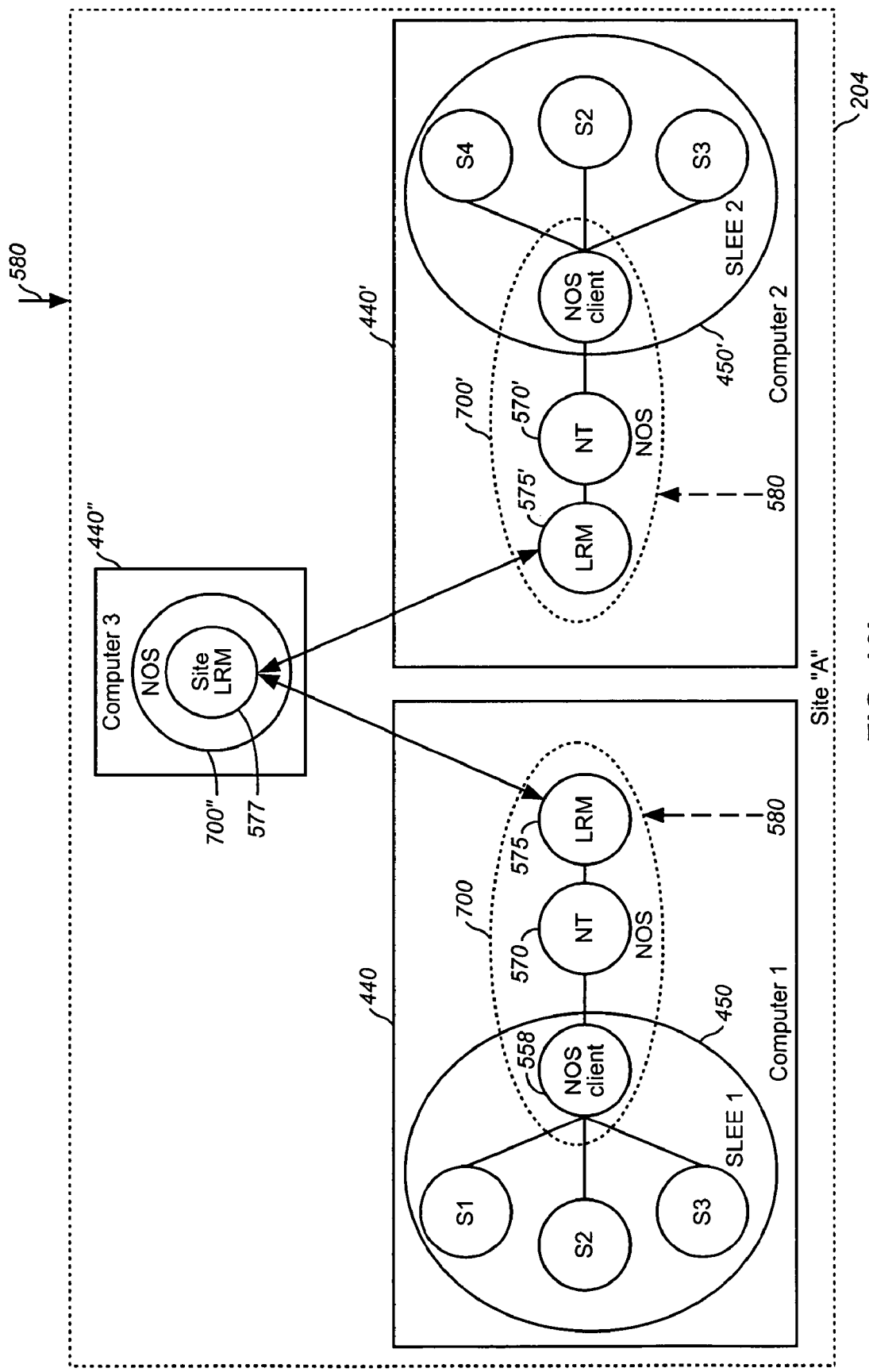
FIG. 10(b) illustrates the functional architecture of the NOS NT and LRM functional sub-components.
Figure 10C:
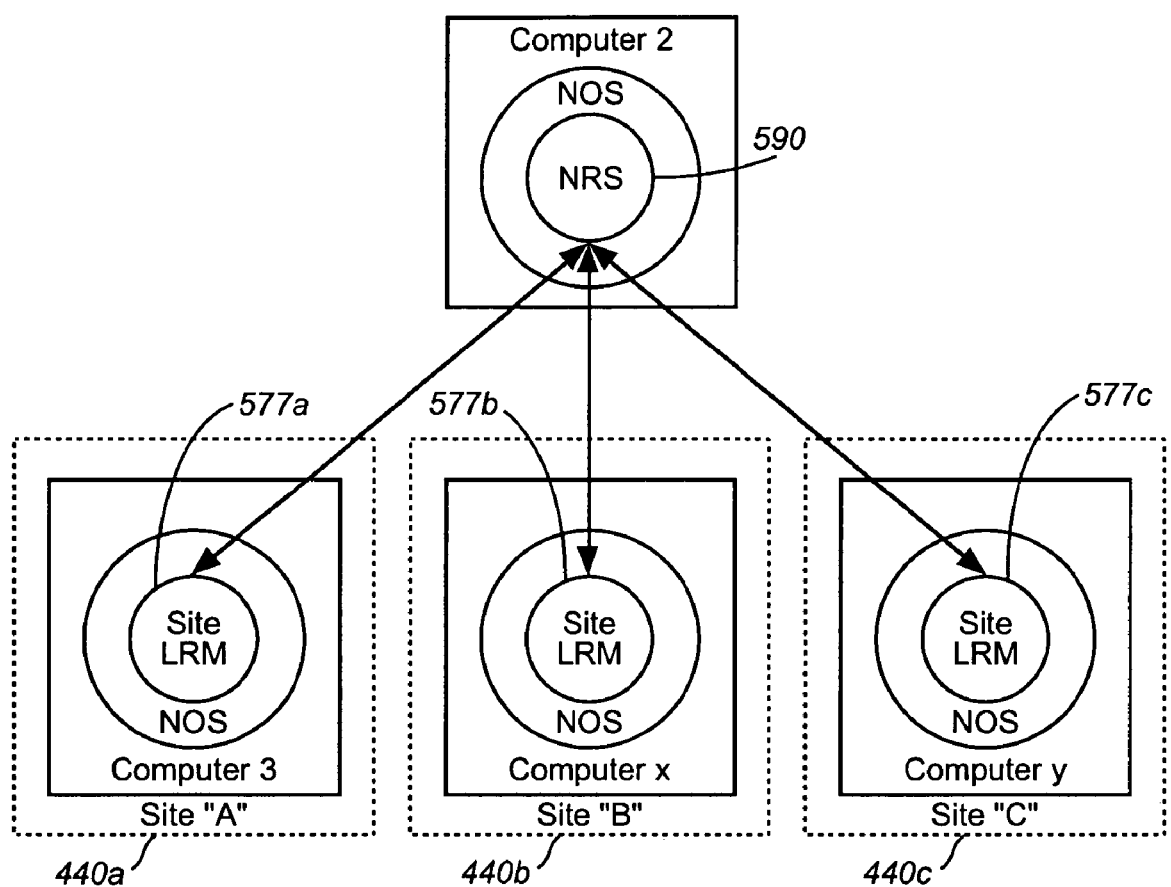
FIG. 10(c) illustrates the architecture of the resource management system for the intelligent network.

As shown in FIGS. 10(a)–10(c), the NGIN NOS functional sub-components include: 1) a Name Translation ("NT") process 570 that resolves logical names for data and service objects to physical addresses that identifies both the computer (as a network address) and the memory address in which the requested object is running; 2) Local Resource Management ("LRM") processes 575, 577 that tracks and maintains the status of resources at a service node; 3) a global Network Resource Status ("NRS") process 590 that maintains the status of all service node resources throughout the entire NGIN network; and, to provide inter-process communications, 4) a set of services for providing object connectivity, such as that provided by a Common Object Request Broker Architecture compliant ORB, such as provided by Orbix®, developed by IONA Technologies of Cambridge, Mass., and Dublin, Ireland, or like equivalent, which enables communications among objects across different computing platforms, API message sets, and Internet Protocol (IP) communications, particularly by mapping logical names of objects to physical addresses in a manner such as to meet or exceed certain real-time call processing performance requirements.

At system boot, the SLEE 450 is started and launches within its environment an instance of a NOS client component 558 and Service Manager process component 554. The SM SLP 554 retrieves the logical name for other components from that node=s configuration files(s) 580 comprising the logical names of services to be immediately instantiated. It then provides the logical name to the ORB name service, which maps that logical name to a physical address. The ORB maintains service object connectivity from that point on. The ORB name service is also used for other services=registrations. Each service started on a SLEE registers itself with NOS and it is through these registrations the ORB identifies physical addresses for logical names.

To implement platform independent communications among interactive objects, interfaces are defined, as enabled by an interface definition language ("IDL"). CORBA currently supports IDL, however other object-oriented communication technologies such as remote method invocation (RMI) protocol may be implemented as long as performance requirements are met for real-time call processing. Particularly, the interfaces for each of the IDNA/NGIN components are defined at the time of their creation and are made available at run-time by storing them in a persistent data store or library (not shown) associated with the local LRM 575. Services are enabled to query this library to learn about new object interfaces. The NOS client process 558 and NOS master 560 is a NOS class library that is used for interfacing with NOS services and is used by all services running within that SLEE to call on NOS NT and LRM services, as is now described with reference to FIGS. 10(b)–12.

FIG. 10(b) illustrates the functional architecture of NOS NT functional sub-component 570 and LRM functional sub-component 575 residing on a computer executing one or more SLEEs 450 and 450', with an NT and LRM sub-component associated with each SLEE. FIG. 10(b) particularly depicts an example of a single IDNA/NGIN service node or "site" 204 having at least two computing systems 440 and 440' implementing respective SLEE components 450 and 450' and respective NOS components 700 and 700' that each include a respective NT functional sub-component 570 and 570', and a respective LRM functional sub-component 575 and 575'. Although a single SLEE is shown executing on a separate computer, it should be understood that two or more SLEEs can operate on the same computer. Running on each SLEE 450, 450' are several service objects or processes labeled S1, . . . ,S4 which may be call line logic, service logic or call processing logic programs, a persistently running feature discriminator object program, or a NOS client object 558, or other process.

As described herein, each NOS NT functional sub-component 570, 570' includes a process for identifying the correct version of a data or service object to use, and the optimal instance of that object to use, particularly by allowing a process to call on any other process, using a single, common logical name that remains unchanged throughout different versions and instances of the called process. Thus, the NOS NT component 570 encapsulates object references, versioning, and physical locations of instances from processes.

As described herein, each Local Resource Manager ("LRM") component 575, 575' of NOS 700 at each service node determines which services to execute on which SLEEs at a node, per configuration rules contained in service profile (configuration) files 580, which may include the contents of the service profile an example of which is depicted herein in Table 2 and deployed from the SA component for storage in the local cache. The LRM first reads this service profile file 560 stored in the local cache 415 (FIG. 10(a)) at that node, and determines which specific SLEE to run a service on in accordance with the rules in the service profile file and, which services are to run actively (as persistent objects) in the SLEE, or are to be instantiated only on-demand.

Specifically, as described herein, the SA generates, for each service, a service profile which may be embodied as a formatted data file in SA, that specifies that service's requirements and to which SLEE(s) and/or computers within the network it should be deployed. An example service profile for a particular service to be deployed in the network is depicted as provided in Table 2 herein.

In further view of FIG. 10(b), the LRM 575 enables run-time configuration and optimization of service execution, by tracking the health and status of each service resource in the manner as will be described in greater detail. Particularly, each LRM functional sub-component maintains a list of all services that are programmed to run on that SLEE, which service processes (object references) are actively running on a SLEE, and the current load status (processing capacity) of the SLEE(s) at that node based on predetermined thresholds.

More particularly, the LRM component 575 of NOS is a set of libraries built into a local cache of object references corresponding to every object (logic program) in the system, and which object reference contains the information about the server, such as IP address and port number, to enable communication. When new objects become available within the system, they are registered with NOS, i.e., an object reference is created for them for registration in the local cache through data management.

After querying its service profile (configuration) file 580 to determine which services are to be immediately instantiated, the NOS LRM component 575 sends a service activation request from NOS NT 570 to the active Service Manager object 554 in SLEE via the NOS client instance 558 also executing in the SLEE 450. The SM object 554 is an API object for enabling control of SLEE services. For example, it provides the capability to instantiate new services when a request for an inactive service is received. That is, it is capable of assigning a process thread to the object when it is instantiated and the service then registers itself with NOS via LRM 575. As a service is called by another service, using its logical name, the LRM uses the rules in the configuration file to determine which instance to invoke by utilizing the ORB name service to map the logical name to physical addresses of active instances.

As shown in FIG. 10(b), associated with an NGIN site or service node 204, is a site LRM 577 running over a NOS component 700" on a separate computer 440", or on a shared computer, such as computer 440 or computer 440'. The Site LRM 577 functions to: 1) track the availability of services at each SLEE, which is a function of current loads of all processes running on each SLEE; and, 2) maintain a resource status list that is an actively updated copy of each individual SLEE LRM 575, with the addition of a SLEE identifier for each resource. The site LRM sub-component 577 determines which instance of a requested service should be used based on any of several criteria, including, but not limited to: 1) the proximity of a called service instance to the calling service instance (same versus different SLEE, same versus different site); 2) the proximity of the called service instance to the Data Management data that is needed by the called service; and, 3) the current system and process loads.

As an example, illustrated in FIG. 11(b), whenever a process, for example, S1 in SLEE 1, needs to instantiate an SLP, S4, to perform a particular process, e.g., Vnet service, NOS first makes a determination as to whether the service, i.e., its object reference, is available in the local cache, for example, in SLEE 1. If the local LRM 575 does not have the requested object reference, NOS seeks out the site level LRM 577 to determine the location of that particular object reference corresponding to the requested service. For instance, as shown in FIG. 11(b), that object may be found in SLEE 2, and when found, NOS will make available that service by instantiating an instance of that object, if SLEE to has the capacity for doing so, i.e., its utilization threshold has not been reached.

As further shown in FIG. 10(c), in addition to a respective LRM 575 for each SLEE and LRM 577 for each site, the NOS component 700 further includes a Network Resource Status ("NRS") sub-component 590 which is a process that performs a network-wide resource management function. Particularly, the NRS includes a subset of data maintained by each site LRM, for every Site LRM in the network, for example, site LRMs 577a, . . . ,577c corresponding to sites labeled 440a–440c in FIG. 10. The NRS 590 includes: 1) a list of SLEEs; 2) which types of services are programmed to run on each SLEE, and 3) which services are actively running on each SLEE, i.e., the SLEE=s current load as a per-cent basis. This NRS sub-component 590 is a logically centralized function giving NOS another level of propagation for requests that the site LRMs 577a, . . . ,577c can not satisfy. Additionally, the NRS sub-component 590 includes an indicator for each SLEE 450 to indicate whether that SLEE is up or down, and whether a service utilization threshold has been reached by that SLEE. The "up or down" indicator and the utilization threshold application are used to determine if a SLEE is available to accept service requests from other services and the NRS sub-component can simply provide a binary indicator of whether or not a SLEE is available given these indicator and threshold applications. As an example, if a requested SLP object is found in a SLEE, but that SLEE does not have the capacity to instantiate the requested process, it will send a notification to the site LRM 577 that the utilization threshold for that SLEE has been reached and is incapable of handling further requests for that service. This information will also propagate to the NRS component 590.

Preferably, each node implements a monitoring system 595 (FIG. 10(a)) for monitoring the memory capacity, database capacity, length of a queue for requested objects, amount of time in queue, and other resource/load parameters for each SLEE in the system. These factors are made available to NOS 700 which makes a determination as to the SLEE's utilization threshold based on one or more of these factors. In addition to a fixed threshold, multiple thresholds may be used for hysteresis.

The functions performed by NT, LRM, and NRS enable NOS 700 to provide location-independent processing, while optimizing the overall processing capabilities of NGIN, is now described in greater detail in view of FIGS. 12(a)–12(c) and 15a and 15(b).

Figure 12A:
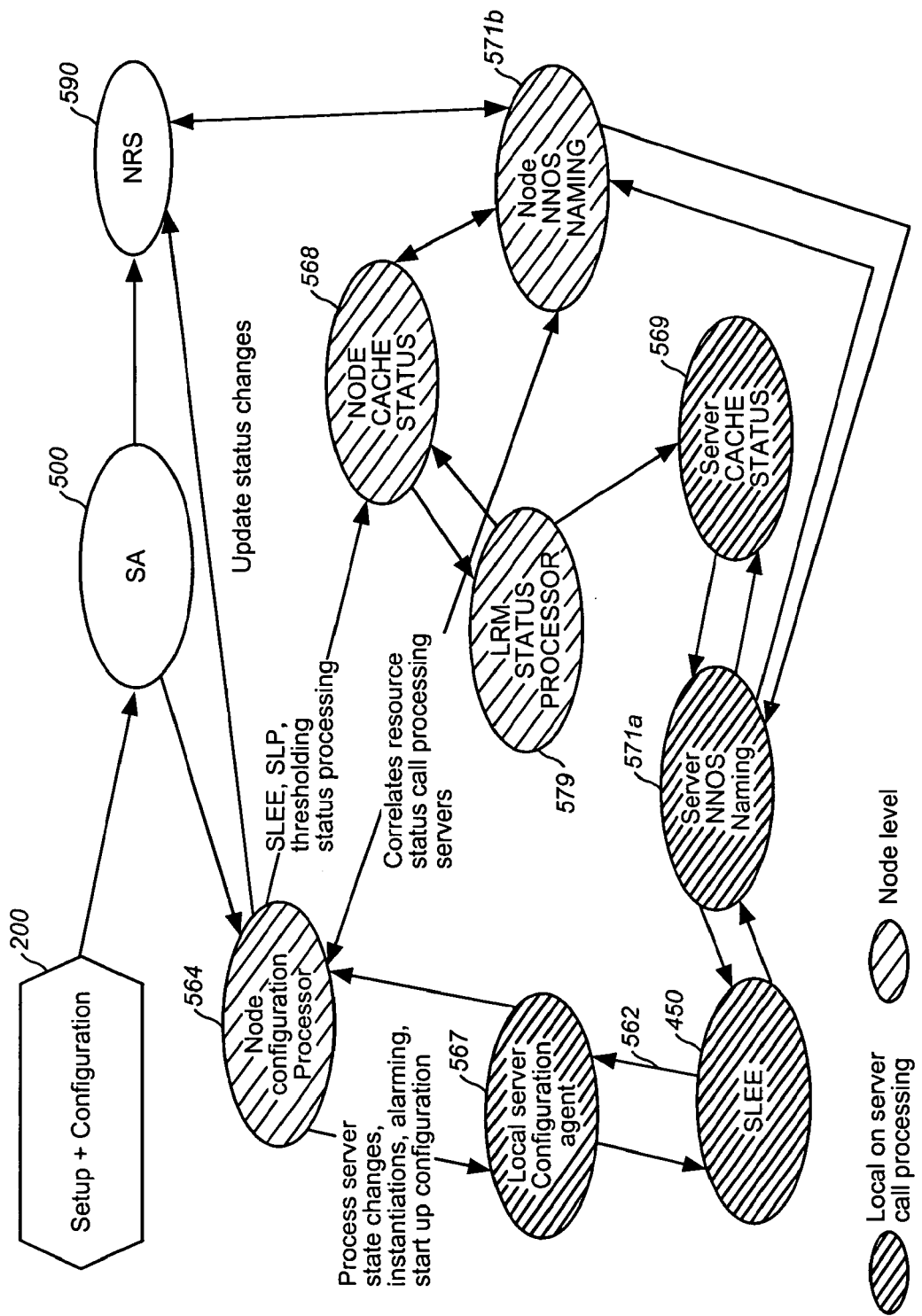
FIG. 12(a) illustrates the architecture of the resource management system for the intelligent network.

As shown in FIGS. 10(a) and 12(a), service packages including SLPs data and other components are configured (as configuration packages) and down loaded from SA component 500 to node configuration files provided at a node configuration processor ("NCP") 564 located at each individual service node, and, downloaded to the NRS 590. The configuration data downloaded to SA comprises a data structure pertaining to a service profile including: 1) the service name (for each service); 2) the in-service date/time for each service; 3) the out-service date/time (if any) for each service; 4) a service dependency, e.g., databases to be loaded with memory and other processes (SLPs) for the current service to run; 5) service calendar, e.g., day of week holiday including start time duration, start-up load volume (expected load); 6) load rate per instants; and, 7) threshold percents. As an example, for a particular service, if the load threshold for the SLEE is 100/service instance and an expected load volume is 200, then at least two (2) and preferably three (3) instances would need to be available for supporting that service at the SLEE.

The configuration data delivered to and maintained at the NRS component 590 includes: the service name for each service at each node; the capability of the service, i.e., an indicator that the hardware and software required to run that service is available at a node; and, a node status for that service which may include the following sub-classes: 1) active; 2) overload; 3) out-of-service; and 4) shut down, e.g., going into maintenance. For example, a service node may be capable of providing a service but inactive, i.e., service is not instantiated, but capable of being instantiated. When a service becomes instantiated, the service=s status at that node becomes active. The NRS system 590 thus looks at capabilities and status to determine whether it may receive a request to activate a service at a particular node.

As further shown in FIG. 12(a), each node configuration processor 564 maintains and accesses a node cache status ("NCS") database 568, having information including what that node has currently running on it including: the service object name and object reference; the node and the SLEE; its status (active permanent/temp, alarm level, out of service, removed); the time stamp of the last status message, the time stamp of the last change (update) and, the time stamp of the last LRM status process check. The NCP 564 further has access to the configuration file so that it can monitor when to start and bring-down processes. Particularly, the node configuration processor 564 reads the configuration file and kicks off the instantiation of a SLEE or changes the status from permanent to temporary when the time runs out. A local server configuration agent process 567 is the mechanism enabling the communication between the SLEE 450 and the NCP 564 and LRM systems 577 (FIG. 11). The SLEE 450 may, for example, issue an alarm threshold signal 562 indicating that the service at the SLEE may no longer be or currently is not available. This signal is communicated to the service node configuration processor 564 which changes the status of the service in the node cache status database 568 to indicate an alarm level, e.g., temporarily out-of-service, or removed, and, further queries the NCS node cache status database to determine if this service is currently running on another SLEE(s). Based on this determination, it may either instantiate another SLEE or instantiate a new thread for that service on another SLEE. Thus, when the NOS makes a name translation assignment, it is based on the data in the node configuration processor.

Additional data that is kept and maintained by the node cache status database 568 includes SLEE service status data profiles associated with SLEEs that are instantiated at a service node. This SLEE status profile includes a SLEE name; a SLEE object reference; a SLEE status including active, temporary, alarmed, out-of-service, or removed; a time stamp of the last status message sent from the SLEE to the node configuration processor; a time stamp of the last status change (update); a time stamp of the last heartbeat with indicates the last time a message is sent to check on the SLEE from the node configuration processor; a time of the alarm level; and a time of the alarmed level when it is cleared. Additionally maintained as part of the SLEE status data is the schedule of the SLEE active time and, the schedule of the SLEE shutdown time with the shutdown status being either hard, meaning the SLEE will shutdown regardless of whether calls services are currently executing at that SLEE or, soft, meaning that the SLEE will shutdown after all calls are completed or removed.

It should be understood that the real-time call processing system runs independent of the resource maintenance system, i.e., the same data is used, but different processes perform the maintenance. Particularly, as depicted in FIG. 12(a), NOS naming processes 570a,b are provided which is a real-time process agent for processing run-time service requests. On the other hand, the node configuration processor 564 performs an administrative function and is responsive to: input from SA; an alarm and status inputs from a SLEE; and, requests to instantiate new processes from NOS naming, as will be hereinafter described.

Figure 12B:
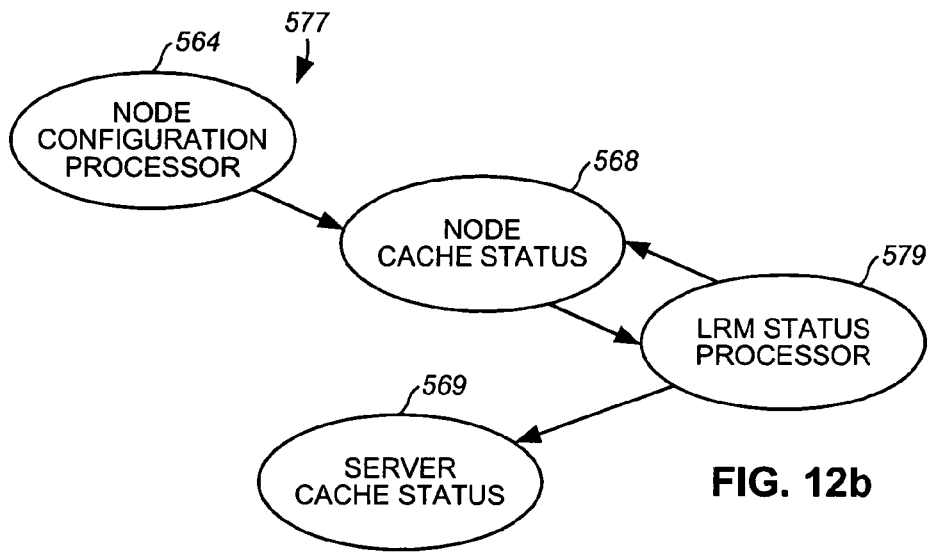
FIG. 12(b) illustrates the local resource management status processor flow.

As shown in FIGS. 12(a) and 12(b), the LRM system 577 comprises the following subcomponents: an LRM status processor 579, the NCP 564, the NCS 568, and the (local) server cache status database 569. Optionally included is the local server configuration agent 567 which functions as an interface between the SLEE and the NCP 564. The LRM status processor 579 is the object that reads the NCS database 568, looks for any status changes or updates (FIG. 12(a)), and distributes any changes or updates in status to the local server cache status database 569 where the local cache maintained. Chronologically, as depicted in FIG. 12(b), the node cache database 568 is updated first with any current active running services at each SLEE along with a recorded time stamp of the updates. The LRM status processor ("LSP") 579 periodically polls the node cache database, e.g., every two seconds, to look for any update changes which are to be distributed to the computing system caches supporting the respective SLEEs. For example, the LSP will read the NCS and pick up all status changes with a time stamp greater than the time stamp of the last LSP poll, and further, updates the copy to the local server cache status 569. Thus, for example, if node cache is lost during a failure condition, the local nodes may run on the current copy of the status at the local level (server cache status).

Figure 12C:
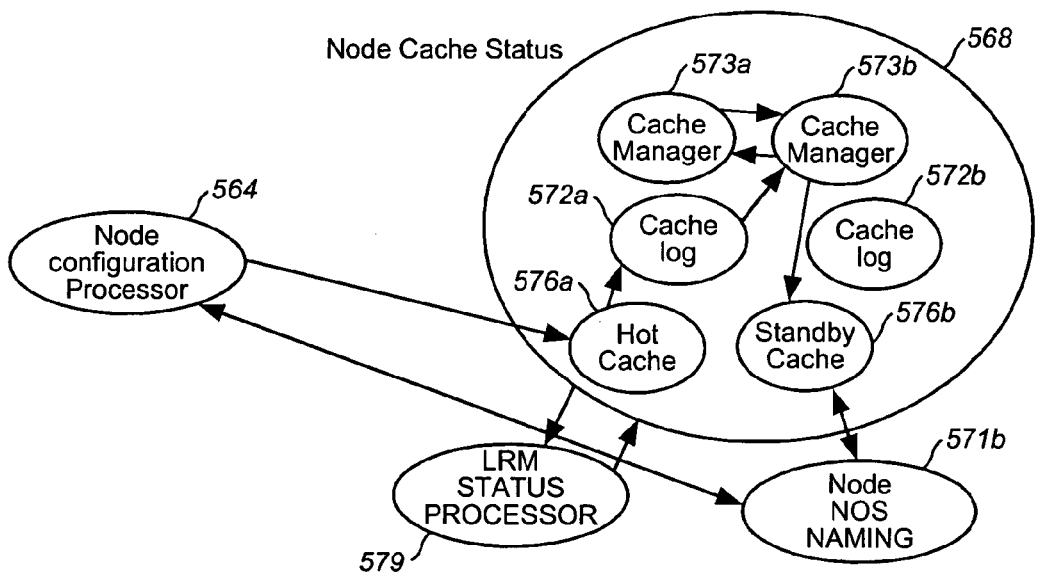
FIG. 12(c) is a more detailed illustration depicting node cache status database architecture.

FIG. 12(c) illustrates a more detailed architecture of the node cache status database 568. As shown in FIG. 12(c), there is provided two cache systems, preferably residing on different servers: 1) a hot cache 576a functioning as the current cache resource, and 2) a standby cache 576b functioning to maintain the hot cache resource in near real-time. At different times during the operation of the resource management system of the invention, the hot cache 576a is used as the main repository of node cache status data. This data is periodically updated to one or more cache logs 572a,b under the control of one or more cache manager processes 573a,b. It is the function of the cache manager processes 573a,b to reference a cache log 572a,b to obtain updated status information from the hot cache and input it into the standby cache 576b for redundancy. In the preferred embodiment, there is a small lag time ranging from about 5 to 15 milliseconds between the time a hot cache 576a first receives status updates and the time it takes for the cache manager to update the standby cache 576b. At such time that there is a failure in the node cache database, or, when the hot cache 576a is currently unavailable to receive further updates, the system switches from the hot cache 576a to the standby cache 576b which then functions as a hot cache. For maximum performance, the cache switch over from hot to standby takes place within about 50 milliseconds. It should be understood that the cache manager periodically checks the hot cache 576a to insure that it is still up and functioning and to insure quick changeover to standby cache 576b. Additionally, each cache manager 573a,b registers itself with each of the three major processes that access the node cache status database including the node configuration processor 564, the LRM status processor 579 and the node NOS naming process 570b. This is so that the three agents, i.e., the NCP, LRM status processor and node NOS naming, may be notified of a changeover, so that they each may reference the correct copy of the cache.

In a preferred embodiment, as depicted in FIG. 13, a first SLP instantiation process in a node is as follows: First, as indicated at step 460, the NCP reads all the service profiles in that node's configuration file, and at 463 determines which SLP needs to be instantiated, e.g., based on time of day. Then, the NCP will choose a SLEE/server based on the SLEE=s current load and the service data dependency. For instance, if a database needs to be loaded (or node is inactive), the NCP 764 will request cache manager to load dependency data to the server data management. If data is already loaded from DM to the SLEE, or if data did not have to be loaded, the process proceeds to step 470. If the required data was loaded by DM, the DM will respond to the NCP when it is done at steps 468, and the NCP will request to load the SLP on the SLEE at step 470. Then, the SLEE responds that the service is available at step 472, and the NCP 764 (FIG. 12(b)) accordingly updates the node cache status with the active service name (registered object reference for NOS name translation), at step 474. Additionally, at step 476 the status for that service at that node is updated to "active" in the NRS 590. In the case of subsequent instantiation of that service, the NRS service status may not be updated as it already has an "active" status. The NCP updates the node cache 768 with the name and the registered object reference to supply NOS, so that NOS-can perform name translation. Thus, when NOS gets a request, it has an object reference to go to.

The SLEE thresholding process is now described with reference to FIG. 14(a). As shown at step 470, a SLEE, e.g., SLEE 1, will issue an alarm than a service threshold is exceeded. Preferably, there are several possible levels of thresholds including: a "warning" or "overload" (a threshold level exceeded). Then, steps 472–485 correspond to like steps 460 through 474 of FIG. 13 with step 472 invoking a function of the NCP to read the node cache status 768 to determine if the service is running on any other SLEE at the service node. Based on load, an instantiation process may be started, particularly by picking a SLEE, e.g., SLEE 2, as shown in step 474, and any required data dependencies are loaded by the DM. After receiving the DM response at step 478 (if any), the NCP requests that the SLP be loaded on the chosen SLEE 2, and the SLEE 2 responds accordingly when the service is successfully instantiated on SLEE 2. Finally, at step 485, the NCP 764 updates the node cache status of the first SLEE 1, e.g., to a warning or "overload" condition, for example. Furthermore, the status of the service at SLEE 2 is set to active in the NRS. It should be understood that at this point, the NRS does not have to be updated, as the node is still capable and the service still active. However, if it is determined that the node has no more room to start up with the SLEE, the status may go into overload, and the network resource status may be updated to reflect that the node is overloaded.

Figure 14B:
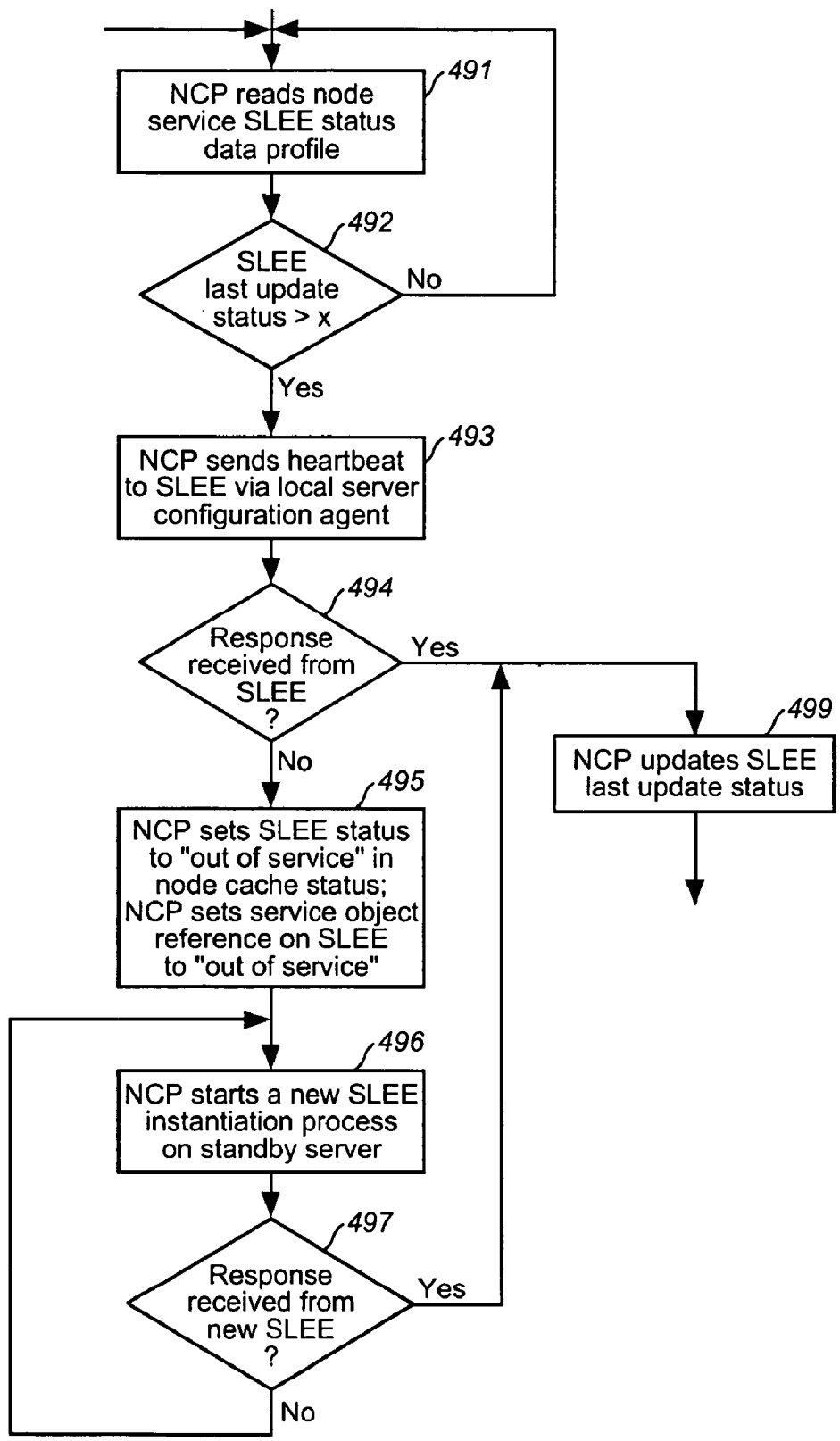
FIG. 14(b) is a flow diagram depicting the SLEE monitoring process.
Figure 15B:
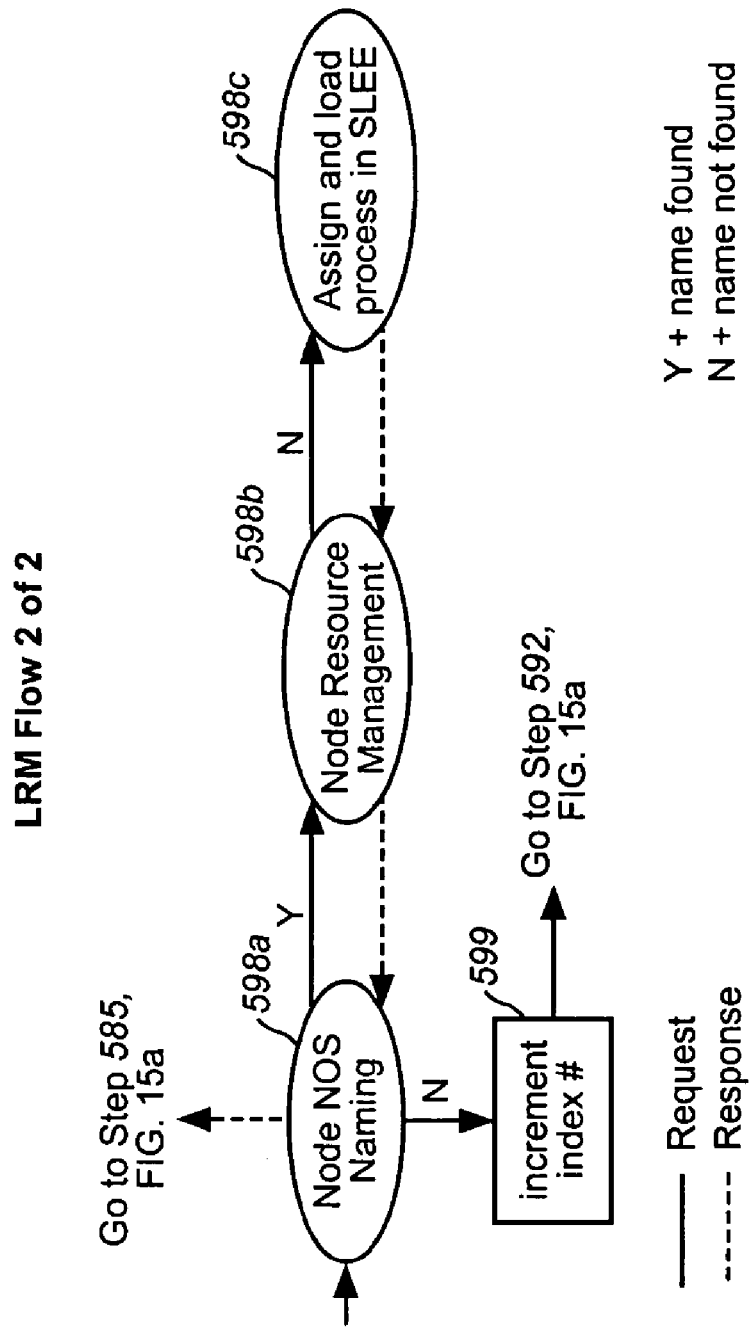

Additionally built into the local Resource Management System is a SLEE monitoring process such as exemplified in view of FIG. 14(b). The SLEE monitoring process is necessary to enable update of status changes to the node cache status database 768. Particularly, the process begins by enabling the node configuration processor 764 to read the node service SLEE status data profile in the node cache status database 768, as indicated at step 491, FIG. 14(*b*). Particularly, the NCP determines whether a predetermined time 'x' has elapsed since the previous SLEE status update at step 492. If the last SLEE update status is greater than the predetermined time 'x', then the NCP sends a query message to the SLEE via the local server configuration agent 767, as indicated at step 493. This NCP generated query message is also known as the heartbeat. The NCP then waits for a response or an error response from the SLEE that it directed the heartbeat message to, as indicated at step 494. If the SLEE responds with update status, then the NCP updates the SLEE status profile in the node cache database as indicated at step 499. If no response or error message is received, the NCP sets the SLEE profile status to "out-of-service", for example, as indicated at step 695. Additionally, the NCP sets each service object reference on that SLEE to out-of-service, and will initiate a SLEE instantiation process on a standby server to replace the out-of-service SLEE at step 496. This may require querying the object reference library in the node cache status database to make a determination as to the service objects that were currently executing on the SLEE, and may also require querying the original configuration file to determine which services may have been instantiated at the time the SLEE went out of service. It should be understood that when the SLEE is determined to be out of service, all call states that have been executing at that SLEE are lost and may not be recovered, unless other fault-tolerant and/or redundancy mechanisms are built into the system. The start-up of a new SLEE may only recover those object instances that had been available at the time the SLEE went down. Once a new SLEE is instantiated, the NCP waits for the new SLEE to respond as indicated at step 497. If the new SLEE responds affirmatively, then the NCP resumes its updating of the SLEE status in the node cache status database at step 499. Otherwise, the NCP may instantiate a new SLEE process on another server at the service node. In either event, the process returns to the SLEE monitoring step 491.

An illustrative example of the resource management functions performed by NOS including the NT, LRM, and NRS that enable NOS 700 to provide location- and platform-independent processing, while optimizing the overall processing capabilities of NGIN, is now described in greater detail in view of FIGS. 15(*a*)–15(*b*). In the LRM process flow 583 described with respect to FIGS. 15(*a*) and 15(*b*), it is assumed that a service S1 executing on SLEE 1 on a service control server 1, needs to invoke a service S2, as indicated at step 585. Service S1 may be a FD or Service logic program that has received an event service request from the switch fabric call control and needs to invoke another SLP, S2, e.g., in order to complete call processing.

Particularly, in view of FIG. 15(*a*), service S1 issues a request to NOS 700 using the logical name for SLP S2. When the SLP request for a service object is received, the NOS name translation function 570*a* is implemented as indicated at step 586*a*, for determining if the NOS recognizes the requested service as actively running on the local service control server 1, i.e., has an object reference associated with the logical name of the requested service. Preferably, data stored in local server cache includes the following NOS naming data fields: 1) an SLP logical service name which typically is the logical name describing the service and is the name which the Feature Discriminator data point to; 2) an optional version number which describes the version of a particular service which may be needed, e.g., for a particular customer who requires that version of the service running, or a node, etc.; 3) the status including: deployed, i.e., when SA has deployed work packages to nodes but the services are not activated, active, i.e., indicating that the service is currently active, or fallback, when it is desired to fallback to a previous version of a service object, e.g., to provide a quick reversal; 4) the object name or reference which may include an IP address, port, and other information identifying the physical location of the object instance; 5) the in-service date and time and out of service date and time; 6) the error process object name, e.g., if the object is not available or unable to be activated; and 7) the fallback object name to be executed when in a fallback status. As additionally described herein with respect to FIGS. 11 and 12, the local server NOS naming process 570*a* is benefitted from services provided by the LRM status processor 579 which updates the local server cache status database 569 only with currently active services running in a particular SLEE in the service control server. This is so that the local server NOS name translation function may first be performed locally. When NOS first gets a name request, it looks up a logical name to obtain an object name (or object reference). NOS gets the object name from the logical name and the node LRM process determines the best instance of the requested object to address based on one or more previously noted business rules, as indicated at step 586*b*.

If, at step 586*a*, the logical name is recognized and the object reference is available, then the process proceeds to the LRM function at step 586*b* to determine active ("available") instances of S2 running on the SLEE 1, in accordance with certain criteria, such as utilization thresholds. If no active instances are found, the LRM may check to see if S2 is programmed to run on SLEE 1, but has not been instantiated. If this is the case, NOS 700 may decide to instantiate an instance of S2 on SLEE 1, if SLEE 1 has enough available capacity. As mentioned, the LRM at the server level only knows what is active at the server and knows what has been instantiated. If the object is currently active and instantiated at the local server level, then the object reference for instantiating a new thread for this service is returned to the SLP request. NOS will initiate instantiation of a new service thread for performing the service requested based on the returned object reference and returns an object reference if not already instantiated.

If, at step 586*a*, it is determined that SLEE 1 does not have enough available capacity, or if S2 is not available to be run on SLEE 1, then at step 588*a*, the LRM on SLEE 1 sends a service request to the Site LRM 577*a*, (FIG. 14). The site LRM applies similar business rules and determines if an instance of S2 is active, or should be instantiated, on another SLEE at that site. Thus, at step 588*a*, the node NOS name translation function 570*b* (FIG. 12(*a*)) is implemented for determining if the requested logical name is available at that node, i.e., whether another SLEE at the same or different local service control server at that node maintains an object reference associated with the logical name of the requested service. If the logical service name is recognized at step 588*a*, the NT sub-component 570 queries NOS LRM 575 to determine which instance of S2 to use. The node LRM then applies business rules against the node cache status database 568 (FIG. 12(*a*)) at step 588*b* in order to retrieve the desired object reference for the requested service, if active, and returns that address to the calling SLP (step 585, FIG. 15(*a*)). If it is determined that the service is not currently instantiated, or, that the required service on a particular SLEE may not be instantiated due to process load or other imposed constraints, then at step 588*c* an assignment and loading process is performed by checking the node cache status database 568, (FIG. 12(*a*)), implementing business rules relating to, e.g., service proximity, data proximity, thresholding, current processing loads, etc., instantiating the requested service in the SLEE where it is determined that the service object is capable for instantiation, as described in further detail with reference to FIG. 13, and, returns the address to the calling SLP. It should be understood that a round robin scheme may be implemented in determining which service thread to instantiate when more than one service is available for instantiation per SLEE.

Returning back to FIG. 15(a), if, at step 588a, it is determined that the current node does not recognize the requested logical name, i.e., the node cache does not have an object reference associated with the logical name of the requested service, or, due to applied business rules, may not instantiate the object at the node, then the global network resource status (NRS) process 590 is queried at step 592 to check the current status of SLEEs across the intelligent network 170 and to determine a SLEE which may handle the service request for S2. Prior to this, as indicated at step 592, a check is made to determine whether an index number representing the number of times that network resource management has been queried to find an object reference, has exceeded a predetermined limit, e.g., three times. If this threshold has been exceeded, the process terminates and the administrator may be notified that the service object cannot be found and that an error condition exists, as indicated at step 596. If the NRS query threshold has not been exceeded, then as indicated at step 594, the NRS process 590 determines which service node in the network may be capable of performing the requested service. After determining the node in the intelligent network, as indicated at step 594, the process continues to step 598a, FIG. 15(b), where the node NOS name translation function 570b is implemented to obtain an object reference associated with the logical name of the requested service. If the logical service name at that node is not recognized at step 598a, then the NRS query index number is incremented at step 599, and the process proceeds back to step 592, FIG. 15(a), to check if the index number threshold has been exceeded in which case an error condition exists. If, at step 592, FIG. 15(a), the NRS query index has not exceeded its predetermined threshold, the NRS process 590 is again queried at step 594 to find a new location of an available service at another service node.

If the logical name is recognized at step 598a, then the process continues at step 598b, to determine an address associated with the requested object reference in accordance with acceptable processing loads. This address is then returned to the requesting SLP as shown at step 585, FIG. 15(a). If, at step 598b, it is determined that the service is not currently instantiated (active), then the process proceeds to step 598c to enable an assignment and loading process by checking the node cache status database 568 at that node, implementing business rules, and, instantiating the requested service in the SLEE where it is determined that the service object is available for instantiation. Subsequently, the address of the instantiated object SLP is returned to the requesting client at step 598a.

Once an active instance of S2 has been selected, the object reference for that S2 instance is returned to NT on SLEE 1 (step 802). The NT then effectively translates the logical name S2 to an object identifier for the selected instance of S2, and uses that object identifier for S2 in the proceeding inter-process communications between S1 and S2. The object identifier includes an IP address, port, and other information identifying the physical location of the object instance. Once an object reference is determined, NOS then provides object connectivity between the two services by implementing the CORBA-compliant ORB, and data communications connection less protocols such as UDP/IP. The location of the called service, whether running on the same SLEE or on another SLEE at another site thousands of miles away, is completely transparent to calling service. Thus, if an SLP that is needed to service a call is instantiated on a SLEE at a remote site, the call is still held at the switch on which it was received. Preferably, once an object reference is accessed once, for example, at another site via the NRS level, NOS ensures that the object reference is cached at the requesting site for future reference, and audited, through service administration. Thus, in the instant example, in order to reduce subsequent look-ups by initiating a site LRX look-up when this service is again needed, the object reference for service S2, wherever it was located, is thereafter cached in the local cache in the LRM 575 of SLEE 1. It should be apparent to skilled artisans that there are a variety of ways in which service object reference data may be provided at a SLEE. For instance, a NOS data replication mechanism may be employed to replicate all object references at a site LRM 577 to each and every LRM for every SLEE at the site.

It should be understood that this three layer resource management hierarchy (LRM, site LRM and NRS) shown and described as the preferred embodiment herein, may be modified by skilled artisans. For example, additional NOS resource management layers may be built into the hierarchy with a plurality of regional NRS components provided, each of which may communicate with a single global NRS.

Having described the major functional components of the NGIN system 100, one example of a preferred implementation is now described.

Figure 16:
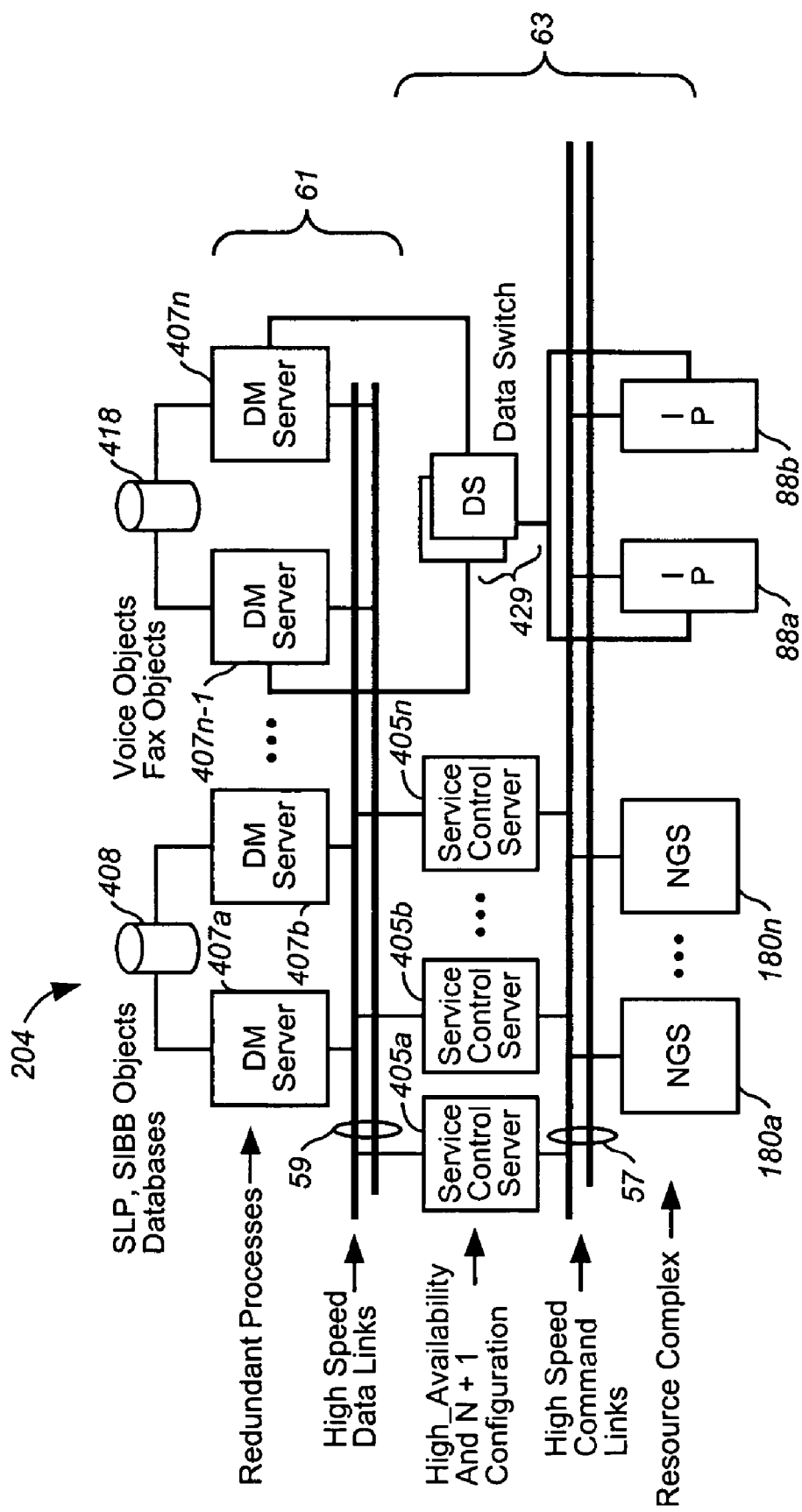
FIG. 16 illustrates a physical architecture of an example NGIN service node.

FIG. 16 illustrates a preferred physical architecture of a service node, also referred to as a site 204'. The site in FIG. 16 is shown as including one or more network switch components 180a, . . . ,180n each comprising a switching platform referred to as a Next Generation Switch ("NGS"), the operational details of which is described in commonly assigned, co-pending U.S. patent application Ser. No. 08/580,712 entitled "A Telecommunications System Having Separate Switch Intelligence and Switch Fabric", the contents and disclosure of which is incorporated by reference as if fully set forth herein. The Service Control functions are embodied by Service Control Servers 405 which may be a general purpose computer, such as an IBM RS6000, DEC Alpha Server, Pentium based Personal Computer, or the like, and running any standard operating system that is compatible with the computer on which it is running may be used; for example, Microsoft Windows NT, UNIX, Sun Solaris, or VMS. Then, on top of the operating system, the NGIN SLEE 450 runs to provide the Service Control/SLEE environment within which the various Service Control processes execute. As shown in FIG. 16, there may be one or more Service Control Servers 405a, . . . ,405n at a site 45. Although a Service Control Server can embody multiple SLEEs, in the preferred embodiment, a single SLEE may consume an entire Service Control Server with an LRM (not shown) also running on each Service Control Server and a site LRM (not shown) running to track the services running on all Service Control Servers at this site. Each NGS resource complex 180a–180n interfaces with Service Control Servers 405a, . . . ,405n via high speed data links 57, such as provided by a LAN switch, e.g. a Gigabit Ethernet switch. Call Control and Service Control exchange Service Requests and Service Responses via links 57, using NNOS. While an NGS switch 180a may be physically located at a specific service node, it has access to Service Control functions everywhere in the network, via NNOS.

In further view of FIGS. 10(a) and 15, the Data Management component 400 functions of the DM Server 425, DBOR Extract Manager 426, SA Client 422, and DDAPI 426 are embodied in back-end DM servers 407a, . . . ,407n which may be the same type of computer hardware/operating system as the Service Control Servers, but does not require a SLEE. In the preferred physical embodiment, a database server 407 is implemented as dual redundant processors with a shared disk array 408 comprising the DBOR Extract databases. The Service Control Servers 405a, . . . ,405n interface with the back-end DM servers 407a, . . . ,407n via high speed data links 59, such as provided by a LAN switch, e.g., Gigabit Ethernet switch. The Service Control/DM Server LAN 61 is partitioned from the NGS/Service Control LAN 63 used to interface the resource complex (NGS) with the Service Control Servers, as the NGS/Service Control LAN 63 is used for data-intensive, real-time call processing functions, while the Service Control/DM Server LAN 61 sees much less traffic, as most call processing data are cached to local memory in the Service Control Servers. The DM servers themselves are partitioned in accordance with different types of data. For example, one pair of servers 407a,407b and corresponding shared disk array 408 is used for services (SLPs, SIBBs, etc.) and service data (customer profiles, routing tables, etc.) while a second pair of DM Servers 407n-1, . . . ,407n and corresponding shared disk array 418 are used for multi-media data (voice objects, fax objects, etc.). This second set of DM Servers is accessed by one or more Intelligent Peripheral ("IP") devices 88a,88b via data switches 429 and the collective architecture of the IPs 88a,88b, DM Servers 407n-1, 407n, shared disk array 418 for multi-media data, and high speed data switches 429, is well-suited for interactive service platforms, such as Voice Response Units ("VRU").

As can be shown from the architecture of FIG. 16, the Intelligent Peripherals operate within the SLEE/NNOS environment, and can thus receive service responses from Service Control Servers 405a, . . . ,405n. For example, a Service Control Server may send a service response to an Intelligent Peripheral to play for a caller a certain audio message. Preferably, the IPs 88a,88b are capable of receiving and handling telephony calls and are connected via voice links (which may be circuit-switched or packet-switched) to the switch fabric of NGS. The IP will use the Data Switch 429 to retrieve the requested audio object from the DM Server. The IPs may additionally include fax servers, video servers, and conference bridges. As can be readily understood, the NGIN site 204' architecture shown is highly scalable as additional service control servers, DM Servers, NGS platforms and Intelligent Peripherals may be easily added by connecting them to the site LAN and configuring them in service administration.

Figure 17:
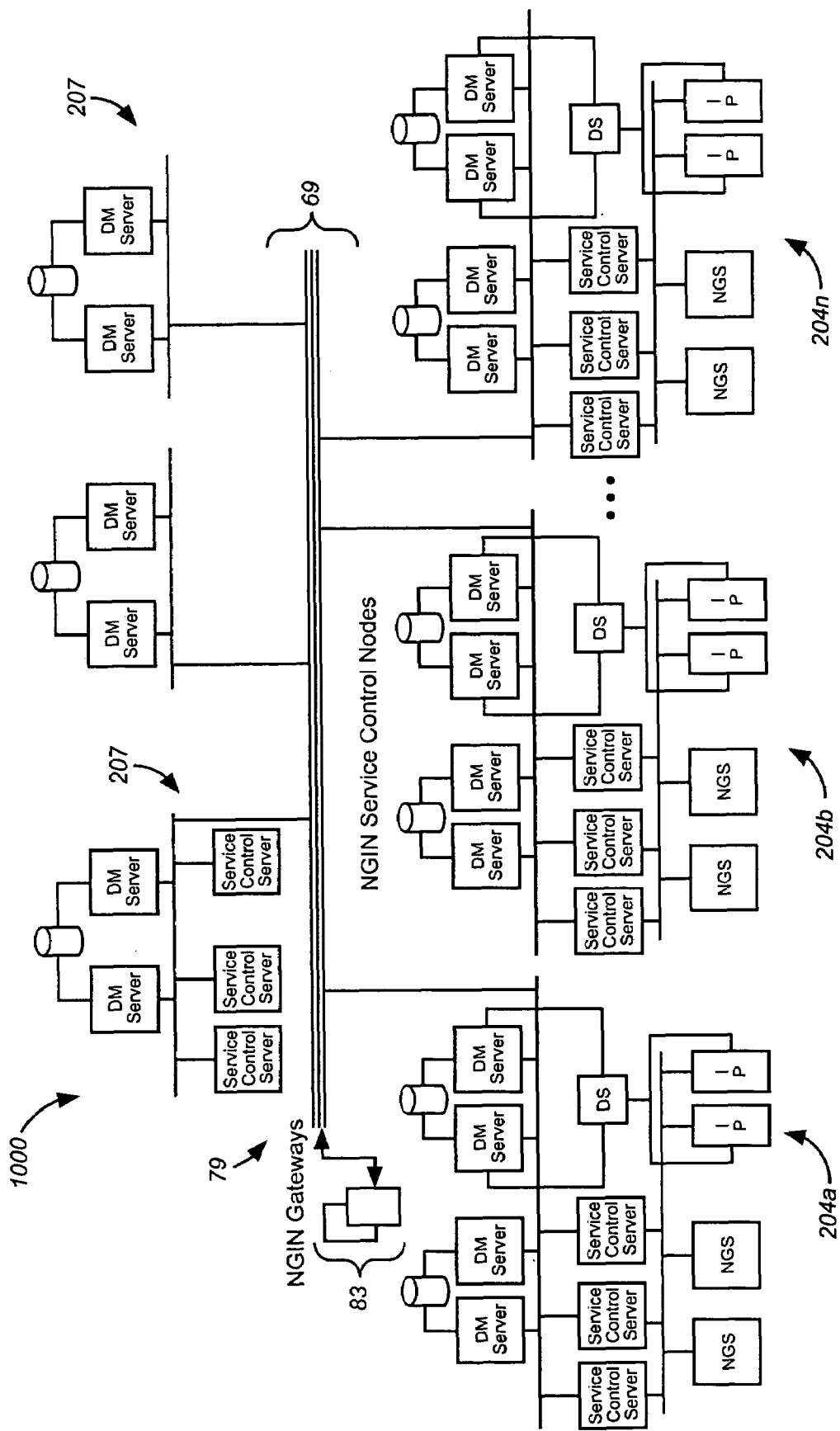
FIG. 17 illustrates an example physical architecture of the NGIN domain.

External interfaces, may also be linked to the site 204 and given an IP address as shown in FIG. 17. Particularly, various external interfaces 83 may be incorporated into the NGIN architecture as needed to provide process interfaces between NGIN and external systems that may be needed for call processing but that are not NNOS compliant. An external interface thus adapts whatever communications protocols and messaging formats are used by an external system to NNOS. In one embodiment, the interface may comprise a signaling gateway, which interfaces an NGIN process that uses NNOS with an external system that uses a signaling system such as SS7, such as, for example, when performing an LIDB query. Therefore, an SS7 gateway is used to translate NNOS messages to SS7 messages, and vice versa. In another embodiment, the external interface may constitute a Remote Data Gateway, which is used to interface NGIN with an external Service Control Point (FIG. 1), for example, as may be owned by a large customer of a telecommunications service provider. The RDG translates NNOS messages to whichever type of messages and communications protocols are needed by the remote SCP.

More particularly, FIG. 17 illustrates an example physical architecture of the NGIN system domain 1000 comprising a network 79 including a router-based or switch-based WAN 69 linking two or more sites 204a, . . . ,204n and external interfaces 83. The NNOS services traverse this WAN so that any process at any site can communicate with any other process at any other site. Several different configurations for the sites 204 may be used. For example, service nodes 204a, 204b are ones which embody both resource complex (switch) and Service Control functions. There may be sites dedicated to Data Management, shown as data management nodes 207.

It is key to the understanding of the present invention that the NGIN system eliminates the concept of specialized service nodes due to the distributed processing capabilities and the location-independent inter-process communications provided by NNOS, and due to the platform-independence afforded by a common SLEE. As any service may be provided at any site 204, there is no need to transport a call to a specialized service node, i.e., a call may be processed at the first NGIN service node it accesses. It should be understood however, that with the high level of configurability provided by the NGIN system 1000, a network may be configured to have specialized service nodes. For example, network resources, such as conference bridges, are more cost-effective to deploy to specialized service nodes.

According to the principles of the invention, call service applications and capabilities performed by IDNA/NGIN may be divided may into the following categories, including, but not limited to: 1) Customer Defined Routing; 2) Call Handling including: incoming calls; call destination routing; call extensions; signaling; and access types; 3) Call Interaction; and 4) Services.

Representative customer defined routing capabilities and features of NGIN include:

1) the ability to use the call origination information from the network (dialed number, originating switch/trunk) to look up the customer's subscribed features and routing plans, and possibly customer external routing database triggers. A routing plan refers to the specific advanced routing capability information that a customer has ordered and, it should be understood that a customer may have more than one routing plan; 2) the ability for national and international dialed VNET numbers to be screened; 3) the ability to translate VNET dialed number digits to a format (such as outpulse digits) that the switch will understand, in order to support national or international DAL and Direct Distance Dialing (DDD) terminations; 4) the functionality to determine which international carrier to route the call to including the determination of the geographic point of call origin (area code, state, and country code of the caller), by using the originating information received from the network; 5) the ability to instruct the switch to provide a high quality trunk for FAX transmission to an international termination; 6) in the event that a customer automatic call distributor (ACD), e.g. an ARU or live operator resource, is unavailable, the NGIN provides the ability to park the call in the network and wait until the customer's resource becomes available. The call will be queued and greeted with voice or music. When it is notified that the customer ACD may receive a call, the call on the top of the queue will be transferred to the customer ACD. More than one queue can be deployed for different prioritization. (Network Based Queuing); 7) the ability to provide Customized Message Announcement (CMA) & Failure Response Message (FRM) Special Routing Treatment which enables calls that can not be completed due to failures in dialing plan translation, range restriction, or supplemental code verification, to be rerouted to a Dedicated Access Line (DAL) for special message treatment; 8) the ability to provide Network Call Redirect (NCR) functionality which is an advanced overflow routing capability that allows calls which cannot be completed to their intended terminations to be routed to a secondary or alternate termination. NCR calls use special tables which are indexed by Cause Value and Overflow hop-count to come up with the termination ID; 9) the ability to change the termination address obtained from the originating party and reroute the call to an alternate termination (Call Rerouting/Alternate Routing) in a manner transparent to the user. The alternate termination can be a NANP DDD number, a Vnet termination, a mobile phone number, an international termination number IDDD, an ACD or a voice/fax mail system, etc.; 10) the ability to provide Least Cost Routing, i.e., routing of designated VNET numbers that translate to a DAL termination may be overridden based on the originating and terminating switch ID; 11) the ability to validate a Personal Identification Number (PIN) or Supplemental (Screening) codes; 11) the ability to provide NXX exchange routing which involves using the exchange code, and the Area ID (retrieved by using a customer's NXX exchange routing plan id), instead of the normal geographic lookup information, when performing termination translation; 12) the ability to provide Point of Call routing which allows customers to route calls based on the originating area of the caller. Granularity includes ANI NPA-NXX, Country Code, NPA, or city code; 13) the ability to provide treatment/preamble information (action codes) back to the network switch when a message must be played to the call originator, e.g., for error conditions, and for digit collection; 14) the ability for VNET calls to be screened at the corporate, network, or access (originating switch, carrier, etc.) levels (Range Privilege Screening); 15) the ability to provide Real-Time Automatic Number Identification (ANI) for a DAL termination by querying for the ANI of the caller for DAL terminations and returning these to the switch; 16) the ability to provide Real-Time Dialed Number Identification System (DNIS) which is the capability to include the customer defined DNIS digits when constructing the outpulse digits for a DAL termination when this feature has been subscribed. The digits identify the dialed number for DAL terminations that are shared by more than one product/customer; 17) the ability to provide Remote Access to VNET, i.e., designating 800, 900, and global freephone numbers for remote access to VNET. When such a number is dialed, a VNET dial tone is provided, as well as the nature of permissible VNET addresses, and how many supplementary digits to collect; 18) the ability to provide a Route Data Calls capability, i.e., the ability for customers to order all digital routing for their VNET service; 19) the ability to provide Service Billing Information, i.e., action codes, feature codes, and outpulse digits that are returned to the network element. Many of these fields are used in the billing record to help bill the call; 20) the ability to provide Supplemental Code Screening and validation of PIN or Supplemental Codes associated with a dialed number; 21) the ability to provide Supplementary Code Collection by instructing the switch to collect the proper number of supplementary code digits, e.g., when required for call screening or routing translation, and, the ability to provide Supplementary Code Translation by lookup and translation to an actual termination, or retrieve data based on receiving a range of supplementary codes from the EVS ARU. In support of Personal Communication Service (PCS), the translation is determined based on receiving a PIN supplementary code; 22) the ability to use different termination translation tables depending on the call type and call status (Termination Translation/Variable Length Outpulsing). The actual termination address to give back to the network switch are determined (or in some cases an ARU). Calls may terminate to a national and international Switch/Trunk (DAL), or direct distance dialing DDD; 23) the ability to provide time-out Processing for Remote Query. A timer for remote data queries (trigger requests) to the 800 Gateway is used, and generates a default routing response upon timeout; 24) the ability to provide Percentage Allocation routing to subscribed customers and to network resources when a call can utilize more than one termination. This provides load balancing across multiple terminations. The customer may specify up to 100 terminations, for example, and the percentage of calls to be allocated to those terminations. Load balancing across ARU terminations may also be implemented using percent allocation; 25) the ability to provide switch based routing, the capability to route switched based services. This includes 3/6/10 digit routing and Country Code routing; 26) the ability to provide time-out routing, e.g., routing a call to operator services in the event of digit collection time-out; 27) the ability to provide Schedule routing, e.g., Time of Day, Day of Week, and Day of Year (TOD, DOW, DOY) routing based upon information in a customer profile; 28) ability to provide Source Address Screening, which provides security for a customer's virtual private data network by preventing a caller from placing a calls to prohibited destinations and enabling a service carrier to prevent customers from making calls outside of their network. Customers may also make use of this feature to provide internal segmentation of their network, preventing particular sources from calling particular destinations. With this type of screening a source would be associated with an inclusion on exclusion list of destinations which would be checked prior to attempting to complete the call; 29) the ability to provide Destination Address Screening which is a type of security, similar to Source Address Screening, for protecting the integrity of a private network by allowing subscribers to prevent calls from being delivered to destinations. Customers use this feature to provide secure access to a particular destination within their network. With this type of screening, a destination is associated with either an exclusion or inclusion list and these lists would be checked before allowing a call to be presented to that destination; 30) the ability to provide Closed User Groups, to be used to define virtual private data networks for customers. Calls placed from within the closed user group may only be connected to destinations that are also within the closed user group; 31) the ability to provide Call Parking, which is described as follows: if the address specified (e.g., an ATM end System Address format) is currently unavailable, the NGIN may park the call until the destination becomes available or a time limit for the park expires. If the destination becomes available, the call setup will proceed; if the destination does not become available before the expiration of the park, the call may be dropped or sent to an alternate destination; 32) the ability to provide routing based upon settings in the AAL parameters. The "Setup" and "Add Party" signaling messages allow the specification of user defined parameters which may be used to specify a particular type of destination. For example, if the caller was dialing a well known number for a video operator, they may specify that they need a Spanish speaking operator; 33) the ability to identify an account code to which a call should be charged (e.g., by using the ATM Adaptation Parameters); 34) the ability to provide Subscription control for quality of service which feature allows for the enforcement of subscription levels for subscribers. If a subscriber signs up with an ATM network provider, they may pay a charge associated with a particular quality of service. When a Setup or Add Party message is sent from that subscriber, the quality of service parameters associated with that message should be verified against the subscription for that subscriber; 35) the ability to provide Source address validation, i.e., verifying that the source address specified in a Setup or Add Party message is correct and is authorized for use on the incoming port. This provides for the assurance that the billed party is actually the one making the call; 36) the NGIN shall provide Call Triage (Network ACD), i.e., based on the calling party number, the NGIN may prioritize the incoming call by putting the more important call to a prioritized queue or to a reserved customer service representative; 37) the ability to provide Incoming Rate Control; i.e., offering calls to the network when it is predicted that there is capacity to handle the call. Automatic call gapping may be used to throttle calls based on dialed number; 38) the ability to load and activate a Contingency Routing Plan at any time, which, once activated, is used in place of the currently active routing plan (feature/capability); 39) the ability to provide Plan Performance Statistics which are gathered on a customer's call plan. From these statistics, a customer may determine how many calls are passed to an Answering Center and how many were routed to a message node; 40) the ability to provide digit forwarding, i.e., enabling entered digits to be translated as the blocks of digits are entered rather than waiting for the caller to enter the entire string of digits; and 41) the ability to provide Conference Processing, i.e., after performing a customer subscription lookup, a conferencing reservation information record could be retrieved. In an 800 "meet me" conference, each party dials the designated 800 number and supplemental "suppcodes". The call is routed to the same conferencing bridge for a meet me conference.

Representative call handling features supported by the NGIN include: the support of private dialing plans of any business or residential customer; enabling users to modify their own dialing plans; providing an interface with Automatic Call Distributors (ACDs); support multimedia messages store/forward/retrieval services through interaction with the NGS and message storage systems; provide advanced queuing capabilities for incoming calls waiting for a limited resource; determining what information to be forwarded to the destination; support number screening feature for any number parameter available to it; support maintenance mode operation for all services/features such that a particular implementation of a feature may be installed but operated in restricted mode for purposes of testing, maintenance, or monitoring; supporting multiple destinations for single origination, e.g., for sequential or simultaneous terminating; provide an "add party to conference" feature; blocking potentially fraudulent calls; support the ability of the user to change the type of call that is in progress; support both data and voice call; support connectionless mode services; support two-party and multiparty calls; support multimedia calls; initiating one or multiple calls through NGS based on a variety of triggers, such as timer events, caller request, and external system requests.

The NGIN provides the following features and functionality with regard to processing incoming calls:

1) Accepting Inbound Call, i.e., the capability to receive an indication of an inbound call and determining if the required resources and application to service the call are available. If the required resources and application are available, the inbound call is accepted and notification is sent back to the switch. If the required resources or the application are not available, a reject indication is sent back to the switch. 2) Incoming Call Screening with a list, i.e., allowing the subscriber to define a screening list to refuse or accept incoming calls. If the list is defined as an acceptance list, any incoming call that is on the list is handled normally. If the list is defined as a refusal list, any incoming call that is on the list is refused. When the incoming call is refused, the caller is greeted by an announcement and then directed to voice mail. The subscriber may give out passwords to important callers to override the screening; 3) Incoming Call Screening without a list, i.e., allowing the subscriber to hear the caller's name prior to accepting the call. The subscriber can then choose to accept the call or redirect the call to voice mail box; 4) Queuing for incoming calls for any type of resource, i.e., when a resource (a termination, an operator, or an expensive hardware resource) is not available, the call which is requesting the connection to the resource is put into a queue in the manner as described herein. As described, the system maintains more than one queue based on the priority of the call for the same resource. The queue size can be changed in real-time based on the change of number of resources. When the queue becomes available the system pushes the call to the top of the queue out and direct the call to the available resource. If any calling party drops the call while in the queue, the system removes the call from the queue and pushes the rest of the calls one step up towards the top of the queue. Preferably, a timer is applied to the queued call such that, when the timer expires, the system notifies the caller and redirects or disconnects the call. The capability may be used together with the User Interaction capability for calling party treatment while the calling party remains in the queue. The instruction received from the calling party during the interaction may trigger an action to remove the calling party out of the queue. For example, the calling party may choose to leave a message instead of waiting for connection at any time while waiting for a connection; 5) Call Queuing, i.e., queuing and distributing calls to operator positions, pending availability of a resource. Calls may be sent to a manual or automated operator; 6) Calling Party ID delivery, i.e., the ability to deliver the calling party number or name (e.g., alphanumeric characters) to the subscriber terminal through inband signaling without impacting alerting or call waiting signals. The system is also able to concatenate the calling party ID with some other arbitrary characters for extra information or indication; 7) the ability to analyze the incoming call parameters to determine the type of service processing required by the call (Identify Service). This process also identifies if the incoming call is a transferred call or re-originated call. Following are some of the parameters which are available to determine the service type: ANI, Called number, Called number NOA, Information Digits; 8) the ability to access and modify service profile information for any service (Service Profile Identification). The service profile specifies the parameters that are required for service processing and provides some level of configurability on certain service parameters. Examples of service specific parameters include country-specific DTMF delay parameters for world phone menu choices termination options; 9) the ability to apply different kinds of alerting signal patterns to the called party before the call is answered (Customized Alerting). Any existing alerting signals may be applied under the control of service logic. Any new signals may be easily added to the repository for use; 10) Attempt Threshold by ANI feature, i.e., attempts by ANI are counted and compared to a configurable threshold value. This is used to indicate a need to transfer to a manual operator next time the caller calls; 11) Select/Execute a customer Script, e.g., based on the DNIS passed from the switch. Once found, the application may be executed; 12) Detect Fax, i.e., monitoring an incoming call to determine if this call has been placed by a fax machine. The call is "listened" to for a CNG tone e.g., a 1100 Hz tone that is on for 0.5 seconds and off for 3.0 seconds) transmitted by fax machines to indicate that a "non-speech" device is calling; 13) Agent Control Services allowing the following capabilities for manual operators: Agent Log-on/Log-off; Agent Update (agent monitoring); Ready/Not Ready; Timing Services; Time and Charges; Supervisor Service; Observe Agent; OA&M Services; and, DN Initialization; 14) International Re-Dial, e.g., when a subscriber encounters a busy or no answer condition for the call to an overseas termination, the network prompts the subscriber to use the Re-Dial service. The subscriber will hang up and wait for the network to re-try the termination until the call is answered or times out. If the call is answered by the overseas party, the network automatically calls back the subscriber and bridge the two parties together. The subscriber may specify the time period that he/she would like to wait for retry before giving up; 15) the ability of the PCS to register the mobile phone when it is powered up including: terminal authentication for the mobile station; user authentication for the mobile station; accepting passwords; subscriber PIN access; PIN intercept; validation of source address.

The NGIN's call destination routing feature is a feature enabling the network to determine the destination to which a call should be terminated. Calls may be routed to many different entities in the network and the determination of how to route a call may be affected by a diverse set of factors. The NGIN handles call destination routing in collaboration with several external systems. The NGIN provides the following features and functionality with regard to processing incoming calls:

1) routing calls based on the point of origin, the identity of the originator, the time of day, the day of the week, the day of the year, the percent utilization of destination resources, on least cost; 2) routing calls to an appropriate party by matching the skills required by the call with the skills possessed by the terminator; 3) Customer Controlled Routing (CCR) in which an external customer database is consulted for routing directions for each call; 4) overflow call routing in which calls that cannot be completed to their intended destination are routed to a secondary or alternate destination; 5) priority route selection; 6) routing a call to an operator; 7) interrupting a non-priority call in order to place a priority call; 8) routing a call based on the originating trunk group; 9) capture routing data as part of the call context data; 10) routing based on any sub unit of data (e.g., first 3 digits, first 6 digits, etc.); 11) a Goto feature that allows call plans to point directly to another point in a call, bypassing all intermediate processing; 12) routing calls based on whether the call originated from a BT registered payphone; and, 13) routing calls based on whether they originated on an ISDN line.

The NGIN provides the following features and functionality with regard to processing call extensions:

1) Setting up an Outbound Call, i.e., extending calls from the platform to domestic and international terminations. When a call extension is attempted on the platform, a check is made to determine if an outbound port is available for the outdial. This capability includes transferring calls to manual operators, voice mail systems, fax mail systems, customer terminations, operator to operator transfers, or transfers to foreign language operators; 2) Request Routing Instructions, i.e., when a call extension is done from the platform, a lookup is performed to determine the appropriate routing instructions. The routing response may be a routing plan, a Direct Distance Dialing (DDD) or a logical termination (LTERM) in which to extend the call; 3) Call Duration Limit, i.e., imposing a duration time limit on a call based on different parameters, for example, the money left on a PrePaid calling card, a budget card, restriction on some high fraud risk call originations or terminations. Upon approaching the limit, an event will be generated to make the service logic aware of the situation. The service then takes appropriate actions, based on the service logic; 4) Call Interrupt, i.e., interrupting an ongoing call upon receipt of certain event, such as Call Duration Limit, or an external instruction. Any or all party(s) are taken away from the connection; the service may then proceed with other actions; 5) Outgoing Call Screening, i.e., prohibiting any special numbers to be dialed from an originating location. For example, the subscriber may restrict any 900 calls from a house; 6) Call Progress Detection, i.e., when an attempt is made to transfer a call to a subscriber, it must determine whether a live answer is received. Types of call progress detection which may be provided include, but are not limited to: Answer supervision, SIT tone, Busy, Ring-no-answer, Answering machine, Live answer, Call connected, Fax or Modem detected, No Dial Tone, No Ring back, Duration of answering greeting, and Silence timing measures on answer greeting; 7) Busy/No Answer Ring (B/NAR), i.e., detecting a busy or no answer condition on a circuit and based on the result executing a predefined course of action. Call progress is monitored and if the dialout is busy or has no answer it reroutes the call to a designated location in the call processing logic; 8) the ability to instruct the NGS to bridge a call, e.g., when a call extension is done, an outdial is performed on a separate circuit. Once an answer indication is received, the caller and the called party are bridged together so that both parties may speak to one another; 9) Break the Bridge on a bridged call, e.g., when a hang-up indication is received, a bridge between two parties is broken. A bridge may also be broken upon receipt of an activation code indicating that the caller would like to be transferred to someone else or back to the response unit for further processing; 10) the ability to instruct the NGS to put a call on hold during a bridged call which involves breaking the current bridge between two parties to allow one party to perform another action (e.g., outdial, message retrieval). Once the action is completed, the party on hold will be bridged back into the call. The party on hold may be played music while they wait; 11) the ability to instruct the NGS to execute a Blind Transfer, i.e., transferring a call to a third party without speaking to the third party prior to the transfer. For example, party A calls party B. Party B decides that he is not the right person to handle the call so he transfers party A to party C without talking to party C first; 12) the ability to instruct the NGS to execute an Attended Transfer, i.e., transferring a call to a third party but the called party speaks to the third party prior to the transfer. For example, party A calls party B. Party B puts party A on hold and calls party C. Party B talks to Party C on the phone then hangs up causing party A to be bridged with Party C; 13) the ability to instruct the NGS to provide Conference Parties capability, i.e., allowing multiple parties (up to 32) to be bridged together on a conference call; 14) the ability to instruct the NGS to Detect Hang-up, e.g., detecting a hang-up condition on a circuit, which may result in the call being torn down; 15) the ability to instruct the NGS to Tear down a Call, i.e., freeing up the resources for the call, e.g., the ports and the application. A call is torn down when a hang-up condition is detected or when the application has terminated; 16) the ability to instruct the NGS to perform Release Link Trunk (RLT) signaling, i.e., allowing parties to be bridged on the switch versus the intelligent platform, thus saving resources on the intelligent platform; 17) Automatic Outbound Rate Control, i.e., preventing a destination switch overload and protecting customers connected to that switch from surge-induced switch crashes; 18) HLR and VLR capabilities.

The NGIN provides signaling features enabling the NGS to perform the following functions including, but not limited to:

1) Dual Tone Multi-Frequency (DTMF) signaling, i.e., a type of in-band signaling available on switches, PBX=s, and other telephony platforms. DTMF signaling also provides for detection of the #—digit for call re-origination; 2) Multi-Frequency (MF) signaling, i.e., a type of in-band address signaling, available on switches, which produces a tone; 3) Dial Pulse (DP) signaling, i.e., a type of in-band signaling consisting of regular momentary interruptions of a direct or alternating current at the sending end in which the number of interruptions corresponds to the value of the digit or character; 4) Bong Tone signaling which is needed for automated Bell Operating Company (BOC) Card call processing; 5) Release Link Trunk (RLT) signaling which allows parties to be bridged on the switch versus the intelligent platform thus saving resources on the intelligent platform; 6) ISUP Release Link Trunk functions are implemented using SS7 ISDN User Part Facility Messages: Facility Request (FAR); Facility Accept (FAA); Facility Reject (FRJ); Make A Call; Call Detail Recording; Call Release; Call Transfer; Call Bridging; and Access Type.

The NGIN additionally provides the following service objects having functionality regarding processing of the following Call Interactions:

1) Detect/Accept DTMF w/cut through capability, i.e., callers interact by entering DTMF tones in response to system prompts. "Cut-through" refers to the capability to accept a string of DTMF digits that allows the caller to respond to system prompts before they are played. Within DTMF collection, the following capabilities are allowed: Start/Stop DTMF collection; Detect an individual signal; Detect a sequence of signals matching a pattern; Detect a specified number of signals; Timeout when detecting a specific signal or pattern count; 2) Detect/Accept Voice Input w/out through capability, i.e., enabling voice to be detected and recognized as part of the call processing on the platform. Voice inputs may be used in a database query, menu route selection or PIN type usage; 3) Play prerecorded voice message, e.g., a custom message, a generic message, or a recorded message, which message may be interruptible, and repeatable (replay). The message may be playable from an index location and portions may be skipped. Playing audio (voice, music, etc.) scripts enables the application to notify a call participant of events, prompt the participant for information, play messages or relay spoken information. The following capabilities or parameters are supported by a play voice capability: Start the player; Start the player in paused mode; Stop the player in response to specified DTMF actions; Stop the player under application control; Control the duration of the play; Jump forward or backward by a specified increment; Change the speed up or down by a specified increment; Pause or resume play; Adjust the volume up or down by a specified increment; and, play multiple voice scripts in sequence (concatenate phrases). Preferably, multiple language voice scripting is supported, as is the specialized resource stores for the voice prompts required for multiple products. Since most of the services support multiple languages it also stores multiple language versions of these voice prompts; 4) Play DTMF used to interact with a paging company. Preferably, the information transmitted for each page is specific to the paging service provider, with possible information including: menu selection, pager PIN, and page string; 5) Menu Routing, i.e., enabling a caller to select from a preprogrammed set of options on a menu with DTMF or SIVR inputs. The options may be provided for call routing purposes, or for playing of different messages; 6) Perform database lookups and queries to aid in call processing. A query may be to an NGIN database or to a customer host database, and may be done for information pertaining to, for example, the status of a voice mailbox, a customer profile, a fax mailbox status or for specific routing information; 7) 3rd Party Billing Validation, i.e., enabling, in a manner similar to collect calling, 3rd party billed numbers to be validated as billable. This validation may additionally be performed via an SS7 LIDB (line information database) validation. 8) AT&T Card Validation, i.e., enabling validation of AT&T card in a manner similar to the LIDB validation performed for the BOC card; 9) Billing Number Validation, i.e., ensuring that the billing number provided for any call is actually billable. This function may comprise steps such as: validating billing number length and format, checking billed number restrictions (hot card, bill type restrictions etc.), external validation (LIDB, AMEX etc.); 10) BOC Card Validation, e.g., validating BOC cards by sending an SS7 TCP message from an SS7 gateway requesting a query to an appropriate BOC STP. The BOC STP queries a LIDB database and returns a result to the ISN; 11) Called Number Validation enabling several checks to be performed to make sure that the call may be terminated to the number. For example, if an international number is dialed, a check is made to ensure that the customer is allowed to terminate to this Country/City Code from this location and also other Billing restrictions that may apply. The validation steps may include: Called number format check (e.g., 10 digit or 01+16 digits), NPA/NXX or Country/City code validation, etc.; 12) Collect Call Number Billing Validation enabling verification that a destination is billable when a collect call is placed to that number. This validation may be provided via an SS7 LIDB query; 13) Domestic Commercial Credit Card Validation enabling validation of commercial credit cards; 14) International Commercial Credit Card Validation enabling validation of commercial international credit cards; 15) VNET Card Validation enabling validation of the Vnet card; 16) Database Updates capability which includes the ability to update various kinds of databases, e.g., NGIN specific or customer databases. The service logic, customer and callers are able to update certain databases. For example, when a voice mail is left, the mailbox status is updated or a customer may be allowed to change his routing plans; 17) Record Voice capability enabling a subscriber to perform a "call screening by name" feature, whereby a caller is prompted to record their name.

The name is then played to the subscriber when the ARU receives a live answer on one of the find-me numbers. This voice file is not permanently kept on the ARU, it is deleted after the caller is connected to the subscriber, or the call has terminated. This capability allows the caller to record information for later playback to the called party. Use of this capability includes leaving voice mail or recording personal identification information for later use in call screening; 18) File Management capability providing the ability for a caller to create, delete, modify or read fax or voice mail that has been stored as a file; 19) Send Paging ability enabling the sending of alpha-numeric pages, e.g., a call is placed via a modem pool and the "TAP" protocol is used to send pages; 20) Collect Fax capability enabling NGIN to collect a fax message when a caller is sent to the fax mail system. The system also supports the ability for the subscriber to use the fax mail system to send a fax to an external fax device. The fax mail system collects the fax from the subscriber along with fax delivery information. The following fax collection capabilities are supported for fax collection: Wait for incoming fax; Begin fax negotiation; Stop fax negotiation; Force fax re-negotiation; Receive single incoming page; Receive all incoming pages; and, Stop fax receipt; 21) Send Fax capability enabling NGIN to send a fax transmission, e.g., when a fax is delivered to an external fax device. When sending faxes, the application controls the parameters of the fax negotiation (speed, resolution, header/footer information, etc.). The following fax collection capabilities are supported for fax play: Begin fax negotiation; Stop fax negotiation; Force fax re-negotiation; Send single page; Send all pages; and, Stop fax send; 22) Fax Broadcast capability enabling NGIN to maintain a fax distribution list and specify that faxes are to be delivered to the distribution list. This list may contain the phone numbers of external fax devices, or the identifiers for other fax mailboxes; 23) Voice Broadcast capability enabling an NGIN subscriber to maintain a voice distribution list and specify that voice messages are to be delivered to the distribution list. This list may contain external phone numbers phone numbers, or the identifiers for other voice mailboxes; 24) Schedule delivery of jobs/messages, i.e., when the subscriber instructs the fax or voice mail system to send a fax/voice mail message either to an external phone number or to another mailbox within the system, the subscriber may specify the date and time that the message should be delivered; 25) Caller Takeback enabling a caller to return to the application after initiating a call to an out-dial location. The caller may interrupt a bridged conversation in progress to initiate subsequent actions, or the called party may hang-up to return the caller to the platform for subsequent actions; 26) Application Branching enabling an application script to branch to another script and return to the main script with call context preserved. This enables applets to be built that perform specific functions which may be called by the main control application for the customer; 27) Speaker Dependent Voice Recognition (SDVR) for providing the ability to recognize specific speakers, e.g., voice print matching. A callers voice may be matched with a previously stored voice print to provide security access. Personalization may be achieved such that specific callers can get specific prompts and messages played to them; 28) Speakback Digits for providing the ability to speak back digits to the caller and which is a subset of a full text to speech capability; 29) Text-to-Speech capability enabling text to be converted to speech and played back to the caller. Uses of this capability include reading email and database query results to the caller; 30) Speech-to-text capability converts speech to text by taking information provided by the caller (spoken over the phone) and converting it into a text string for data manipulation; 31) Large Vocabulary Voice Recognition (LVVR) which is an expansion of SIVR having much larger vocabularies defined and are phoneme-based. LVVR provides the capability to recognize an entire string, e.g., a mutual fund name, versus just digits and the words "YES/NO"; 32) Key Word Spotting enabling NGIN to recognize a key phrase contained within an entire spoken sentence; 33) Generate Call Record enabling the generation of a call record (s) that includes information specific to the call such as platform time, call arrival time, terminations, options selected, events that occurred and time of occurrence. The call record is used as input to billing and reporting systems for proper invoicing and reporting; 34) Teletype Capability for Hearing Impaired enabling the connection of an operator position to a teletype terminal used by the hearing impaired; 35) Sequential Ring In Find-Me service wherein NGIN is able to sequentially ring the numbers specified in the find-me number list. In this scenario, a next number will be dialed only when the current number is no answer. Further to this, NGIN preferably provides a Simultaneous Ring In Find-Me service, enabling NGIN to simultaneously ring all the numbers or a group of the numbers specified in the find-me number list in order to reduce the time of locating the subscriber. If the subscriber is located at any of the locations, the subscriber will be connected with the calling party; 36) Distributed Database access, i.e., if the data is not located on the local node where the service logic executes, the service logic is able to retrieve, modify and delete the data on a distributed database whenever necessary. If data is partitioned among different physical nodes, the location transparency is maintained for the application. If duplication data copies exist in the network, the update is populated to all the copies on the network in a real-time fashion; 37) External Database Access, i.e, enabling access to an external database for the purpose of retrieval and update. The database may be located in customer=s premier or within another network. The protocols to be used for carrying query messages may be different from system to system and from network to network, however, a mechanism is provided to hide the specific protocol from the applications; 38) Message Repository for Store/Forward/Retrieval providing a network wide repository capability whereby any type of message(s) may be stored for forwarding and delivery purposes. The format of the message in which the message is stored may also be converted to other format while delivered or retrieved based upon the type of the user terminal involved. Expected format of the messages are voice, fax, video, text or binary file. This capability may be used by voice/fax mail, email services/features. A message is a self contained object with the full information associated with it, such as the destination, authentication requirement, time stamp, format, length, etc. The messages may be distributed cross the network, but the subscriber may access the message from any location. A backbone message delivery system may be provided to ensure real time message delivery; 39) Master List which is a list of conference call participants may be kept on file by System Administration [Please Verify] simplifying the effort to gather names and phone numbers in preparation for each call; 40) Standing Reservation, i.e., NGIN enables these to be made from any regularly scheduled, recurring conference call, eliminating the need to make a new reservation for each call; 41) Participant Notification, i.e., enabling notification of all participants of the day and time of a scheduled call. Prior to the conference call, Conferencing Specialists may fax information (agenda, sales figures, etc.) to any or all conference participants; 42) Music On Hold, i.e., providing music to participants before the beginning of the conference call; 43) Translation Services, i.e., enabling online language interpretation services to a user for providing international accessibility; 44) Conference Recording, i.e., enabling conference calls to be recorded on audiocassettes, or transcribed and provided on either paper or diskette; 45) Roll Call Services, i.e., conducting a roll call so that all participants know who else is on the line; 46) Conference Monitoring Services, wherein, at the user=s request, a Conferencing Specialist may stay on the line during the call to monitor and assist. Dialing "0" will bring the >Chairperson=an immediate Conferencing Specialist, for assistance. A confirmation tone let=s the Chairperson know the Specialist has been alerted; 47) Listen only/Broadcast Mode Services enabling all or some participants to be placed in a listen-only mode while others are speaking; 48) Executive Sub-conferencing Services enabling designated participants to confer privately during the call and then return to the main call; 49) Question & Answer Services for conducting orderly question and answer session without interruptions, while the audience remains in the listen-only mode. If participants have a question, they may signal via their touch-tine keypad and are entered on-by-one into the interactive mode to ask questions; 50) Polling Services enabling conduction of an instant option poll or survey by asking participants to signify responses via their touch-tone keypads; 51) Conference Instant Replay Services enabling conference calls to be replayed instantly after being concluded without a scheduled reservation. Options include fast forward, reverse and pause; 52) Customer reference codes Services enabling the identification of the calls listed on the conferencing invoice by name, number or combination of both; 53) Specialized Greetings Services which allows the customer to create a customized greeting for each conference. When participants join a conference they are assured of being in the correct conference or, be given other information regarding the conference; 54) Conference on Demand whereby NGIN enables real-time access to the conferencing products in real-time and be able to setup audio conferences quickly; 55) Other call interaction services supported by NGIN include, but are not limited to, the following: distance-based registration; geographic-based registration; parameter change registration; periodic registration; timer-based registration; support the roaming feature and handoff capabilities of wireless and PCS systems; support the do not disturb feature; support multilevel precedence and preemption for higher priority users; support priority access and channel assignment to allow emergency service personal to have higher priority access; support an encryption process to provide voice privacy; and, support the short message service for wireless and PCS systems.

Figure 24:
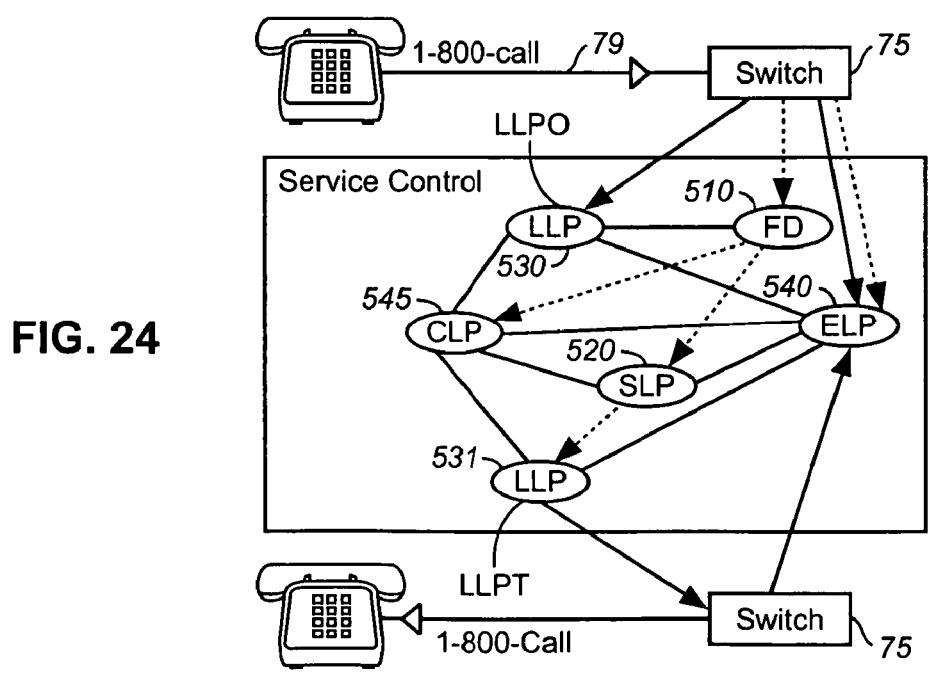
FIG. 24 depicts a call processing scenario as performed by NGIN.

Exemplary service processing and utilization scenarios are now described with reference to the sequence diagrams of FIGS. 18(a)–18(i) and the conceptual functional diagram of FIG. 24. According to the preferred embodiments of the invention, FIGS. 18(a)–18(i) describe the basic functional blocks implemented by the NGIN in the performance of services, e.g., calls, received at a network switch of the resource complex. These functional building blocks are generic in the sense that they may be implemented regardless of the type of service being performed and, particularly, they are described herein in the context of a 1-800/888 toll free call ("18C"), 1-800 collect call, etc. It is understood that with various modifications as described, the functional building blocks may be implemented in many event service scenarios.

Figure 18A:
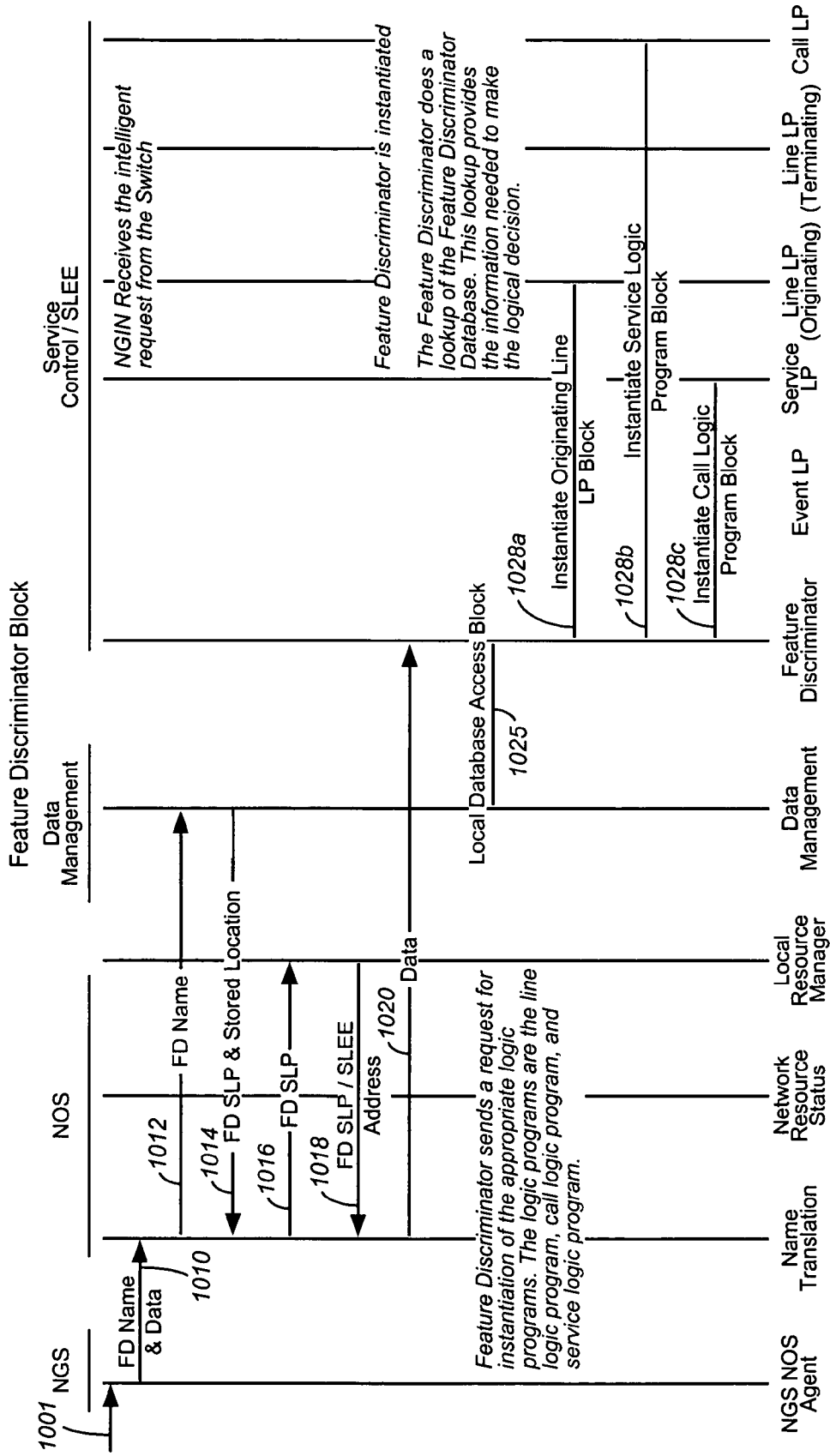
FIG. 18(a) depicts the generic functionality of an example feature discrimination instance.

First, as shown at step 1001, FIG. 18(a), it is assumed that a received call arrives at the NGS switch fabric 180. When the NGS 180 receives a call, the bearer control component 218 (FIG. 3) provides the call control component with the access line on which the call was received, as well as the ANI, dialed number, and other data needed for call processing. Call control SLP 545 maintains a state model for the call, as executed in accordance with its programmed logic. Additionally included in the state model are triggers for instantiating an ELP 540 and sending a service request to a feature discriminator service (FD) 510 as shown in FIG. 24 in the manner as will be described.

FIG. 18(a) is a sequence diagram describing the steps for performing feature discrimination on an incoming call. As shown at step 1010, a logical name for the FD is sent from an NGS/NNOS agent object to the NNOS Name Translation (NT) function. Preferably, this Initial Address Message message includes both the name and the data (envelope and letter) with additional data such as the called 800#, ANI, Line ID, Network-Call ID, Originating Switch Trunk. An ELP address is also sent along in this information. As indicated at step 1012, a Name Translation is performed by NT to determine the feature discriminator name. It sends that name to DM to get the actual SLP name, i.e., FD.SLP). In this scenario, it is assumed that there is a feature discriminator in each SLEE that is always running (i.e., a persistent SLP). Then, as indicated at step 1014, Data Management communicates the actual name of the FD SLP with its stored locations to the Name Translator (NT) which, in turn, sends the name to the NNOS LRM function at step 1016 to determine where the FD SLP is instantiated. It is understood that if a FD is not instantiated, NNOS will instantiate one. The LRM picks a SLEE and returns the address of the SLEE to NT SLEE Address) as indicated at step 1018. Then, at step 1020, the NNOS NT then sends the message (that came from NGS) to the Feature Discriminator SLP containing all the call origination information that came in. As part of this functionality, as indicated at step 1025, the FD SLP then performs an FD database ("DB") lookup so that it may make a logical decision.

Figure 18B:
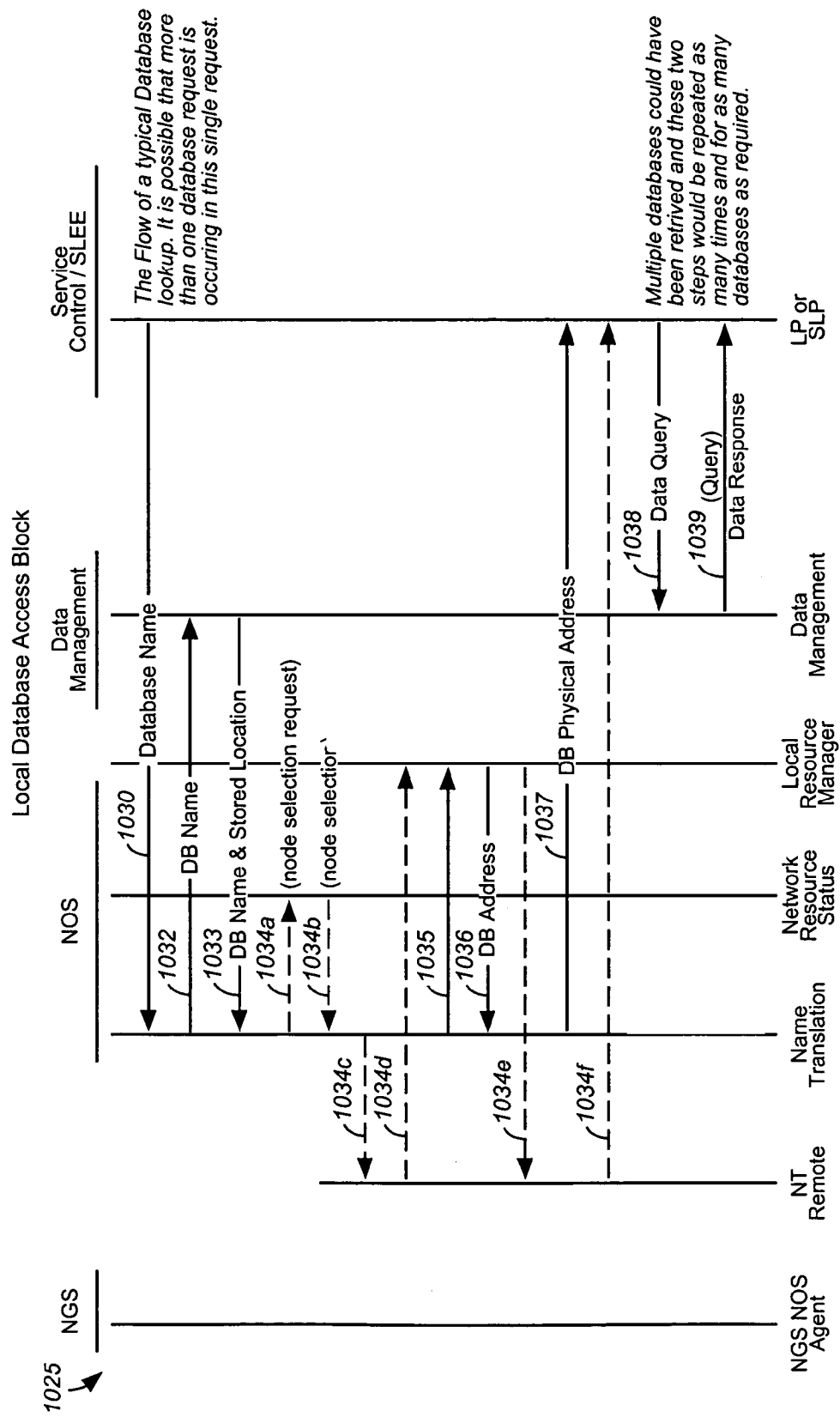
FIG. 18(b) depicts the generic local and remote database access functionality implemented by object instances employed during service processing.
Figure 18C:
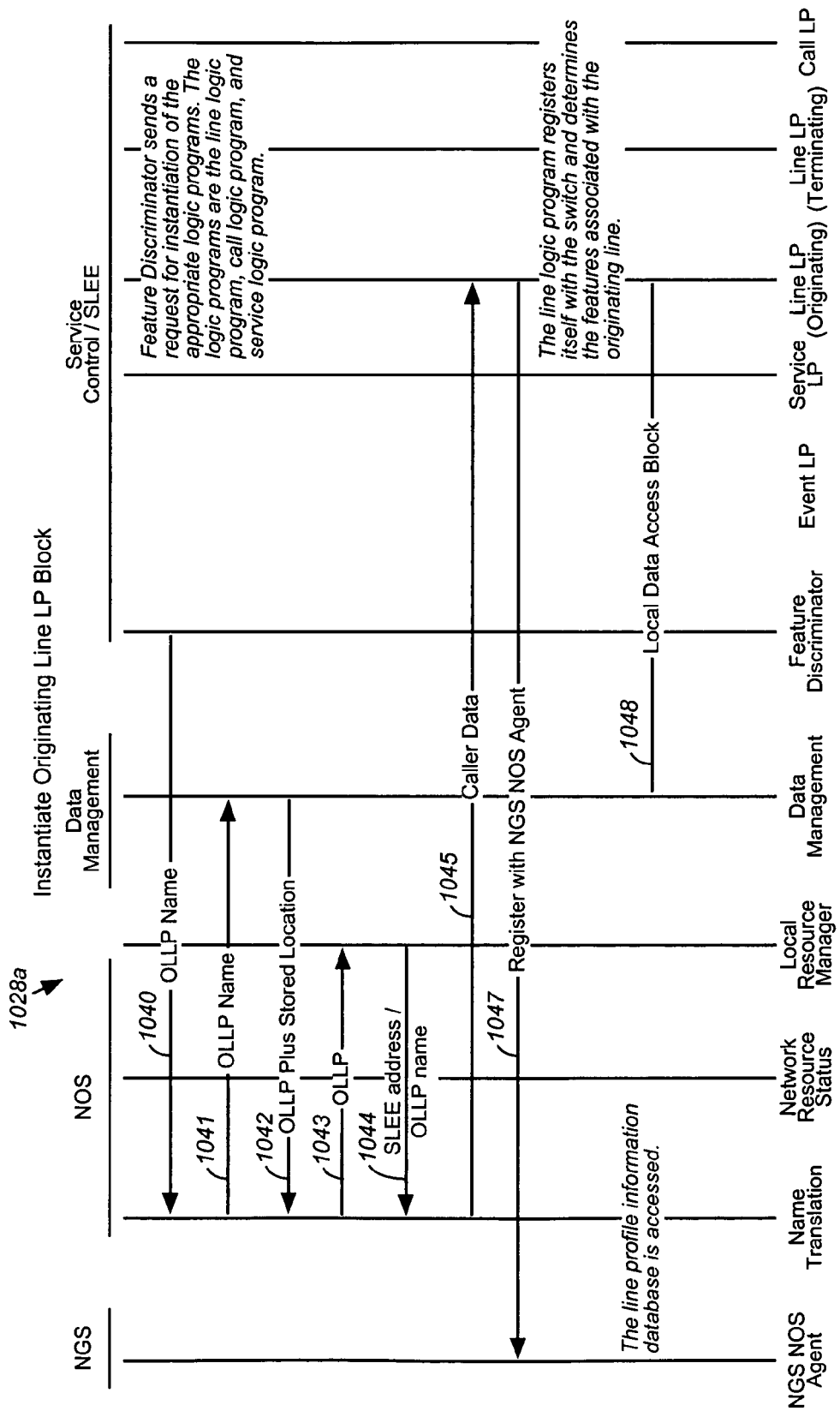
FIG. 18(c) depicts the generic process for instantiating an example line logic program instance at an originating node.
Figure 18D:
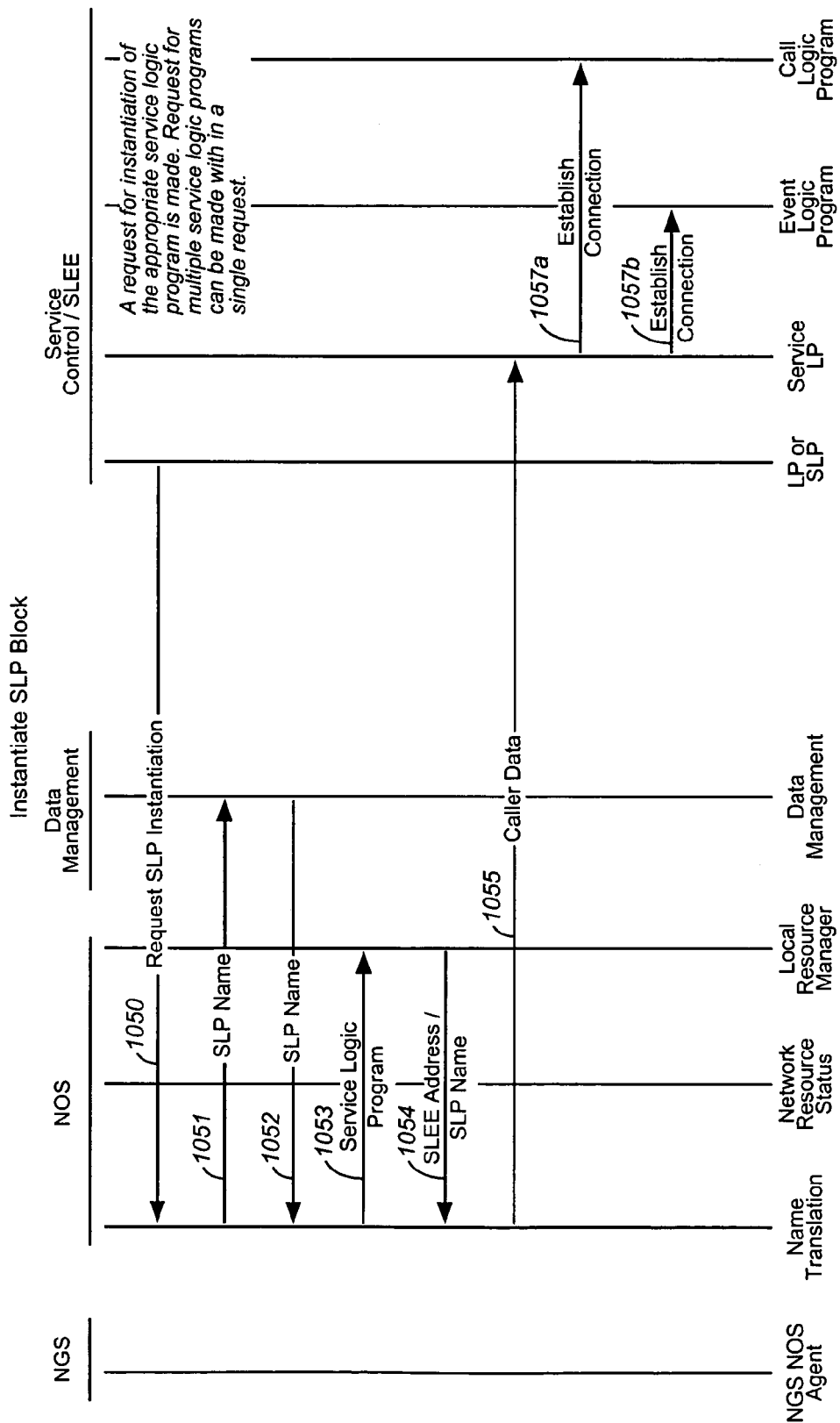
FIG. 18(d) depicts the generic process for instantiating a service logic program instance.
Figure 18E:
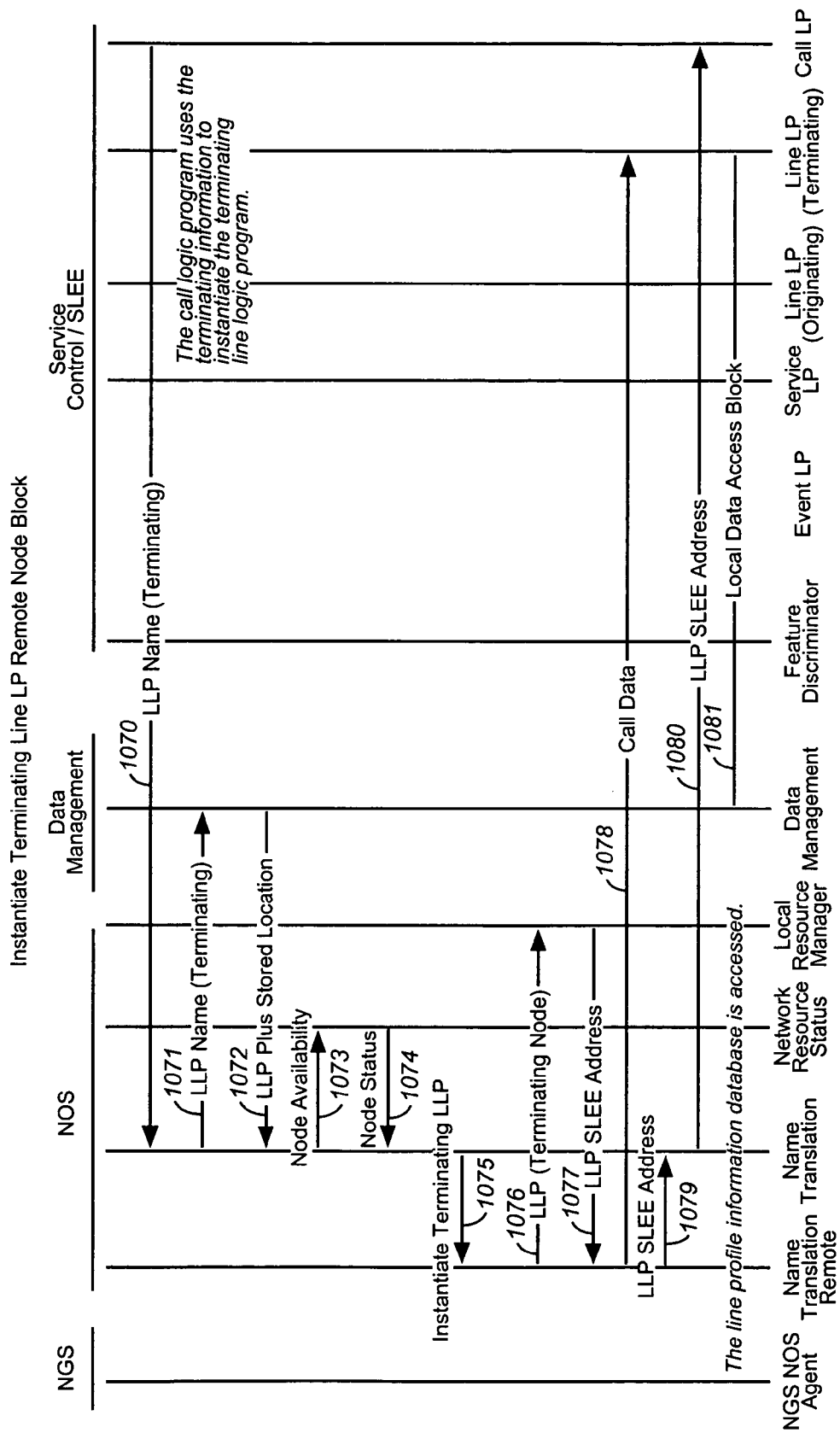
FIG. 18(e) depicts the generic process for instantiating an example line logic program instance at a terminating node.

A SIBB invoked by an SLP for performing a DB lookup is now generically described in view of FIG. 18(b). In the context of feature discrimination, the DB lookup involves having the FD SLP communicate a logical FD Database name to NNOS NT as indicated at step 1030, however, any SLP object instance may initiate a database look-up. The NT queries DM with the logical DB name at step 1032, and DM returns the database name and the addresses of its stored locations at step 1033. For the situation where the database is at a remote node, a node selection request to the NNOS NRS system may be performed as indicated at step 1034a. As a result, based on availability of services and the status of SLEEs at service nodes, the NRS determines which node the database is located and sends the logical name to NNOS NT as indicated at step 1034b. Furthermore, as indicated at step 1034c, NNOS NT submits the DB address to the NNOS NT instance at the remote node.

As indicated at step 1035, the NNOS NT may query the LRM to see if the database is locally available and if not, where it=s available before finally choosing a location. The LRM returns the address of the DB to NT at step 1036 which then sends the database physical address to the SLP, e.g., FD SLP, at step 1037.

Alternately, as indicated by broken lines at steps 1034d–1034f, for the database location at a remote node, the NT at that node queries its LRM, returns the address to the remote NT, and returns the physical address to the SLP. The SLP, uses the data received earlier from the NGS NNOS Agent and queries Data Management. For instance, in the case of the feature discrimination [in FIG. 18(*a*)], a query is made to find an SLP to handle the call as indicated at step 1038 in FIG. 18(*b*). Finally, a data response is returned to the calling LP or SLP as indicated at step 1039.

Particularly, in the context of the 18C service request, an FD SLP uses its feature discrimination table to identify which SLP is to handle the received service request. For example, if the received message is a 18C service request, it is to be handled by the 18C SLP. Table 3 below is an example abbreviated FD table having entries including pointers to various "toll-free", e.g., 1-800, call services.

```
Entry Port Table
    A001001" SLP pointer 'Vnet'
    A001002" Table pointer to FGD table
    FGD table
        1800* table pointer 800 table
        1888* table pointer 800 table
        1900* table pointer 900 table
        1* SLP pointer 'Local number'
    800 table
        1800collectSLP pointer to '1-800-C'
        18008888000SLP pointer 'Op Service'
        1800*          SLP pointer '800 service'
        1888*          SLP pointer '800 service'
``` where FGD is the feature group discriminator. Particularly, based on where the call originated in the network (switchboard) and the type of call received (e.g., 1-800), the FD will determine an appropriate SLP logical name. For instance, the identification "001002" indicates receipt of a call requiring a look-up in the FGD table (pointer to FGD table). The FGD table in turn, maintains pointers to other tables depending upon the called number, e.g., 800* where '*' is a delimiter. From this 800 table, for example, the FD obtains a pointer to the requested SLP logical name as indicated at step 1049. Subsequently, this SLP is invoked and the service request is handed off to NNOS which instantiates a CLP 545, LLPO 530 and the SLP 520 objects according to the 18C service requested.

In the preferred embodiment, the NGIN Service Creation component has defined the database that the FD SLP uses. It is populated by the NGIN SA component from service orders. As a result of the FD DB query, DM sends back the results of the query to FD including at least three SLP names, LLP, CLP, SLP for object instantiation, in the manner as described herein. Next, as indicated at steps 1028*a*–1028*c*, the originating Line LP, i.e., LLPO, the SLP and CLP are respectively instantiated in the manner as described herein for the call service instance as with respect to FIG. 18(*c*).

FIG. 18(*c*) is a sequence diagram describing the steps 1028*a* for instantiating an LLPO relating to a received service request. Particularly, using the results of the FD DB query, [step 1039, FIG. 18(*b*)], the FD SLP sends the LLPO logical name to NT as indicated at step 1040, and NT, in turn, queries it instance tables, e.g., included in a local DM cache, to obtain the physical location (object reference) and actual name of instantiated or available LLPO to execute as indicated at step 1041. Preferably, the logical name for the LLPO is provided to NNOS NT based on the bearer control line on which the call was received. That is, identification of this line is based on either the ANI or the access line identified by the bearer control component. The ANI identifies the original access line that originated the call, which may or may not be the same access line on which NGS receives the call, i.e., the received call may have originated on a local network, for example, and passed to switch 180 on an inter-exchange carrier network. Therefore, features associated with a line, such as call waiting or call interrupt, can be identified by the ANI. As indicated at steps 1042 and 1043, the NNOS NT translates the logical name for the LLPO to a physical address for an LLPO instantiation. It should be understood that, while other logic programs (such as SLPs) may be instantiated at other sites, the LLPs are instantiated at the site at which their associated lines are. The NT then queries the NNOS LRM to find out where the LLPO is instantiated as indicated (at step 1043) and LRM returns the actual LLPO (SLP) name with the SLEE address (at step 1044) which may be at the service control server, or the call control server. Next, as indicated at step 1045, the caller identification data is communicated to the instantiated LLPO instance via NNOS NT, and, at step 1047, the LLPO registers itself with the NGS NNOS Agent at the switch. Once instantiated, the LLPO queries Data Management (at step 1048) for features associated with the line, maintains the state of the originating line, and invokes any features such as call waiting or overflow routing when those features are invoked by the caller (i.e., call waiting) or network (i.e., overflow routing). The local database access query is performed in accordance with the steps described in FIG. 18(*b*), however, the physical address of the line information DB is communicated to the LLPO which requests DM to lookup customer originating line information for receipt by the LLPO.

FIG. 18(*d*) is a sequence diagram describing the steps for instantiating an SLP relating to a received service request (as indicated at step 1028*b*, FIG. 18(*a*)). Preferably, a request for multiple SLPs may be made in a single request such that the SLP, CLP and LLPO corresponding to the requested call service may be instantiated concurrently. Utilizing the results of the FD DB query, [step 1025, FIG. 18(*a*)], the FD SLP sends the SLP logical name to NT as indicated at step 1050, FIG. 18(*d*) and NT, in turn, queries its instance tables, e.g., local DM cache for the name translation for the physical location (object reference) of the SLP to execute as indicated at step 1051. The DM (local cache) sends back the object reference of the SLP(s) (storage address), as indicated at step 1052. The NT then queries the NNOS LRM to find out if the SLP is instantiated locally and, if not, which instance of the requested service to use, as indicated at step 1053. In response, the LRM returns the actual SLP name with the SLEE addresses at step 1054. The NNOS, in response, may send a request to the Service Manager object running on a Service Control SLEE in order to instantiate a new SLP service, or alternately, request that the service=s thread manager assign a new thread for the requested service having a unique tracking identifier representing the call. In the preferred embodiment, NNOS will select the SLP from a Service Control server that received the original incoming service request notification from the NGS, however, it is understood that NNOS could select the SLP in any service control component through implementation of the NNOS LRM and the NRS list of Service Control instances and their current status. The next step of FIG. 18(*d*), requires that the instantiated SLP process registers its physical address with the NNOS, and that the NNOS allocates this SLP to the service request. Then, at step 1055, the NNOS passes the service request hand-off message to the new SLP so that the SLP may begin processing the call in accordance with its programmed logic. Parallel to the SLP instantiation process, the associated CLP (and any other SLP) for this call may be instantiated as well, and it should be understood that an ELP instance for this call has been pre-instantiated for call context data collection. Finally, as indicated at step 1057a, FIG. 18(*d*), the SLP communicates with the CLP providing it with the addresses of the SLP, LLP and the ELP, and at step 1057b, the SLP communicates with the ELP providing it with the addresses of the SLP, LLP and the CLP. Via the CORBA implementation NNOS, interfaces are thus established between the LLP, CLP, SLP.

The prior instantiation of the ELP requires steps such as: having the NGS call control component communicate a message to NNOS including a logical name for an ELP and, in response, having NNOS send a message to a Service Manager object (FIG. 10(*a*)) to instantiate an ELP within a SLEE; and, return an object reference for that ELP back to call control which generates the ELP instance for that call. The NGS call control component includes this object reference in a service request message that is sent to an FD in the SLEE. Thus, all qualified event data that are generated for the call by any process are written to the instantiated ELP process.

Preferably, at the time the LLPO initiates DM to lookup customer originating line information, the instantiated SLP for the call is processing the service request. In the 18C scenario to be described, the 18C SLP has determined a routing termination, e.g., including a logical termination (LTERM) and switch/trunk in the context of a 18C service scenario, and the next step is to determine the terminating node location in NGIN and instantiate the terminating line logic program LLPT for the outgoing call. As will be explained in greater detail with respect to the 18C service scenario, the local database access sequence [of FIG. 18(*b*)] is implemented to determine the terminating NGIN node location based on the given final routing information. It should be understood that the terminating node may be at the same node where the call was received, or at a remote node other than the originating node. Once the terminating node location is received, the terminating LLP is instantiated as is a terminating line profile lookup.

FIG. 18(*e*) illustrates the process for instantiating the terminating LLP at a remote NGIN node prior to routing a call. As shown at step 1070, this requires the CLP to send the terminating node location and the logical name of the terminating LLP to NT so that it may be instantiated (the terminating node location is part of the routing response returned from DM). The NT then sends the LLP logical name to DM at step 1071 which returns the actual LLP name plus the addresses of its stored location (object reference) at step 1072. At step 1073, the NT then queries the NNOS NRS function to determine if the node to which this call is terminating is up and operational, and, at step 1074, the NRS returns to NT the status of the terminating node. Via NNOS, the NT of the local node requests the NNOS NT agent of the remote node to instantiate the terminating LLP at step 1075. As indicated at step 1076, this requires the NT on the terminating node to query its LRM to determine if the LLP is already instantiated for this terminating line, and if not, instantiates the LLP. The LRM at the terminating node returns to NT the SLEE address where the LLP for the terminating line is running at step 1077. Then, at step 1078, the NT of the terminating node sends the call data to the LLP of the terminating line and additionally sends the address of the SLEE executing the LLP for the terminating line to the NT of the originating node as indicated at step 1079. The NT of the originating node sends the address of the SLEE executing the LLP for the terminating line to the CLP at step 1080, and, as indicated at step 1081, a local database lookup is performed to determine the features (if any) on the terminating line. Specifically, the terminating LLP sends logical database name of the line info database to NT for name translation. NT requests the actual line information database name from DM and sends the actual line information DB name and its stored locations to NT. NT queries LRM to find out if the line information DB is available locally and LRM sends back the physical DB address to NT. NT passes the line information DB physical address to the terminating LLP. Then, the terminating LLP sends request to DM to look up customer terminating line information and DM returns the customer line information to LLPT. The system is now ready to perform the routing of the call, as will be described.

FIG. 18(*f*) is a sequence diagram illustrating the procedure for performing call completion after the particular service, e.g., call routing, is performed. As indicated at step 1084, FIG. 18(*f*), the LLPO receives a call completion notification from the NGS NNOS Agent and at step 1085 the LLP forwards the call completion notification to the CLP. At steps 1086a and 1086b, the CLP forwards the call completion notification to all associated LPS (e.g., LLPT, ELP) and the CLP terminates. Finally, upon notification of the call completion from the CLP, at step 1088, the ELP writes the call information to DM.

Figure 18F:
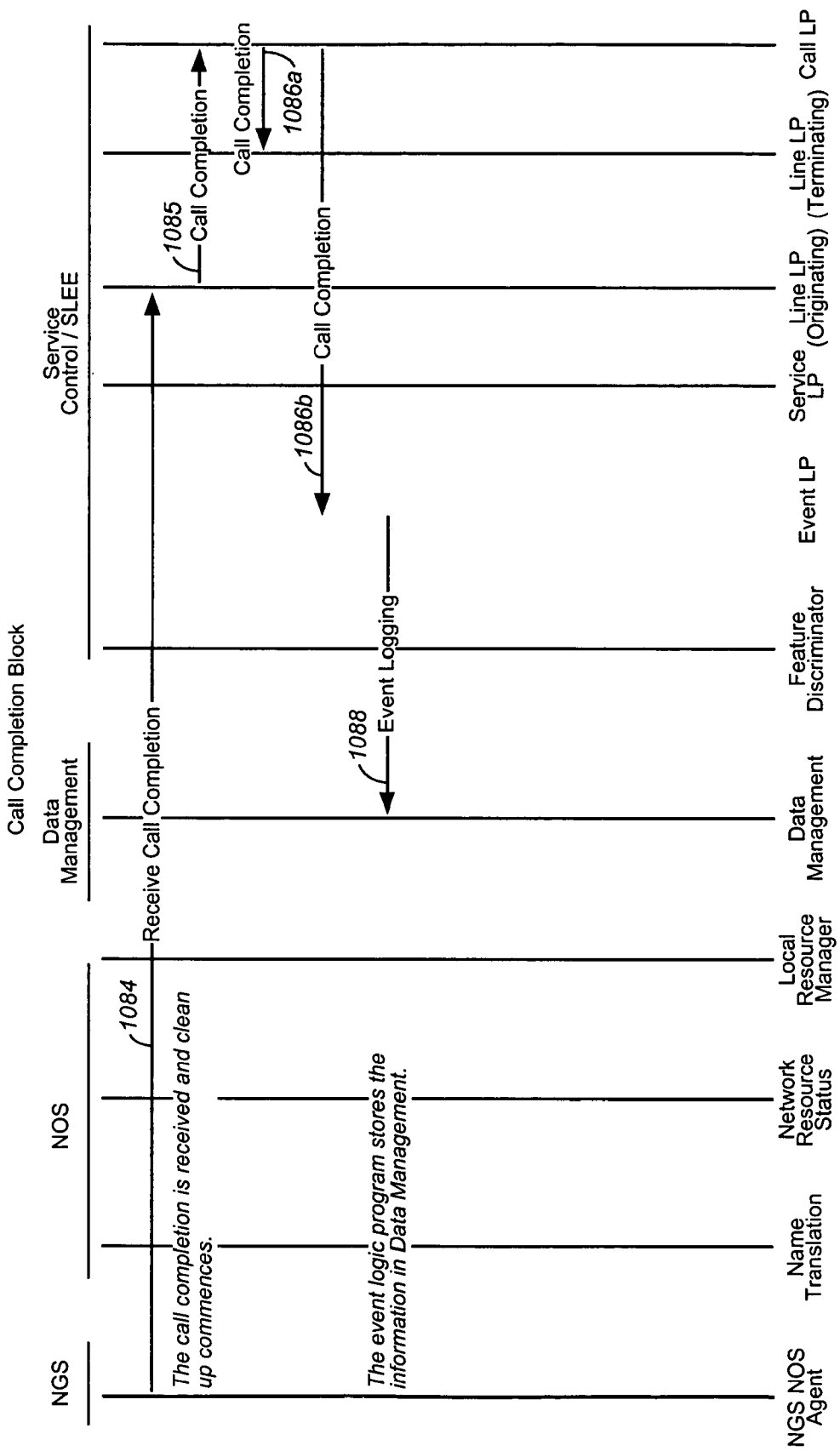
FIG. 18(f) depicts the generic process for completing service execution relating to a call.
Figure 18G:
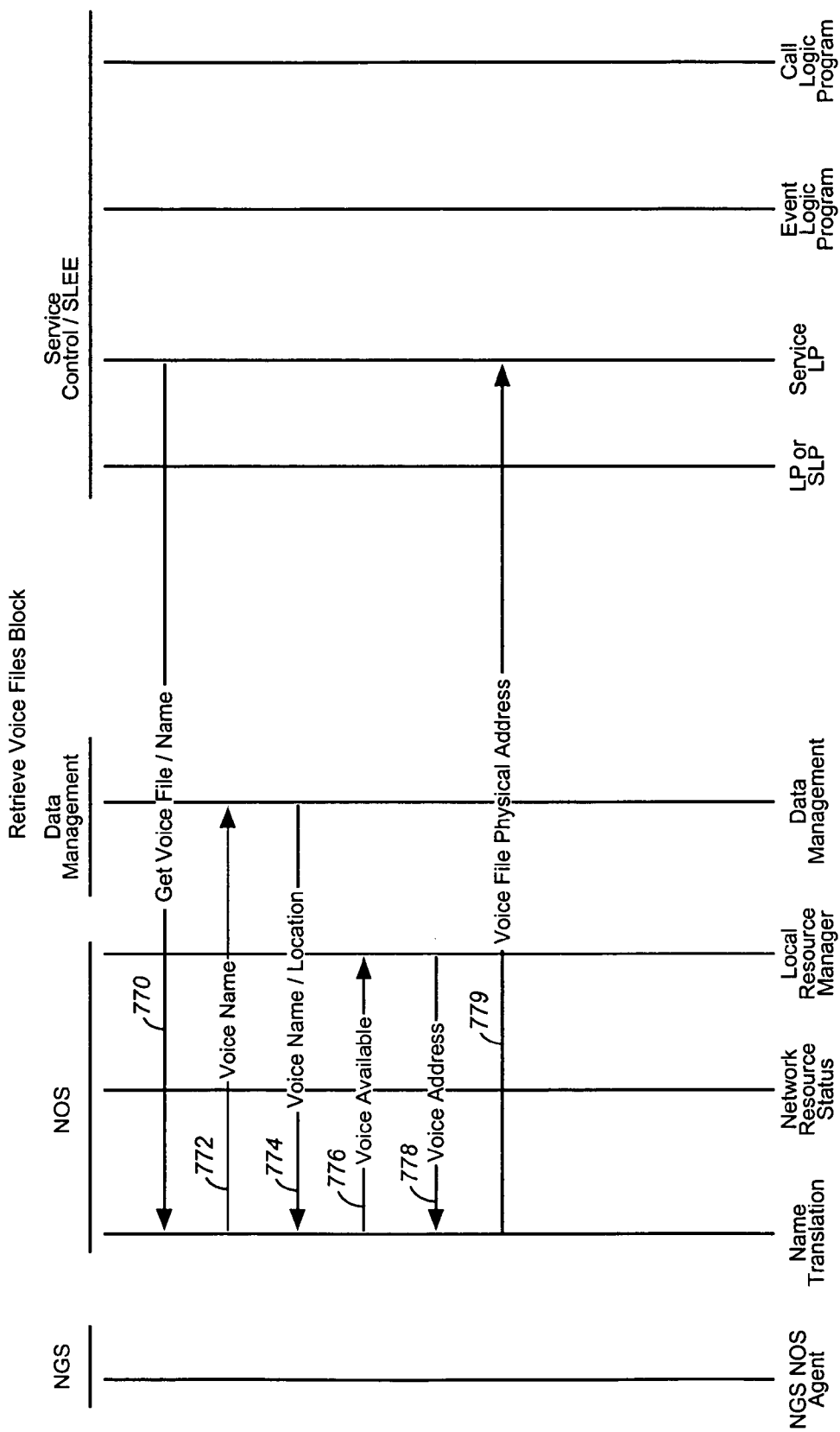
FIG. 18(g) depicts the generic process for retrieving voice files during service processing.
Figure 18H:
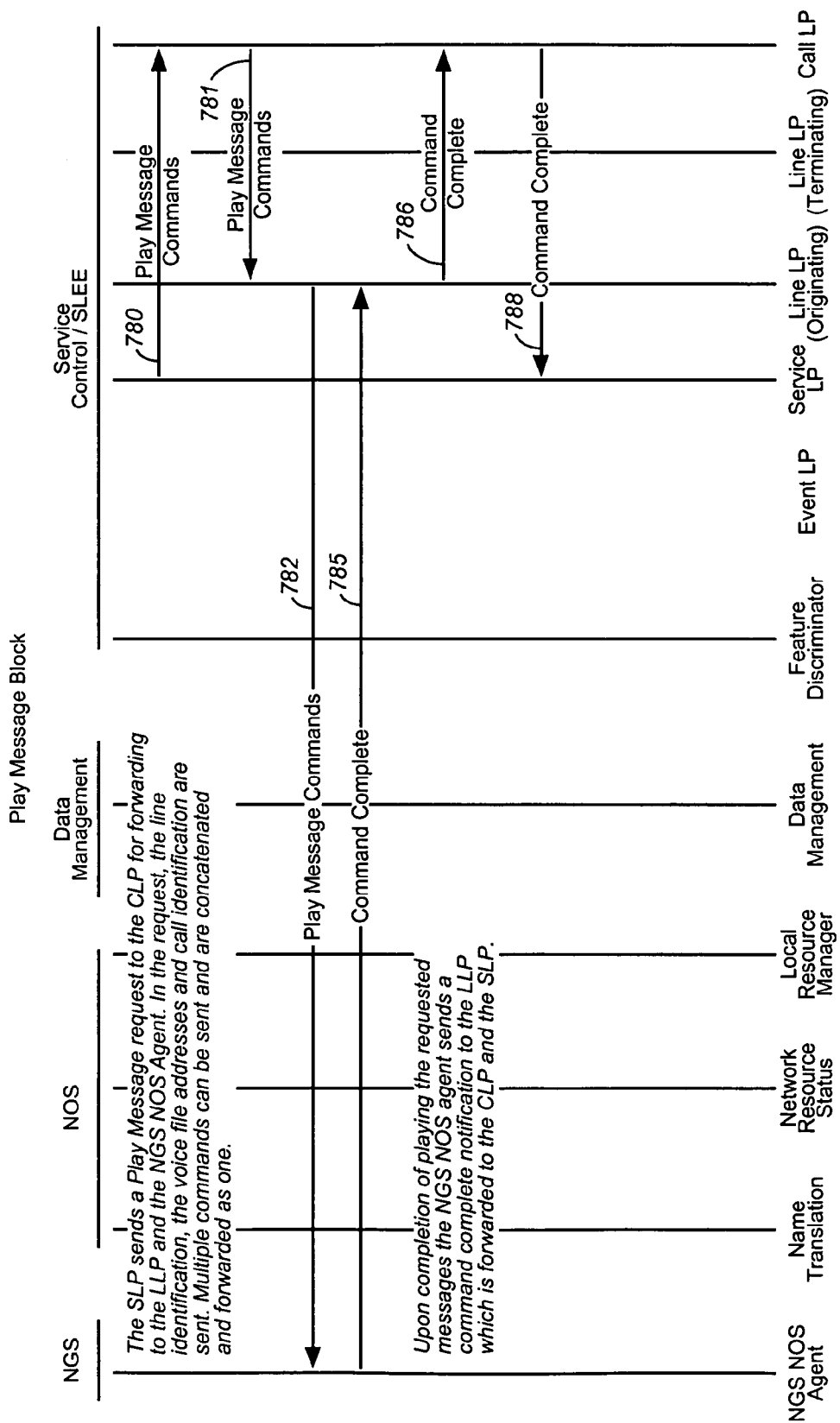
FIG. 18(h) depicts the generic process for playing a voice file message at a network switch during service processing.
Figure 18I:
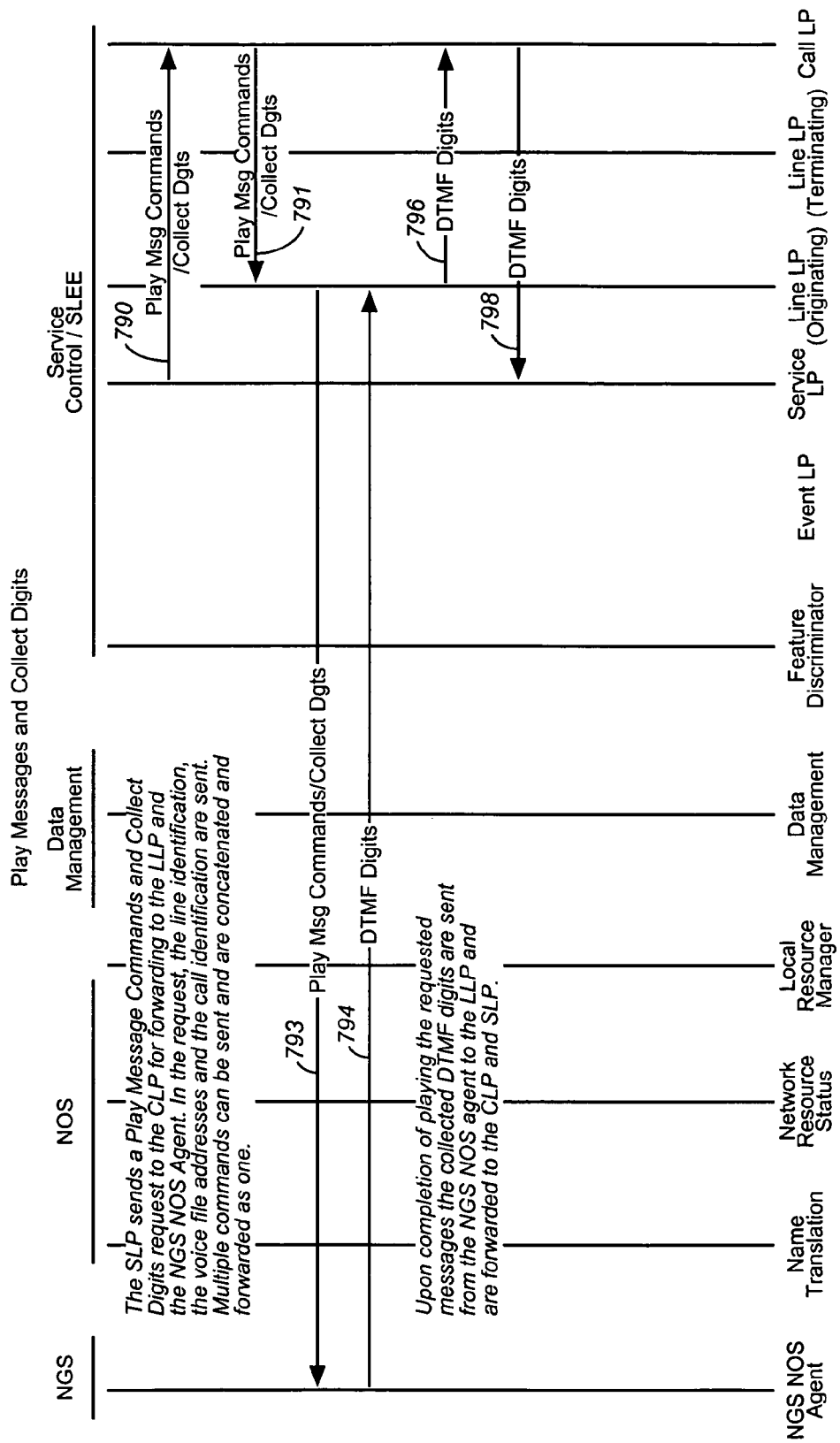
FIG. 18(i) depicts the generic process for playing a voice file message and collecting entered DTMF digits at a network switch during service processing.
Figures 19A, 19B:
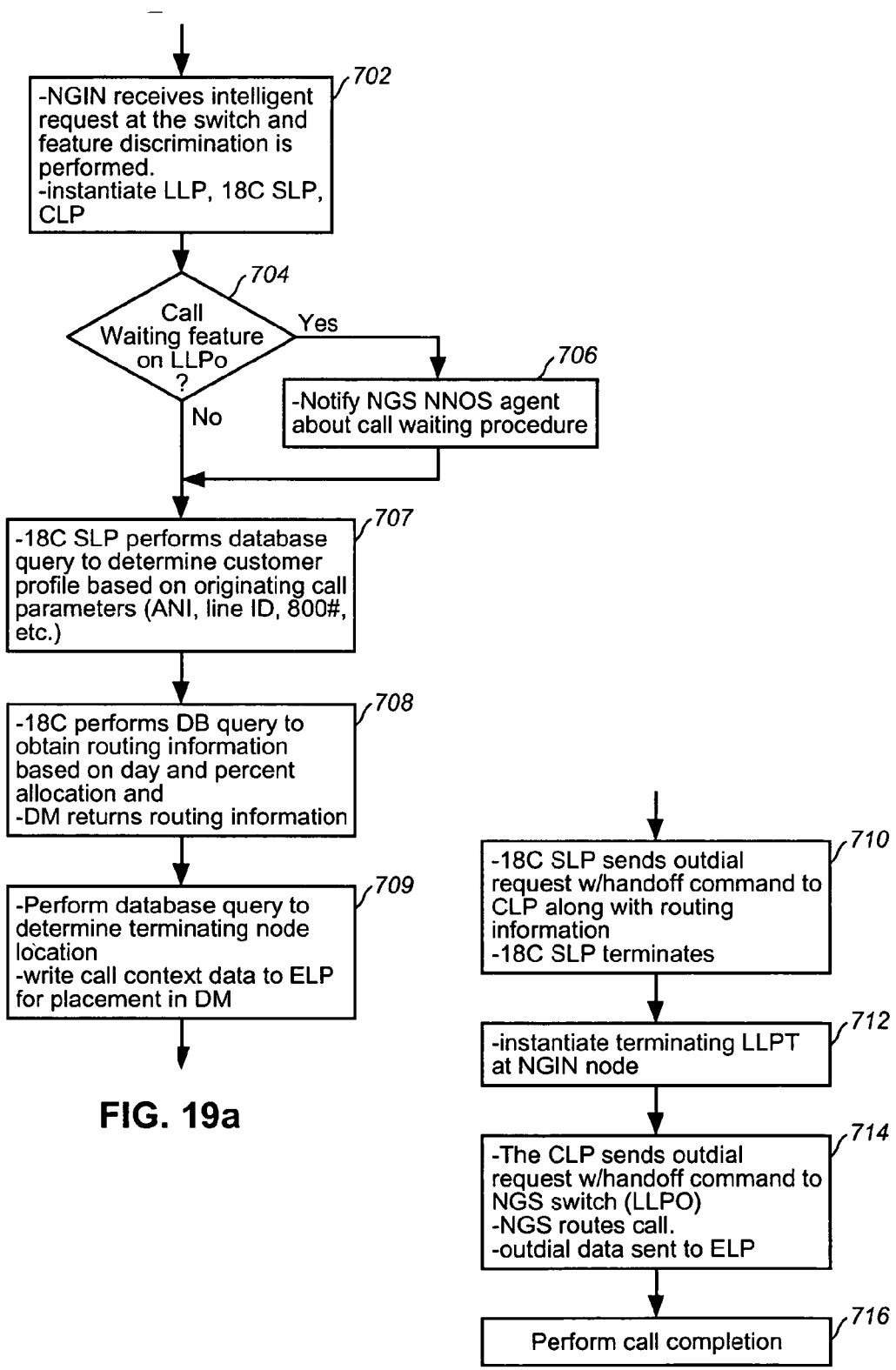
FIGS. 19(a)–19(c) depict an example SLP process for performing 1-800/8xx number translation, call extension to a termination, and implementing Call Waiting feature at the originating line.
Figure 19C:
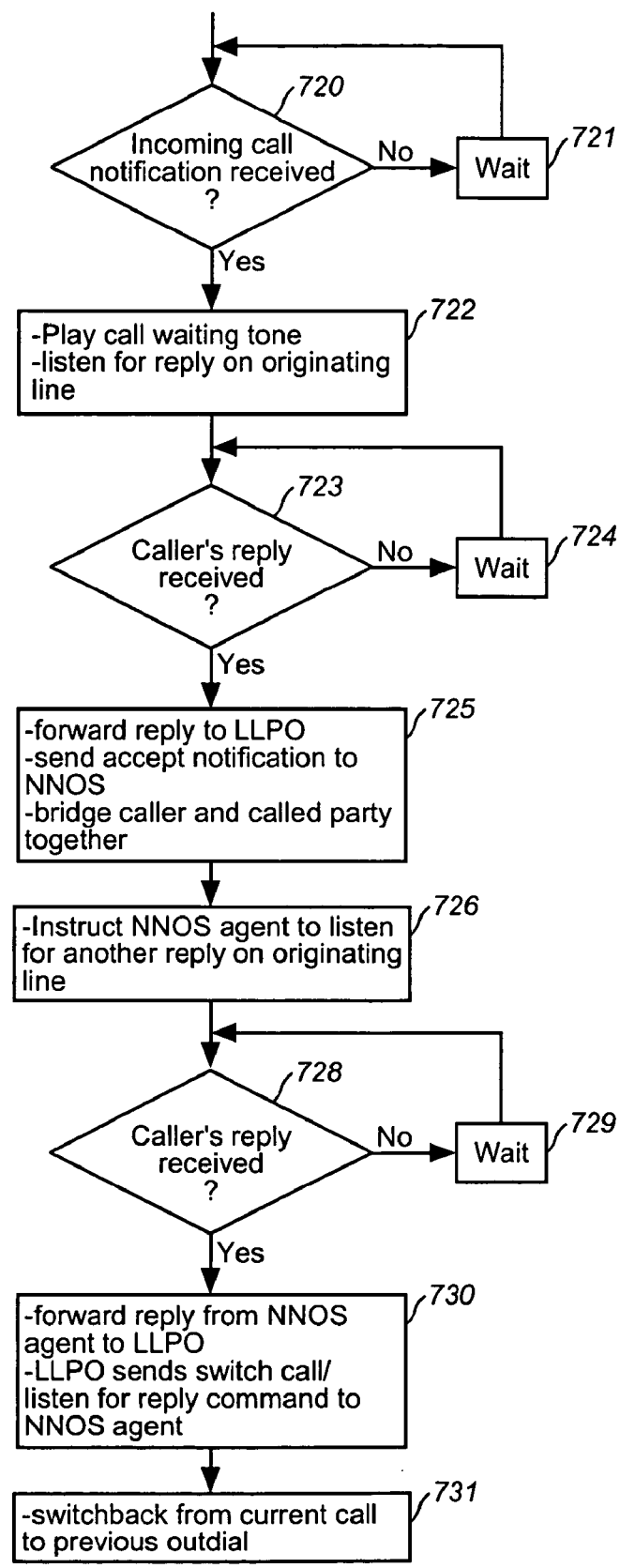

An example 1-800 call service (18C) scenario is now described in greater detail with respect to FIG. 19(*a*). The 18C service performed by NGIN enables an 800 number to be translated, e.g., based on the Day of Week and percent (%) allocation before extending the call to the correct termination. Particularly, as indicated at step 702, the NGIN receives the intelligent request at the switch, the feature discrimination is performed as described with respect to FIG. 18(*a*) and, the SLP, CLP and LLP instantiations are performed as described with respect to FIGS. 16(*c*) and 18(*d*). Then, at step 704, if the LLPO has determined a Call Waiting feature associated with the originating line, the LLPO sends the NGS NNOS Agent a notification to inform the LLPO if an incoming call is detected, as indicated at step 706. This notification informs the NGS not to play a busy signal if an incoming call is received, e.g., while the originating line is trying an outdial. Next, at step 707, the instantiated 18C SLP performs the database query to determine the customer profile based on the Day of Week and percent (%) allocation. This entails querying the DM cache for the logical name of the 800 call routing database, and once the database is located, performing a customer lookup for the correct routing termination based on, for example, the called 800 number, the line identification, the originating switch trunk and the ANI. The DM returns a customer profile to the 18C SLP. Then, as indicated at step 708, the 18C SLP constructs a query for DM by sending the day and percent (%) allocation according to the customer profile. The DM will then return the final routing information including the LTERM and the Switch/trunk.

Next, as indicated at step 709, a database query is performed to determine a terminating node location for the termination specified in the routing response. After DM returns the terminating location to the SLP, any call context data is written to the ELP for eventual storage in the DM.

Next, at step 710, [FIG. 19(*b*)], the 18C SLP sends an outdial request with a handoff command to the CLP along with the routing information and the 18C SLP terminates. At step 712, [FIG. 19(*b*)], the terminating LLPT at the termination node is instantiated in the manner as described with respect to FIG. 18(*e*). Then, as indicated at step 714, the CLP sends the outdial with handoff command to the LLPO which is forwarded to the NGS NNOS agent. The NGS routes the call to the termination node and the ELP writes the outdial data to the DM. Finally, as described with respect to FIG. 18(*f*), call completion is performed as indicated at step 716 [FIG. 19(*b*)].

In a more advanced 18C service, the 18C SLP includes functionality for servicing calls having Call Waiting feature on the originating line. In an example service scenario, an interrupt is received on the originating line during the 800 number translation process indicating that another call has been received. The incoming call is accepted by the caller and the pending outdial is continued. Additionally, the caller switches back to the 800 number outdial and completes that call.

FIG. 19(*c*) illustrates this advanced 18C service scenario. Particularly, after the LLPO has communicated the notification to the NGS NNOS agent to inform it when a call interrupt has been received as indicated at step 704, with respect to FIG. 19(*a*), the LLPO enters a call waiting mode.

As indicated at steps 720, 721, FIG. 19(*c*), the LLPO waits for a possible incoming call notification from the NGS NNOS Agent in response to a Call Waiting interrupt signifying that a new incoming call for the originating line been received. When a call is received as determined at step 720, the LLPO instructs the NGS NNOS Agent to play the call waiting tone and listen for a reply on the originating line, as indicated at step 722. At steps 723, 724, the NGS NOS Agent listens for a reply and forwards the caller=s reply to the LLPO. When the caller=s reply is received at step 723, the following is performed at step 725: 1) the NGS NNOS agent forwards the reply to the LLPO; 2) the LLPO sends a call accepted notification to the NGS NNOS Agent indicating that the caller has accepted the incoming call; and, 3) the NGS bridges the caller and the calling party together. In this scenario, it is assumed that the incoming call has already established its CLP, LLP and ELP through its instantiation processes. Then, as indicated at step 726, the LLP further instructs the NGS NOS Agent to listen for another reply on the originating line, and at steps 728 and 729, the process waits to receive the caller's reply indicating that the second call is terminated.

In the meantime, as described with respect to FIGS. 19(*a*) and 19(*b*), the advanced 18C SLP has continued its processing by determining a terminating node location given the routing information (e.g., not on an originating node), and sending an outdial request with handoff command to the CLP, including the routing information. At this point, the advanced 18C SLP instance terminates. Additionally, in the manner as described, the LLPT is instantiated (associated with the terminating line), the CLP sends an outdial command to the NGS which routes the call to the instantiated LLPT, and writes the outdial information to the ELP.

Returning back to FIG. 19(*c*), assuming the caller's reply has been received at the originating line as indicated at step 728, it is necessary to switch back to the previous outdial. That is, at step 730, the NGS NNOS Agent forwards the reply to the LLPO. The LLPO interprets the reply to be a switch from the current call to the previous outdial that was initiated. The LLP dispatches a Switch Call/Listen for Reply command to the NGS NNOS Agent and a switchback to the previous outdial is performed at step 731. It is assumed that the LLP of the originating line receives a call completion notification from the CLP of the second call indicating that that call waiting call has been completed. Finally, the call completion is performed [FIG. 18(*f*)]. It should be understood that the process described herein for handling the Call Waiting interrupt would be applicable no matter what time a call waiting interrupt is received at the originating line. Additionally, similar principles apply to the scenario of a call waiting applied at the terminating line.

Building on the advanced 18C scenario, another SLP may be executed to play a message to the caller first before extending the call to its termination. FIG. 20(*a*) illustrates this advanced 18C service scenario implementing customized message announcement and call extension features. First, the advanced 18C SLP described with respect to FIG. 19(*a*) is instantiated for the 800 number translation. Particularly, as indicated at step 732, this involves: receiving the intelligent request at the switch, performing feature discrimination, and, performing the advanced 18C SLP and LLP (and CLP) object instantiations. Assuming the instantiated advanced 18C SLP determines no features associated with the originating line, then, a lookup is performed to determine the correct routing. As part of this routing query, a customer profile lookup is first done, as indicated at step 733 followed by a day and percent allocation query, as indicated at step 734. As a result of the day and percent allocation query, DM returns routine instructions for a call extension and the name of the new Customized Message Announcement SLP ("CMA SLP") for handling the remainder of the call to the advanced 18C SLP. Then, as indicated at step 735, the terminating node location is determined, and, any call context data may be written to the ELP at this point for placement in the call context DM.

Then, as indicated at step 736, the new Customized Message Announcement SLP ("CMA SLP") is instantiated. This CMA SLP invokes SIBBs to direct the playing of the voice file and the extending of the call. As a result of the CMA_SLP instantiation, the NNOS NT sends the call identification data and SLP address list (ELP, CLP, and LLP) to the new CMA SLP. Then, the advanced 18C SLP terminates and hands off this call to the CMA SLP.

FIG. 20(*b*) illustrates the methods implemented by the CMA SLP. As indicated at step 740, the CMA_SLP invokes SIBBs to perform a DM database query for retrieving specific customer voice files for message playback at the originating line as described with respect to FIG. 18(*g*).

Next, as indicated at step 742, the CMA SLP invokes SIBBs for instructing the NGS to play messages (retrieved voice files) to the caller, as described in greater detail with respect to FIG. 18(*h*). Finally, as indicated in FIG. 20(*b*), step 744, the CMA SLP sends an outdial command to the CLP with the routing instructions that were received in the routing response of the advanced 18C SLP.

Finally, in this example scenario, the terminating LLP is instantiated as indicated at step 745; a profile lookup is performed to determine the features available on the terminating line; the outdial command is completed as indicated at step 746; and the outdial data is written back to the ELP. Finally, at step 748, the call completion is executed.

FIG. 18(*g*) is a sequence diagram illustrating a SIBB process for retrieving voice files from DM for playback over the resource complex. Specifically, according to the FIG. 18(*g*), the following steps are implemented: 1) the CMA SLP sends the logical name of the voice file to NT for name translation (step 770). In this scenario, it is assumed that a generic voice file message may be retrieved, however, utilizing the customer profile information, a unique voice file message specific to a customer may be retrieved; 2) the NNOS NT queries DM for the actual name and location of the voice file (step 772); 3) DM returns the voice file name and the addresses of its stored locations to NT (step 774); 4) NT queries the LRM and/or NRS for the availability of the database containing the voice file (step 776) and the LRM returns the address of the database containing the voice file to NT (step 778). Finally, the physical address of the voice file is returned to the CMA SLP from NT, as indicated at step 779.

FIG. 18(*h*) is a sequence diagram illustrating a SIBB process for initiating the playing of messages to the caller. In an example scenario, the SIBBs perform the following steps: 1) communicating a Play Message request from the SLP to the CLP (step 780), forwarding the request to the originating LLPO (step 781). It should be understood that in the request, the line identification, the voice file addresses and the call identification data are sent. Preferably, multiple commands may be sent that are concatenated and forwarded as one; 2) the LLPO forwards the play message command to the NGS NNOS Agent (step 782). The NGS allocates the appropriate resource, e.g., which switch port has IVR capabilities, VRU port, etc., and performs the play message command; 3) the NGS NNOS Agent communicates a Play Msg Complete command to the LLP for future forwarding to the SLP (step 785); 4) a Play Msg Complete notification is forwarded from the LLP to the CLP (step 786); and, 5) the Play Msg Complete notification is then forwarded from the CLP to the SLP. (step 788).

Figures 21A, 21B:
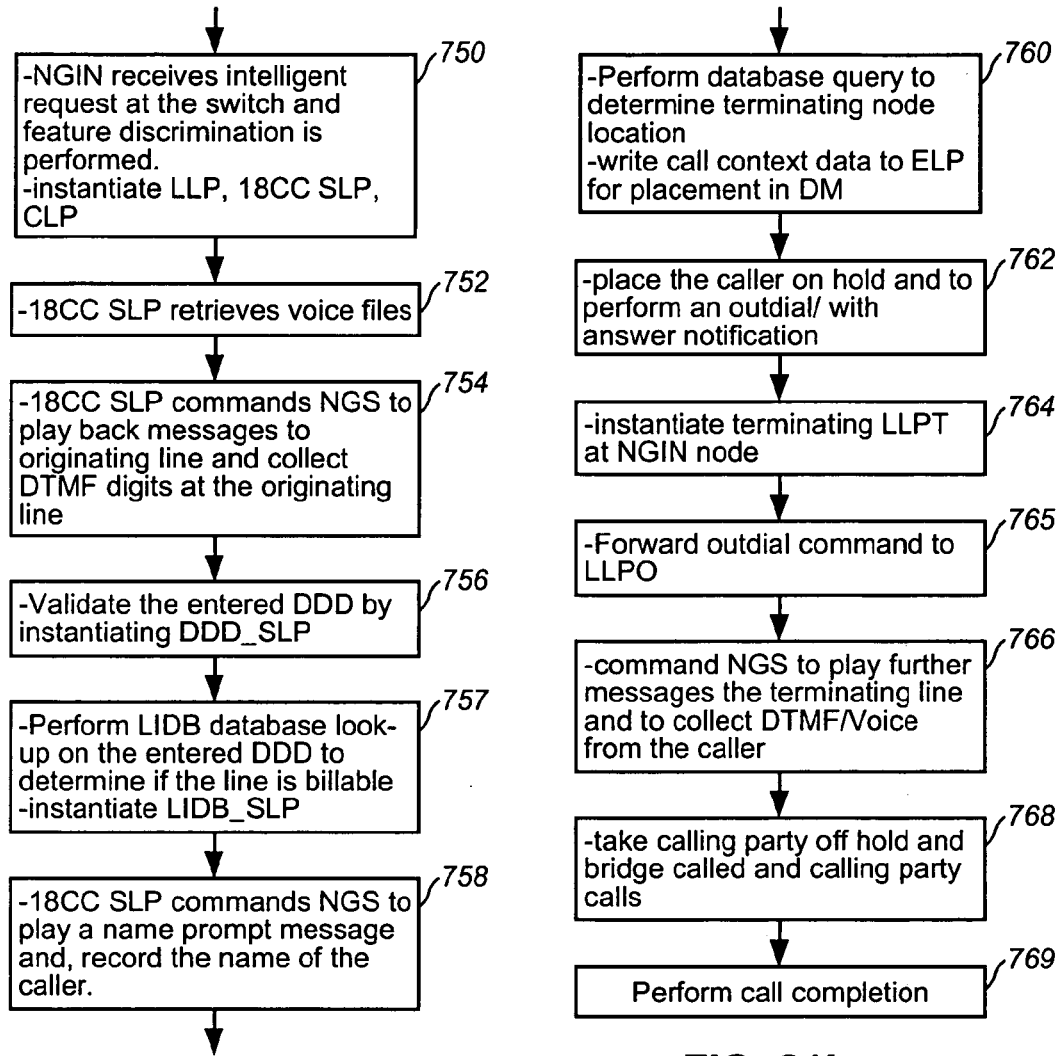
FIGS. 21(a) and 21(b) depict an example process for performing 1-800/8xx collect call service.

A 1-800 collect call ("18CC") service with a collect call option is now described in greater detail with respect to FIG. 21(*a*). This 18CC scenario describes the ability to provide a 1-800 Collect service with options such as collect call and calling card options. To provide this functionality, this scenario implements an 18CC SLP which instantiates an LIDB Lookup SLP or SIBB ("LIDB SLP") to verify that the called line is billable, and implements a validate direct dialed digits SLP or SIBB ("DDD_SLP") to verify that the DDD entered by the caller is valid. It is assumed that all database and voice files used in this scenario have been built using the NGIN Service Creation Environment.

First, as indicated at step 750, FIG. 21(*a*), the NGIN receives the intelligent request at the switch, performs feature discrimination, and, performs the 18CC SLP and LLP (and CLP) instantiations. Assuming no features are associated with the originating line, then, as indicated at step 752, the 18CC SLP retrieves voice files for the service. Then, at step 754, the 18CC SLP commands the NGS to play messages to and collect digits at the originating line, as now described with respect to FIG. 18(*i*).

FIG. 18(*i*) is a sequence diagram illustrating the procedure implementing SIBBs for playing messages to and collect digits at the originating line. As indicated at step 790, FIG. 18(*i*), the 18CC SLP sends a Play Message request to the CLP for forwarding to the LLP and the NGS NOS Agent. In the request, the line identification, the voice file addresses and the call identification are sent. The commands sent may include: Play Tone, Play Greeting w/cutthru and Collect Dual Tone Multi-Frequency ("DTMF") w/a timeout. It is understood that these commands may be concatenated and forwarded by NNOS in a single message. Then, as indicated at step 791, the CLP forwards the 18CC SLP request to the originating LLP and the LLPO forwards the Play Msg commands and the Collect Digits command to the NGS NOS Agent, as indicated at step 793. The NGS then allocates the appropriate resource and performs the commands in the sequence they are received. That is, at step 794, the NGS NOS Agent sends the collected DTMF Digits to the LLP for future forwarding to the 18CC SLP and, at step 796, the LLPO forwards the DTMF digits to the CLP. Finally, at step 798, the collected DTMF Digits are forwarded from the CLP to the 18CC SLP where the DTMF digits represent the DDD of the called party.

Returning to FIG. 21(*a*), having received the DTMF, the next step is to perform the validation of the entered DDD which entails instantiating a validate DDD_SLP in the manner as described herein with respect to FIG. 18(*d*). Particularly, the 18CC SLP or SIBB sends a logical name representing the validate DDD SLP to NNOS NT for name translation. Then, NT sends the logical validate DDD SLP Name to DM and DM returns the actual validate DDD SLP name plus the object reference (stored location). The NT then queries its LRM to determine if the validate DDD SLP is already instantiated on this node. If not, it instantiates the SLP. The LRM returns the address of the SLEE where the validate DDD SLP is instantiated to NT and NT sends the physical address of the instantiated validate DDD SLP to the 18CC SLP.

Returning back to FIG. 21(*a*), at step 756, the 18CC SLP forwards the query to the validate DDD SLP and the DDD is validated according to length, NPA and NXX. The Validate DDD SLP executes the query and the result is returned to the 18CC SLP. For purposes of explanation, it is assumed that the query result returned indicates a valid DDD.

Having validated the entered DDD, the next step is to perform the LIDB DB Lookup on the entered DDD to determine if the line is billable, as indicated at step 757, FIG. 21(*a*). Thus, in accordance with FIG. 18(*b*), the following steps for instantiating the LIDB lookup are performed. First, the 18CC SLP sends the logical LIDB SLP to NT for name translation and NT returns the physical address for the LIDB SLP if already instantiated, or if not instantiated, implements NNOS LRM and NRS functions to determine the best node that is able to run the LIDB SLP, e.g., on the basis of location and node status. After NRS returns the selected node to NNOS NT, the NT of the local node requests the NT of the remote node to instantiate the LIDB SLP. Thus, the NT on the remote node queries its LRM to determine if the LIDB SLP is already instantiated on this node. If not, it instantiates the SLP. The LRM of the remote node forwards the query data to the LIDB SLP, including the return address of the 18CC SLP. The LIDB SLP formats the query data to the appropriate format and forwards the query to the gateway to the LIDB database. The LIDB query is executed and the result is returned to the 18CC SLP.

Then, as indicated at step 758, the following steps are performed to command the NGS to play the name prompt message and to record the name of the caller. Specifically, the 18CC SLP implements a Play Message request SIBB implementing functionality for forwarding the line identification, the voice file addresses and the caller identification data to the NGS NNOS agent, and commanding NGS to Play Name Prompt and Record Name at the originating line. These NGS commands may concatenated and forwarded as one message. The CLP forwards the 18CC SLP request to the originating LLPO which then forwards the respective Play Message command and Record message command to the NGS NNOS Agent. The NGS allocates the appropriate resource and performs the commands in the sequence they are received.

The NGS NNOS Agent then sends a command complete notification to the LLPO for future forwarding to the 18CC SLP. Finally, the command complete notification is forwarded from the LLP to the CLP which then forwards it to the 18CC SLP.

Next, at step 760, FIG. 21(*b*), the terminating node location lookup is performed, and, at step 762, SIBBs are invoked to communicate a command to the NGS to place the caller on hold and perform an outdial. Specifically, the following steps are implemented: 1) the 18CC SLP forwards a Place Caller on Hold command to the CLP for forwarding to the NGS NNOS Agent. Along with the command is the line identifier of the line that is to be placed on hold; 2) the CLP forwards the command to the originating LLP; 3) the originating LLP forwards the Place Caller on Hold command to the NGS NNOS Agent and the NGS places the caller on hold; 4) the NGS NNOS Agent then sends a command complete notification to the LLPO for future forwarding to the 18CC SLP; 5) the Command Complete notification is forwarded from the LLPO to the CLP which then forwards notification to the 18CC SLP indicating that the caller has been placed on hold; and 6) the 18CC SLP forwards an Outdial w/Answer Notification command including the terminating node location to the CLP for forwarding to the NGS NNOS Agent.

The next step 764 is to instantiate the LLP for the terminating line (LLPT) on the terminating node and perform a lookup of the profile associated with the line and to return the customer line information to LLP. Then, as indicated at step 765, steps for performing the outdial, and receiving answer notification are performed. Particularly, these steps include: 1) the CLP forwarding the outdial command to the originating LLPO; 2) the originating LLPO forwarding the outdial w/Answer Notification command to the NGS NNOS Agent; 3) the NGS places the outdial; 4) the ELP writes the outdial data to Data Management for formatting and forwarding; 5) the NGS NNOS Agent sends an answer notification to the LLPO of the originating line; 6) the LLP forwards the answer notification to the CLP which then forwards the answer notification to the 18CC SLP; and 7) the 18CC SLP determines that the answer notification is an indication that someone has answered the phone versus an answer machine or other device.

Next, as indicated at step 766, a command is initiated to the NGS to play further messages at the terminating line and to collect DTMF/Voice from the caller representing the called party=s response to the acceptance of the charges. In this scenario, it is assumed that the called party accepts the charges. The steps include: 1) the 18CC SLP sends a "Play Message" request to the CLP for forwarding to the LLPT and the NGS NNOS Agent. In the request, the line identification, the voice file addresses and the call identification data are sent. The commands sent may include: Play Collect Call Message, Playback Recorded Name, Play Accept Charges Message and Recognize Voice/Collect DTMF w/a timeout and may be concatenated and forwarded as one message; 2) the CLP forwards the 18CC SLP request to the terminating LLP; 3) the LLP forwards the Play Msg commands to the NGS NNOS Agent and, in response, the NGS allocates the appropriate resource and performs the commands in the sequence they are received; 4) the NGS NOS Agent sends the collected DTMF Digits/Recognized Voice to the LLP for future forwarding to the 18C SLP; and, 5) the collected DTMF Digits/Voice are forwarded from the LLP to the CLP which are then forwarded to the 18CC SLP.

Next, as indicated at step 768, FIG. 21(*b*), the NGS is instructed to take the caller off hold and bridge the caller and the called party. These steps comprise: 1) sending the command to take the caller off hold to the CLP for future forwarding to the NGS NNOS Agent; 2) forwarding the request to the LLPO of the originating line; 3) forwarding the command to the NGS NNOS Agent. Within the command, the lines to be bridged are identified; 4) the NGS NNOS Agent sends a command complete notification to the LLP for future forwarding to the 18CC SLP; and 5) the command complete notification is forwarded from the LLP to the CLP which is then forwarded to the 18CC SLP indicating that the caller and called party have been bridged. Finally, as indicated at step 769, the call completion process is performed.

A 1-800 collect call (18CC) scenario with a calling card option is now described in greater detail with respect to FIG. 22(*a*). This 18CC scenario describes the ability to provide a 1-800 Collect service with a calling card option. In this scenario, a 18CC SLP is instantiated to provide the service. This SLP will call a Validate DDD SLP to verify that the DDD entered by the caller is valid.

First, as indicated at step 802, FIG. 22(*a*), the NGIN receives the intelligent request at the switch, the feature discrimination is performed and, the 18CC SLP and LLP (and CLP) instantiations are performed and respective interfaces established. In this 18CC scenario, the instantiated 18CC SLP performs a DM database query and determines features associated with the originating line. For purposes of explanation, it is assumed that no features are associated with the originating line. Then, as indicated at step 804, the 18CC SLP retrieves voice files for the service. Then, at step 806, the 18CC SLP commands the NGS to play messages to and collect digits at the originating line. As previously described with respect to FIG. 18(*i*), the 18CC SLP implements SIBBs for playing messages to and collecting digits at the originating line which represent the calling card option.

Then, as indicated at step 808, the NGS is further commanded to play further messages and collect the actual BOC calling card number from the caller. These steps include: sending a Play Message request, including the line identification, the voice file addresses and the call identification data, to the CLP for forwarding to the LLP and the NGS NOS Agent; and, sending a concatenated message including a Play Message w/cutthru command prompting the caller to enter the BOC Card message and a collect DTMF w/a timeout command. The CLP then forwards the 18CC SLP request to the originating LLP which then forwards the Play Msg command and the collect DTMF command to the NGS NNOS Agent. The NGS allocates the appropriate resource and performs the commands in the sequence they are received. The NGS NNOS Agent sends the collected DTMF Digits (representing the BOC card number entered by the caller) to the LLP for future forwarding to the 18C SLP. The collected DTMF Digits are then forwarded from the LLP to the CLP which then forwards them to the 18C SLP.

In the manner as described with respect to FIG. 18(*c*), the next step 810 instantiates a BOC Card validation SLP or SIBB ("BOC_CC_SLP") which requests the validation of the BOC Card number entered by the caller. Once instantiated, the BOC CC SLP formats the query data to the appropriate format and forwards the query to the gateway to the BOC Card database. The BOC Calling Card query is executed and the result is returned to the 18CC SLP. For this scenario, it is assumed that the entered BOC Card number is valid.

Next, as indicated at step 812, the NGS is commanded to play a message to collect the DTMF digits representing the DDD from the caller, forwarding the collected digits, and validating the entered DDD, as indicated at step 814, FIG. 22(*b*). As described herein with respect to FIG. 18(*h*), this requires instantiation of a Validate DDD SLP which executes the query and returns the result to the 18CC SLP. In this scenario, it is assumed that the DDD entered is valid. Next, as indicated at step 816, the terminating node location lookup is performed followed by a command from the 18CC SLP to place the caller on hold and to perform an outdial in the manner as previously described. Then, as indicated at step 818, an outdial with handoff from the 18CC SLP to the CLP is initiated including the terminating node information. The 18CC SLP is thereafter terminated.

The next step 820 is to instantiate the LLP for the terminating line (LLPT) on the terminating node, perform a lookup of the profile associated with the line, and to return the customer line information to the LLP. Then, at step 827, the command for the outdial and the receipt of the answer notification, and further instructions are forwarded to the NGS for the terminating line.

Finally, the call completion process described herein with respect to FIG. 18(f) is performed at step 824. Upon notification of the call completion from the CLP, the ELP writes the call information to DM and terminates.

Figure 23C:
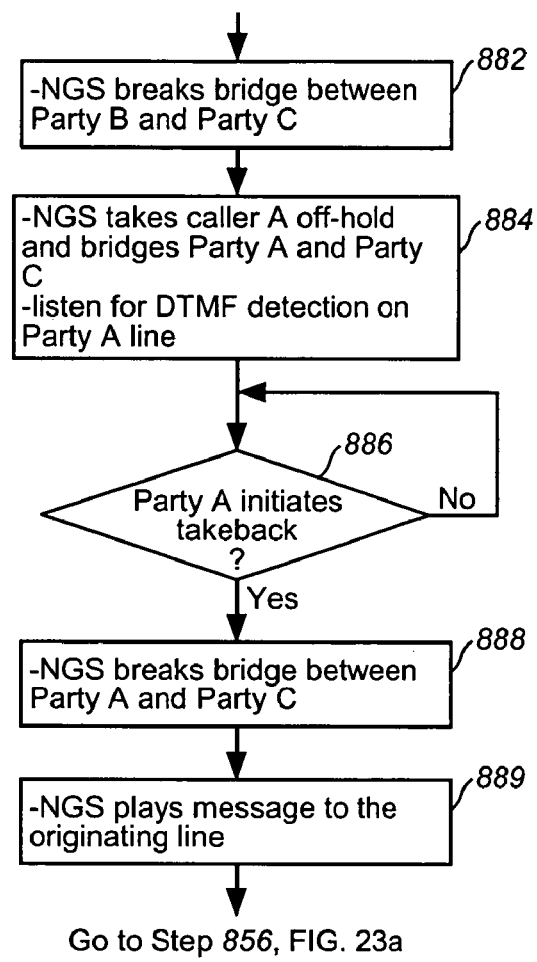

A further service provided by NGIN, and exemplified by the flow chart of FIG. 23(a), is an Enhanced Voice Service Takeback and Transfer (TNT) service implementing a TNT SLP in the manner as described. First, as indicated at step 852, FIG. 23(a), the NGIN receives the intelligent request at the switch, performs feature discrimination, and, the instantiates TNT SLP, LLP (and CLP) objects with respective interfaces established. Then, as indicated at step 854, the TNT SLP retrieves voice files for the service. This entails performing a database query via NNOS to retrieve the physical address of the actual voice file library. Next, at step 856, NGS is commanded to play messages to the originating line. Specifically, the TNT SLP sends a Play Message request to the CLP for forwarding to the LLP and the NGS NNOS Agent. In the request, the line identification, the voice file addresses and the call identification are sent. The commands sent include: Play Greeting, Play Menu Route w/cut-thru and Collect DTMF w/a timeout and, may be concatenated and forwarded as one. Then, the CLP forwards the TNT SLP request to the originating LLP which forwards the Play Msg commands and the Collect Digits command to the NGS NNOS Agent. The NGS allocates the appropriate resource and performs the commands in the sequence they are received. The NGS NNOS Agent then sends the collected DTMF Digits to the LLP for future forwarding to the TNT SLP via the CLP. In this EVS TNT scenario, the DTMF digits represent the menu option selected by the caller. The TNT SLP logic correlates the menu option with an outdial to a Routing Plan ID associated with a second Party B as indicated at step 857.

Then, as indicated at step 858, a routing DB lookup is performed to translate the routing plan ID to a physical termination address of Party B which is returned to the calling TNT SLP. Additionally, as indicated at step 860, a database lookup is performed to determine the terminating node location. As a result of this query, DM returns the terminating location to the TNT SLP. In this scenario, the terminating node for Party B is one other than the originating node.

At the following step 862, an outdial to Party B is performed, i.e., the TNT SLP forwards an Outdial w/Answer Notification command including the terminating node information to the CLP for forwarding to the NGS NOS Agent. Since this is a supervised outdial, an indication of busy, no answer or answer must be sent back from NGS. It is assumed that the TNT SLP remains running. Next, at step 864, in the manner described herein, the LLPT for the terminating line (Party B) on the terminating node is instantiated and a lookup of the profile associated with the line is performed.

The process continues at step 866, FIG. 23(b), where the command for the outdial is forwarded from the CLP to the LLPO, which is forwarded to the NGS via NNOS to place the outdial. At this point, the ELP may write the outdial data to Data Management for formatting and forwarding. Assuming that Party B answered the call, the NGS NNOS Agent sends an answer notification to the LLPO which forwarded to the TNT SLP via the CLP. The TNT SLP accordingly determines that the answer notification is an indication that someone has answered and, in response, initiates a bridge to the caller.

As indicated at step 868, FIG. 23(b), the NGS bridges Party A to Party B and listens for DTMF detection on both lines. Specifically, the TNT SLP forwards a Bridge Parties/Listen for DTMF command to the CLP for forwarding to the NGS NNOS Agent. Along with the command is the line identifiers of the lines that are to be bridged. The Listen for DTMF command includes detecting a hangup condition on the lines. The CLP forwards the command to the originating LLPO which forwards the Bridge Parties/Listen for DTMF command to the NGS NNOS Agent. The NGS NNOS Agent in turn, sends a command complete notification to the TNT SLP via, the LLPO and CLP, the notification indicating that Party A and Party B are bridged and may now converse.

At the next step 870, it is assumed that DTMF digits entered by Party B and representing the transfer code and predefined list selection of Party C, are detected. Specifically, this step entails having the NGS NNOS Agent send the collected DTMF Digits to the LLP for future forwarding to the TNT SLP via the CLP. The TNT SLP then forwards a Place Caller on Hold/Play Music command to the CLP for forwarding to the NGS NNOS Agent. Along with the command is the line identifier of the line (Party A) that is to be placed on hold. The CLP forwards this command to the originating LLP which, in turn, forwards the Place Caller on Hold/Play Music command to the NGS NNOS Agent to enable the NGS to place caller A on hold. The NGS NOS Agent sends a command complete notification to the LLP for future forwarding to the TNT SLP via the CLP, the notification indicating that caller A has been placed on hold. It is assumed that the act of placing Caller A on hold breaks the bridge between A and B, cancels the Listen for DTMF on Party A's line, and starts the playing of the music on-hold to Party A.

At the following step 872, a lookup on the entered list option entered by Party B is performed. The TNT SLP sends the list selection entered by Party B to DM for a destination translation. The DM returns the physical termination address (of party C) to the TNT SLP, i.e., the list selection translated to Party C=s physical termination address. Included is the step of determining the terminating node location for Party C via NNOS to determine the physical termination address which is returned to the TNT SLP. In this scenario, it is assumed that the terminating node for Party C is one other than the originating node or Party B=s terminating node.

Next, as indicated at step 874, FIG. 23(b), an outdial to Party C is performed. Specifically, the TNT SLP forwards an Outdial w/Answer Notification command including the terminating node information to the CLP for forwarding to the NGS NNOS Agent via the originating LLP and the NGS places the outdial. As this is a supervised outdial, an indication of busy, no answer or answer is sent back from NGS. Additionally, the ELP writes the outdial data to Data Management for formatting and forwarding. The NGS NNOS Agent sends an answer notification to the LLP of the originating line. Assuming that Party C answered the call, the LLP forwards the answer notification to the TNT SLP via the CLP. The TNT SLP determines that someone has answered and a bridge to the caller can now be made. Then, at step 876, the LLPT for the terminating line of Party C is instantiated on the terminating node and a lookup of the profile associated with that line is performed in the manner as described herein.

The next step 878 commands the NGS to bridge Party B to Party C and to listen for DTMF detection on the line associated with Party C. Particularly, the TNT SLP forwards a Bridge Parties/Listen for DTMF command to the CLP for forwarding to the NGS NNOS Agent. Along with the command is the line identifiers of the lines that are to be bridged (Party B and Party C). The Listen for DTMF command includes detecting a hangup condition on the lines and applies only to Party C since Party B=s line already has the DTMF listen initiated. The CLP then forwards the command to the originating LLP which forwards the command to the NGS NNOS Agent. The NGS NOS Agent sends a command complete notification to the LLP for forwarding to TNT SLP via the CLP which notification indicates that Party B and Party C are bridged. After the completion of these steps, Party B and Party C are now talking, Party A is on Hold and the TNT SLP is still running.

As indicated at step 880, a determination is made as to whether a hangup by Party B has been detected. If not, the process waits for the hang-up event. If a hang-up is detected on Party B=s line at step 880, then, as shown in FIG. 23(*c*), step 882, the NGS is commanded to break the bridge between Party B and Party C. Specifically, the NGS NNOS Agent sends the hangup detection to the LLP for forwarding to the TNT SLP via CLP. The TNT SLP forwards a Break Bridge command to the NGS NNOS agent via the CLP and LLPO. Along with the command is the line identifiers of the lines (Party B) that are to be affected. The NGS NNOS Agent sends a command complete notification to the LLP for forwarding to the TNT SLP via the CLP indicating that the bridge between Party B and Party C has been broken.

Then, as indicated at step 884, the NGS is commanded to take Caller A off-hold and bridge Party A and Party C together. Upon completion of these steps, Party A and party C are talking, Party B has hung up and the TNT SLP is still running in case a takeback or giveback is initiated. Particularly, the TNT SLP forwards a Take Caller off Hold/Bridge parties/Listen for DTMF command to the CLP for forwarding to the NGS NNOS Agent. Along with the command is the line identifiers of the lines that are affected. The Listen for DTMF command only affects Party A=s line since the Listen for DTMF has already been initiated on Party C=s line. Via the LLP, the CLP forwards the Take Caller Off Hold/Bridge parties/Listen for DTMF command to the NGS NNOS Agent. The NGS NNOS Agent sends a command complete notification to the TNT SLP via the CLP, the notification indicating that the bridge between Party A and Party C has been made.

Next, as indicated at step 886, a determination is made as to whether Party A has initiated a takeback. If not, the process waits for the takeback digit code to be entered. Particularly, the DTMF digits representing the takeback code entered by Party A are detected and forwarded to the TNT SLP via NNOS. As a result of a takeback being detected, the NGS is commanded to break the bridge between Party A and party C, as indicated at step 888. The TNT SLP forwards a Break Bridge command to the CLP for forwarding to the NGS NNOS Agent via the LLPO. Along with the command is the line identifiers of the Party A and Party C lines that are to be affected. When the command is completed, the NGS NNOS Agent sends a command complete notification to the LLPO for forwarding to the TNT SLP via the CLP the notification indicating that the bridge between Party A and Party C has been broken. Party A is now returned back to the menu route of the TNT SLP.

Finally, as indicated at step 889, the NGS is commanded to play messages to the originating line and collect digits in the manner as described herein. In the request, the line identification, the voice file addresses and the call identification are sent including commands such as: Play Menu Route w/cutthru and Collect DTMF w/a timeout. In the manner as described herein, the NGS NNOS Agent sends the collected DTMF Digits to the LLP for future forwarding to the TNT SLP via the LLP and CLP. The DTMF Digits represent the menu option selected by the caller.

The EVS TNT scenario is now ended at this point. Party A has initiated a takeback and is now played the main menu message. This scenario loops back to step 856, FIG. 23(*a*) where the caller can enter any option off of the menu.

In addition to the 18C and advanced collect call services described herein, the NGIN supports the following additional services, including, but not limited: 1) 900 Service, i.e., upon receiving 900 calls, NGIN decides whether the 900 service provider is local or national. If it is local, the call is routed to the service provider CPE. A special rate will be applied to the caller. If the service provider is national, the call is routed to the long distance carrier of the service provide to further call routing; 2) Find me/Follow Services, i.e., an address is assigned to a particular subscriber and that subscriber may change the destination associated with that address. IN this manner, NGIN allows a subscriber to receive calls as they move locations; 3) Abbreviate Services, i.e., translating subscriber=s abbreviated dialing digits into a valid NANP digits and routing the call accordingly. The subscriber may specify the length of the abbreviated dialing number, and number of total abbreviated dialing numbers. The subscriber may also change the abbreviated dialing number by interaction with the system through DTMF tones; 4) Advance Call Waiting Services, i.e., extending the call waiting feature by delivering caller ID to the called party via special user terminal or, playing the caller=s name; 5) Advanced Fax Service, i.e., forwarding the fax according to the Forward List having, for example, TOD/DOW options; 6) Advanced Voice Mail Services, e.g., Voice Mail services with advanced features, such as integrated fax mail box, voice mail message indication through special tone when the subscriber picks up the phone, or paging, delivering voice mail to an address or, a list of addresses; 7) Anywhere Call Pick-up Services, i.e., combining conventional paging services with network based capabilities for completing calls. The calling party is given the option of paging the subscriber, entering some indicator via DTMF input to inform the subscriber who is calling (e.g. pre-assigned number or code), and wait for the subscriber to be connected to the line. As an option, the service platform may pass along the calling number of the calling party for display on the subscriber=s pager screen; 8) One Number Service, i.e., providing a single number for a business customer for all the service locations across the country. The user dials the number, and the call will be routed to a location nearest to the caller based on the calling party=s originating location; 9) Single Number Service, i.e., a combination of Find-Me and Follow-Me services; 10) Voice Activated Dialing Services, i.e., a subscriber may speak a word or a phrase to make a call instead of dialing digits on the phone pad. To enable the service, the subscriber is required to create a voice dialing list and do the following: first, record the names of the frequent called numbers; secondly, associate the recorded name with a called number; and finally, send the voice dialing list to the service provider=s database. Then, the subscriber may use the voice dialing list to originate calls by saying a name that is on the voice dialing list. It is understood that the subscriber may change the content of number list any time; 11) Voice Activated Corporate Directory Services, i.e., a feature working in conjunction with Centrex service to provide automated access to any station within the corporate campus. The system prompts the caller for the name of the party to be accessed and terminates the call to the party requested; 12) Voice Activated Network Control Services, i.e., by dialing *feature code, a subscriber may activate or deactivate a certain feature, such as call waiting, by giving voice instruction to the system; 13) Voice Activated Premier Dialing Services, i.e., enabling commercial customers to put their company=s name in the voice activated dialing list. For example, a hotel chain may put its hotel name or location in a voice activated dialing list. When a caller calls the hotel reservation service, the caller may speak the name of the hotel and the location of the hotel. In response, the call will be routed to the designated hotel and the specified location; 14) Vnet Work At Home Voice Services, i.e., assigning to employees who work at home a business number to their home phone. Thus, when the employee makes a business phone, they may use the Vnet service by dialing a *feature code prior to the Vnet number. The network will access the Vnet dialing plan of the customer and translate the number to the Vnet termination. The call will be charged to the Vnet business customer automatically. When an incoming call is received, a distinctive ringing will be applied to alert the user of a business call; 15) Who Called Me Services, i.e., storing in the network all the phone calls to a subscriber that were not answered. The subscriber may browse through all the stored phone calls. The calling party name may be spelled out to the customer if requested; 16) Prepaid Card Services, i.e., enabling an end user to purchase a PrePaid calling card and make long distance calls with the card. An access number is assigned to the service. The caller may be prompted for the card ID after greeted by the system. If any units equivalent to the prepaid money are still available on the card, the caller will be allowed to make long distance call. The units are depleted while the conversation is going on, and when the units are used up, the caller will be disconnected. The user has the option to recharge the card with any commercial credit card. Customer service and operator service may also be provided; 17) Automated Customer Name and Address Services, i.e., dedicating a special service access number for callers to check the name and address associated with any directory number. The system will prompt the caller for the directory number to be checked and play back the name and address associated with the number; 18) Automatic Call Back Incoming Services, i.e., providing a memory of those calls not answered by the subscriber. The subscriber may decide to call back any of the not answered call by browsing through the list of calling party numbers and indicating to the system the one to be dialed through DTMF tone. This feature can be accessed through * feature code; 19) Call Forwarding Busy/No Answer Services, i.e., forwarding a call on Busy or No Answer condition either to another directory number or to a voice mail box. The subscriber may change the forwarding number plan; 20) Call Waiting Services, i.e., providing a tone indication of an incoming call to the subscriber while another conversation is in progress. The subscriber may choose to ignore or receive the call by hook flash; 21) Calling Name Delivery Services, i.e., enabling a subscriber to receive, with a special terminal, the calling party name/number when an incoming call is in alerting stage. If the call is not answered, the calling party number/number will be stored in the terminal for later use; 22) Find-Me Services, i.e., assigning a phone number to a subscriber, not a terminal. A single number consolidates all current contact numbers such as home, office, mobile, pager, etc. to make the subscribers readily accessible to associates, customers and family. The subscriber is provided with a Find-Me List which consists of home, office, mobile, pager, voice mail or fax numbers. When there is a call to the subscriber, Find Me Feature directs the calls to the termination according to the Find-Me List. If the call is not answered by any of the termination specified in the Find-Me List, the call will be sent to subscriber=s voice mail box; 23) Follow Me Services, i.e., allowing the Find Me feature subscriber to manipulate the Find Me number list, e.g., to change the order, number, schedule (TOD, DOW) etc.; 24) supporting the automatic recall function; the automatic reverse charging function, the calling number identification restriction function, the message waiting notification function, the mobile access hunting function, the preferred language, the remote feature call, the three-way calling, the ability to broadcast services with/without user individual presentation control, supporting directory services capabilities, supporting computer-based training services, supporting entertainment on demand, games and contests, supporting information gathering and archiving-warehousing, support multimedia archive access, supporting pay per view for special events, support programming packaging, support shopping, targeted advertising, targeted entertainment, targeted news, video on demand movies, and video cam recorder capabilities online.

A preferred implementation of an Operator Service system implemented in the IDNA/NGIN system of the present invention is now described.

In accordance with the present invention, an operator is a resource, and is assigned certain capabilities which may refer to a certain type of call that the operator is trained to handle, such as calls for a particular service (e.g., 1-800-COLLECT) or calls for a particular customer (e.g., a large commercial bank). An operator typically is assigned one or more capabilities, with each single capability assigned to an operator being considered a single resource. In addition, the operator may be assigned a skill level for each capability. For example, a skill level of "2" may indicate the operator is fully trained to handle calls for that service, while a skill level of A1" may indicate the operator is partially trained and is to be used as backup for that service.

The NGIN operator services method and architecture offers available resources to calls in queue, preferably by invoking two processes in parallel. In a first process, a call is placed in a queue according to the type of resource it needs. In the other process, available resources are offered to calls in a queue.

Figure 25:
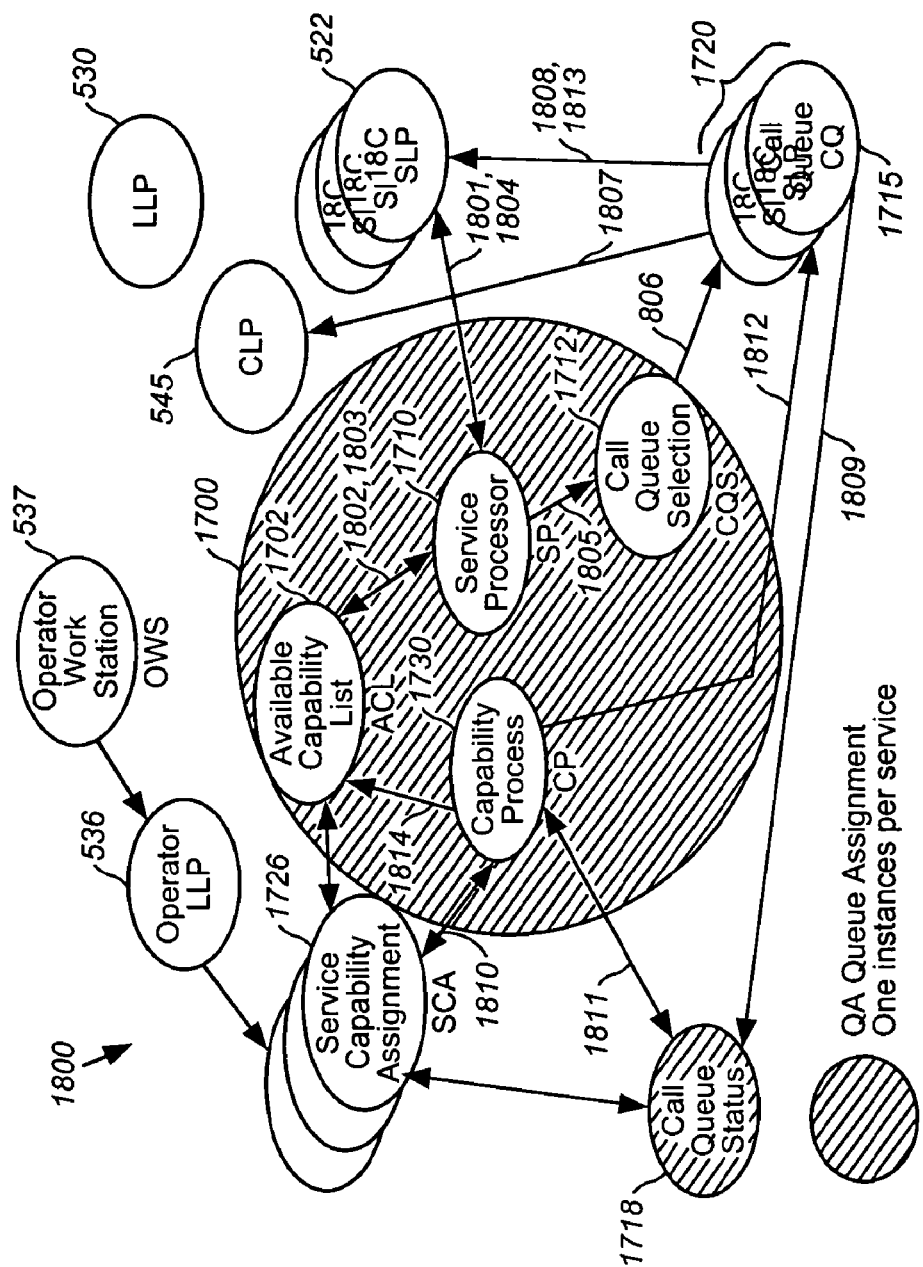
FIG. 25 illustrates the Operator and Call Center Service process architecture 900 for an NGIN system node.

As shown in FIG. 25, an operator service system architecture 1800 for the NGIN system is embodied as service logic programs (SLPs) executing in a service control local execution environment (ASLEE@) provided at a service node. The exceptions are LLPs 530, which may execute in a SLEE 450 that is functionally part of a resource complex (switch network, NGS) and, Operator LLPs 536 which are software applications executing on an Operator Workstation OWS 537. Although an operator workstation may comprise a standard PC that does not support a SLEE, the OWS application process 537 readily interfaces with NGIN SLEE 450 processes, such as the Operator LLP 536, via standard messaging, for example, such as provided through NOS. It should be understood that it is not necessary that operator centers be NOS compliant. For example, a standard telephony interface through a gateway conversion to an LLP supporting call termination to call centers may be provided.

The operator service logic object programs are divided into two groups: 1) a Queue Assignment group and 2) a Capability Assignment group. As will be explained with reference to FIG. 25, the Queue Assignment group comprises a logical group of processes (sub-components) for handling the queuing associated with assigning an operator to a request for an operator service; checking if resources are available for handling the requested operator service and if none are available, assigning calls to queues. As will be described in greater detail, included within a Queue Assignment component 1700 are the following sub-components: an Available Capability List ("ACL") 1702, a Capability Process (ACP@) 1730, a Service Processor ("QA_SP") 1710, and, a Call Queue Selection ("CQS") 1712. It should be understood that numerous Queue Assignment components may be established and are service based. The Capability Assignment group comprises processes for equating an operator to a set of resources, ascertaining which resource capability is needed (based on business rules) and placing the desired resource address having the requested capability in a queue determined to need that resource when that resource becomes available, as will be described in greater detail herein.

In the preferred embodiment, one or more instances of the following Queue Assignment (QA) group processes is provided for each service type in the NGIN network:

The Service Processor sub-component 1710 (QA_SP) is an object instance that: 1) receives operator resource requests from SLPs, these resource requests including a list of the operator capabilities required, e.g., 1-800-Collect and English speaking, etc.; 2) queries the Available Capability List sub-component 1702 to see if an operator is available that has the specified capabilities to handle the call; 3) receive query responses from the Available Capability List sub-component indicating if an operator resource is available to handle the call, and, if an operator resource is available, forwards the physical address of the operator station to the requesting SLP. If an operator resource is not available, the Service Processor sub-component forwards the operator resource request to the Call Queue Selection sub-component 1712 for assignment to a Call Queue sub-component. For example, as shown in FIG. 25, the Service Processor sub-component 1710 receives requests for services from specific SLPs, e.g., the 18C SLP 522 and queries the ACL 1702 to determine if an operator resource is available to receive the call. If no resources are available, it passes the request to an instance of the call queue selection object 1712 for assignment to a call queue. Preferably, the Service Processor 1710 is a persistent object that runs actively beyond processing a single call request.

The Available Capabilities List (ACL) process 1702 is a static sub-component, preferably embodied as an object program, that is always instantiated and not destructed when service processing is complete. It functions to maintain a list of the available operator capabilities and their associated lines within a Queue Assignment component. The Available Capability List sub-component: 1) maintains a list of available operators, their capabilities and their physical addresses; 2) responds to queries from the Service Processor sub-component 1710 regarding available operators; 3) receives available operator resource information from the Capability Process sub-component 1730; and, 4) returns available operator resources back to the Service Capability Assignment sub-component 1726 upon expiration of a timer indicating that the operator has remained idle for too long.

The Call Queue Selection instance sub-component 1712: 1) receives operator resource requests from the Service Processor sub-component; 2) selects a call queue (CQ) 1715 to handle a request for operator services if an available operator is not currently available to handle the request; 3) determines which Call Queue sub-component shall receive the operator resource request; and 4) forwards the operator resource request information to the selected Call Queue sub-component for placement in a queue. Preferably, the Call Queue Selection sub-component is a static sub-component that is always instantiated and not destructed when service processing is complete.

In the preferred embodiment, as shown in FIG. 25, the Call Queue sub-component 1720 comprises one or more Call Queues 1715, each of which is a logic program that maintains the queues of calls awaiting an operator and are established based on service and operator capabilities. Preferably, the Call Queue 1715 is a static sub-component 1715 that is always instantiated and not destructed when service processing is complete. Particularly, each Call Queue instance: 1) maintains multiple queues of calls awaiting specific operator capabilities; 2) is responsible for placing calls on and off queues; 3) registers its address with the requesting SLP and its associated CLP once the call is placed in a queue; 4) status its call queues in terms of number of calls in queues and the average hold time in queues; 5) receives available operator resource indications from the Capability Process sub-component; 6) forwards a routing response (including the available operator=s address) to the requesting SLP once a call is taken off of the queue; 7) receives a hang-up notification from a CLP in the event that a caller currently in a queue has hung-up and, upon receipt of a hang-up notification from a CLP, deletes the call off of the queue. It should be understood that a Call Queue instance may be accessed by more than one instance of a Queue Assignment group, and a single instance of a Queue Assignment group can access multiple Call Queues. For example, for a 18C service 522, there may be one Queue Assignment group, but multiple Call Queues, e.g., one Call Queue for each different language in which the service is offered. There may additionally be multiple Call Queues (for a single service) for different geographical regions of call origination, if this is a criteria for call routing.

The capability process (CP) 1730 is an object program that: 1) receives available operator resource indications from the Service Capability Assignment sub-component 1726; 2) queries a call queue status data store 1718 to determine if any of the Call Queue sub-components are requiring the operator resource with the specified capability; 3) if the operator resource is required by a Call Queue sub-component, forwards the operator resource indication to the Call Queue sub-component that is to receive the available operator resource; and 4) if the operator resource is not required by a Call Queue sub-component, forwards the operator resource indication to the Available Capability List sub-component. The Capability Process sub-component 1730 additionally sends information to the Service Capability Assignment sub-component 1726 regarding the need for specific operator resources. Preferably, the Capability Process sub-component 1730 is a persistent object that runs actively beyond processing a single call request.

The following processes and functional components included in the Capability Assignment group include: the Operator LLP 536 which is a line logic program that executes within the SLEE for maintaining the state of a communications line associated with an operator and the operator's capabilities; and, the Service Capability Assignment (SCA) process 1726 that assigns available resources to various services based on current system demands and processing rules. Preferably, there is one Operator Line Logic Program for an operator line which program is instantiated when the operator signs on and remains running until the operator signs off. It functions to notify the Service Capability Assignment sub-component when the operator line is available to take another call. As previously mentioned, the OWS instance 537 is an operator workstation application that does not necessarily execute in a SLEE, but interfaces with an associated Operator LLP that does execute in a SLEE.

The Service Capability Assignment process 1726 selects operator capabilities (resources) based on demand and business rules, and offers them to Queue Assignment. Particularly, the Service Capability Assignment 1726 is a static sub-component that: 1) assigns available operators to various services based on current system demands and processing rules; 2) determines which Queue Assignment is to receive an available operator resource taking into consideration current system demands and operator capability; 3) supports multiple Queue Assignment components; 4) receives available operator resource information from the Available Capability List sub-component 1702 for re-assignment to a Queue Assignment; and 5) receives notification from the Operator Line Logic Programs that an operator is available to take a call. Preferably, the Service Capability Assignment sub-component is always instantiated and is not destructed when service processing is complete.

An example of the Operator and Call Center system 1800 provided in the NGIN service control architecture is now described with respect to FIGS. 25 and 26(*a*)–26(*g*):

In the example, it is assumed that an SLP executes in accordance with NGIN Service Control system as described herein. In the example shown, an SLP for 1-800-COLLECT service (18C) 522 is executing. During execution, the caller may request an operator by hitting the "0" key, for example. The 18C SLP 522, in response, invokes the Service Processor object 1710 for the 18C service. As an example, the 18C SLP 522 may request a capability (18C operator—English speaking) from the QA_SP 1710. This is indicated at step 1801 in FIG. 25. More particularly, the 18C SLP 522 invokes the Service Processor, and provides the Service Processor with a call identifier for the call for which an operator service is being requested. In response, the Service Processor 1710 queries the ACL instance 1702 to determine if a resource (an operator with 18C capability, e.g., English speaking) is available as indicated at step 1802 in FIG. 25. That is, the QA_SP forwards the request for a specific capability to the ACL to see if there is currently an operator in the network who is free and can handle the request. The steps 1841–1847 in FIG. 26(*a*) describe the process for performing the 18C QA lookup, and particularly, describes the steps that the 18C SLP may perform in locating the operator resource that the originator of the call has requested. In the step 1848 depicted in FIG. 26(*b*), the 18C SLP requests a resource/capability (i.e., an Operator) from the QA 1700. The QA, in response, will return the line information required for the 18C SLP to start the process of terminating to the operator line. It is assumed that the initial query from the 18C SLP contains the address of the SLP and the associated CLP.

An example implementation for performing the QA_ACL location lookup is depicted as process steps 1849–1857 as shown in FIG. 26(*c*). The QA_SP 1710 forwards the request for a specific capability to the ACL 1702 to see if there is currently an operator in the network who is free and can handle the request. As shown at step 1857 in FIG. 26(*c*), a determination is made as to whether the requested capability is currently not free, indicating that the request will have to be placed on a Call Queue (CQ).

If a resource is available, e.g., there is an operator in the ACL list 1702 who has been assigned the requested capability, the ACL instance 1702 provides the QA_SP 1710 with a line identifier (i.e., a network termination address) for that resource (operator) who has been assigned the requested capability as indicated at step 1803 in FIG. 25. Additionally, the operator is removed from the ACL. The Service Processor 1710 then passes this to the 18C SLP, and instructs the 18C SLP 552 to route the call to that resource, as indicated at step 1804 (FIG. 25).

If it is determined by ACL 1702 that no resource is available, e.g., there is no operator having the requested capability, the ACL 1702 returns a negative response at step 1803 in FIG. 25. The Service Processor 1710 then sends the call identifier to Call Queue Selection instance 1712 as indicated at step 1805 in FIG. 25. The Call Queue Selection instance 1712 then selects and places the call identifier in the appropriate Call Queue 1715 as indicated at step 1806 in FIG. 25.

FIGS. 26(*d*) and 26(*e*) depict in greater detail the Call Queue Selection (CQS) location lookup with steps 1858–1863 (FIG. 26(*d*)) describing the steps implemented by the QA_SP for sending a request to the QA_CQS to place the call on a Call Queue, and steps 1864–1871 (FIG. 26(*e*)) describing the Call Queue (CQ) location lookup process implemented by the QA_SP for placing the current call on a Call Queue.

It should be understood however, that the actual call is physically held at the NGS resource or switch, for example, at which it originated, and a placeholder for that call (the call identifier) is placed in the software queue (Call Queue). Preferably, the selection of the call queue is based on business rules that are part of the Call Queue Selection logic program. These business rules take into account and apply various criteria when selecting a Call Queue. For example, Call Queues may be partitioned based on point of call origination. In this instance, calls are placed in a Call Queue 1715 where they may be routed to the "nearest" (in terms of network efficiency) call center. Other criteria may be based on current queue levels and wait times, call center loads, call center preferences, time of day and day of week algorithms, etc. Once the call is queued in the call queue instance 1715, it sends a message to the CLP 545 for that call, indicating that the call has been queued. This is indicated at step 1807 in FIG. 15. More particularly, the CQ 1715 registers its address with the CLP 545 just in case the caller hangs up and the capability request needs to be purged from the CQ. Additionally, the CQ registers its address with the 18C SLP instance 522, as indicated at step 1808 and, updates its status information in a Call Status Queue 1718, as indicated at step 1809. Preferably, the Call Status Queue 1718 is notified of the CQ's running state, for instance, how deep are its queues filled, what is the average hold time, and, eventually, a notification of when the queue is empty.

It should be understood that at this point, there is no activity as far as processing of the 18C call is concerned. The operator service system is waiting to be notified that an operator resource has become available which has the requested capability.

When an OWS instance 537 becomes available, the associated Operator LLP 536 detects this and notifies the SCA instance 1726. As described, SCA instance 1726 is the instance responsible for assigning the available operator to a certain Queue Assignment for a service. The SCA and Operator LLPs run independently of any Queue Assignment group, and can interface with multiple Queue Assignment groups 1700. Because an operator may be available for more than one type of service, and therefore, more than one Queue Assignment, the SCA applies business rules to determine to which service the operator should be assigned. Business rules implemented in the SCA 1726 dictate how resources are assigned to services (services map to a Queue Assignment group). In the preferred embodiment, these rules may be based on available operator capabilities, skill levels, contractual agreements, time of day and day of week algorithms, current call queue levels, and a number of other criteria. As an example, intelligent network service provider and current assignee of the invention, MCI/Worldcom, may have a contract with a customer, e.g., Commercial bank A, for providing customer services for Commercial bank A, which states that a certain number of operators that are primarily assigned for 18C calls will be provided for Commercial bank A calls. Thus, if there are no calls in the 18C Call Queue when an operator becomes available, that operator will be assigned to the Commercial bank A Call Queue.

Figure 30A:
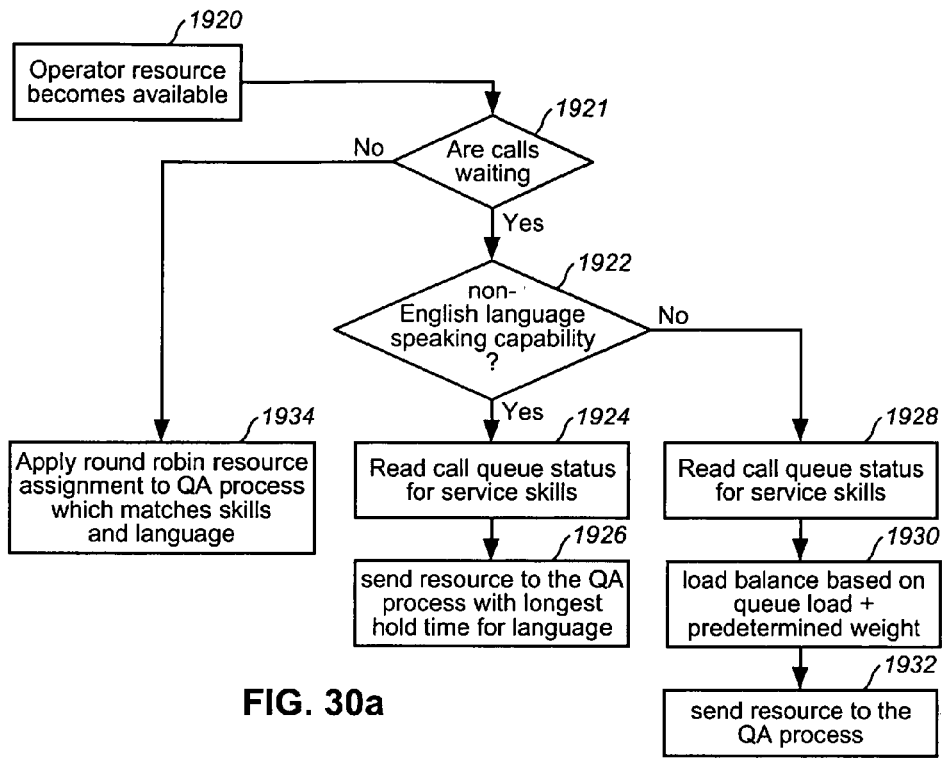
FIGS. 30(a) and 30(b) depict application of business rules for assigning operator resources to waiting calls.
Figure 30B:
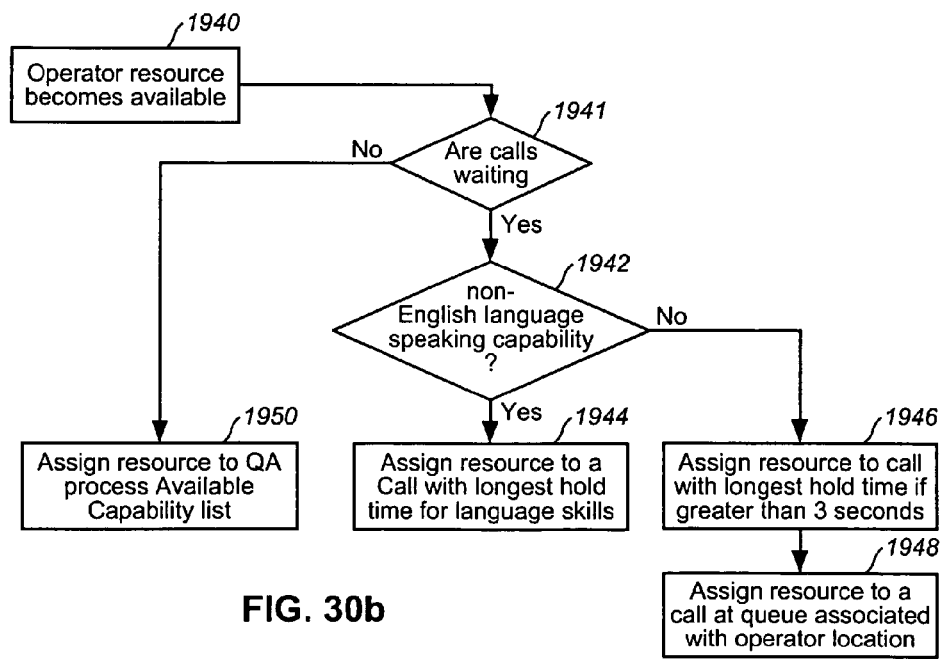

More generally, FIG. 30(*a*) illustrates an example application of business rules implemented by the service capability assignment process 1726 (FIG. 25). These rules may be implemented to determine, for instance, which service to give an available operator resource. As shown in FIG. 30(*a*), a first step 1920 is a determination that an operator resource has become available. This operator resource, for example, may have the following capabilities: it may know English and French languages; it may have 1-800-collect service skills, or, it may be qualified for general operator services, and the resource may be located in the Northeast.

At step 1921, a determination is made as to whether there are calls waiting. If there are calls waiting a determination is made as to which QA call waiting process to send the call to.

As indicated at step 1922, this involves determining whether the newly available operator resource has a non-English language speaking capability. If the operator resource does have a non-English language speaking ability, then at step 1924, a determination is made as to the status of calls requiring service skills such as 1-800-collect or operator services in the call queues of the respective QA processes. This is accomplished by querying the call queue status process 1718 (FIG. 25). Then, at step 1926, the operator resource is sent to the QA process having the longest hold time for the call waiting for an operator with that non-English language skill, e.g., French. If, at step 1922, it is determined that the operator resource has only an English language speaking capability, then the process proceeds to step 1928 where a determination is made as to the call queue status for operator service skills such as 1-800-collect, or operator services. Then, as indicated at step 1930, a rule may be implemented to achieve a balance of the call weighting queue loads according to pre-determined weights. For example, it may be desirable to have five percent (5%) more operator resources assigned to calls placed in call queues waiting for general operator services, as compared to, for instance, assigning them to calls in call queues waiting for 1-800-collect services. Then, once the QA process to receive the operator resource is determined, the resource is sent to that QA process. If, at step 1921, it is determined that there are no calls waiting, then at step 1934, a round-robin resource assignment may be performed such that the operator resource is assigned to the QA process matching the skills and language capabilities of the available resource.

With further reference to FIG. 25, the SCA 1726 queries the Capability Process 1730 of a Queue Assignment group 1700 to determine Call Queue levels as indicated at step 1810. Steps 1881–1888 of FIG. 26(*f*) describe the QA_CP location lookup process in greater detail. The SCA forwards to the Capability Process (CP) that an operator with a specific assigned capability has become available (step 1888, FIG. 26(*f*)).

Referring back to FIG. 25, the CP 1730, in turn, queries the Call Queues 1715 via the intermediary of the call queue status instance 1718, to see if any call is requesting the capability that has just become available, as indicated at step 1811. As mentioned, the call queue status instance 1718 knows the current status of each Call Queue. Thus, for example, the SCA 1726 may use current Call Queue levels as a criteria when applying its business rules. If an available operator has two or more capabilities assigned, the SCA queries the Capability Process of each Queue Assignment associated with those capabilities, in a sequence that is dictated by the SCA business rules. For example, if an available operator is assigned to handle both 18C calls and Commercial bank A calls, the SCA business rules may dictate that the SCA query the Capability Process for 18C first. If no calls are in queue for 18C, then the SCA 1726 may assign the operator to the Commercial bank A Capability Process.

FIG. 26(*g*) depicts the process steps 1889–1897 invoked for performing a lookup in the Call Queue Status to determine if the operator capability which has just become free is currently waiting in a Call Queue. For purposes of explanation, it is assumed that there is a request on a call queue for the newly available operator resource.

After applying its business rules, the SCA instance 1726 assigns the available resource to a service by sending an identifier for that resource to the Capability Process 1730 of the service's Queue Assignment. Particularly, the CQ receives the physical address of the capability to connect the call. The CP 1730 then assigns the resource to a Call Queue as indicated at step 1812 in FIG. 25.

If there is a call in that Call Queue, then the Call Queue process sends a message to the SLP, in this example, the 18C SLP 522. This message assigns the resource to the call and as indicated at step 1813 with steps 1808 and step 1813 representing the confluence of the two processes. In response, the 18C SLP routes the call to that operator resource by including the operator's network termination address in its service response message that it sends to NGS. It should be noted that the SLP may need to communicate with the operator LLP, so the operator's network termination address is additionally sent to the SLP so as to eliminate any further Name Translations.

Immediately thereafter, the call drops out of the Call Queue and, as indicated at step 1814, the ACL is updated to indicate this resource is unavailable, thus reserving the resource for the call until the call is answered by the operator.

As an additional feature of the operator service system for a distributed intelligent network, a trigger predictive of operator availability may be inserted. As an operator is servicing a call, that operator typically reaches a point at which they (or their OWS application) know they will be soon available, for example, in 30 seconds. A trigger point may be inserted, either into the OWS application 537 which automatically sends a message to the Operator LLP 536, or as a manual option that is selected by the operator and that results in a message sent to the Operator LLP. This message causes the Operator LLP to notify the SCA instance 1726 of the pending availability of the resource. The SCA may then begin the process of assigning the operator to a Call Queue. Thus, by the time the operator is actually assigned to a call in a Call Queue, and that call is routed to the operator, the operator will be available. A timer (not shown) may be set in the SCA to more closely coincide the events of the call reaching the operator and the operator becoming available.

In accordance with the NGIN method of the present invention, available resources are assigned to calls. An available resource is offered to only one Call Queue, preventing any conflicts. The implication of assigning resources to Call Queues by the methodology of the invention is that since Call Queues and SCAs are not part of a Queue Assignment group instance, it is possible for multiple resources to be assigned to a single Call Queue which has only one call. This occurs if the multiple assignments occur within the timeframes needed for Capability Processes to query and report on Call Queue status. If this happens, the first resource that gets assigned to a Call Queue, gets the call. The next resource is assigned to an empty Call Queue. To accommodate this situation, the ACL additionally may include a timer mechanism that is set (e.g., for 5 seconds) and assigned to a resource at step 1814, when the Capability Process 1730 updates the ACL 1702 to indicate the resource is unavailable. If the timer expires before the resource is assigned to a call, the resource is removed from the Call Queue, made available in the ACL, and can then be re-assigned by SCA. If the resource is an operator with only one assigned capability, it may remain in the Call Queue after the timer expires, since it has nowhere else to be assigned.

FIG. 30(*b*) illustrates generally the application of business rules regarding the queue assignment capability service process. As shown in FIG. 30(*b*), the first step 1940 determines that operator resource becomes available. For this example, it is assumed that the operator resource has been assigned to a 1-800-collect QA process. Next, at step 1941, a determination is made as to whether there are calls waiting in the call waiting queue for 1-800-Collect services. If there are calls waiting in the call waiting queues, a determination is then made at step 1942 as to whether there are any calls waiting for operator resources having non-English language speaking capability. If there are calls waiting for these types of operator resources, then at step 1844, the resource is assigned to the call with the longest hold time. If, at step 1942, it is determined that all calls are waiting for English language speaking operator resources, then at step 1946, the resource is assigned to a call having the longest hold time, if it is greater than three seconds, for example. If there are no calls having hold times greater than three seconds, then, at step 1948, the operator resource may be assigned to a call queue associated with the location of the operator resource, for example, in the Northeast location. Alternately, the operator resource may be assigned in a round-robin fashion to other call waiting queues.

If, at step 1941, it is determined that there are no calls waiting for operator services, then at step 1950, the operator resource is assigned to the QA available capability lists 1702, such as shown in FIG. 25.

Figure 27A:
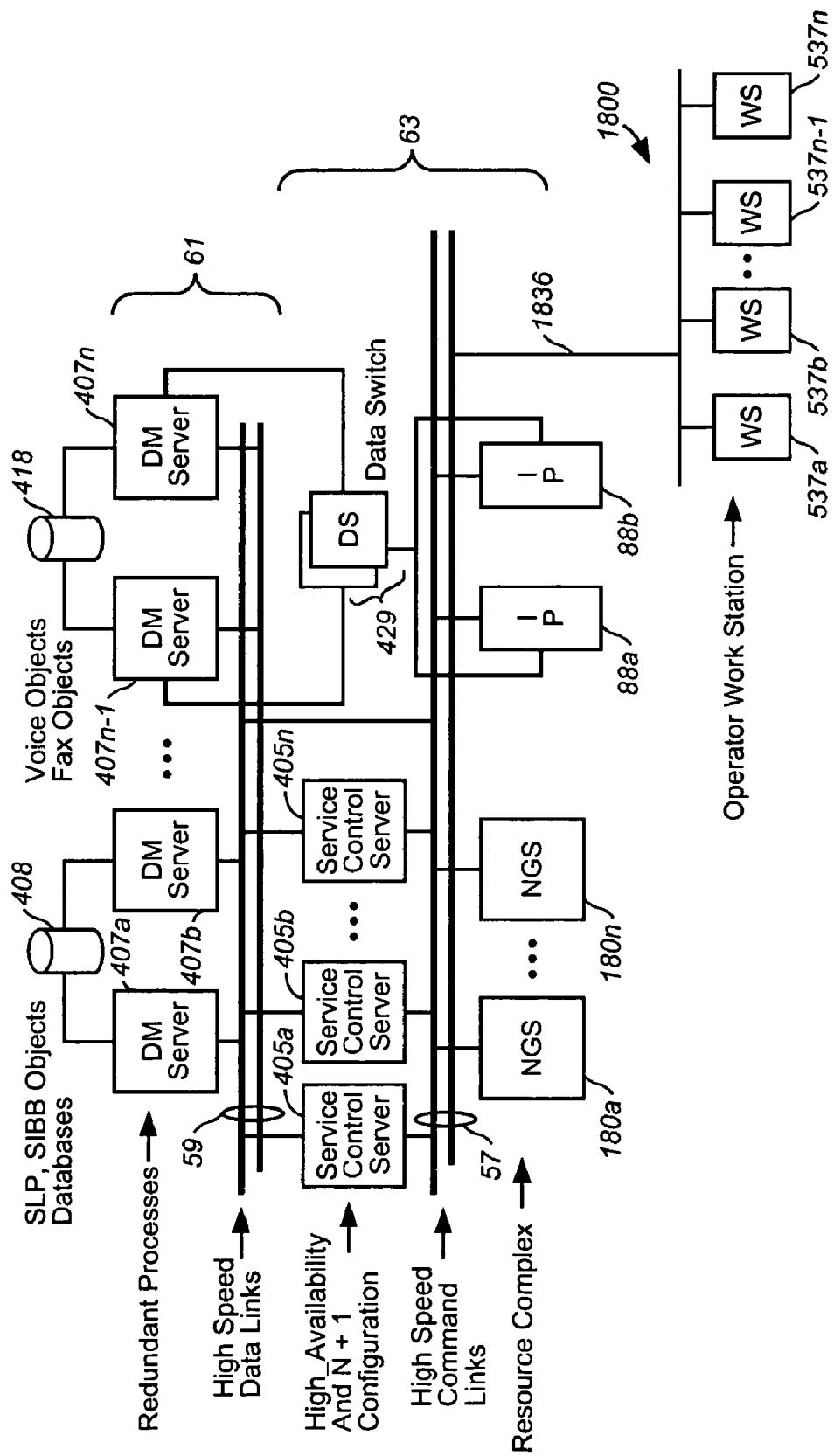
FIGS. 27(a) and 27(b) illustrate the physical architecture of an example NGIN service node 45 incorporating the Operator and customer Call Center service systems.
Figure 27B:
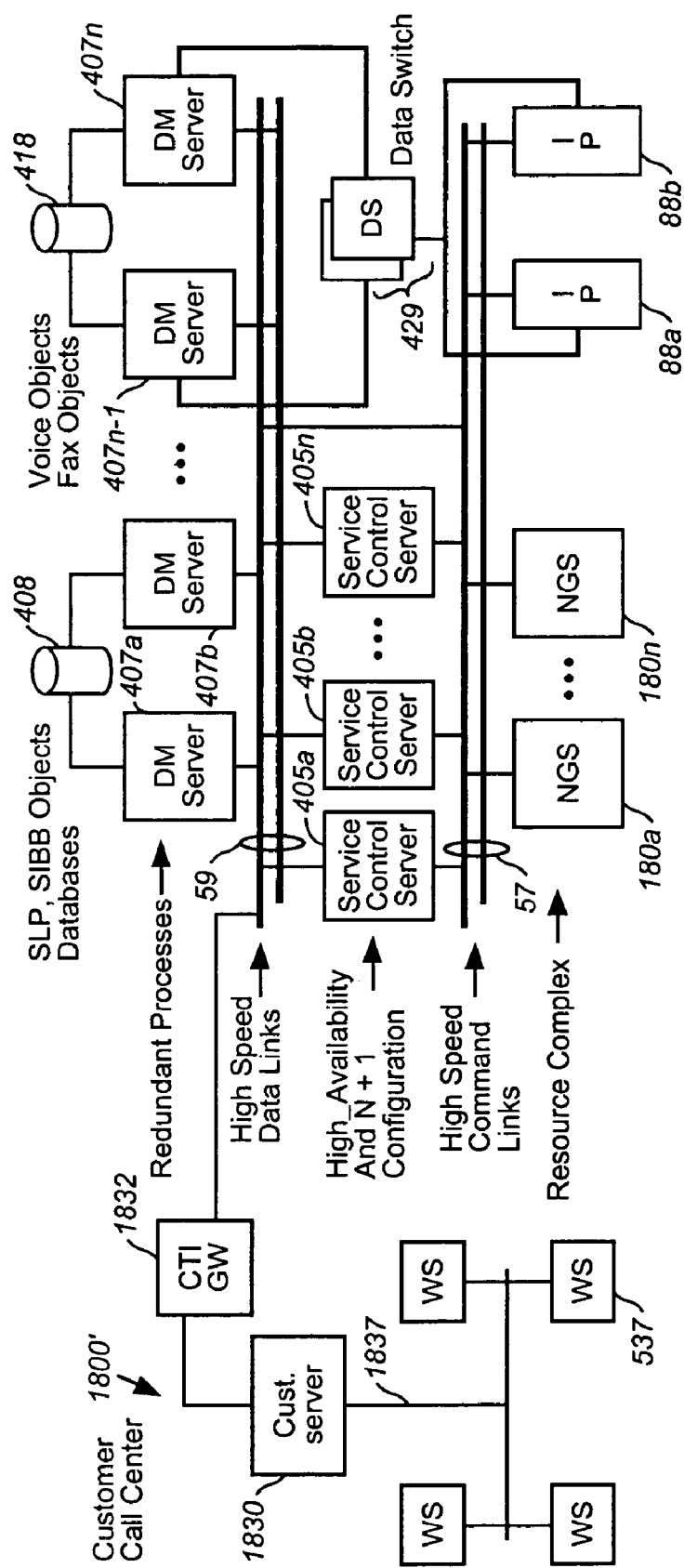

FIGS. 27(*a*) and 27(*b*) illustrate example physical architectures of a service node incorporating Operator and Call Center Services. Particularly, FIG. 27(*a*) illustrates one implementation of the Operator service system 1800 within the NGIN service node 204' depicted in FIG. 16. As shown in FIG. 27(*a*), one or more individual operator work stations 537(*a*), . . . 537(*n*) are shown connected via a LAN 1836 to the high speed wide area network WAN 57.

In an alternate embodiment, shown in FIG. 27(*b*), an Operator and Customer Call Center service system 1800' may be integrated within the NGIN system architecture via an external interface. In this embodiment, one or more operator work stations 537*a*, . . . ,537*n* are connected via LAN 1837 to a customer call center server 1830, which interfaces with high speed data links 59 provided at the NGIN service node via a computer telephony interface device 1832. It should be understood, that operator services and customer call center services may be interfaced with the NGIN system via a T1/FGD interface or an ISDN interface.

It should be understood that, in the context of the Operator and Call Center services, a customer requesting an Operator resource of a particular capability received at a site, e.g., 204', may readily be assigned that Operator resource service having the requested capability as NGIN provides for the inter-process communication between an operator workstation 537, e.g., located at another site 45*a*, and the site at which the call was received.

A scenario describing NGIN's ability to provide a 1-800 Collect service using an Operator Assist option is now described with reference to FIG. 28(*a*). In this scenario, a 1-800 Collect (18C) SLP is used to provide the service. This SLP calls a LIDB Lookup SLP to verify that the called line is billable and a Validate DDD SLP to verify that the DDD entered by the caller is valid. It is assumed that all database and voice files used in this scenario have been built using the Service Creation Environment 228. In this scenario, there are no features on the originating or terminating line (e.g., Call Waiting, Call Forwarding). Furthermore, in describing this scenario, the following assumptions are made: 1) all calls require NGIN services; 2) NGIN determines if originating and terminating line features exist; 3) before NGIN gets the service request from NGS, NGS has created a place to write call context data in Data Management. NGS assigns it a "Network Call ID" which is a name used to identify that space, where NGIN will write information; 4) NGS has also instantiated the Event Logic Program (ELP) which logs all event information into the call context data; 5) NOS connectivity is being used to talk between the SLPs and DM, between DM and the NOS, and between the NOS and the SLPs; 6) SIBBs co-reside in the same libraries as SLPs, thus, there is no need for an SLP to request name translation on a SIBB; 7) New versions of SIBBs are backward compatible with prior versions; 8) The locations and actual names of all voice files used within the service are retrieved at the beginning of the service versus retrieving them at the time they are used; 9) No originating line check is performed on 1-800-Collect calls. That is, any caller from any type of line is allowed to make a 1-800-Collect call; 10) NGIN interface is through the NGS NOS Agent who is responsible for getting the proper resource to handle the request sent from NGIN; 11) The commands sent to the NGS will have a line identifier to allow the association of the line with the command; 12) SLPs may be set up in service creation to: a) always be instantiated b) terminate based on usage/timeout; c) be terminated as a result of a command; and, 13) instantiated SLPs are managed by the SLEE Resource Manager based on usage and time. It should be understood that the steps described in this scenario may be readily extended to support other collect call and BOC (Bell Operating Company) calling card features.

Referring to FIG. 28(*a*) there is provided a first step 1160 for performing feature discrimination on the incoming call, placed, for example, by a Calling Party A such as described herein with reference to FIG. 18(a). This entails instantiation of the FD and then, originating line LLPs, 18C SLP and a CLP (step 1034, FIG. 18(a)), establishing connections between the LLPO, CLP and SLP, and registering the 18C LLP with the NGS NOS agent in the manner described. For example, these steps may include: sending the FD Name from NGS/NOS agent to Name Translation (NT) and including in such a message the called 800#, ANI, Line ID, Network Call ID, and Originating Switch Trunk data (e.g., name=FD). The ELP address is also sent along in this information. Name Translation is then performed by NT to determine the feature discriminator name. It sends that name to DM to get the actual SLP name (e.g. Name=FD.SLP). Assuming that there is a feature discriminator in each SLEE that is always running (persistent SLP), DM 400 sends the actual name of the FD SLP with its stored locations to the Name Translator (NT). NT sends the name to LRM, which determines where the FD SLP is instantiated. The LRM picks a SLEE and returns the address of the SLEE to NT. (SLEE Address). NT sends the message (that came from NGS) to the Feature Discriminator. The message contains all that information that came in originally. A data query is then made to DM whereby the FD SLP, using the data received earlier from the NGS NOS Agent, finds a LLP, a CLP and the SLP. It should be understood that, in other embodiment, rather than looking for these objects through NOS NT, they may be made readily available through a dataview, and accessed through a DMAPI. The DM sends back the results of the query to FD with the three SLP names, LLP, CLP, SLP, and using the results of this query, the FD SLP sends the SLP logical names to NT to perform the name translation function and obtain the respective physical locations of the SLPs to execute. This may be done with a single message or three messages performed, e.g., in parallel. NT queries LRM to find out where these SLPs are instantiated with the assumption that LRM may request a SLEE to instantiate if necessary (SLPs may run in different SLEEs). LRM returns actual SLP names with the SLEE addresses.

After instantiation, as indicated at step 1162, the NT sends all data to CLP, including addresses of ELP, LLP and SLP; sends all data to LLP, including address of CLP and ELP; and, sends all data to SLP, including address of CLP and ELP, with connections between the LLP, CLP SLP being established.

Next, as indicated at step 1164, the 18C SLP retrieves the voice/file name for the service. The following steps involve the 18C SLP retrieving the voice files for the service: The 18C SLP sends the logical name of the voice file library to NT for name translation. The NT queries DM for the actual name and location of the voice file library involved in the 18C service. The name is at the library level and the library contains all voice files that could be used in the service. DM returns the actual voice file library name and the addresses of its stored locations to NT which queries the LRM for the availability of the database containing the voice file library. The LRM returns the address of the database containing the voice file library to NT. The physical address of the voice file library is returned to the 18C SLP from NT.

Next, as indicated at steps 1166, 1168 the NGS is commanded to play messages to the originating line. This may include the step of enabling the 18C SLP to send a Play Message request to the CLP for forwarding to the LLP and the NGS NOS Agent. In the request, the line identification, the voice file addresses and the call identification are sent. The commands sent may include: Play Tone, Play Greeting w/cutthru and Collect DTMF w/a timeout. These commands may be concatenated and forwarded as one. Particularly, the CLP forwards the 18C SLP request to the originating LLP and the LLP forwards the Play Message commands and the Collect Digits command to the NGS NOS Agent, as indicated at step 1170. The NGS allocates the appropriate resource and performs the commands in the sequence they are received. The NGS NOS Agent sends the collected DTMF Digits to the LLP for future forwarding to the 18C SLP via the CLP as indicated at step 1172. It should be understood that the DTMF digits represent the operator option, e.g., (0), has been selected.

Figure 28A:
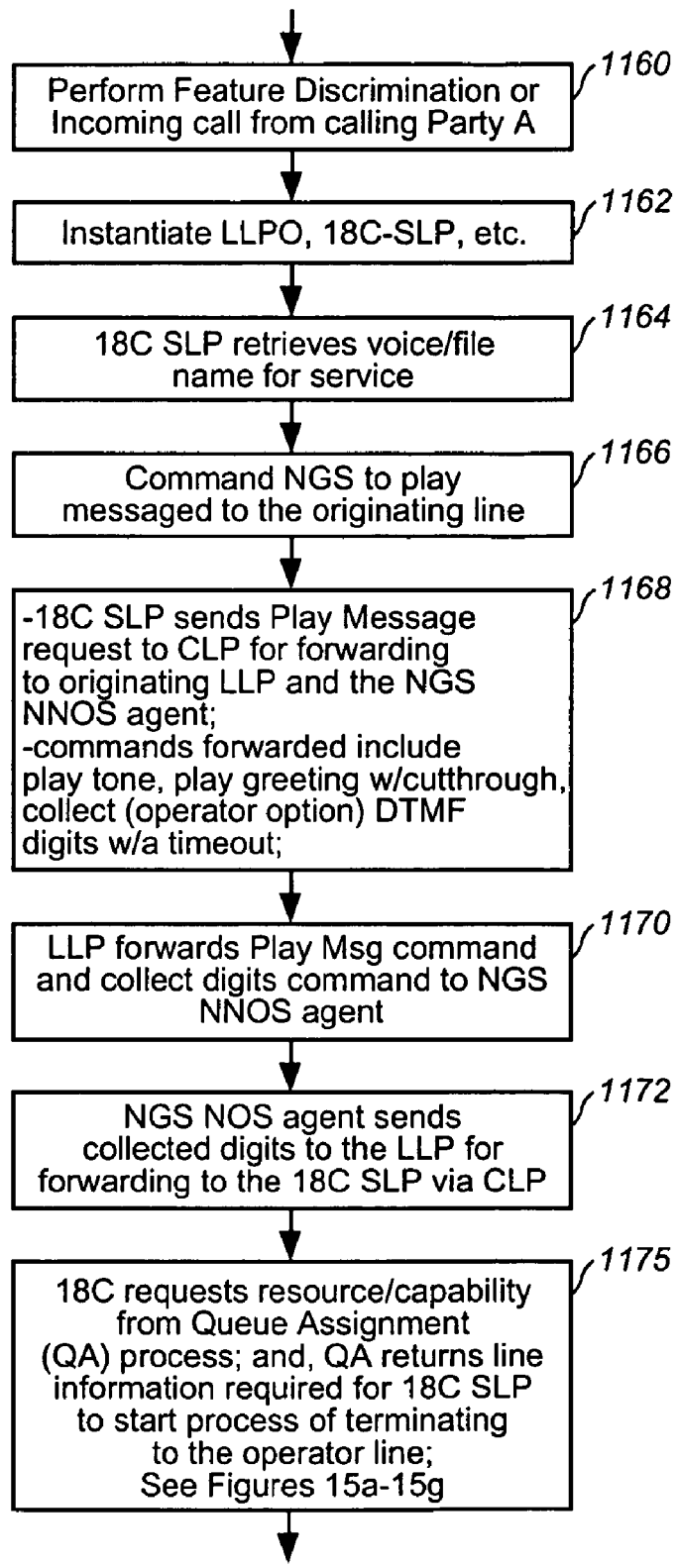
FIGS. 28(a) and 28(b) is a flow diagram depicting an example 1-800 (collect) call operator service process implemented in NGIN.

Next, as indicated at step 1175, FIG. 28(a), and as described in greater detail herein with respect to FIGS. 26(a)–26(g), and FIG. 29, the 18C SLP requests a resource/capability (i.e., an Operator) from a 18C_QA SLP 700 and the QA returns the line information required for the 18C SLP to start the process of terminating to the operator line. After receiving the operator termination, the operator terminating node location lookup is performed as part of an operator line outdial process. This process may entail steps of: enabling the 18C SLP to send the logical database name of the operator termination location database to NT for name translation; enabling NT to request the actual operator termination location DB name from DM and having DM send the actual operator termination location DB name and its stored locations to NT; referring to the LRM to find out if the termination location DB is available locally; and returning the physical DB address to NT; and passing the operator termination location DB physical address to the 18C SLP. The 18C SLP sends a request to DM to look up the operator terminating location (node) and the DM returns the operator terminating location to the 18C SLP. In this scenario, for example, the terminating node is one other than the originating node.

Figure 28B:
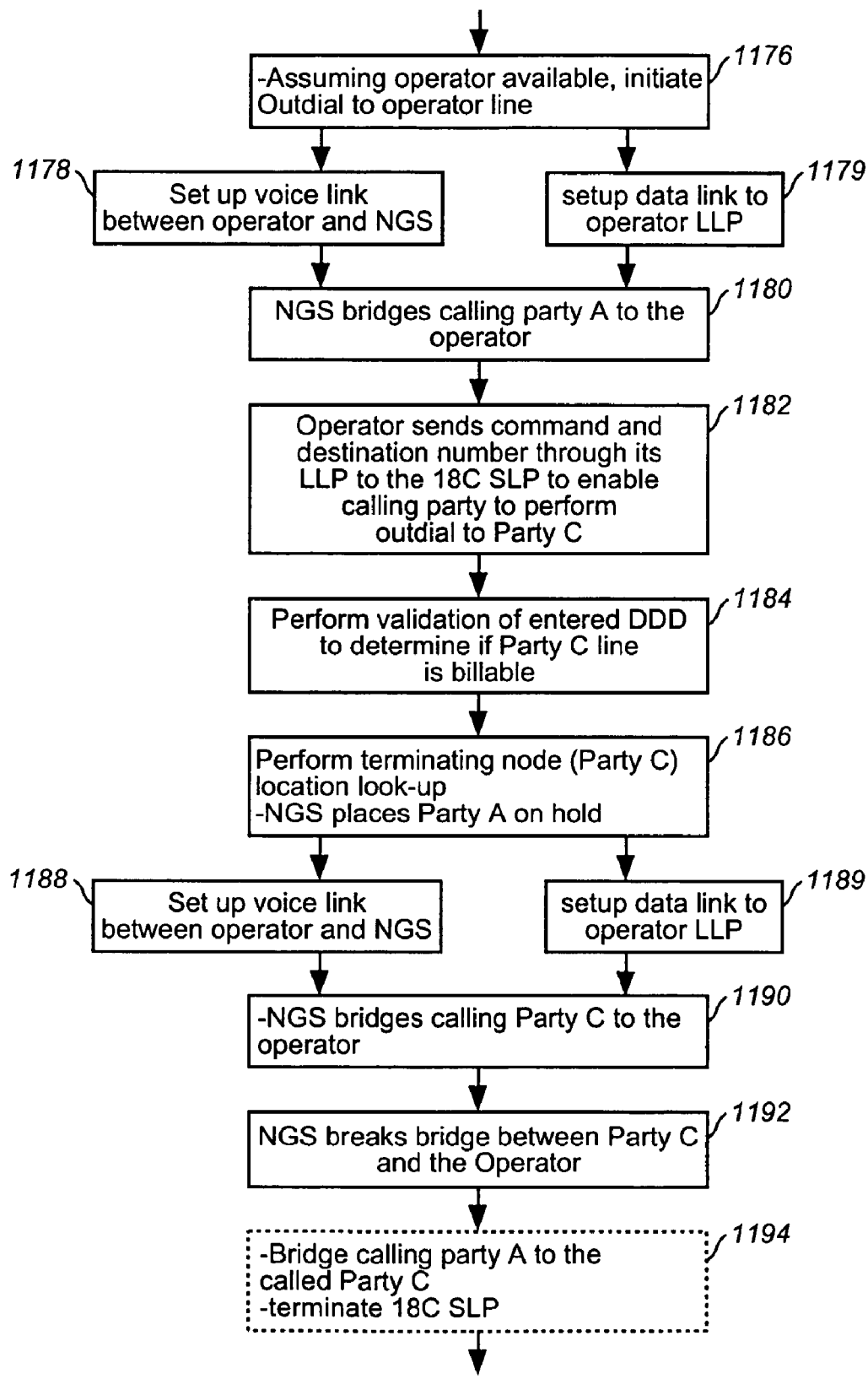

Referring now to step 1176, FIG. 28(b), the 18C SLP forwards an Outdial w/Answer Notification command to the CLP for forwarding to the NGS NOS Agent. The outdial command includes the terminating node information. Since this is a supervised outdial, an indication of busy, no answer, or answer must be sent back from NGS. The 18C SLP remains running.

Two processes are then performed, preferably simultaneously: 1) a process for setting up a voice link between the calling Party A and the Operator, as indicated at step 1178, and 2) a process for setting up a data link between the calling Party A and the Operator, as indicated at step 1179.

With respect to setting up the data link at step 1179, the LLP for the Operator line on the terminating node is instantiated and a lookup of the profile associated with the line is performed in the manner as described herein. For instance, the CLP sends the terminating node location and the logical name of the operator LLP to NT so that it may be instantiated. The operator node location was determined during the lookup prior to the outdial. NT sends the operator LLP logical name to Data Management which returns the actual LLP name plus the addresses of its stored locations. NT queries the resource management (NRS) system to determine if the node to which this call is terminating is up and operational. NRS returns to NT the status of the terminating/operator node. The NT of the local node requests the NT of the remote node to instantiate the operator LLP. The NT on the operator node queries its LRM to determine if the LLP is already instantiated for this operator line. If not, it instantiates the LLP. The LRM at the operator Node returns to NT the SLEE address where the LLP for the operator line is running. The NT of the operator node sends the call data to the LLP of the operator line. The NT of the terminating node sends the address of the SLEE executing the LLP for the terminating line to the NT of the originating node. The NT of the originating node sends the address of the SLEE executing the LLP for the operator line to the CLP. Via database lookup, DM also returns the operator line information to LLP. In this scenario, there are no features on the terminating line (operator).

With respect to setting up the voice link at step 1178, the following steps are performed which include the command for the outdial (Party A to Operator), and the receipt of the answer notification. The CLP forwards the outdial command to the originating LLP and the originating LLP forwards the Outdial w/Answer Notification command to the NGS NOS Agent. The NGS places the outdial. The ELP writes the outdial data to Data Management for formatting and forwarding. The NGS NOS Agent sends an answer notification to the LLP of the originating line and the LLP forwards the answer notification to the CLP which forwards the answer notification to the 18C SLP. The 18C SLP determines that the answer notification is an indication that someone has answered the phone versus an answer machine or other device. A bridge to the caller may now be made.

The next step 1180 in FIG. 28(*b*) commands the NGS to bridge Party A to the Operator and wait for the command from the Operator with the information on who Party A should outdial to. This data is sent through the Operator LLP to the 18C SLP. After the completion of these steps, Party A and the operator may talk, with the 18C SLP still running. Particularly, the 18C SLP forwards a Bridge Parties command to the CLP for forwarding to the NGS NOS Agent. Along with the command is the line identifiers of the lines that are to be bridged (Operator and Party C). The CLP forwards the command to the originating LLP and the originating LLP forwards the Bridge Parties command to the NGS NOS Agent. The NGS NOS Agent sends a command complete notification to the LLP for future forwarding to the 18C SLP. The Command Complete notification is forwarded from the LLP to the CLP which forwards the command to the 18C SLP indicating that the Operator and Party C are bridged.

As indicated at step 1182, the Operator then sends a command through its LLP to the 18C SLP containing the information (e.g., Destination number, etc.) required for Party A to perform an outdial to Party C.

Step 1184 relate to performing a validation of any entered direct dialed digits (DDD) and, performing a LIDB DB lookup on the entered DDD to determine if the line (Party C line) is billable. This, for example, may invoke steps of enabling the 18C SLP to send the logical LIDB SLP to NT for name translation; having NT send the logical LIDB SLP Name to DM and query the NRS to determine the best node that is able to run the LIDB SLP, e.g., based on location and node status. It is understood that through a DMAPI, an SLP may request services or data from DM local cache. NRS returns to NT the selected node and the NT of the local node requests the NT of the remote node to instantiate the LIDB SLP. The NT on the remote node further queries its LRM to determine if the LIDB SLP is already instantiated on this node. If not, it instantiates the SLP. The LRM of the remote node additionally forwards the query data to the LIDB SLP. The query includes the return address of the 18C SLP. The LIDB Answers by first formatting the query data to the appropriate format and forwarding the query to the gateway to the LIDB database. The LIDB query is executed and the result is returned to the 18C SLP.

Next, at step 1186, the terminating node look-up for the called Party C is performed and Calling Party A is put on hold. This may involve, for example, the steps of: enabling the 18C SLP to send the logical database name of the termination location database to NT for name translation; having NT request the actual termination location DB name from DM; having DM send the actual termination location DB name and its stored locations to NT; having NT query LRM to find out if the termination location DB is available locally, and if so, having the LRM send back the physical DB address to NT; having NT pass the termination location DB physical address to the 18C SLP so that the 18C SLP may send a request to DM to look up the terminating location (node) of the DDD entered by the caller and return the terminating location to the 18C SLP. In this scenario, the terminating node is one other than the originating node.

To place the Calling Party A on hold and to perform an outdial requires the following steps: enabling the 18C SLP to forward a "Place Caller on Hold" command to the CLP for forwarding to the NGS NOS Agent. Along with the command is the line identifier of the line that is to be placed on hold. The CLP forwards the command to the originating LLP which forwards the Place Caller on Hold command to the NGS NOS Agent. The NGS places the caller on hold. Afterward, the NGS NOS Agent sends a command collect notification to the LLP for future forwarding to the 18C SLP via the CLP. This indicates to the 18C SLP that the caller has been placed on hold. The 18C SLP forwards an Outdial w/Answer Notification command to the CLP for forwarding to the NGS NOS Agent. The outdial command includes the terminating node information.

The setting up the data link at step 1189, includes the instantiation of the LLP for the terminating line (Party C) on the terminating node and a lookup of the profile associated with the line. This, for example, may involve: enabling the CLP to send the terminating node location and the logical name of the terminating LLP to NT so that it may be instantiated. The terminating node location was determined during the lookup prior to the outdial; having NT send the LLP logical name to Data Management which returns the actual LLP name plus the addresses of its stored locations; having NT query the NRS to determine if the node to which this call is terminating is up and operational; NRS returns to NT the status of the terminating node. The NT of the local node requests the NT of the remote node to instantiate the terminating LLP. The NT on the terminating node queries its LRM to determine if the LLP is already instantiated for this terminating line. If not, it instantiates the LLP. The LRM at the Terminating Node returns to NT the SLEE address where the LLP for the terminating line is running and the NT of the terminating node sends the call data to the LLP of the terminating line. The NT of the terminating node sends the address of the SLEE executing the LLP for the terminating line to the NT of the originating node. The NT of the originating node sends the address of the SLEE executing the LLP for the terminating line to the CLP.

The profile lookup may require the terminating LLP to send a logical database name of the line info database to NT for name translation. NT requests the actual line info DB name from DM which sends the actual line info DB name and its stored locations to NT. NT determines from LRM whether the line info DB is available locally. LRM sends back the physical DB address to NT which passes line info DB physical address to the terminating LLP. The terminating LLP sends request to DM to look up customer terminating line information. DM returns the customer line information to LLP. In this scenario, it is assumed that there are no features on the terminating line.

With respect to setting up the voice link at step 1188, the CLP forwards the outdial command to the originating LLP and the originating LLP forwards the Outdial w/Answer Notification command to the NGS NOS Agent. The NGS places the outdial. As part of this, the ELP writes the outdial data to Data Management for formatting and forwarding. The NGS NOS Agent sends an answer notification to the LLP of the originating line and the LLP forwards the answer notification to the CLP which forwards the answer notification to the 18C SLP. The 18C SLP determines that the answer notification is an indication that someone has answered the phone versus an answer machine or other device.

Next, as indicated at step 1190, the NGS is commanded to bridge the Operator to Party C. This may require the step of enabling the 18C SLP to forward a "Bridge Parties" command to the CLP for forwarding to the NGS NOS Agent. Along with the command is the line identifiers of the lines that are to be bridged (Operator and Party C). The CLP forwards the command to the originating LLP and the originating LLP forwards the Bridge Parties command to the NGS NOS Agent. The NGS NOS Agent sends a command complete notification to the LLP for future forwarding to the 18C SLP. The Command Complete notification is forwarded from the LLP to the CLP which forwards the command to the 18C SLP indicating that the Operator and Party C are bridged.

After the completion of these steps, the Operator and Party C are now in a talking state, Party A is on Hold and the 18C SLP is still running. Assuming that Party C indicates acceptance of the collect call from Party A, the next step 1192 requires the NGS to break the bridge between the Party C and the operator. This may involve, for example, enabling the CLP to forward the command to the originating LLP which forwards a "Break Bridge" command to the NGS NOS Agent; enabling the NGS NOS Agent to send a command complete notification to the LLP for future forwarding to the 18C SLP; forwarding the Command Complete notification from the LLP to the CLP which forwards the Command Complete notification to the 18C SLP indicating that the bridge between Party C and the Operator has been broken.

The following steps instruct the NGS to take the caller (Party A) off hold and bridge the calling party (Party A) and the called party (Party C), as indicated at step 1194 in FIG. 28(*b*). The 18C SLP is terminated after the completion of the bridge between Party A and Party C. First, the 18C SLP sends the "Take Caller off Hold/Bridge Calls" command to the CLP for forwarding to the NGS NOS Agent The CLP forwards the request to the LLP of the originating line which forwards the command to the NGS NOS Agent. Within the command, the lines to be bridged are identified. The NGS NOS Agent sends a Command Complete notification to the LLP for future forwarding to the 18C SLP. This command is forwarded from the LLP to the CLP which in turn forwards it to the 18C SLP indicating that the bridge between Party A and Party C has been made.

The following steps process the call completion: 1) the LLP(s) receive a call completion notification from the NGS NOS Agent at the switch; the LLP forwards the call completion notification to the CLP; the CLP forwards the call completion notification to all associated SLPs which results in their termination. The CLP then terminates. Upon notification of the call completion from the CLP, the ELP writes the call (event logging) information to DM and terminates. That is, prior to its termination, the ELP call detail data which needs to be maintained after the call completes, e.g., for billing and various other purposes, is first stored.

Figure 31A:
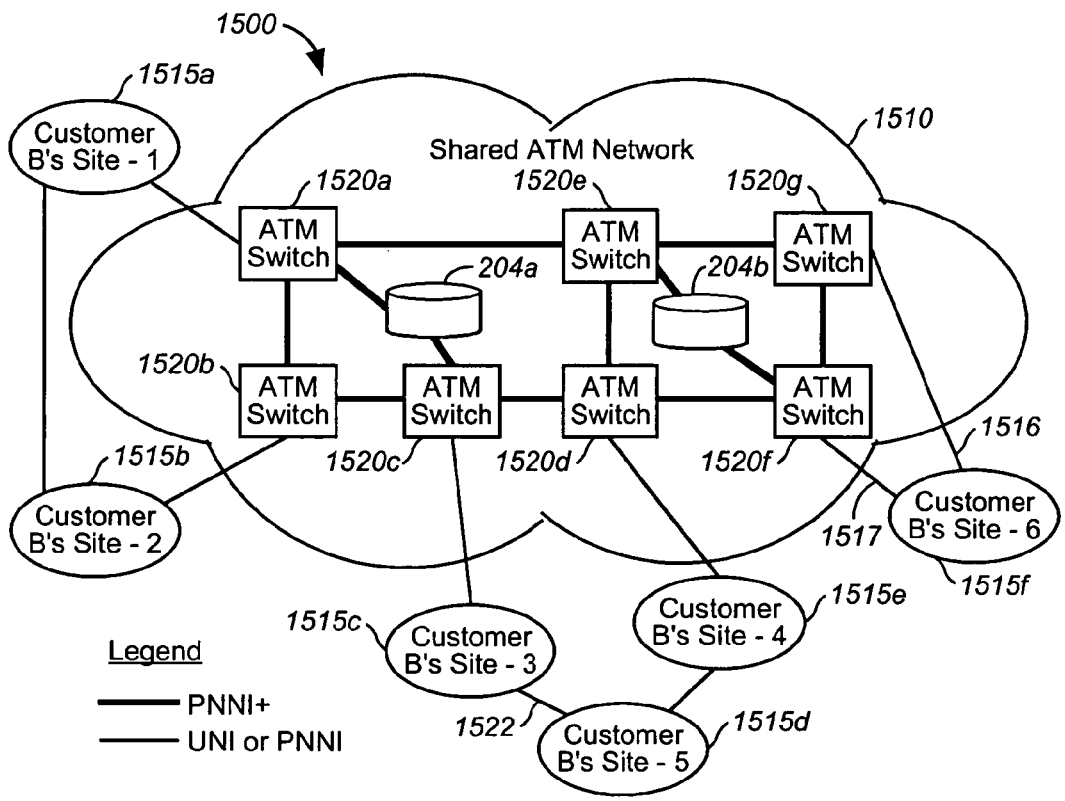
FIG. 31(a) illustrates the basic components of the ATM Virtual Private Network (VPN) Architecture supported by the NGIN architecture of the invention.

The system of the invention further supports Virtual network ("Vnet") and Asynchronous Transfer Mode (""ATM") communications services in an intelligent network. In accordance with standard ATM technology, a shared ATM network 1510, such as shown in FIG. 31(*a*), transfers and routes video, data, and voice traffic in 53 byte fixed-length packets from a source 1515*a* to a destination 1515*f* over a series of ATM switches 1520*a–g* and interconnected links 1516, 1517. The capability of carrying multimedia traffic on a single network makes ATM the preferred technology for B-ISDN services. The Asynchronous Transfer Mode protocol is connection-oriented, and traffic for an ATM "call" is routed as cells over a virtual connection that extends from the source to the destination.

The ATM Virtual Private Network (VPN) Architecture 1500 depicted in FIG. 31(*a*) comprises customer sites, e.g., 1515*a*–1515*f*, resource complexes comprising ATM switches 1520*a*–1520*g*, for example, and the NGIN service nodes, two of which nodes 204*a,b* having an NGS resource complex capable of receiving ATM call events and one or more NGIN service control components (e.g., service control servers executing SLEE's) being provided. Particularly, the SLEEs at each service node execute SLPs for providing Vnet/VPN services over the ATM network, for example and particularly implement ATM shared network functionality as described in commonly-owned, co-pending U.S. patent application Ser. No. 09/128,495 entitled ATM VIRTUAL PRIVATE NETWORKS, the contents and disclosure of which is incorporated by reference as if fully set forth herein. It should be understood that the SLEEs execute SLPs for providing Vnet/VPN services over traditional circuit-switched networks, as well.

In the preferred embodiment, the NGIN system 1000 provides ATM and Virtual Private Data Network Services such as: 1) Source Address Screening providing security for a customers virtual private data network by preventing a caller from placing a calls to prohibited destinations, e.g., to prevent customers from making calls outside of their network; and, to provide internal segmentation of their network, i.e., preventing particular sources from calling particular destinations. With this type of screening, a source is associated with an inclusion or exclusion list of destinations, e.g., provided in a local DM cache, which is checked prior to attempting to complete the call; 2) Destination Address Screening for providing a similar type of security by allowing subscribers to prevent calls from being delivered to destinations. This feature is used in a similar manner as source screening to protect the integrity of a private network with customers using this feature to provide secure access to a particular destination within their network. With this type of screening, a destination is associated with either an exclusion or inclusion list and these lists may be checked before allowing a call to be presented to that destination; 3) Closed User Groups for defining a virtual private data network for customers. Calls placed from within the closed user group may only be connected to destinations that are also within the closed user group.

Additionally NGIN supports ATM call center capability including, but not limited to the following call center applications: 1) Time of day routing wherein the address specified (either E.164 or as an ATM end System Address format) in the "Setup" or "Add Party" signaling message may be modified to a different address depending upon the time of day that call was placed; 2) Day of week routing wherein the address specified (e.g., in E.164 or as an ATM end System Address format) in the "Setup" or "Add Party" signaling message may be modified to a different address depending upon day of the week that call was placed; 3) Percentage allocation wherein the address specified in the "Setup" or "Add Party" signaling message may be modified to a different address depending upon the percentage of calls that are allocated to go to that address; 4) Contingency routing plans wherein an alternate ATM routing plan may be defined by the customer to be used in the event of a major change in the availability of call center resources at a particular destination. For example, a customer may have a normal routing plan that does time of day routing, day of week routing and percentage allocation routing to three call centers. If one of those centers is shut down unexpectedly, the customer may have elected to define an alternate routing plan that accounted for the situation; 5) Point of origin routing wherein the address specified in the Setup or Add Party signaling message may be modified to a different address depending upon point of origin for the call; 6) Call parking wherein when the address specified in the Setup or Add Party signaling message (e.g., E.164 or as an ATM end System Address format) is currently unavailable, the network may need to park the call until the destination becomes available or a time limit for the park expires. If the destination becomes available, the call setup will proceed. If the destination does not become available before the expiration of the park, the call may be dropped or sent to an alternate destination; 7) Routing based upon settings in the AAL parameters wherein the Setup and Add Party signaling messages allow the specification of user defined parameters. It may be possible to use these parameters to specify a particular type of destination. For example, if the caller dials a well known number for a video operator, they might be able to specify a need for a Spanish speaking operator, for instance.

Additionally NGIN supports ATM one number services capability including: 1) Find me/Follow me wherein given an address that is assigned to a particular subscriber, that subscriber may change the destination associated with that address. The feature that would be provided with this capability enables a subscriber to receive calls as they move locations; and, 2) Alternate routing wherein if a destination is unavailable, it is possible to specify an alternate destination.

Billing services are additionally supported including the use of the ATM Adaptation Parameters enabling the specification of an account code to which a call should be charged; and, subscription control for quality of service which feature allows for the enforcement of subscription levels for subscribers. That is, if a subscriber signs up with an ATM network provider, they may pay a charge associated with a particular quality of service. When a Setup or Add Party message is sent from that subscriber, the quality of service parameters associated with that message are verified against the subscription for that subscriber; and, Source address validation which feature provides verification that the source address specified in a Setup or Add Party message is correct and is authorized for use on the incoming port. This provides for the assurance that the billed party is actually the one making the call.

Figure 31B:
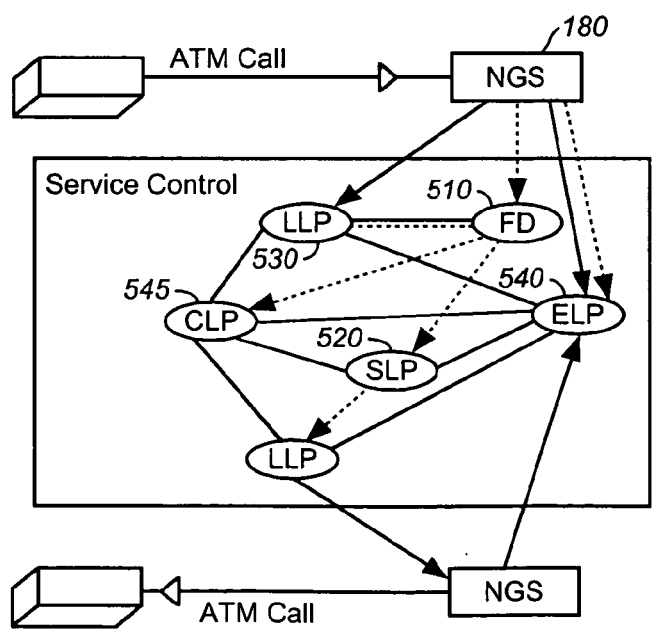
FIG. 31(b) illustrates an ATM/Vnet call processing scenario as serviced by NGIN; and, FIGS. 32(a)–32(g) depict a flow diagram illustrating a basic ATM/Vnet call service processes implemented in NGIN.

In the context of ATM Vnet services ("ATM/Vnet"), a processing and service utilization scenario is now described for exemplary purposes, with reference to the functional flow diagrams of FIGS. 32(a)–32(g). First, as shown in FIG. 31(b), an ATM/Vnet call event first arrives at the NGS switch fabric of the NGS 180. When the NGS 180 receives a call, the bearer control component provides the call control component with the access line on which the call was received, as well as the Vnet #, ANI, line ID, Network Call ID, originating switch trunk, and other data needed for call processing. The NGS Call control maintains a state model for the call, as executed in accordance with its programmed logic. Additionally included in the state model are triggers for instantiating the ELP 540 and sending a service request to a FD 510 as shown in FIG. 31(b). To instantiate an ELP, the NGS call control component addresses a message to NNOS, using a logical name for an ELP as described herein. The NNOS, in response, sends a message to a Service Manager object to instantiate an ELP within a SLEE and returns an object reference for that ELP back to call control. The NGS call control component includes this object reference in a service request message that is sent to an FD in the SLEE. Thus, all qualified event data that are generated for the call by any process are written to the instantiated ELP process. Particularly, the service request message is addressed to a logical name for FD; this logical name is translated by the NNOS NT component to a physical address for an FD logic program that is running at the same service node on which the call was received. Included in the service request message is the Vnet #, ANI, and other data.

Next, the FD uses its feature discrimination table to identify which SLP is to handle the received service request. For the example Vnet service request, it is to be handled by the ATM_Vnet_SLP. The table below is an example abbreviated FD table having entries including pointers to various "Vnet" call services.

Entry Port Table
    A001001" SLP pointer 'ATM_Vnet'
    A001002" Table pointer to FGD table
    FGD table
        Vnet1* table pointer Vnet1 table
        Vnet2* table pointer Vnet2 table
        Vnet3* table pointer Vnet3 table
    Vnet1 table
        Vnet SLP pointer to 'ATM_Vnet_SLP' where FGD is the feature group discriminator. Particularly, based on where the call originated in the network (switchboard) and the type of call received, the FD will determine an appropriate SLP logical name in the manner as described herein. For instance, the identification A001002" indicates receipt of a call requiring a look-up in the FGD table (pointer to FGD table). The FGD table in turn, maintains pointers to other tables depending upon the called number, e.g., Vnet* where '*' is a delimeter. From this Vnet table, for example, the FD obtains a pointer to the requested SLP logical name which is to be invoked and, the service request is handed off to NNOS which instantiates a CLP 545, LLPO 530 and the SLP 520 objects according to the ATM/Vnet service requested. It should be understood that instantiation of these objects requires implementation of the NNOS LRM function which determines the best available instance based on the variety of factors as discussed, e.g., local SLEE loads. For instance, with respect to the LLPO, a logical name for the LLPO is provided to NNOS based on the bearer control line on which the call was received. Identification of this line is based on either the ANI or the access line identified by the NGS bearer control component. The ANI identifies the original access line that originated the call, which may or may not be the same access line on which NGS receives the call, i.e., the received call may have originated on a local network, for example, and passed to switch fabric on an inter-exchange carrier network. Therefore, features associated with a line, such as call waiting or call interrupt, may be identified by the ANI. The NNOS translates the logical name for the LLPO to a physical address for an LLPO instantiation. While other logic programs (such as SLPs) may be instantiated at other sites, the LLPs are instantiated at the site at which their associated lines are. Once instantiated, the LLPO queries Data Management for features associated with the line, maintains the state of the originating line, and will invoke any features such as call waiting or overflow routing when those features are invoked by the caller (i.e., call waiting) or network (i.e., overflow routing). In the ATM/Vnet context, the LLP may request from the DM whether the line is able to handle ATM calls with the specified bandwidth.

The NOS receives a service request hand-off request from the feature discriminator containing the logical name representing the particular service to be invoked, e.g., ATM_Vnet. The NOS identifies that the request contains a logical name and looks in its instance tables (not shown) to determine whether it has any SLP processes available to service this service request. It also identifies through the NNOS LRM function which instance of the requested type to use. Thus, NOS sends a request to the Service Manager object running on a Service Control SLEE to invoke the requested Vnet service if it has not already been instantiated. In the preferred embodiment, NNOS selects the SLP from a Service Control server that received the original incoming service request notification from the NGS, however, it is understood that NNOS could select the SLP in any service control component through implementation of the NOS LRM function. The NOS then determines whether the selected SLP is already instantiated and if the selected SLP is not already instantiated, will direct the SM to instantiate the SLP object, including an ATM_Vnet service agent object which initiates a thread. Otherwise, if the selected SLP is already instantiated, the thread manager assigns a new process thread to the SLP object. The instantiated ATM_Vnet SLP then registers its physical address with the NOS, and that the NOS allocates this SLP to the service request. Then, the NOS passes the service request hand-off message to the new ATM/Vnet SLP instance. Included in the service request hand-off message is the pertinent Initial Address Message ("IAM") information, including information such as: the time that the service request is initiated; the Switch ID that the request is originated from; the Port ID that the call is originated; the terminal equipment ID that the call is originated; the calling party's number; and the called party's number. Additionally included in the IAM message may be the requested ATM setup parameters including: the requested class of service, bandwidth, and ATM Quality of Service (QoS) parameters, etc. This information is used to determine if the ATM/Vnet call may be routed based on the state of the network and the subscriber's user profile. In addition to receiving the IAM message, the NNOS sends to the instantiated CLP all service related data, including object references for the instantiated SLP, ELP, and LLPO objects. Object references for the CLP and ELP are also provided to the LLPO and the (ATM/Vnet) SLP, so that the LLPO and the SLP may interface with the CLP and the ELP. Finally, as indicated at step 154, the ATM/Vnet SLP then begins processing the call in accordance with its programmed logic.

Figure 32A:
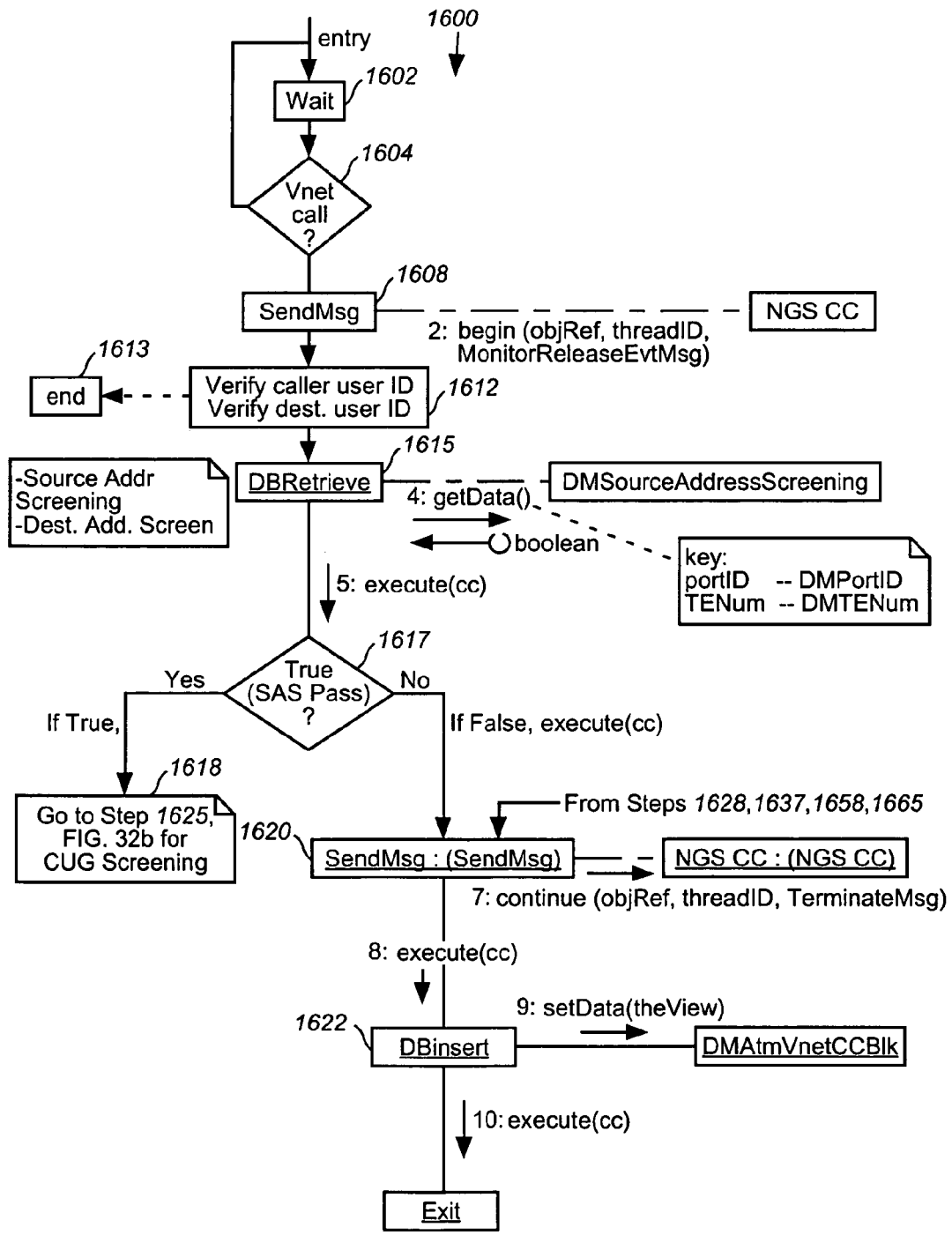
Figure 32B:
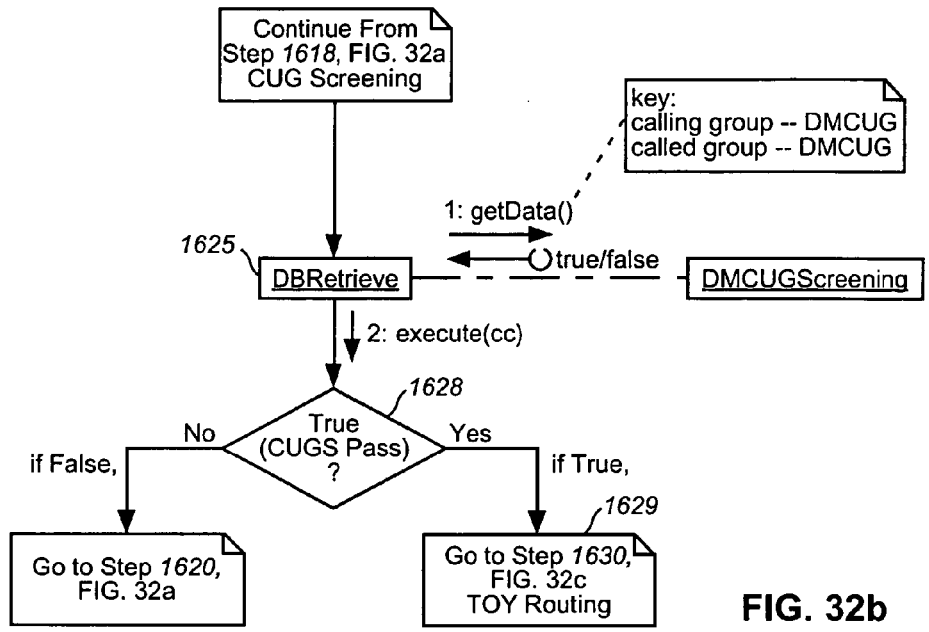
Figure 32C:
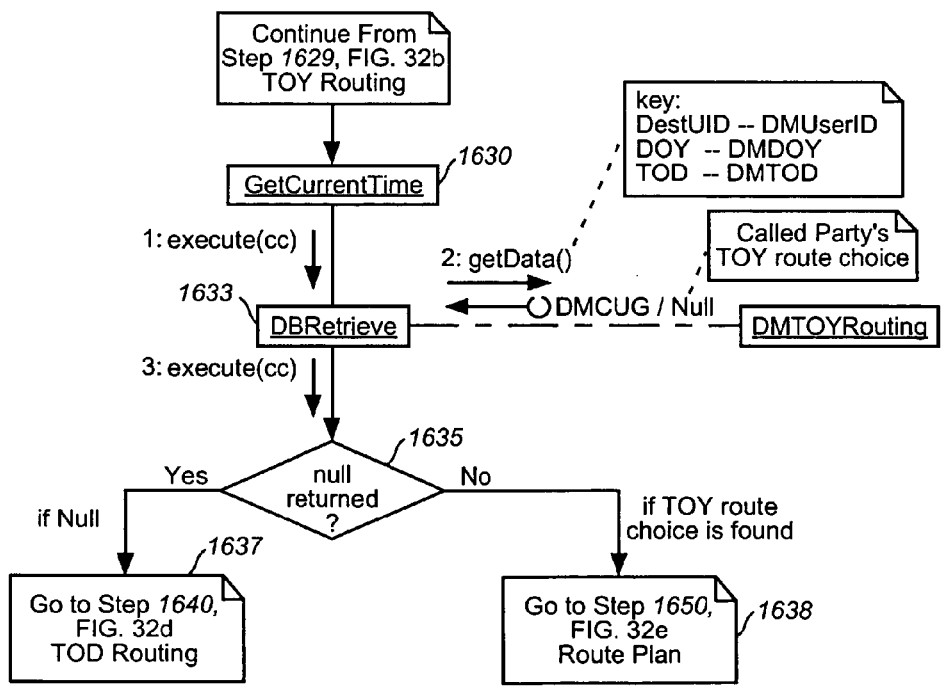
Figure 32D:
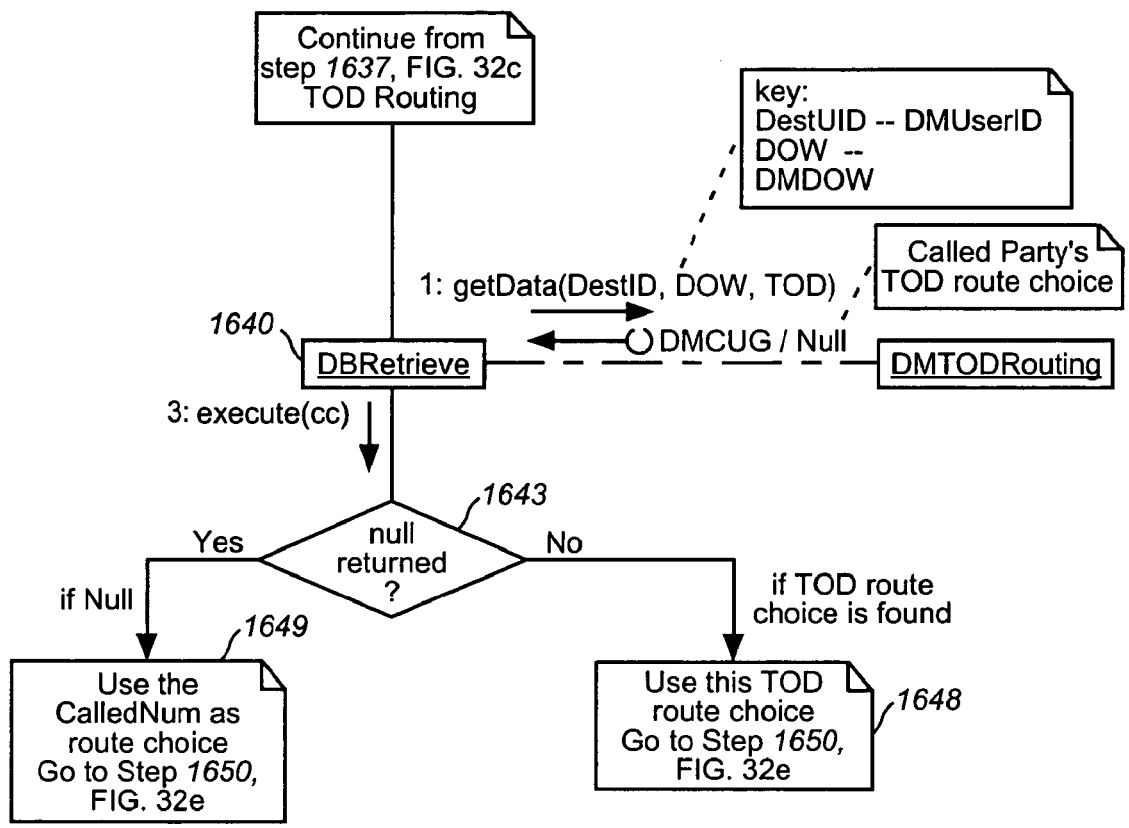
Figure 32E:
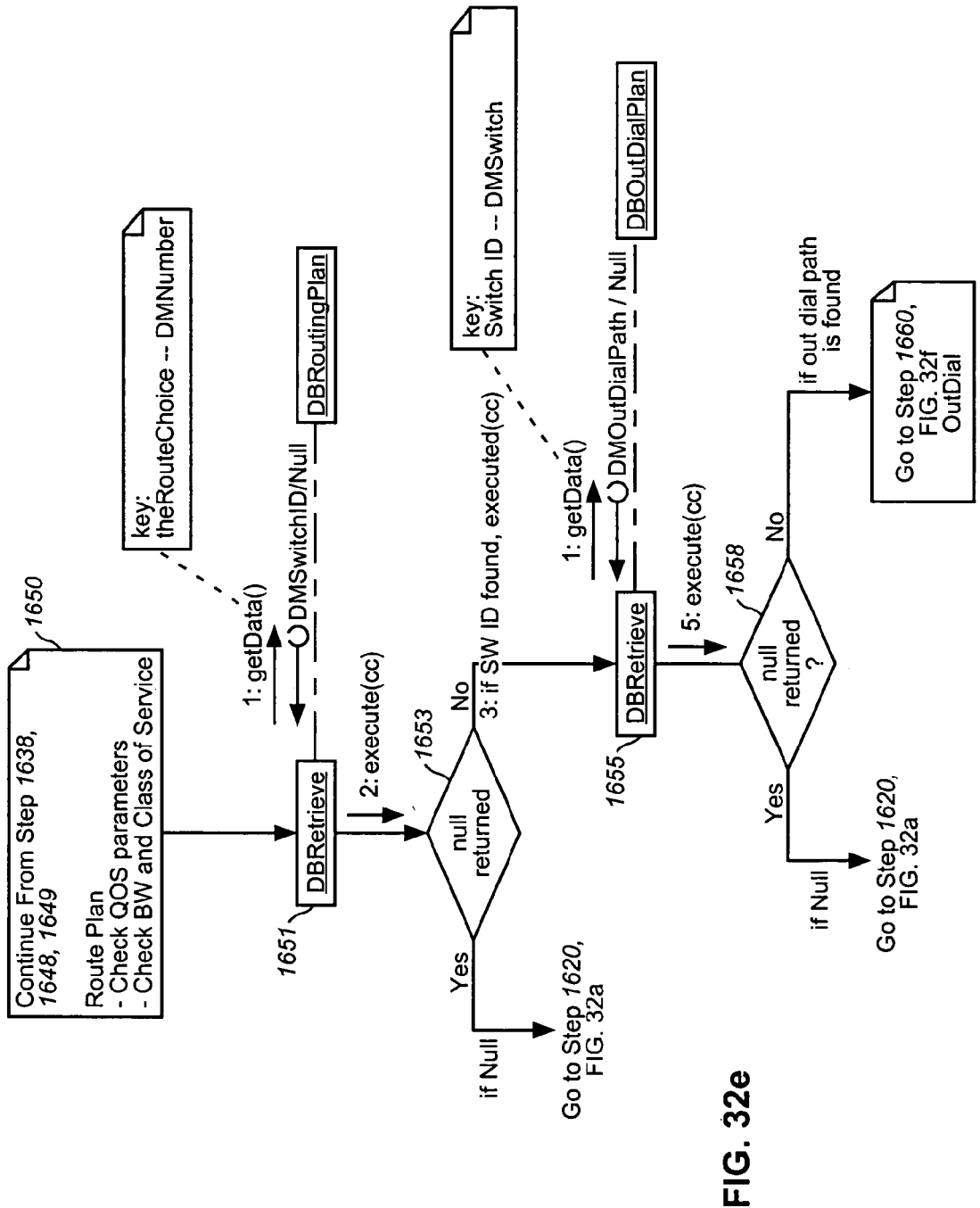
Figure 32F:
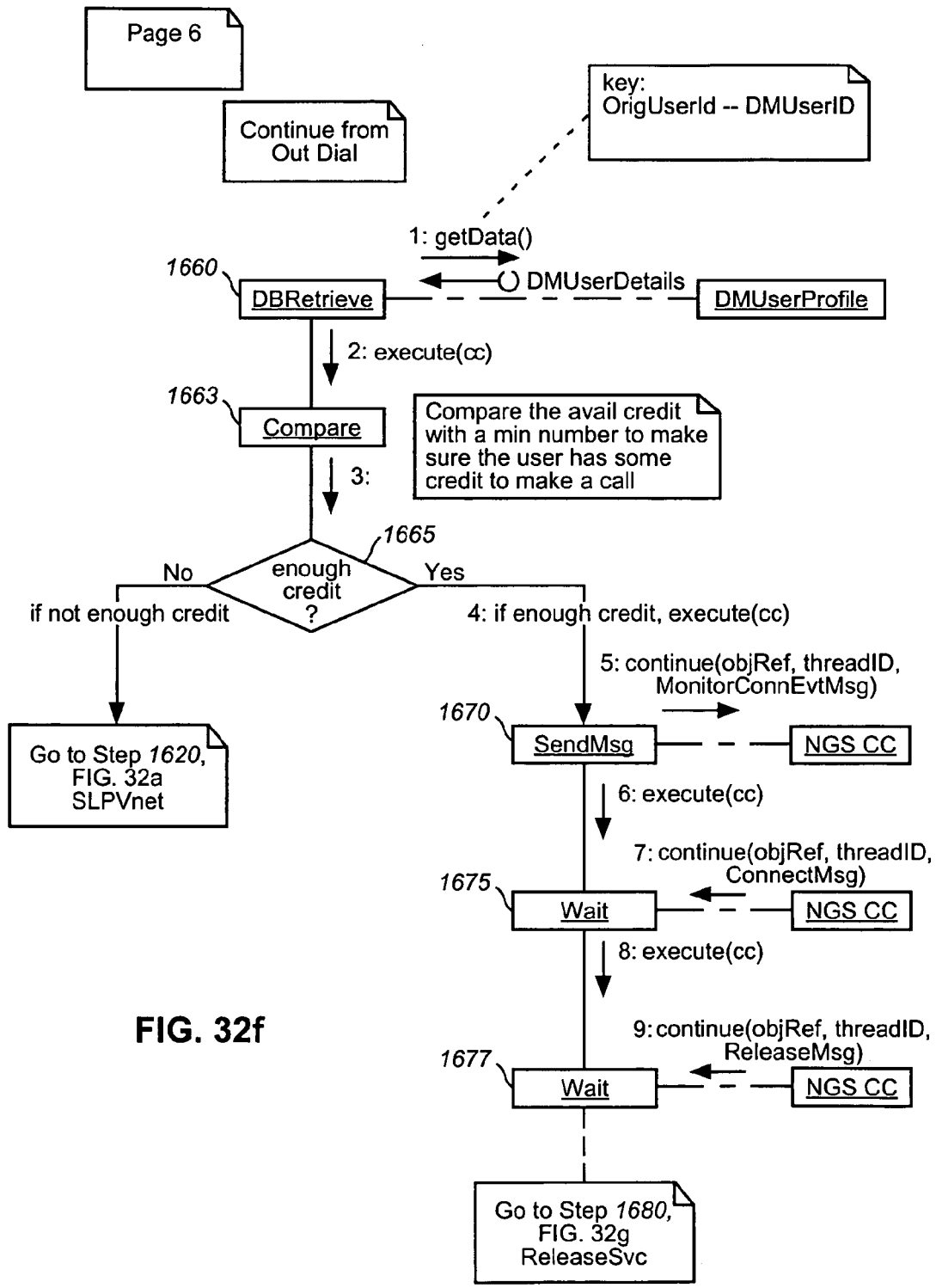
Figure 32G:
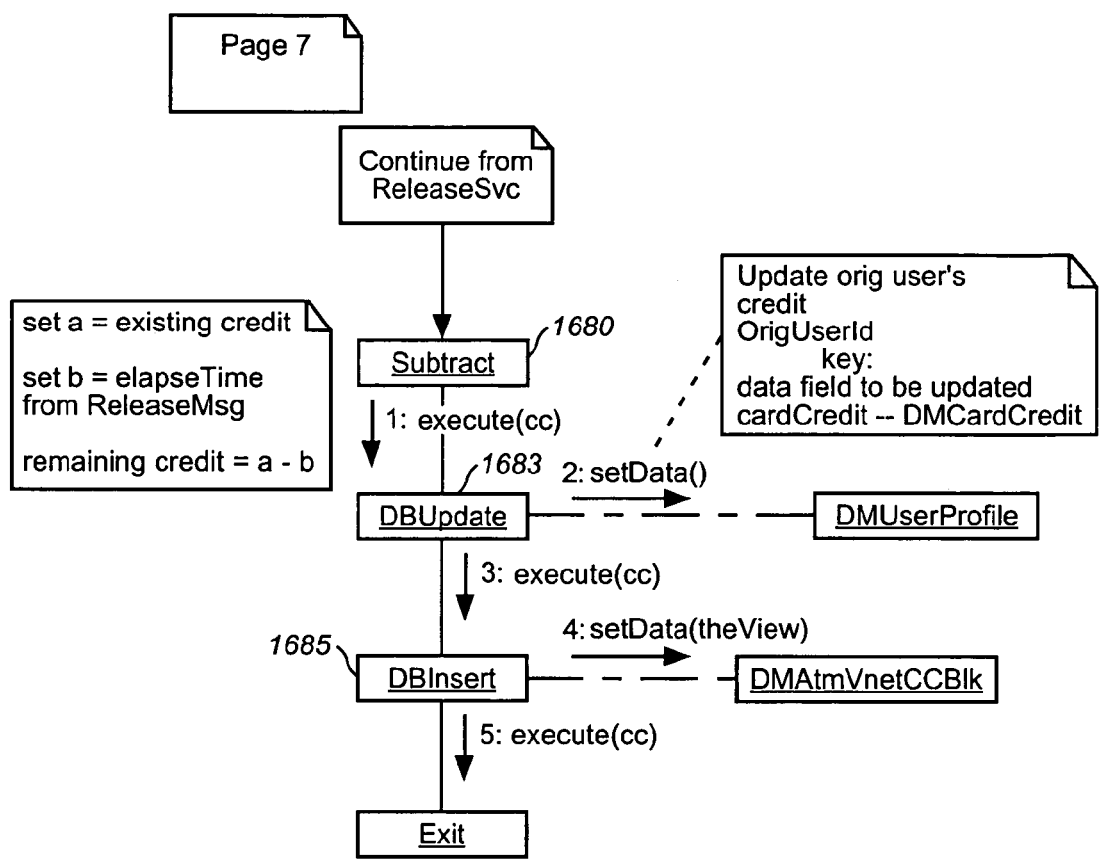

In the context of the ATM/Vnet call, the ATM/Vnet SLP 520 preferably queries and obtains the necessary data from one or more ATM/Vnet databases (not shown) to make an appropriate decision. As shown in FIGS. 32(c)–32(g), the ATM/Vnet SLP 520 invokes the following steps:

Assuming an ATM_Vnet_SLP service thread 1600 has already been instantiated, the first step 1602 in FIG. 32(a) is to remain idle until a Vnet service request event message is received either from the FD or directly from NGS, and, at step 1604, to determine whether a received call is a Vnet call. As described, a (ServiceRequestEvent) class is instantiated having methods responsible for conveying an initial service request from NGS to NGIN. Preferably, a SIBBWait-.java class (SIBB), is invoked to wait for the ATM/Vnet call and to extract information from a service request event into a call context object associated with the Vnet call instance, when it is received. Preferably, the call context object implements put( ), get( ), and remove( ) instance methods for manipulating key-value pairs in a hashtable array for storing information relating to a particular call.

Next, as indicated at step 1608, once a message relating to the ATM/Vnet call is received, the SLP Vnet process sends a MonitorReleaseEvent message to the NGS along with a call identifier, e.g., thread id and SLP object reference. This may be accomplished by invoking a SIBBSendMsg-.java (SIBB), which may be used by SLPs to communicate messages. Particularly, the MonitorReleaseEvent message is a public class extending base class NGINEvent and is used to inform the NGS that if it should receive a release indication, e.g., from the call originator, it should be forwarded to NGIN.

Then, as indicated at step 1612, a determination of the originating Vnet user id is made. This entails invoking a SIBBDBR.java (SIBB), to perform a database query for verifying whether there is an originating user ID associated with the calling number. If there is no originating user ID associated with the calling number, then the process terminates, as indicated at step 1613 and an appropriate message is sent to NGS that the originating user ID was not found. If the originating user ID is found, then a similar process is invoked to determine the destination user ID. If the destination user id is not found, then the appropriate indication is sent to NGS that the destination user ID was not found and that the call should be terminated, as indicated at step 1613.

If the destination user id is found, then a source address screening ("SAS") function is performed, as indicated at step 1615, FIG. 32(a). Particularly, the ATM_Vnet SLP initiates a database query to validate the source address and, to verify that the ATM setup message parameters fall within the limits of the customer=s subscription. To accomplish this, the source address screening procedure is invoked via the SIBBDBR.java method to return a boolean indicator verifying whether the portID and terminal equipment ID of the originating call message corresponds to the proper user ID. This is performed to prevent transfer of data in the Vnet network by unauthorized callers. Implementation of the SIBBDBR.java method to provide source address screening includes the following steps: 1) the ATM_Vnet SLP requests the Source Address database name from NNOS NT; 2) NNOS NT requests the actual Source Address database name from DM; 3) DM sends the actual Source Address database name and its stored locations to NNOS NT; 4) NT queries the LRM function to find out if the Source Address database is available locally and the NNOS LRM returns the physical database address to NT; 5) NNOS NT passes the Source Address database physical address to the ATM_Vnet SLP; 6) the ATM_Vnet SLP queries DM to determine if the Source Address is valid and if the specified bandwidth in the setup message matches the customer's subscription. It is assumed that the setup message parameters (e.g., bandwidth) are validated against the customer's subscription versus the current network utilization. Finally, the DM returns a boolean response to the ATM_Vnet SLP query.

As shown in FIG. 32(*a*), step 1617, if a false is returned, i.e., SAS test fails, then the process terminates. As indicated at step 1620, this involves sending a terminate message (TerminatEvent.java) to the NGS via the SIBBSendMsg-.java to initiate the tear down connection process. At this point, any accumulated call context data pertaining to this call is stored in the call context object or database for subsequent use, as indicated at step 1622, and the process terminates. It should be understood that, at various times throughout the ATM_Vnet_SLP process, as indicated in FIGS. 32(*a*)–32(*f*), call context data is written to a call context object, e.g., the instantiated ELP, and/or a database structure so that a proper call record is maintained, as indicated by the "execute(cc)" call. As indicated at step 1622, a SIBBDBInsert.java (SIBB) is executed to allocate storage in the DM (database) and write to the database the call context data accumulated for the call.

If the SAS is successful and a boolean true value is returned as determined at step 1617, then, at step 1618, FIG. 32(*a*), the ATM_Vnet_SLP performs a Closed User Group screening ("CUGS") procedure to verify whether the originating user ID may place the call to the called destination. Instead of or prior to performing CUG screening, it should be understood that a Destination Address Screening may be performed for verifying that the destination address is a valid termination for the originator of the call.

As depicted in FIG. 32(*b*) the CUGS process includes a first step 1625 for performing a database query in the DMCUGScreening database by implementing SIBBD-BR.java. As a result of the query, a boolean result is returned indicating that the caller ID is part of a calling group having authorization to call the destination which is part of a called group. Thus, at step 1628 a determination is made as to whether the boolean result returned is true indicating that the CUGS is successful. If the step is not successful, i.e., fails CUGS test, then the process returns to step 1620, FIG. 32(*c*), to perform the termination procedure including sending a message to NGS via the SIBBSendMsg.java to initiate the tear down connection process and, writing the accumulated call context data to the allocated database structure.

If the CUGS is successful, and a true is returned at step 1628, then, at step 1629, FIG. 32(*b*), the Vnet SLP performs a Time of Year Routing (TOYRouting") procedure to obtain the routing plan choice depending upon the current time the call is placed.

As depicted in FIG. 32(*c*), the TOYRouting process includes a first step 1630 of obtaining the current time which includes invoking a SIBBGetTime.java class, to obtain the current time from the NOS service. Then, as indicated at step 1633, a database query is performed in a TOY Routing database using the Destination UserID, the current time of day and time of year values by invoking the SIBBDBR.java class to retrieve the called party=s preferred routing choice or, a null indication, indicating no routing preference. Thus, at step 1635, a determination is made as to whether the result returned is null indicating no called party TOY routing preference. If there is a preference, then the route choice associated with the route plan is implemented, as indicated at step 1638.

It should be understood that, in the context of an ATM to ATM call, no number translation need be performed. For other types of Vnet calls, however, if a number translation is required, the ATM_Vnet process requests that NNOS return an object reference to the Vnet number translation database provided by DM. Once the SLP receives the location of the database, a database query is performed to lookup the physical address associated with the logical destination Vnet number and DM returns the physical address. Accordingly, a terminating profile is used to determine if the destination address can handle ATM and the specified bandwidth. The Vnet number translation may then be written to the ELP instance for placement in DM=s allocated call context database.

Returning back to FIG. 32(*c*), if, at step 1635, if a null is returned indicating no preferred TOYRouting route choice, then the process continues at step 1637, FIG. 32(*c*), where the ATM_Vnet SLP performs a Time of Day Routing ("TODRouting") procedure to obtain the routing plan choice depending upon the current time the call is placed.

As depicted in FIG. 32(*d*), the TODRouting process includes a first step 1640 of performing a database query in a TOY Routing database using the Destination UserID, the current day of week and time of day values as keys and invoking the SIBBDBR.java class to retrieve the called party=s preferred routing choice or, a null indication, indicating no routing preference. Thus, at step 1643 a determination is made as to whether the result returned is null indicating no called party TOD routing preference. If there is a preference (no null returned), then the TOD route choice associated with the route plan is implemented, as indicated at step 1648, FIG. 32(*d*).

If, at step 1643, it is determined that there is no TODRouting route choice returned, then the process continues at step 1649, FIG. 32(*d*), where the ATM_Vnet SLP initiates routing of the call based on the called number.

Referring now to steps 1648 and 1649, FIG. 32(*d*), once a route choice is ascertained, the ATM_Vnet_SLP performs a process for determining which switch the call should be sent to based on the routing choice. Thus, as depicted in FIG. 32(*e*), the next step 1651 is to perform a database query in a routing plan database using the route choice as a key and invoking the SIBBDBR.java class to retrieve the called party=s preferred routing plan, in the form of a Switch ID, or a null indication, indicating no Switch ID found. Then, at step 1653 a determination is made as to whether the result returned result indicates a switch ID found and that the call may be routed. If there is no switch ID found, the process proceeds to step 1620, FIG. 32(*a*) to send a message to NGS via the SIBBSendMsg.java to initiate the tear down connection process and writing the accumulated call context data to the call context object and/or database structure.

If, at step 1653, a switch ID is returned, then the process continues to step 1655, to determine an Outdial path, i.e., a trunk ID associated with the switch and the routing plan choice. Thus, in FIG. 32(*e*), the next step 1655 performs a database query in an Outdial Plan database using the Switch ID as a key and invoking the SIBBDBR.java class to retrieve the outgoing trunk from the switch, or a null indication, indicating no trunk is available. Then, at step 1658 a determination is made as to whether the returned result indicates an outgoing trunk found and that the call may be routed.

If at step 1658 it is determined that there is no outgoing trunk found, the process proceeds to step 1620, FIG. 32(*a*) to send a message to NGS via the SIBBSendMsg.java to initiate the tear down connection process and write the accumulated call context data to the call context object and/or database structure.

If, at step 1658, if a trunk is returned, i.e., an outdial path found, then the process continues at step 1660, FIG. 32(*f*), where the Vnet SLP queries the user profile of the calling party.

As depicted in FIG. 32(*f*), step 1660, a database query in a User Profile database is performed using the Originating User ID as a key and invoking the SIBBDBR.java class to retrieve the user profile details. Then, at step 1663, a comparison is made to determine if the user has enough available credit for a minimum call time. To make this comparison, a SIBBCompareInt.java class is invoked to compare the user credit line detail with the minimum amount of cost for establishing the ATM/Vnet call. Next, at step 1665, if it is determined that there is not enough credit to forward the call, the process proceeds to step 1620, FIG. 32(*a*), to send a message to NGS via the SIBBSendMsg.java to initiate the tear down connection process and write the accumulated call context data to the call context object and/or database structure.

If, at step 1665, it is determined that there is enough available credit, then the process continues at step 1670 where the Vnet SLP process sends a MonitorConnectEvent message to the NGS along with a call identifier, e.g., thread id and object reference. This may be sent via a SIBBSendMsg.java (SIBB) used by SLPs for communicating messages. Particularly, the Vnet SLP performs an outdial request with a handoff command to the associated call logic program, including the termination address, so that the Vnet call may be routed to its destination. Additionally, the call MonitorConnectEvent message is a public class extending base class NGINEvent and is used to inform the NGS that if it should receive a connect message, it should send an event to NGIN.

Thus, as indicated at step 1675, FIG. 32(*f*), a wait process is performed until NGS receives its indication that the Vnet call has been placed. A new instance of the SIBBWait.java class (SIBB) is performed at this step to wait for a connect event. Once the Vnet call connection has been established, as indicated at step 1675, the NGS sends a ConnectEvent message back to NGIN for the ATM_Vnet SLP thread instance identified by the returned object reference and thread ID. The parties to the call have been verified and connected at this point, and the ATM_Vnet process now waits for an eventual release event, as indicated at step 1677. Preferably, the Release service is used to report the release event which may be caused when either the calling or called party terminates the call or, if user credit is run out. The ReleaseEvent relies on NNOS services for determining the time a release event is generated, and implements methods for determining the cause of the generating event and, the determining the amount of time elapsed from call connection to the release event. This information is returned with the Release service message.

Once a release service message has been received at step 1677, the process continues to step 1680, FIG. 32(*g*), where a process for subtracting the cost "b" relating to the elapsed time returned from the ReleaseMessage, from the existing user credit "a" established at step 1663, FIG. 32(*f*), is performed. This entails invoking a SIBBSubtract.java class (SIBB) to perform the subtraction. Once the subtraction is performed, a user profile database update is performed at step 1683 to update the users credit in light of the subtraction due to the placed Vnet call. This entails invoking the SIBBDBR.java class (SIBB) using the originating user ID as a key to set the updated data in the User Profile database. Then, as indicated at step 1685, FIG. 32(*g*), prior to terminating the ATM_Vnet SLP, the process may additionally write accumulated call context data to the allocated call context database by invoking the SIBBDBInsert.java class.

Thereafter, the procedure entails sending the routing response information to the ELP 510 for placement in call context data, e.g., stored in DM; and, sending an outdial request with handoff command to the CLP 545 including the routing information. In this scenario, the terminating node may be remote, in which case it would be necessary to instantiate the terminating LLP on the remote node and performing a profile look-up to determine any features on the terminating line.

More particularly, an outdial/handoff procedure is implemented which requires the CLP 545 to send the outdial with the handoff command to the LLPO (originating line) which is forwarded to a NNOS agent at the call switch, which routes the Vnet call to the terminating node. The ELP process then writes the outdial call context data to DM.

Finally, Call Control then executes the instructions which may involve instructing NGS switch to set up and complete the call to a network termination. When the call has completed (i.e., when both parties have disconnected), the LLPs receive a call completion notification from the NNOS component at the switch and forwards the call completion notification to the CLP. The CLP forwards the call completion notification to the associated LLPs and ELP and are killed as triggered by the CLP notification. Prior to its termination, the ELP call detail data which needs to be maintained after the call completes, e.g., for billing and various other purposes, may first be stored. For instance, in the case of the ATM_Vnet service, the NGS switch writes packet count data to the ELP for billing purposes.

In addition to the foregoing, NGIN is capable of supporting the following functional requirements relating to ATM/Vnet service including, but not limited to: 1) the ability for national and international dialed VNET numbers to be screened; 2) the ability to translate VNET dialed number digits to a format (such as outpulse digits) that an NGS switch will understand, in order to support national or international DAL and Direct Distance Dialing (DDD) terminations; 3) the ability to allow international VNET calls to have a predetermined format including, for example, three (3) digits for identifying the country and the seven (7) digits indicating the private network number; 4) the capability to change the termination address obtained from the originating party and reroute the call to an alternate termination (Call Rerouting/Alternate Routing). The alternate termination may be a NANP DDD number, a Vnet termination, a mobile phone number, an international termination number IDDD, an ACD or a voice/fax mail system, etc. and any change made may be transparent to the calling party if necessary; 5) providing NXX Exchange Routing involving the use of the exchange code, and the Area ID (retrieved by using the customers NXX Exchange routing plan id), instead of the normal geographic lookup information, when performing termination translation; 6) providing the ability for VNET calls to be screened at the corporate, network, or access (originating switch, carrier) levels (Range Privilege Screening); 7) the ability to provide Remote Access to VNET, i.e., to designate 800, 900, and global freephone numbers for remote access to VNET. When such a number is dialed, a VNET dial tone is provided, as well as the nature of permissible VNET addresses, and how many supplementary digits to collect; 8) ability to provide a Route Data Calls capability, i.e., the ability for customers to order all digital routing for their VNET service. A digital route indicator (uses switch 56 path) is sent to the switch along with the route translation; 9) the support of private dialing plans of any business or residential customer. Currently, VNET customers may create their own network dialing plans, e.g., 4–12 digit national numbers dialing plans, and 7–15 digit international dialing plans may be defined; 10) the ability to perform VNET Card Validation, e.g., via an ADF message; 11) the ability to perform a Vnet work at home voice services, i.e., employees who work at home may be assigned a business number to their home phone. When they make business phone calls, they may use the Vnet service by dialing a *feature code prior to the Vnet number. The NGIN Vnet SLP accesses the Vnet dialing plan of the customer; translates the number to the Vnet termination; and charges the call to the Vnet business customer automatically. When an incoming call is received, a distinctive ringing may be applied to alert the user of a business call; and, 12) the capability to deactivate VNET cards and enable a user to deactivate VNET cards.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

An additional example is the "Java" programming language can be replaced with other equivalent programming languages that have similar characteristics and will perform similar functions as required to implement the invention.

The usage herein of these terms, as well as the other terms, is not meant to limit the invention to these terms alone. The terms used can be interchanged with others that are synonymous and/or refer to equivalent things. Words of inclusion are to be interpreted as non-exhaustive in considering the scope of the invention. It should also be understood that various embodiments of the invention can employ or be embodied in hardware, software or microcoded firmware.

While the present invention has been disclosed and discussed in connection with the above-described embodiment, it will be apparent to those skilled in the art that numerous changes, variations and modifications within the spirit and scope of the invention are possible. Accordingly, it is, therefore, intended that the following claims shall encompass such variations and modifications.

What is claimed is:

1. An apparatus for deploying services on a service node in a telecommunications network, comprising:
   a first component configured to:
      receive customer order data, and
      generate a request for a service object based on the customer order data; and
   a second component coupled to the first component, the second component configured to:
      receive the request for a service object from the first component, and
      create a first service object based on the request for a service object;
   wherein the apparatus is configured to send the first service object to a first service node.

2. The apparatus of claim 1, further comprising the first service node, wherein the first service node is coupled to the first component and is configured to:
   deploy a telecommunications service based on the first service object.

3. The apparatus of claim 2, wherein the first service node includes a data management component configured to implement the first service object.

4. The apparatus of claim 2, wherein the first service node includes a resource manager coupled to the first component, the resource manager configured to specify types of service objects supported by the first service node.

5. The apparatus of claim 2, wherein the first service node includes a service execution environment for implementing a service based on the first service object.

6. The apparatus of claim 2, wherein the first service node includes a service node communication component configured to communicate with a second service node.

7. The apparatus of claim 6, wherein the service node communication component is configured to transmit an availability of the first service object at the first service node to the second service node.

8. The apparatus of claim 2, wherein the first service node includes a resource complex, the resource complex including a switch fabric.

9. The apparatus of claim 1, wherein the second component includes a repository of service components that include service objects.

10. The apparatus of claim 1, further comprising a system coupled to the first component, the system configured to generate the customer order data and send the customer order data to the first component.

11. The apparatus of claim 1 wherein the first component includes an interface device for receiving service node resource capacity information.

12. The apparatus of claim 1, wherein the first component includes a trigger mechanism configured to initiate activation of the first service object received by the first service node.

13. An apparatus for deploying services in a telecommunications network, comprising:
   a first component configured to:
      receive customer order data, and
      generate a request for a service object based on the customer order data;
   a second component coupled to the first component, the second component configured to:
      receive the request for a service object, and
      create a first service object based on the received request; and
   a first service node coupled to the first component, the first service node configured to:
      receive the first service object, and
      deploy a telecommunications service based on the first service object.

14. The apparatus of claim 13, further comprising a system coupled to the first component, the system configured to generate the customer order data and send the customer order data to the first component.

15. The apparatus of claim 13, wherein the first service node includes a resource manager configured to specify types of service objects supported by the first service node.

16. The apparatus of claim 13, wherein the first service node includes a service execution environment for implementing a service based on the first service object.

17. The apparatus of claim 13, wherein the first service node includes a service node communication component configured to communicate with a second service node and the service node communication component is configured to transmit an availability of the first service object at the first service node to the second service node.

18. The apparatus of claim 13, wherein the first component includes an interface device for receiving service node physical resource capacity information.

19. The apparatus of claim 13, wherein the first component includes a trigger mechanism configured to initiate activation of the first service object received by the first service node.

20. The apparatus of claim 13, wherein the first service node includes an intelligent call processor.

21. The apparatus of claim 13, wherein the first service node includes a resource complex, the resource complex including an intelligent peripheral.

22. A method for deploying services in a telecommunications network, comprising:
receiving customer order data;
generating a request for a service object based on the customer order data;
creating a first service object based on the request; and
sending the first service object to a first service node.

23. The method of claim 22, further comprising:
deploying a telecommunications service at the first service node based on the first service object.

24. The method of claim 23, wherein the deploying a telecommunications service includes implementing the first service object at the first service node.

25. The method of claim 22, further comprising:
receiving information specifying types of service objects supported by the first service node.

26. The method of claim 22, further comprising:
transmitting, from the first service node, an availability of the first service object at the first service node to a second service node.

27. The method of claim 22, further comprising:
generating the customer order data.

28. The method of claim 22, further comprising:
initiating activation of the first service object received by the first service node based on a trigger event.

29. A system, comprising:
a memory configured to store at least one object associated with a service in a telecommunications network;
a first component configured to distribute a first one of the at least one object stored in the memory; and
a first node configured to:
receive the first object distributed from the first component,
execute the first object to perform the service, and
transmit an availability of the first object to at least one other node.

30. The system of claim 29, wherein the first component is further configured to:
receive customer data,
generate a request for an object based on the received customer data; the system further comprising:
a second component configured to:
receive the request from the first component,
generate the first object based on the request, and
forward the first object to the first component.

* * * * *